United States Patent
Zhong et al.

(12) 
(10) Patent No.: US 12,288,086 B2
(45) Date of Patent: Apr. 29, 2025

(54) APPLICATION INTERFACE LAYOUT METHOD AND ELECTRONIC DEVICE

(71) Applicant: Huawei Technologies Co., Ltd., Shenzhen (CN)

(72) Inventors: Wei Zhong, Shanghai (CN); Yang Li, Shanghai (CN); Zhang Gao, Shanghai (CN); Longjiao Xin, Shanghai (CN); Qichao Yang, Shanghai (CN); Bo Tang, Shanghai (CN); Tong Jiao, Shanghai (CN); Xiaoxiao Chen, Nanjing (CN); Jun Zhu, Guangdong (CN); Letian Liu, Shanghai (CN); Duoxian Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 122 days.

(21) Appl. No.: 18/191,378

(22) Filed: Mar. 28, 2023

(65) Prior Publication Data
US 2023/0281025 A1    Sep. 7, 2023

Related U.S. Application Data

(63) Continuation of application No. PCT/CN2021/118570, filed on Sep. 15, 2021.

(30) Foreign Application Priority Data

Sep. 29, 2020  (CN) .......................... 202011058008.5
Oct. 16, 2020  (CN) .......................... 202011110788.3
(Continued)

(51) Int. Cl.
G06F 9/451      (2018.01)
G06F 8/61       (2018.01)

(52) U.S. Cl.
CPC ................ *G06F 9/451* (2018.02); *G06F 8/61* (2013.01)

(58) Field of Classification Search
CPC ...................................................... G06F 9/451
See application file for complete search history.

(56) References Cited

U.S. PATENT DOCUMENTS 9,513,783 B1 * 12/2016 Vaidya .................. G06F 3/0484
2014/0096009 A1   4/2014 Grosz et al.
2014/0282055 A1   9/2014 Engel et al.
(Continued)

FOREIGN PATENT DOCUMENTS

CN    103488403 A    1/2014
CN    110489043 A    11/2019
(Continued)

OTHER PUBLICATIONS

Harumi, "Specifying % with ConstaltLayout," Wild Programmer Z [online], Jan. 7, 2018, 6 pages.
(Continued)

*Primary Examiner* — James J Debrow
(74) *Attorney, Agent, or Firm* — Conley Rose, P.C.

(57) ABSTRACT

An application interface layout method includes that a developer sets a layout container having an adaptive layout capability in a layout file of an application, where the adaptive layout capability includes at least one of an extension capability, a proportion capability, an equalization capability, a wrapping capability, a hiding capability, a stretching capability, or a scaling capability. In this way, when running the application, an electronic device arranges, based on a screen parameter of the electronic device and the adaptive layout capability of the layout container in the layout file, a size and a location of a child view in the layout container on a display interface.

20 Claims, 60 Drawing Sheets

(30) Foreign Application Priority Data

| Oct. 22, 2020 | (CN) | 202011141053.7 |
| Oct. 22, 2020 | (CN) | 202011142649.9 |
| Oct. 22, 2020 | (CN) | 202011142738.3 |
| Oct. 29, 2020 | (CN) | 202011183319.4 |
| Oct. 29, 2020 | (CN) | 202011183328.3 |
| Oct. 30, 2020 | (CN) | 202011189853.6 |
| Jun. 21, 2021 | (CN) | 202110687153.8 |

(56) References Cited

U.S. PATENT DOCUMENTS

| 2020/0234275 A1 | 7/2020 | Zhang et al. | |
| 2022/0269405 A1 | 8/2022 | Wu et al. | |
| 2023/0359447 A1* | 11/2023 | Gao et al. | G06F 8/38 |

FOREIGN PATENT DOCUMENTS

| CN | 110597512 A | 12/2019 |
| CN | 110990009 A | 4/2020 |
| CN | 111651109 A | 9/2020 |
| JP | 2013145515 A | 7/2013 |
| WO | 2019242440 A1 | 12/2019 |

OTHER PUBLICATIONS

Cyomox, "Creating layouts for different screen size models," Qiita [online], May 5, 2019, 8 pages.

Matsubo1987, "Displaying a Child View out of the Parent View in Android." Qiita [online], Feb. 1, 2016, 8 pages.

* cited by examiner

TO

APPLICATION INTERFACE LAYOUT METHOD AND ELECTRONIC DEVICE

CROSS-REFERENCE TO RELATED APPLICATIONS

This is a continuation of International Patent Application No. PCT/CN2021/118570 filed on Sep. 15, 2021, which claims priority to Chinese Patent Application No. 202011058008.5 filed on Sep. 29, 2020, Chinese Patent Application No. 202110687153.8 filed on Jun. 21, 2021, Chinese Patent Application No. 202011110788.3 filed on Oct. 16, 2020, Chinese Patent Application No. 202011142738.3 filed on Oct. 22, 2020, Chinese Patent Application No. 202011142649.9 filed on Oct. 22, 2020, Chinese Patent Application No. 202011141053.7 filed on Oct. 22, 2020, Chinese Patent Application No. 202011183319.4 filed on Oct. 29, 2020, Chinese Patent Application No. 202011183328.3 filed on Oct. 29, 2020, and Chinese Patent Application No. 202011189853.6 filed on Oct. 30, 2020. All of the aforementioned patent applications are hereby incorporated by reference in their entireties.

TECHNICAL FIELD

This disclosure relates to the field of electronic technologies, and in particular, to an application interface layout method and an electronic device.

BACKGROUND

An electronic device provides diversified application functions for a user by using an application. Generally, when developing an application, a developer designs a layout of a view (View) or a view group (ViewGroup) on each display interface of the application, to form a layout file, and packs the layout file into an installation package of the application. When the electronic device installs and runs the application, a corresponding layout file is invoked, so as to present a corresponding display interface on a display. There is an increasing quantity of categories of electronic devices, and displays of various specifications (for example, dimensions) appear. If the developer needs to design and develop different layout files for the displays of all specifications, development and maintenance workload is heavy.

SUMMARY

This disclosure provides an application interface layout method and an electronic device, so as to reduce workload of an application developer in developing and maintaining a layout file of an application interface.

To achieve the foregoing objectives, embodiments of this disclosure provide the following technical solutions.

According to a first aspect, an application interface layout method is provided. An electronic device installs an application installation package of a first application, the application installation package includes a first layout file, the first layout file indicates N child views and an enabled preset capability, and N is a positive integer. The preset capability includes one or more of an extension capability, a proportion capability, an equalization capability, a stretching capability, and a hiding capability. The method includes the following. The electronic device receives a first operation performed by a user on a first interface. In response to the received first operation, the electronic device determines attribute values of the N child views based on a device parameter of the electronic device and the preset capability, where the device parameter of the electronic device includes at least one of a screen type value, a screen dimension value, or a running status value of the electronic device, and the attribute values of the N child views are used to indicate sizes and locations of the N child views on a second interface. The electronic device displays the N child views on the second interface based on the attribute values of the N child views.

A screen type includes any one of a bezel-less screen, a curved screen, a notch screen, a drop screen, a foldable screen, and the like. It is easy to understand that the screen type affects an overall display size and display location of the first application on a screen, and further affects display of a child view in a first layout container. A running status includes one or more of a landscape/portrait state, a screen splitting state, and a folding state of the electronic device. It is easy to understand that different running statuses of the electronic device indicate different display sizes and display locations of the first application on the screen, so as to restrict display of a child view in the first layout container.

It can be learned that the attribute values of the N child views in the first layout file are not fixed, but are related to the device parameter of the electronic device. The device parameter includes at least one of a screen type, a screen dimension, or a running status of the device. In other words, when electronic device parameters are different, the electronic device adaptively changes the sizes and/or the locations of the N child views based on the device parameters of the electronic device and the preset capability. It can be further learned that this solution can enable electronic devices having different device parameters to present different display effects based on a same layout file, reduce development and maintenance workload of developers, and meet display requirements of various types of electronic devices.

In addition, compared with a solution in which an application installation package needs to carry a plurality of layout files, this solution in which an application installation package carries one layout file increases traffic costs and time costs of downloading an application installation package by the electronic device. In addition, after installing the application, the electronic device does not need to store another redundant layout file. This increases storage space utilization of the electronic device.

It should be further noted that the foregoing preset capabilities (namely, adaptive layout capabilities) may be used independently, or may be used in combination with each other. For example, different adaptive layout capability attributes are set for different objects (Views or View-Groups) on a same application interface, or two or more adaptive layout capability attributes are set for a same object. It can be understood that, in an actual application development process, in addition to a case in which a conflict occurs during combination, the foregoing adaptive layout capabilities may be randomly combined according to an actual requirement. For example, the stretching capability may be combined with any one of the hiding capability, the proportion capability, the equalization capability, and a wrapping capability, and a scaling capability may be combined with any one of the hiding capability, the proportion capability, the equalization capability, and the wrapping capability.

In a possible implementation, the first layout file includes a preset parameter corresponding to the preset capability. That the electronic device determines attribute values of the N child views based on a device parameter of the electronic device and the preset capability includes the following. The electronic device determines the attribute values of the N child views based on the device parameter of the electronic device, the preset capability, and the preset parameter.

In a possible implementation, a running status of the electronic device includes one or more of a landscape/portrait state, a screen splitting state, and a folding state of the electronic device.

In a possible implementation, the first operation is any one of an operation of starting the first application, an operation of jumping to the second interface, or an operation of switching the running status of the electronic device.

For example, if the second interface is a home page of the first application, the first operation is an operation of starting the first application, or if the second interface is not a home page of the first application, the first operation is an operation of indicating to jump from the first interface to the second interface. In another scenario, when the electronic device displays an interface of the first application, if it is detected that the user switches the running status of the electronic device, for example, switches from a portrait state to a landscape state, or switches from an expanded state to a folded state, or switches from a non-split-screen state to a split-screen state, the electronic device re-obtains a device parameter of the device, re-calculates attribute values of the N child views based on the updated device parameter of the device and the preset capability, and refreshes the current interface. In other words, a same function interface of the first application has different layouts in different running statues of the electronic device, that is, layouts of the N child views on the second interface and the first interface are different.

In a possible implementation, the preset capability is the extension capability, the first layout file indicates that the N child views are arranged in a first orientation of a first layout container, and the first orientation is a horizontal orientation or a vertical orientation. That the electronic device determines attribute values of the N child views based on a device parameter of the electronic device and the preset capability includes the following. The electronic device determines a dimension of the first layout container in the first orientation based on the device parameter, and determines N1 child views and the $(N1+1)^{th}$ child view in the N child views based on the dimension of the first layout container in the first orientation and dimensions of the N child views in the first orientation, where N1 is less than N. That the electronic device displays the N child views on the second interface based on the attribute values of the N child views includes the following. The electronic device completely displays the N1 child views and partially displays the $(N1+1)^{th}$ child view on the second interface based on the attribute values of the N child views.

In other words, when a width of a layout container changes, a quantity of displayed child views may be automatically determined based on a dimension of the layout container, so as to meet display requirements of electronic devices having different screen dimensions. In addition, in this disclosure, the quantity of displayed child views may be adaptively reduced based on the change of the layout container, and a child view that displays only partial content may also be displayed. A dimension of the partial content displayed by the child view may keep a fixed value (that is, a dimension threshold). In this way, the child view that displays only partial content may be used to prompt the user that there is still a child view that is not displayed in the layout container. In addition, keeping the dimension threshold as a fixed value can prevent the user from feeling jagged confusion caused because different screen dimensions lead to different dimensions of child views that display partial content.

In a possible implementation, a preset parameter of the extension capability includes a first dimension and a first spacing. That the electronic device determines attribute values of the N child views based on a device parameter of the electronic device and the preset capability includes determining, based on the dimension of the first layout container in the first orientation, the dimensions of the N child views in the first orientation, the first dimension, and the first spacing, that the N1 child views are displayed in the first layout container, and determining partial content displayed by the $(N1+1)^{th}$ child view. That the electronic device displays the N child views on the second interface based on the attribute values of the N child views includes the following. The electronic device displays the N1 child views and the partial content of the $(N1+1)^{th}$ child view on the second interface, where a spacing between two adjacent child views is greater than or equal to the first spacing.

The first spacing is a spacing threshold. The first dimension is a displayed dimension of the $(N1+1)^{th}$ child view. In this way, the developer may set a spacing between first child views in the first layout container, so as to avoid excessive congestion or content overlapping of the first child views.

In a possible implementation, the preset parameter of the extension capability further includes a second spacing, and the second spacing is greater than the first spacing. Before determining, based on the dimension of the first layout container in the first orientation, the dimensions of the N child views in the first orientation, the first dimension, and the first spacing, that the N1 child views are displayed in the first layout container, and determining partial content displayed by the $(N1+1)^{th}$ child view, the method further includes determining, based on the dimension of the first layout container in the first orientation, the dimensions of the N child views in the first orientation, and the second spacing, that the first layout container cannot display all the N child views, narrowing a spacing between two adjacent child views, and keeping the spacing between two adjacent child views not less than the first spacing, and in a process of narrowing the spacing between two adjacent child views, determining that the first layout container cannot display all the N child views.

It can be learned that the developer may set a default spacing between first child views. When the dimension of the first layout container is insufficient to display all first child views, the spacing between first child views may be further narrowed to attempt to display all the first child views. After the spacing between first child views is narrowed but not all the first child views can be displayed, a child view may be incompletely displayed.

In a possible implementation, determining, based on the dimension of the first layout container in the first orientation, the dimensions of the N child views in the first orientation, the first dimension, and the first spacing, that the N1 child views are displayed in the first layout container, and determining partial content displayed by the $(N1+1)^{th}$ child view includes determining, based on the dimension of the first layout container in the first orientation, the dimensions of the N child views in the first orientation, the second spacing, and the first dimension, that N2 child views are displayed in the first layout container, where a spacing between two adjacent child views in the N2 child views is a third spacing, N2 is greater than or equal to N1 and is less than N, and a value of N2 is decreased by one if the third spacing is less than the first spacing, adjusting the third spacing based on the dimension of the first layout container in the first orientation, dimensions of the N2 child views in the first orientation, and the first dimension, and when an adjusted third spacing is not less than the first spacing, determining that the N1 child views are displayed in the first layout container, determining the partial content displayed by the $(N1+1)^{th}$ child view, and determining that a spacing between two adjacent child views is a fourth spacing, where N1=N2, and a difference between the fourth spacing and the adjusted third spacing is within one pixel.

In other words, when the first layout container cannot display all first child views, the quantity N2 of first child views that can be completely displayed may be first determined based on the default spacing, the dimension of the first layout container, and dimensions of the first child views, and then the third spacing between two adjacent first child views is adjusted. If the third spacing does not meet a spacing threshold, the value of N2 is decreased by one, and the third spacing is adjusted again. This operation is repeated until the third spacing can meet the spacing threshold. In this case, it is determined that adjusted N2 is the quantity of first child views that can be completely displayed in the first layout container, and the spacing between first child views is determined.

In addition, because the electronic device performs display in a unit of pixel, a remaining space (the dimension of the first layout container minus an inner margin, a sum of the dimensions of the first child views, or the like) cannot be evenly allocated strictly, that is, the third spacing may not be an integer. Therefore, spacings between child views may be further fine-tuned, so that the spacings between child views completely occupy the remaining space. A difference between a fine-tuned spacing and the third spacing is within one pixel. For a specific fine-tuning method, refer to related content in this specification.

In a possible implementation, the method further includes receiving a second operation performed by the user on the second interface, and displaying a third interface in response to the second operation, where the third interface displays the $(N1+2)^{th}$ child view.

Because not all the first child views in the first layout container are displayed on the second interface, a first child view that is not displayed on the second interface, for example, the $(N1+2)^{th}$ first child view, may be viewed by performing the second operation.

In a possible implementation, the preset capability is the proportion capability, the first layout file indicates that the N child views are arranged in a first orientation of a first layout container, the first orientation is a horizontal orientation or a vertical orientation, and a preset parameter corresponding to the proportion capability includes a proportion of a first child view in the N child views. That the electronic device determines attribute values of the N child views based on a device parameter of the electronic device and the preset capability includes the following. The electronic device determines a dimension of the first layout container in the first orientation based on the device parameter, and determines a dimension of the first child view in the first orientation based on the dimension of the first layout container in the first orientation and the proportion of the first child view. That the electronic device displays the N child views on the second interface based on the attribute values of the N child views includes the following. The electronic device displays the first child view on the second interface. The first orientation may be a layout orientation of the first layout container, or may be an orientation specified by the user.

In other words, when the electronic device runs the application, the electronic device obtains the device parameter, determines a display dimension and a display location of the application based on the device parameter, and further determines a dimension of the first layout container and the like. Then, the electronic device calculates a dimension of a child view based on a specified proportion of the child view and the dimension of the first layout container, so as to meet display requirements of electronic devices having different screen parameters. It can be learned that the proportion capability in this solution can enable electronic devices having different screen specifications to present different display effects based on a same layout setting, reduce development and maintenance workload of developers, and meet display requirements of various types of electronic devices.

In a possible implementation, the preset parameter corresponding to the proportion capability further includes a proportion of a second child view in the N child views. That the electronic device determines attribute values of the N child views based on a device parameter of the electronic device and the preset capability further includes determining a dimension of the second child view in the first orientation based on the dimension of the first layout container in the first orientation and the proportion of the second child view, where the proportion of the second child view is the same as or different from the proportion of the first child view. That the electronic device displays the N child views on the second interface based on the attribute values of the N child views further includes the following. The electronic device further displays the second child view on the second interface based on the attribute values of the N child views.

In other words, different child views in the first layout container may have different proportions, so as to meet different display requirements.

In a possible implementation, the preset parameter corresponding to the proportion capability further includes a case in which no proportion is set for a third child view in the N child views, or the preset parameter corresponding to the proportion capability does not include a proportion of the third child view. That the electronic device determines attribute values of the N child views based on a device parameter of the electronic device and the preset capability further includes determining a remaining space of the first layout container in the first orientation, where the remaining space of the first layout container in the first orientation is determined based on the dimension of the first layout container in the first orientation, an inner margin of the first layout container in the first orientation, and a dimension of a child view that is included in the first layout container and for which a proportion is set, and determining a dimension of the third child view in the first orientation based on the remaining space of the first layout container in the first orientation. That the electronic device displays the N child views on the second interface based on the attribute values of the N child views further includes the following. The electronic device further displays the third child view on the second interface based on the attribute values of the N child views.

It can be learned that the first layout container may include a child view for which a proportion is set, or may include a child view for which no proportion is set. A dimension of the child view for which a proportion is set may be first determined, and then a dimension of the child view for which no proportion is set is determined based on the remaining space of the first layout container.

In a possible implementation, the first child view is a layout container view, the first child view includes a fourth child view for which a proportion is set, a layout orientation of the first child view is a second orientation, and the second orientation is perpendicular to the first orientation. That the electronic device determines attribute values of the N child views based on a device parameter of the electronic device and the preset capability further includes the following. The electronic device determines a dimension of the first child view in the second orientation based on the device parameter, and determines a dimension of the fourth child view in the second orientation based on the dimension of the first child view in the second orientation and the proportion of the fourth child view. That the electronic device displays the N child views on the second interface based on the attribute values of the N child views includes the following. The electronic device displays the fourth child view in the first child view.

In other words, an interface of a layout container with a proportion capability enabled is nested in another layout container with a proportion capability enabled.

In a specific implementation, a proportion capability may be set for a layout container in which a text view, a button view, an image view, or the like is located. When a width or a height of the layout container changes, a width or a height of the text view, the button view, or the image view may automatically and adaptively change based on the width or the height of the layout container, so as to meet display requirements of electronic devices having different screen dimensions. It can be learned that the proportion capability in this solution can enable electronic devices having different screen parameters to present different display effects based on a same layout setting, reduce development and maintenance workload of developers, and meet display requirements of various types of electronic devices.

In a possible implementation, the preset capability is the equalization capability, and the first layout file indicates that the N child views are arranged in a first orientation of a first layout container and indicates a dimension of each of the N child views in the first orientation and an inner margin of the first layout container in the first orientation. That the electronic device determines attribute values of the N child views based on a device parameter of the electronic device and the preset capability includes the following. The electronic device determines a dimension of the first layout container in the first orientation based on the device parameter, and determines a first spacing based on the dimension of the first layout container in the first orientation, the dimension of each of the N child views in the first orientation, and the inner margin of the first layout container in the first orientation, where the first spacing is a spacing between two adjacent child views, and two adjacent child views have an equal spacing. That the electronic device displays the N child views on the second interface based on the attribute values of the N child views includes the following. The electronic device displays the N child views on the second interface based on the attribute values of the N child views, where a spacing between two adjacent child views is the first spacing.

In other words, when the electronic device runs the application, the electronic device obtains the device parameter, determines a display dimension and a display location of the application based on the device parameter, and further determines a dimension of the first layout container and the like. Then, the electronic device adaptively determines a spacing between adjacent child views based on a width/height of the first layout container, an inner margin of the first layout container, and a width/height of each child view in the first layout container. It can be learned that the equalization capability in this solution can enable electronic devices having different screen specifications to present different display effects based on a same layout setting, reduce development and maintenance workload of developers, and meet display requirements of various types of electronic devices.

In a possible implementation, a preset parameter of the equalization capability includes a spacing type corresponding to the first layout container, and the spacing type is a first type or a second type. After determining a first spacing, the method further includes determining a location of the $1^{st}$ child view in the N child views based on the first orientation and the spacing type corresponding to the first layout container. When the first orientation is a horizontal orientation and the first layout container corresponds to the first type, a distance between a left edge of the $1^{st}$ child view and a left edge of the first layout container is 0 or a left inner margin of the first layout container, when the first orientation is a horizontal orientation and the first layout container corresponds to the second type, a distance between a left edge of the $1^{st}$ child view and a left edge of the first layout container is determined based on a left inner margin of the first layout container and the first spacing, when the first orientation is a vertical orientation and the first layout container corresponds to the first type, a distance between an upper edge of the $1^{st}$ child view and an upper edge of the first layout container is 0 or an upper inner margin of the first layout container, or when the first orientation is a vertical orientation and the first layout container corresponds to the second type, a distance between an upper edge of the $1^{st}$ child view and an upper edge of the first layout container is determined based on an upper inner margin of the first layout container and the first spacing.

It can be learned that two different types of equalization methods are defined. The foregoing first-type equalization method means that no spacing needs to be allocated to a side that is of the $1^{st}$ child view and that is closest to a layout container in a layout orientation and a side that is of the last child view and that is closest to the layout container in the layout orientation. The foregoing second-type equalization capability means that a spacing needs to be allocated to a side that is of the $1^{st}$ child view and that is closest to a layout container in a layout orientation and a side that is of the last child view and that is closest to the layout container in the layout orientation. This meets different spacing adjustment requirements of the user.

In a possible implementation, the preset parameter of the equalization capability further includes a first threshold, and determining a first spacing includes determining a dimension of a first space based on the dimension of the first layout container in the first orientation, the dimension of each of the N child views in the first orientation, and the inner margin of the first layout container in the first orientation, when the first layout container corresponds to the first type, evenly dividing the dimension of the first space into N−1 parts, where a dimension of each part is a second spacing, or when the first layout container corresponds to the second type, evenly dividing the dimension of the first space into N+1 parts, where a dimension of each part is a second spacing, and when the second spacing is greater than the first threshold, determining the first threshold as the first spacing, or when the second spacing is not greater than the first threshold, determining the second spacing as the first spacing.

It can be learned that the first threshold may be set to restrict a range of an adjusted spacing between child views, so that the adjusted spacing is not greater than the first threshold.

In a possible implementation, after determining a location of the $1^{st}$ child view in the N child views based on the first orientation and the spacing type corresponding to the first layout container, the method further includes, after the first threshold is determined as the first spacing, adjusting the location of the $1^{st}$ child view in the first layout container in an alignment manner of the N child views in the first layout container, where the alignment manner is any one of horizontal centering, left alignment, right alignment, vertical centering, top alignment, and bottom alignment.

In a possible implementation, the preset parameter of the equalization capability further includes a second threshold, and determining a first spacing includes determining a dimension of a first space based on the dimension of the first layout container in the first orientation, the dimension of each of the N child views in the first orientation, and the inner margin of the first layout container in the first orientation, when the first layout container corresponds to the first type, evenly dividing the dimension of the first space into N−1 parts, where a dimension of each part is a third spacing, or when the first layout container corresponds to the second type, evenly dividing the dimension of the first space into N+1 parts, where a dimension of each part is a third spacing, and when the third spacing is less than the second threshold, determining the second threshold as the first spacing, or when the third spacing is not less than the second threshold, determining the third spacing as the first spacing.

It can be learned that the second threshold may be further set to restrict a range of an adjusted spacing between child views, so that the adjusted spacing is not less than the second threshold.

In a possible implementation, the preset capability is the hiding capability, and the first layout file indicates that the N child views are arranged in a first orientation of a first layout container and indicates a dimension of each of the N child views in the first orientation and an inner margin of the first layout container in the first orientation. That the electronic device determines attribute values of the N child views based on a device parameter of the electronic device and the preset capability includes the following. The electronic device determines a dimension of the first layout container in the first orientation based on the device parameter, and determines M child views from the N child views when a first dimension is greater than a second dimension, where M is an integer less than N, the first dimension is determined based on the dimensions of the N child views in the first orientation, and the second dimension is determined based on the dimension of the first layout container in the first orientation and the inner margin of the first layout container in the first orientation. That the electronic device displays the N child views on the second interface based on the attribute values of the N child views includes the following. The electronic device displays the M child views on the second interface based on the attribute values of the N child views.

In other words, when the electronic device runs the application, the electronic device obtains the device parameter, determines a display dimension and a display location of the application based on the device parameter, and further determines a dimension of the first layout container and the like. When a width or a height of a layout container is insufficient to display all child views, some child views in the layout container may be automatically determined to be hidden, so as to meet display requirements of electronic devices having different screen dimensions. It can be learned that the hiding capability in this solution can enable electronic devices having different screen specifications to present different display effects based on a same layout setting, reduce development and maintenance workload of developers, and meet display requirements of various types of electronic devices.

In a possible implementation, a sum of dimensions of the M child views in the first orientation is less than or equal to the second dimension.

In the conventional technology, when the electronic device cannot display all child views in the first layout container, content that exceeds the dimension of the first layout container is simply truncated. Consequently, some child views display only partial content, and a display interface is disordered. However, in the solution provided in this disclosure, the M child views displayed in the first layout container are child views with complete content, that is, all content of the M child views is displayed, and the display interface is displayed neatly.

In a possible implementation, determining M child views from the N child views when a first dimension is greater than a second dimension includes determining the M child views from the N child views based on priorities of the N child views when the first dimension is greater than the second dimension.

In a possible implementation, priorities of the M child views each are lower than priorities of the other N-M child views in the N child views.

In other words, an importance degree of a child view in the first layout container may be set by setting a priority of the child view. This can avoid a case in which child views arranged behind are simply hidden or not displayed when the first layout container cannot display all child views.

In a possible implementation, a preset parameter of the hiding capability includes a case in which the N child views include at least one first child view, at least one second child view, and at least one third child view, a priority of the first child view is higher than a priority of the second child view, and the priority of the second child view is higher than a priority of the third child view. Determining the M child views from the N child views based on priorities of the N child views when the first dimension is greater than the second dimension includes, when the first dimension is greater than the second dimension, determining that the M child views do not include the first child view, when a sum of dimensions of the second child view and the third child view in the first orientation is less than or equal to the second dimension, determining that the M child views include the second child view and the third child view, or when a sum of dimensions of the second child view and the third child view in the first orientation is greater than the second dimension, determining that the M child views do not include the first child view and the second child view, and when a sum of the dimensions of the third child views in the first orientation is less than or equal to the second dimension, determining that the M child views include the third child views.

In other words, when the first layout container cannot display all child views, hidden child views are sequentially determined in descending order of hiding priorities of the child views.

In a possible implementation, the preset parameter of the hiding capability further includes a case in which the N child views include at least one first child view, at least one second child view, and at least one third child view, a priority of the first child view is higher than a priority of the second child view, and the priority of the second child view is higher than a priority of the third child view. Determining the M child views based on priorities of the N child views when the first dimension is greater than the second dimension includes determining that the M child views include the third child view, and when a sum of dimensions of the third child view and the second child view in the first orientation is less than or equal to the second dimension, determining that the M child views further include the second child view, or when a sum of dimensions of the third child view and the second child view in the first orientation is greater than the second dimension, determining that the M child views do not include the second child view and the first child view.

In other words, when the first layout container cannot display all child views, displayed child views are sequentially determined in ascending order of hiding priorities of the child views.

In a possible implementation, after determining M child views from the N child views, the method further includes determining a spacing between adjacent child views in the M child views based on the second dimension and the sum of the dimensions of the M child views in the first orientation.

After a quantity of child views displayed in the layout container is determined, a spacing between adjacent child views is further adjusted, so as to help the layout container present a better display effect.

In a possible implementation, spacings between adjacent child views in the M child views are equal or unequal.

In a possible implementation, the preset capability is the stretching capability, the first layout file indicates that the N child views are arranged in a second orientation of a first layout container, and a preset parameter corresponding to the stretching capability includes a first threshold and/or a second threshold of the first layout container in the first orientation, where the second orientation is different from the first orientation, and the second threshold is less than the first threshold. That the electronic device determines attribute values of the N child views based on a device parameter of the electronic device and the preset capability includes the following. The electronic device determines an initial value of a dimension of the first layout container in the first orientation based on the device parameter, if the initial value is greater than the first threshold, determines that the dimension of the first layout container in the first orientation is the first threshold, or if the initial value is less than the second threshold, determines that the dimension of the first layout container in the first orientation is the second threshold, and determines a dimension of a first child view in the first layout container in the first orientation based on the dimension of the first layout container in the first orientation, where the first child view is one of the N child views. That the electronic device displays the N child views on the second interface based on the attribute values of the N child views includes the following. The electronic device displays the first child view on the second interface based on the attribute values of the N child views.

When the electronic device runs the application, the electronic device obtains the device parameter, determines a display dimension and a display location of the application based on the device parameter, and further determines the initial value of the dimension of the first layout container in the first orientation based on a dimension constraint transferred by a parent layout container of the first layout container, or determines the initial value of the dimension of the first layout container in the first orientation based on a dimension that is set in the layout file. The first threshold may be a maximum dimension value that is of the first layout container in the first orientation and that is set in the layout file, and the second threshold may be a minimum dimension value that is of the first layout container in the first orientation and that is set in the layout file.

It can be learned that, in this disclosure, after the initial value of the dimension of the first layout container in the first orientation is determined, the dimension of the first layout container in the first orientation may be adjusted by using the first threshold and the second threshold, so as to avoid excessive scale-up or scale-down of the first layout container, and further ensure that the first child view in the first layout container can present a better display effect. In other words, this disclosure provides a layout container whose dimension can be adaptively adjusted based on a device parameter of an electronic device, so that a view in the layout container can also be adaptively adjusted based on the device parameter of the electronic device. In this case, one layout file may be set for electronic devices having different device parameters, so as to prevent a developer from designing different layout files for the electronic devices having different device parameters. In this way, this disclosure reduces workload of the developer in development and maintenance, and also meets display requirements of various types of electronic devices.

It should be noted that an installation package of a general application includes a plurality of types of files such as a logic code file, a resource file, and a layout file. The layout file is used to define a graphical user interface (GUI) (that is, a display interface), that is, define a hierarchical structure relationship between a view and a layout container on the display interface and attributes such as a dimension and a location. The logic code file is execution logic behind a view and a layout container on the display interface. The resource file includes content displayed in a view and a layout container on the display interface, for example, an image, a video, and a website.

In a possible implementation, a larger dimension of the first layout container in the first orientation indicates a larger dimension of the first child view in the first orientation.

In other words, on electronic devices having different device parameters, the dimension of the first child view in the first orientation increases as the dimension of the first layout container in the first orientation increases, so that the dimension of the first child view can be adaptively adjusted on the electronic devices having different device parameters. In this way, the developer may set one layout file for the electronic devices having different device parameters.

In a possible implementation, determining a dimension of a first child view in the first layout container in the first orientation based on the dimension of the first layout container in the first orientation includes determining that the dimension of the first child view in the first orientation is the same as the dimension of the first layout container in the first orientation, or determining that the dimension of the first child view in the first orientation is the dimension of the first layout container in the first orientation minus an inner margin of the first layout container in the first orientation.

In an example, the dimension of the first child view in the first orientation is the same as the dimension of the first layout container in the first orientation, and the first layout container presents the first child view as large as possible in the first orientation, so as to help the first child view display more content.

In another example, an inner margin of the first layout container may be further set. In this way, by ensuring that the first child view in the first layout container keeps a specific distance from the edge of the first layout container, the display interface can present a magazine-like layout, for example, present a large white space, so that the display interface presents a magazine-like reading sense. This improves visual experience of the user.

In a possible implementation, the first orientation includes a horizontal orientation and/or a vertical orientation.

In other words, for the first layout container, the developer may set a stretching capability in one orientation, or may set stretching capabilities in two orientations. For example, if a stretching capability of the first layout container in the horizontal orientation is set, a width of the first layout container varies with a width of the screen. If a stretching capability of the first layout container in the vertical orientation is set, a height of the first layout container varies with a height of the screen. If stretching capabilities of the first layout container in the horizontal orientation and the vertical orientation are set, the width of the first layout container varies with the width of the screen, and the height of the first layout container varies with the height of the screen.

In a possible implementation, when the first orientation is the horizontal orientation, the inner margin of the first layout container in the first orientation includes a left inner margin and/or a right inner margin, where the left inner margin is a distance from a left edge of a leftmost view in the layout container to a left edge of the layout container, and the right inner margin is a distance from a right edge of a rightmost view in the layout container to a right edge of the layout container. When the first orientation is the vertical orientation, the inner margin of the first layout container in the first orientation includes an upper inner margin and/or a lower inner margin, where the upper inner margin is a distance from an upper edge of an uppermost view in the layout container to an upper edge of the layout container, and the lower inner margin is a distance from a lower edge of a lowermost view in the layout container to a lower edge of the layout container.

In a possible implementation, the N child views each are any one of a text view, an edit view, a button view, and an image button view.

According to a second aspect, an electronic device is provided, including a processor, a memory, and a touchscreen. The memory, the touchscreen, and the processor are coupled, the memory is configured to store computer program code, the computer program code includes computer instructions, and when the processor runs the computer instructions in the memory, the electronic device is enabled to perform the method according to any one of the first aspect and the possible implementations of the first aspect.

According to a third aspect, an apparatus is provided. The apparatus is included in an electronic device, and the apparatus has functions of implementing behavior of the electronic device in the method according to any one of the first aspect and the possible implementations. The functions may be implemented by hardware, or may be implemented by hardware executing corresponding software. The hardware or the software includes at least one module or unit corresponding to the foregoing functions, for example, a receiving module or unit, a display module or unit, and a processing module or unit.

According to a fourth aspect, a computer-readable storage medium is provided, including computer instructions. When the computer instructions are run on an electronic device, the electronic device is enabled to perform the method according to any one of the first aspect and the possible implementations of the first aspect.

According to a fifth aspect, a graphical user interface on an electronic device is provided. The electronic device includes a display, a memory, and one or more processors. The one or more processors are configured to execute one or more computer programs stored in the memory, and the graphical user interface includes a graphical user interface displayed when the electronic device performs the method according to any one of the first aspect and the possible implementations of the first aspect.

According to a sixth aspect, a computer program product is provided. The computer program product includes computer instructions, and when the computer instructions are run on a computer, the computer is enabled to perform the method according to any one of the first aspect and the possible implementations of the first aspect.

According to a seventh aspect, a chip system is provided, including a processor. When the processor executes instructions, the processor performs the method according to any one of the first aspect and the possible implementations of the first aspect.

It can be understood that the electronic device, the apparatus, the computer-readable storage medium, the computer program product, the graphical user interface, and the chip system provided in the foregoing aspects are all applied to the corresponding methods provided above. Therefore, for beneficial effects that can be achieved by the electronic device, the apparatus, the computer-readable storage medium, the computer program product, the graphical user interface, and the chip system, refer to the beneficial effects in the corresponding methods provided above. Details are not described herein again.

DESCRIPTION OF EMBODIMENTS

Figures 1A, 1B:
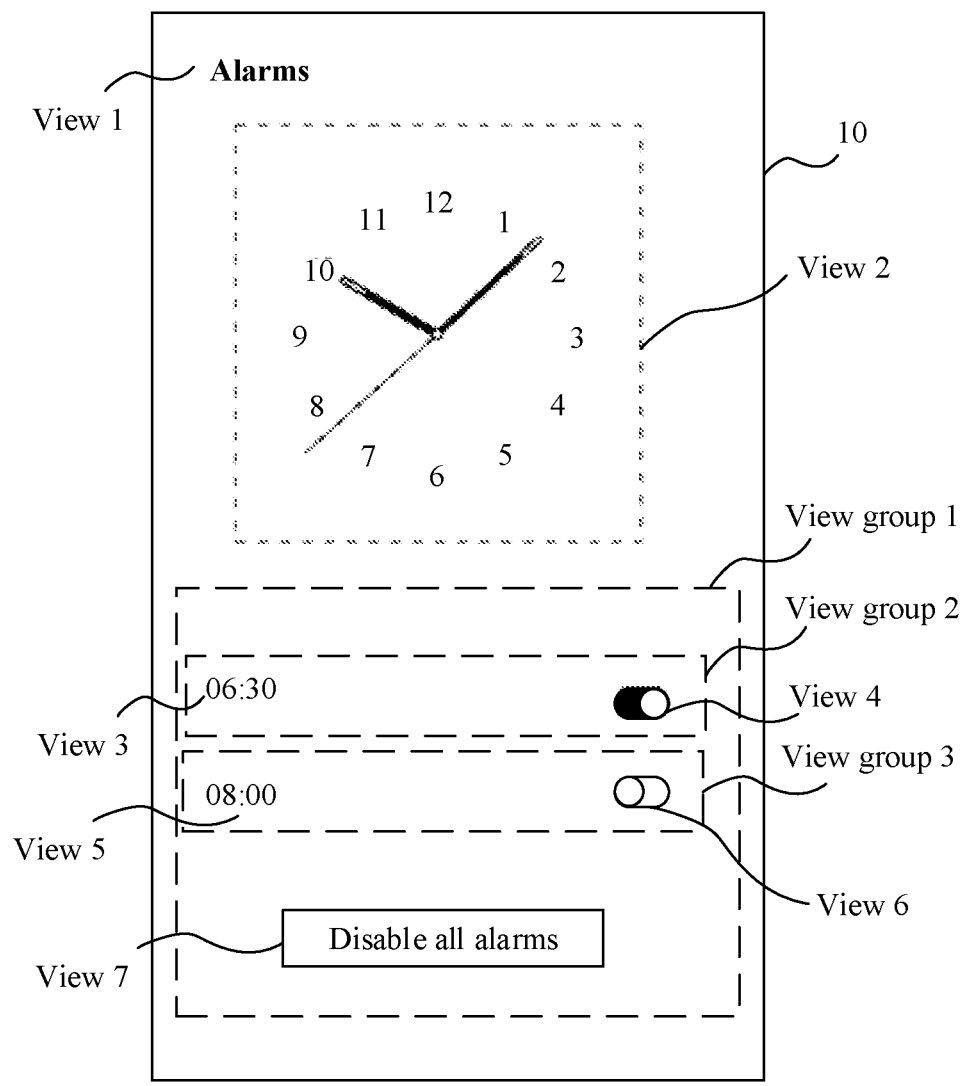
FIG. 1A and FIG. 1B are a schematic diagram of a structure of a display interface according to an embodiment of this disclosure.
Figure 1B:
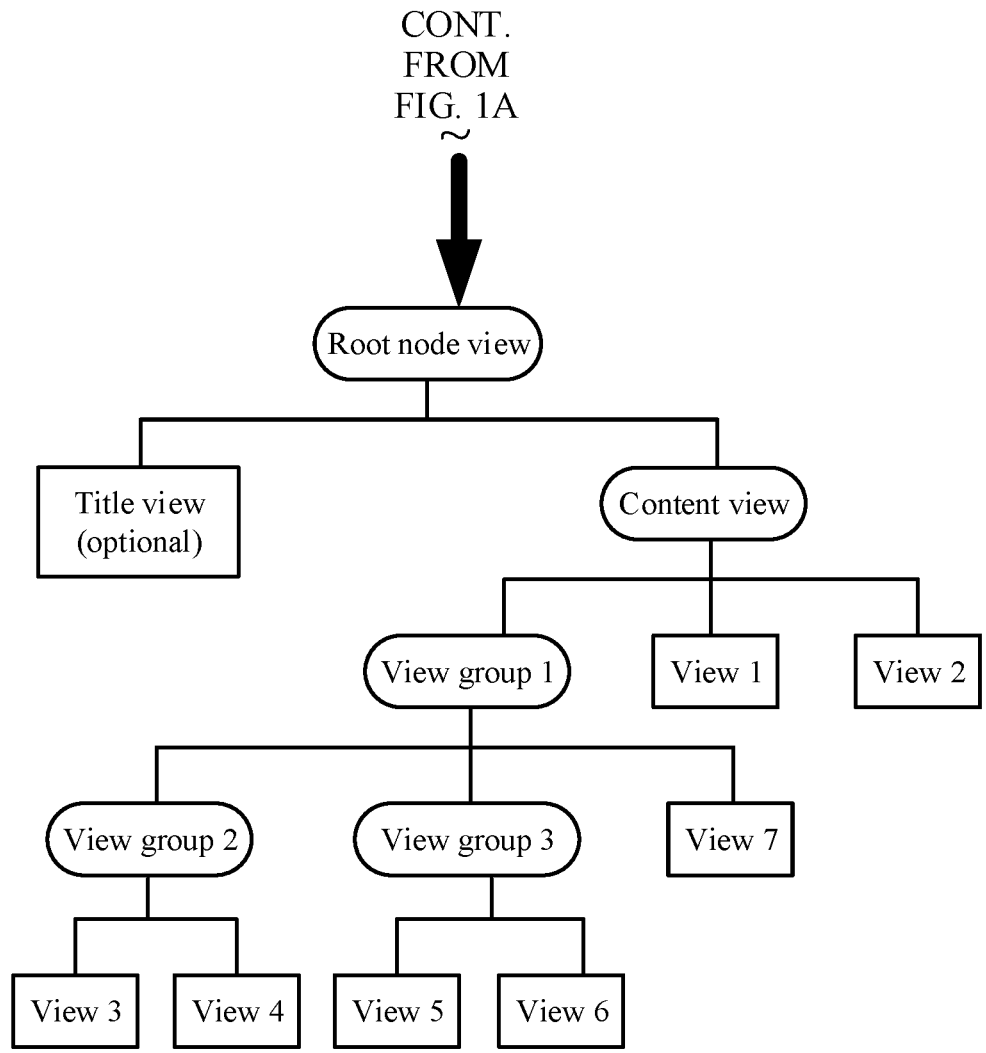

In the descriptions of embodiments of this disclosure, unless otherwise specified, "/" means "or". For example, A/B may represent A or B. In this specification, "and/or" describes only an association relationship between associated objects and represents that three relationships may exist. For example, A and/or B may represent the following three cases: only A exists, both A and B exist, and only B exists. Terms "first" and "second" below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, unless otherwise specified, "a plurality of" means two or more. In embodiments of this disclosure, a word "example" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the word such as "example" or "for example" is intended to present a relative concept in a specific manner.

An ANDROID system is used as an example for description. An application defines a GUI (that is, a display interface) by using a layout file. The layout file includes a view tree, and the view tree includes a view and a layout container.

The view is an element presented on the GUI, and can provide a specific operation function for a user or can be used to display specific content. For example, the view may include a text view such as a TextView view and an EditText view, or may include a button view such as a Button view and an ImageButton view, or may include an image view such as an ImageView view. This is not limited in embodiments of this disclosure.

The layout container is configured to store a view and a layout structure of another layout container. In other words, one layout container may include one or more views, and nest one or more layout containers.

A display interface of the ANDROID system is used as an example for description. Generally, one display interface corresponds to one Activity, one Activity holds one Window object (for example, a PhoneWindow), and the Window is used to draw various views. As a most basic window system of the ANDROID system, the PhoneWindow has a top-level View object DecorView (one ViewGroup). The DecorView is a root view (ViewRoot) of all Views and ViewGroups, and is also referred to as a root node view. The DecorView includes a ContentView (one ViewGroup). The ContentView is a view customized by each application, that is, a display interface of the application. The ContentView is also referred to as a content view. The ContentView includes one or more Views and/or one or more ViewGroups. It should be noted that, in an interface display process, an electronic device traverses an entire view tree from top to bottom starting from a performTraversals( ) method of a root view, each View is responsible for drawing the View, and a ViewGroup further needs to be responsible for indicating a child View of the ViewGroup to perform a drawing operation. Optionally, the DecorView further includes a TitleView (title view), which may be used to customize navigation of the display interface.

FIG. 1A is a schematic diagram of an alarm clock interface 10. The alarm clock interface 10 corresponds to one DecorView. The DecorView includes View 1 (text view), View 2 (image view), and ViewGroup 1. ViewGroup 1 further includes ViewGroup 2, ViewGroup 3, and View 7 (button view). ViewGroup 2 includes View 3 (text view) and View 4 (button view). Similarly, ViewGroup 3 includes View 5 (text view) and View 6 (button view). For a hierarchical structure relationship between each View and each ViewGroup on the alarm clock interface 10, refer to a view tree shown in FIG. 1B.

For example, a developer may design a View or a ViewGroup on each display interface in an application in a layout manner such as a linear layout (LinearLayout) manner, a table layout (TableLayout) manner, a relative layout (RelativeLayout) manner, a frame layout (FrameLayout) manner, an absolute layout (AbsoluteLayout) manner, or a grid layout (GridLayout) manner, to generate a layout file of each display interface.

In other words, the developer may set a hierarchical structure of each View and each ViewGroup on the display interface and an attribute value (for example, a dimension (a width and a height) and a location) in the layout file of each display interface. Then, the layout files of these display interfaces are packed into an installation package of the application, and the installation package of the application is released to an application market. Subsequently, an electronic device may download the installation package of the application from the application market and install the installation package of the application. When an application runs in the electronic device, the electronic device may obtain a layout file of the application, draw a corresponding display interface based on the layout file, and present the display interface to a user.

It should be noted that, in one solution, in the layout file of the display interface, there may be determined attribute values for the View and the ViewGroup included in the display interface. Once the attribute values of each View and each ViewGroup on the display interface are set in the layout file, the dimension and the location of the View or the ViewGroup on the display interface remain unchanged. In other words, when developing the application, the developer has determined an appearance of each display interface presented to the user. It can be understood that, when electronic devices having different screen specifications draw a same display interface by using the layout file, or the entire display interface is simply scaled down or scaled up, because the screen specifications of the electronic devices are different currently, reusing a same display interface often causes a poor display effect. Developers of some applications design different layout files for displays having different specifications, and adapt to corresponding logic, causing huge development and maintenance workload. In addition, a large quantity of layout files is packed into an installation package of an application, causing an excessively large installation package of the application and affecting a speed of downloading the installation package by an electronic device and a space occupied by storing the installation file after installation.

In another technical solution, for an electronic device having a large screen dimension, layout files of a plurality of small-sized electronic devices may be directly reused. For example, a large-screen dimension is a tablet computer, and a dimension of a screen of the tablet computer is 1280*800 pixels, and a small-screen dimension is a mobile phone, and a dimension of a screen of the mobile phone is 720*1080 pixels. In this case, when the tablet computer displays an application interface, the tablet computer may simultaneously display two or more windows, and each window uses a layout file of one display interface corresponding to the mobile phone. In other words, that the tablet computer displays one display interface is equivalent to that the mobile phone simultaneously displays two or more display interfaces. For example, the screen of the tablet computer is evenly divided into two windows, and a size of each window may be 640*800 pixels. Each window is used to display one interface of the mobile phone. Obviously, an aspect ratio of one window on the tablet computer is 640:800 (that is, 4:5), and an aspect ratio of an interface of the mobile phone is 720:1080 (that is, 2:3).

It should be noted that, even if a large-sized electronic device may reuse layout files of a plurality of small-sized electronic devices in a multi-window management manner, an aspect ratio of each window on the large-sized electronic device is inconsistent with an aspect ratio of a small-sized electronic device in most cases. Consequently, directly reusing a layout file of a small-sized electronic device cannot present a relatively good interface layout.

An embodiment of this disclosure provides a display interface layout method, to develop one layout file for one display interface of an application. The layout file is applicable to various electronic devices having different screen specifications. This is because an electronic device may adaptively adjust a display interface layout based on a screen parameter of the electronic device when running the application. This improves display effects of electronic devices having different screen specifications, and also reduces development and maintenance costs of a developer. The screen parameter includes a screen specification (dimension) parameter and a screen status parameter (for example, a landscape/portrait state and a folding state of a foldable screen).

In addition, even if electronic devices of a same or similar type have different screen parameters, most use scenarios (user interaction manners, function views, or the like) are similar. Therefore, display interfaces presented to a user are usually similar. Therefore, designing one layout file for one application can meet a design intention of an application developer. However, electronic devices having different screen parameters adaptively adjust a dimension and/or a location of a View and a ViewGroup in a layout file on a display interface based on adaptive layout capabilities of the View and the ViewGroup, so as to weaken display limitations of different electronic devices. This helps the user switch between different electronic devices for display, and meets display requirements of the user in different scenarios. For example, in a distributed display scenario, the user may send layout files corresponding to different function modules on one display interface to different electronic devices for display. For another example, based on a current application scenario (a driving scenario, a home scenario, a fitness scenario, or the like), the user switches between different electronic devices to display a display interface.

For example, when designing a layout file of each display interface in an application, a developer of the application may set, for a View and a ViewGroup included in the display interface, attribute values extended in this embodiment of this disclosure. These extended attribute values do not uniquely determine a dimension and a location of the View or the ViewGroup, but restrict a relative relationship (for example, a relative size relationship or a relative location relationship) between the View or the ViewGroup and another View (or another ViewGroup) on the display interface. In other words, when developing the application, the developer does not determine an appearance of each display interface presented to the user. Subsequently, when drawing the display interface by using the layout file, the electronic device obtains a screen parameter of the electronic device, determines a display parameter (for example, a display location and a display size of the display interface on a screen of the electronic device) of the display interface, and performs layout on a dimension, a location, and the like of each View and each ViewGroup on the display interface based on hierarchical structures and extended attribute values of each View and each ViewGroup included in the display interface in the layout file, and the screen parameter of the electronic device. For example, when running the application, the electronic device determines, based on the screen parameter of the electronic device, an appearance of each display interface presented to the user. It can be understood that electronic devices having different screen parameters draw different display interfaces based on a same layout file.

In some other embodiments, the solution provided in this embodiment of this disclosure may also be used in combination with a solution in which a large-sized screen reuses a layout file of a small-sized screen. For example, an electronic device having a large-sized screen may reuse a plurality of layout files of small-sized electronic devices in a multi-window management manner. It should be noted that the plurality of layout files of the small-sized electronic devices herein respectively correspond to different display interfaces. In other words, one display interface of the application herein still corresponds to one layout file.

Therefore, when displaying a display interface in each window, the electronic device having a large-sized screen adaptively adjusts a dimension, a location, and the like of each View and each ViewGroup on the display interface based on a layout file of the display interface corresponding to the window and a dimension of the window. In other words, even if an aspect ratio of each window on the electronic device having a large-sized screen is inconsistent with an aspect ratio of the electronic device having a small-sized screen, according to the adaptive layout solution provided in this embodiment of this disclosure, the interface displayed in each window on the electronic device having a large-sized screen can still present a relatively good display effect.

Figure 2:
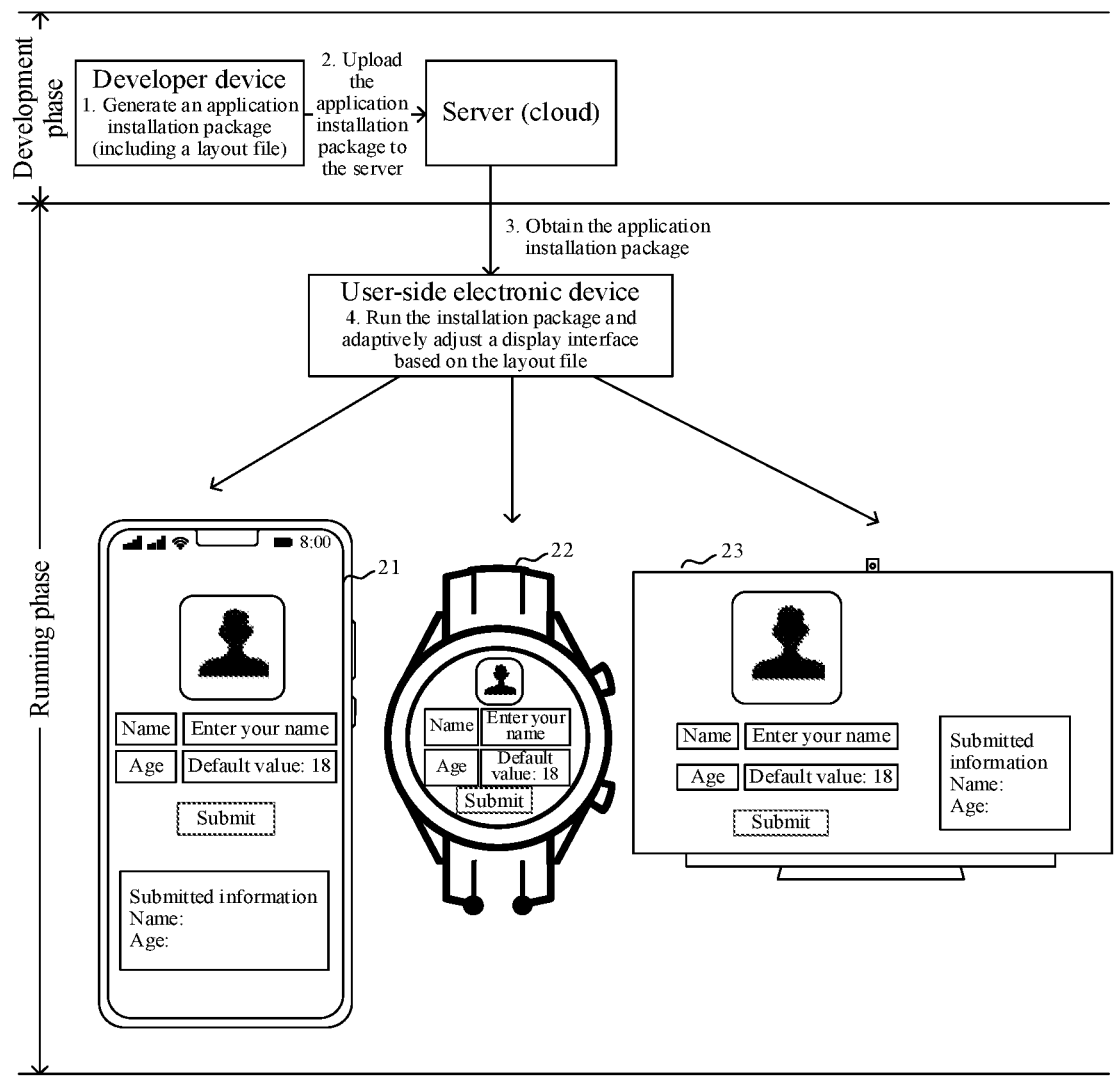
FIG. 2 is a schematic flowchart of an adaptive display interface layout method according to an embodiment of this disclosure.

As shown in FIG. 2, in a development phase, a developer develops one layout file (the layout file includes a View and a ViewGroup that are provided with extended attribute values in this disclosure) for each display interface of an application on a developer device (for example, a computer) by using a related development tool, packs the layout file into an installation package of the application, and uploads the application installation package to a server (cloud). Subsequently, all electronic devices (for example, electronic devices of different types or electronic devices of a same type but different models) having different screen parameters may download the application installation package from the server, and run the application installation package. It can be learned that each of these different electronic devices obtains a screen parameter of the electronic device, and determines a display parameter of the display interface of the application (for example, a display location and a display size of the display interface of the application on a screen of the electronic device). Then, the View and the ViewGroup on the display interface of the application are arranged with reference to the display parameter of the application and the layout file in the foregoing application installation package, and a corresponding display interface is displayed. For example, a mobile phone draws an interface 21 shown in FIG. 2, a smartwatch draws an interface 22 shown in FIG. 2, and Vision draws an interface 23 shown in FIG. 2.

It should be noted that, in this specification, a View or a ViewGroup having an extended attribute is also referred to as a View or a ViewGroup having an adaptive layout capability. In other words, in this embodiment of this disclosure, each View or each ViewGroup on the display interface has an adaptive layout capability. The adaptive layout capability of the View or the ViewGroup may be implemented by using a code module. The following describes an implementation process in detail by using a scaling capability as an example.

The adaptive layout capability of the View or the ViewGroup includes but is not limited to a scaling capability, a stretching capability, a hiding capability, a wrapping capability (which may also be referred to as an automatic branching capability), an equalization capability, a proportion capability, and an extension capability. The adaptive layout capability of the View or the ViewGroup is briefly described herein, and is described in detail below.

The scaling capability means that the View or the ViewGroup has a capability of adaptively scaling down or scaling up in a horizontal orientation and a vertical orientation in a layout container. For example, a proportion of the View or the ViewGroup in a specified orientation in the layout container may be set. In this way, when a dimension of the layout container changes, the View or the ViewGroup in the layout container keeps an original shape (for example, an aspect ratio) for scaling, so that a proportion of the View or the ViewGroup in the horizontal orientation in the layout container reaches a specified proportion after scaling, and/or a proportion of the View or the ViewGroup in the vertical orientation in the layout container reaches a specified proportion after scaling.

The stretching capability means that the View or the ViewGroup has an adaptive stretching capability in a specified orientation in the layout container. For example, a margin value of the View or the ViewGroup in the specified orientation (horizontal and/or vertical) in the layout container may be set. The margin value is a distance between the View or the ViewGroup and an edge of the layout container. In this way, when the dimension of the layout container changes, the View or the ViewGroup in the layout container maintains a margin with the layout container in the specified orientation, and adaptively changes with the dimension of the layout container in the specified orientation.

It should be noted that stretching in this embodiment of this disclosure includes scaling up (the dimension is increased) and scaling down (the dimension is decreased) of the View or the ViewGroup in the specified orientation. For example, the View or the ViewGroup is horizontally stretched, including a width increase or a width decrease of the View or the ViewGroup. The View or the ViewGroup is vertically stretched, including a height increase or a height decrease of the View or the ViewGroup.

The hiding capability is a capability of automatically hiding the View or the ViewGroup based on a priority during display. For example, a hiding priority of the View or the ViewGroup in the layout container may be set. A hiding priority is used as an example. When the dimension of the layout container changes and is insufficient to display all designed Views or ViewGroups, hiding is performed based on a hiding priority of each View or ViewGroup.

The wrapping capability means that the View or the ViewGroup in the layout container has an adaptive wrapping capability. For example, a wrapping reference value of the layout container may be set. When a total width and spacing of a row of Views or ViewGroups in the layout container are greater than the wrapping reference value, another View or ViewGroup greater than the wrapping reference value is automatically wrapped for display.

It should be noted that the wrapping capability herein includes horizontal wrapping and vertical wrapping. The horizontal wrapping means that a plurality of child views is originally arranged horizontally, and the electronic device may automatically determine to display the plurality of child views in separate lines based on a width of the layout container during display. The vertical wrapping means that a plurality of child views is originally arranged vertically, and the electronic device may automatically determine to display the plurality of child views in separate columns based on a height of the layout container during display. In some other examples, the vertical wrapping may also be considered as an inverse operation of the horizontal wrapping. Therefore, the wrapping capability in this disclosure may also be expressed as a branching capability, a column capability, a segmentation capability, a section capability, or the like. This is not limited in this embodiment of this disclosure.

The equalization capability means that the View or the ViewGroup in the layout container has an automatic spacing adjustment capability. For example, a spacing between Views or ViewGroups in a specified orientation in the layout container may be set to be evenly divided. In this case, when the dimension of the layout container changes, the View or the ViewGroup in the layout container adaptively adjusts the spacing of the View or the ViewGroup in the layout container based on the dimension of the View or the ViewGroup and the dimension of the layout container.

The proportion capability is a capability that the View or the ViewGroup maintains a fixed proportion in a specified orientation in the layout container. For example, a proportion of the layout container in the specified orientation (for example, a horizontal orientation or a vertical orientation) may be set. In this way, when the dimension of the layout container changes, the View or the ViewGroup in the layout container keeps an original shape (for example, an aspect ratio) for scaling, so that a proportion of the View or the ViewGroup in the specified orientation in the layout container meets a specified proportion after scaling.

The extension capability means that the layout container has a capability of automatically adjusting a quantity of displayed child views (Views or ViewGroups). The extension capability includes a general extension capability and an extended extension capability. The general extension capability means that, when the dimension of the layout container changes, a quantity of child views that are completely displayed in the layout container is determined based on the dimension of the layout container, a dimension of a child view in the layout container, and a default spacing. The completely displayed child view, also referred to as a fully displayed child view, means that all content of the child view is displayed in the layout container. The extended extension capability means that the layout container can further display a child view that is not completely displayed. The incompletely displayed child view, also referred to as a non-fully displayed child view or a partially displayed child view, means that partial content of the child view is displayed in the layout container. For example, a dimension threshold in the layout container may be set. In this case, when the dimension of the layout container changes, a dimension of the completely displayed child view and a dimension of the partially displayed content of the incompletely displayed child view in the layout container are determined based on a dimension of a child view in the layout container, the dimension of the layout container, and the dimension threshold.

It should be noted that the extension capability includes a horizontal extension capability and a vertical extension capability. The horizontal extension capability means that a quantity of displayed child views is determined based on the width of the layout container for horizontally arranged child views. The vertical extension capability means that a quantity of displayed child views is determined based on the height of the layout container for vertically arranged child views. This specification uses the horizontal extension capability as an example for description. For the vertical extension capability, refer to an implementation of the horizontal extension capability. Details are not described in this specification.

Figure 3:
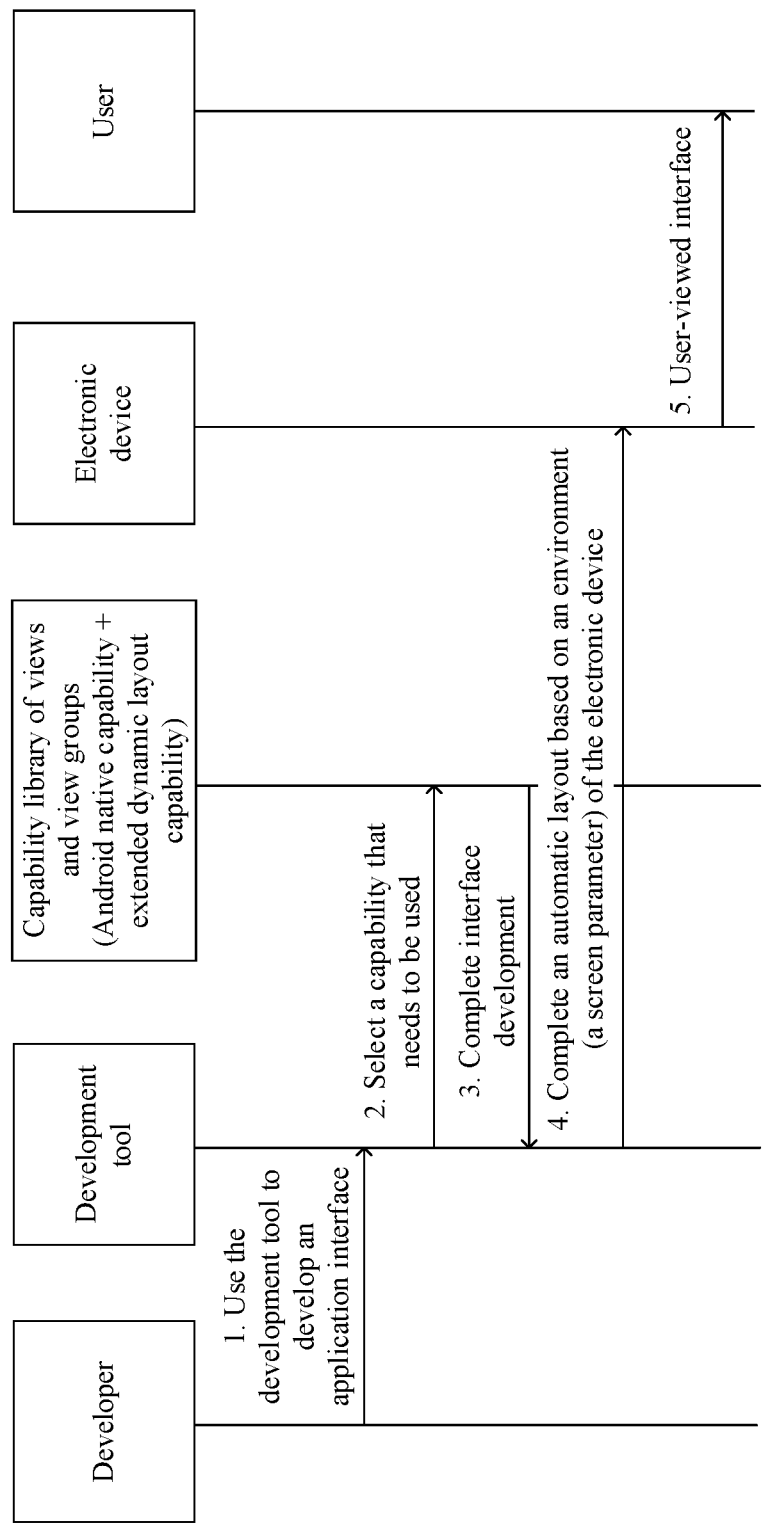
FIG. 3 is a schematic flowchart of another adaptive display interface layout method according to an embodiment of this disclosure.

FIG. 3 shows a general procedure of implementing an adaptive layout capability of a View or a ViewGroup according to an embodiment of this disclosure. First, a developer uses a development tool to develop an application interface. In a development process, a capability that needs to be used may be selected from View and ViewGroup capability libraries (including an ANDROID native capability and an adaptive layout capability extended in this disclosure) to obtain a layout file, to complete application interface development and generate an installation package of an application. Then, an electronic device may download the application installation package from an application market, and install and run the application installation package. When running the application, the electronic device completes an automatic layout based on the layout file and an environment (for example, a screen parameter) of the electronic device, and draws a corresponding application interface, that is, a user-viewed interface.

The following describes a specific solution of implementing an adaptive layout capability of a View or a ViewGroup in this disclosure.

When developing an application, a developer uses an integrated development environment (IDE) tool to develop the application. The IDE tool integrates an integrated software development service set including a code writing function, an analysis function, a compilation function, a debugging function, and the like. For example, a typical IDE tool of an ANDROID system includes any one of ANDROID Studio and DevEco Studio.

Figure 4A:
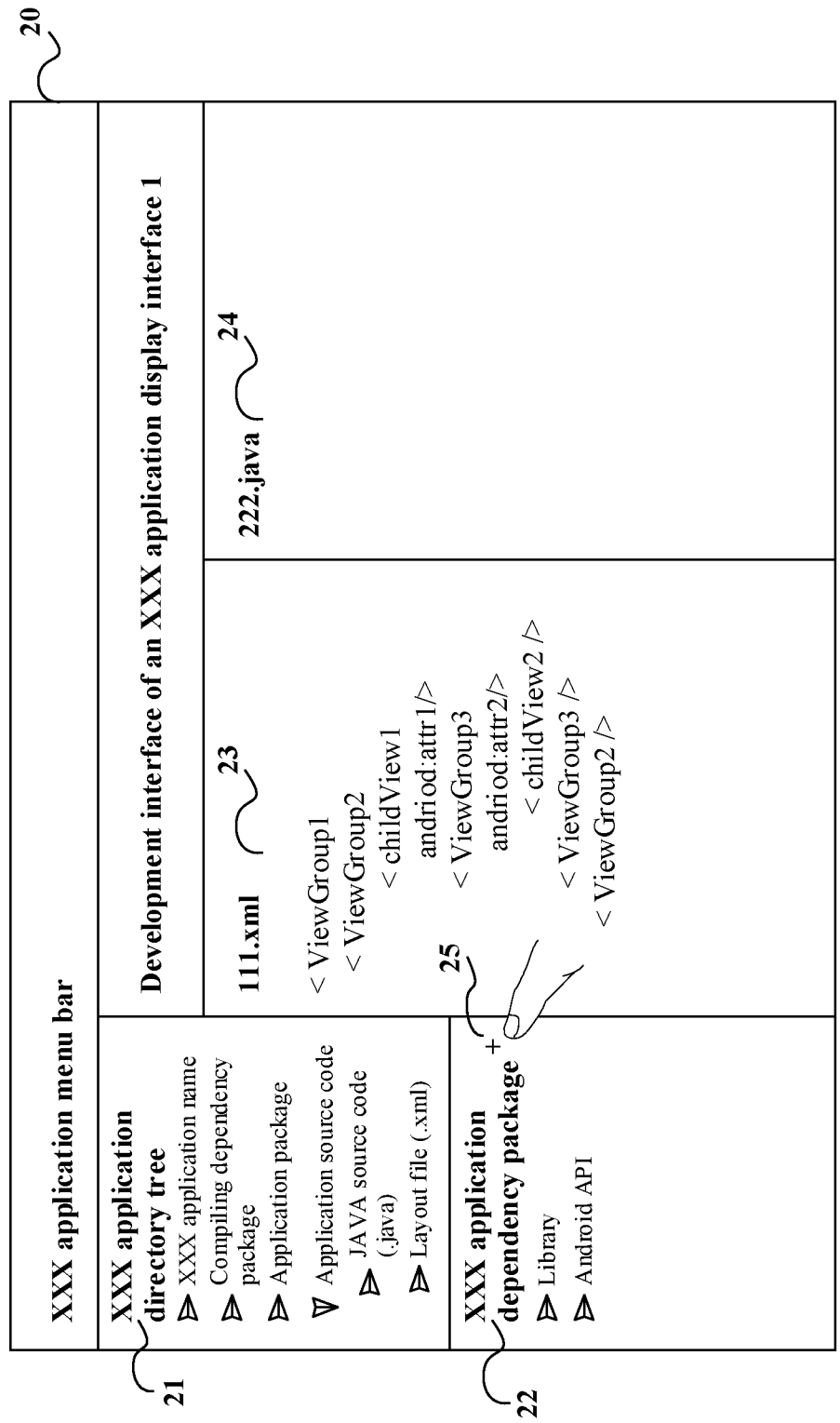
FIG. 4A and FIG. 4B are a schematic diagram of development interfaces of layout files of some display interfaces according to an embodiment of this disclosure.

FIG. 4A shows an example of a development interface 20 displayed when a developer develops an application. The development interface 20 includes an application directory tree 21, an application dependency package 22, and a development interface of an application display interface 1. The development interface of the application display interface 1 includes a layout file (for example, 111.xml) 23 and JAVA source code (for example, 222.java) 24.

The application directory tree 21 includes an application name, a compilation dependency package, an application package, and application source code. The developer may quickly open a corresponding file by using the application directory tree 21, so that the developer can conveniently edit the file. For example, the developer may quickly open a JAVA source code file or a layout file by using the JAVA source code or the layout file in the application source code, and the developer may edit the JAVA source code file or the layout file to edit a layout of each display interface in the application.

It should be noted that, before the layout of the display interface is edited, a library on which application development depends needs to be added. Further, the dependency library may be added to the application dependency package 22. For example, developing an application on the ANDROID system needs to depend on an extended library (External Libs) and an ANDROID application programming interface (API) library.

After adding the dependency library, the developer may set information such as hierarchical structures and attribute values of a View and a ViewGroup included in each display interface in the application and a display resource of each View by invoking a corresponding API interface in the JAVA source code 24, or the developer may set information such as hierarchical structures and attribute values of a View and a ViewGroup included in each display interface in the application and a display resource of each View in the layout file 23.

It should be noted that the View and the ViewGroup provided in this embodiment of this disclosure have adaptive layout capabilities. In addition to a basic library (External Libs or ANDROID API library) of the ANDROID system, an extended library in this disclosure such as an adaptive layout attribute package further needs to be depended on. In a specific implementation, the adaptive layout attribute package includes a declaration of each adaptive layout capability of the View and the ViewGroup, information about an interface invoked by each adaptive layout capability, and a preset algorithm corresponding to each adaptive layout capability (the preset algorithm may include a measurement procedure used for a layout of a layout container provided with each adaptive layout capability, and the like). Therefore, when developing the application, the developer designs a layout file of the application by using the declaration of each adaptive layout capability, the information about the interface invoked by each adaptive layout capability, or the like. In other words, the layout file includes the View or the ViewGroup provided with the adaptive layout capability. The developer packs the designed layout file, the preset algorithm corresponding to each adaptive layout capability, and other program code and resources required by the application into the installation package of the application. In another specific implementation, the developer designs a layout file of the application by using the declaration of each adaptive layout capability or the information about the interface invoked by each adaptive layout capability, and packs the designed layout file of the application and other program code and resources required by the application into the installation package of the application. In this example, an electronic device that subsequently installs the installation package of the application needs to have each adaptive layout capability provided in this embodiment of this disclosure, for example, pre-installs an algorithm module corresponding to each adaptive layout capability.

In other words, in a specific embodiment, the application installation package packed by the developer includes the layout file and the preset algorithm that corresponding to the adaptive layout capability that is set in the layout file. In another specific embodiment, the application installation package packed by the developer includes the layout file, but may not include the preset algorithm corresponding to the adaptive layout capability that is set in the layout file. In this embodiment, an electronic device that subsequently runs the application installation package pre-installs a preset algorithm module corresponding to the adaptive layout capability that is set in the layout file. For example, a pre-installed operating system of the electronic device includes the preset algorithm module corresponding to the adaptive layout capability, or the electronic device may download the preset algorithm module corresponding to the adaptive layout capability from a server (for example, a server that provides the adaptive layout capability or a server of the electronic device) and install the preset algorithm module.

After downloading and installing the installation package of the application, and when running the application, the electronic device may obtain an attribute value of the View or the ViewGroup of the adaptive layout capability based on the interface invoked by each adaptive layout capability, invoke a processing procedure corresponding to layout measurement of each adaptive layout capability to complete measurement and a layout, and finally draw a display interface. The interface invoked by each adaptive layout capability and the processing procedure corresponding to each adaptive layout capability (for example, the preset algorithm corresponding to each adaptive layout capability) are described in detail in the following when a processing procedure of the electronic device is described.

Figure 4B:
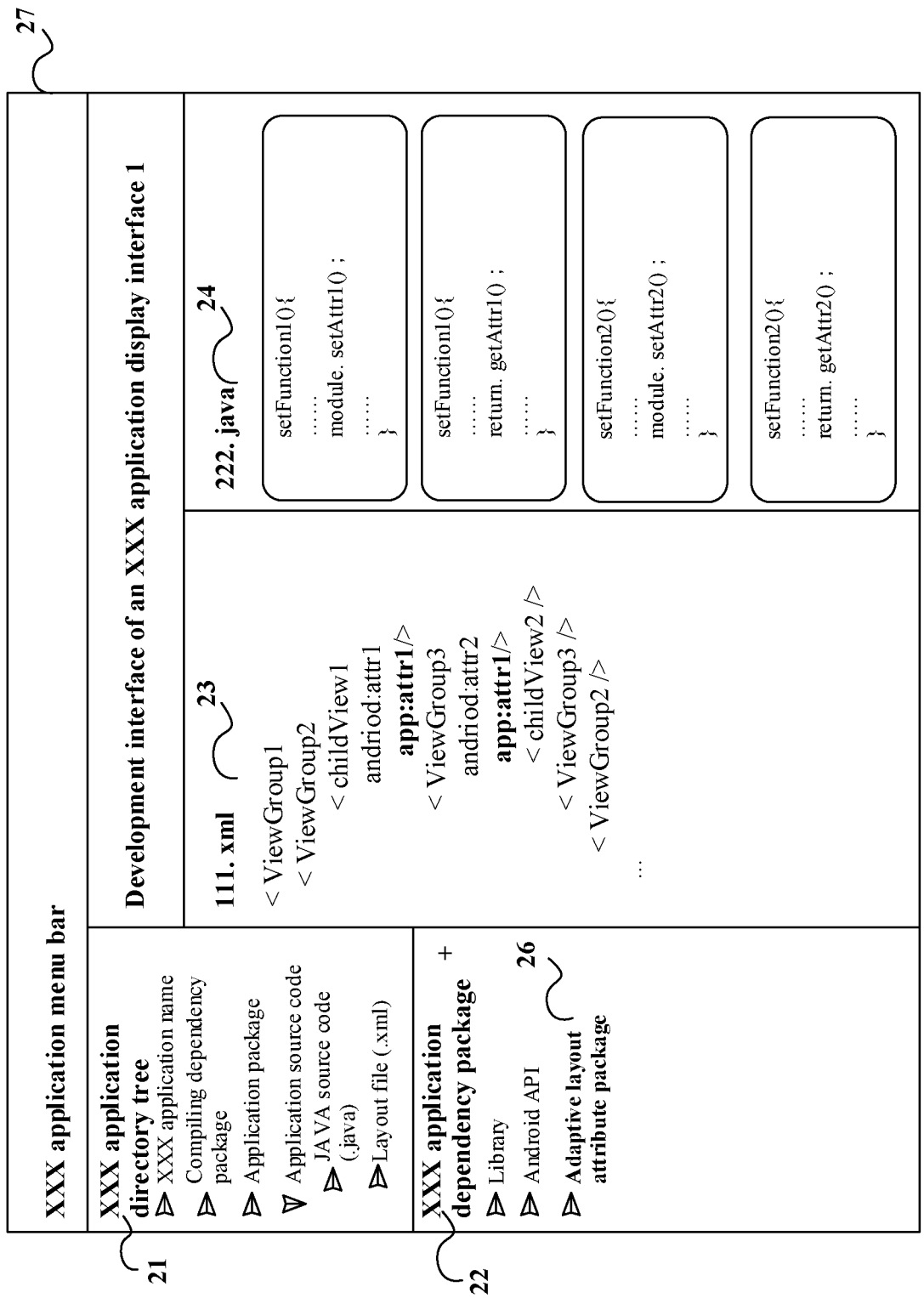

For example, as shown in FIG. 4A, the developer may add an adaptive layout attribute package by using a view 25. As shown in a development interface 27 in FIG. 4B, an adaptive layout attribute package 26 is newly added to the application dependency package.

It can be learned from the layout file 23 that "android:" guides an attribute value of a native View or ViewGroup of the ANDROID system, and "app:" guides an attribute value of an extended View or ViewGroup in this disclosure, that is, an attribute value of a View or a ViewGroup having an adaptive layout capability. Alternatively, it can be learned from the JAVA source code 24 that an API interface corresponding to the adaptive layout capability invoked by the developer includes, for example, setAttr1( ), getAttr1( ), setAttr2( ), and getAttr2( ).

Then, the developer uses the IDE tool to pack the source code, the resources (including the layout file), the dependency library, and the like of the developed application into the installation package (for example, an ANDROID Package Kit (APK) file). In other words, the developer completes the development of the application. Then, the installation package of the application is released to an application market. A user may download and install the application on different electronic devices. It should be noted that electronic devices having different screen parameters draw a display interface of the application by using a same layout file.

For example, the electronic device in this embodiment of this disclosure may be a mobile phone, a tablet computer, a personal computer (PC), a personal digital assistant (PDA), a netbook, a wearable electronic device (such as a smart band or a smartwatch), an augmented reality (AR) device, a virtual reality (VR) device, a vehicle-mounted device, Vision, a smart car, or a smart speaker. A specific form of the electronic device is not limited in this disclosure.

Figure 5:
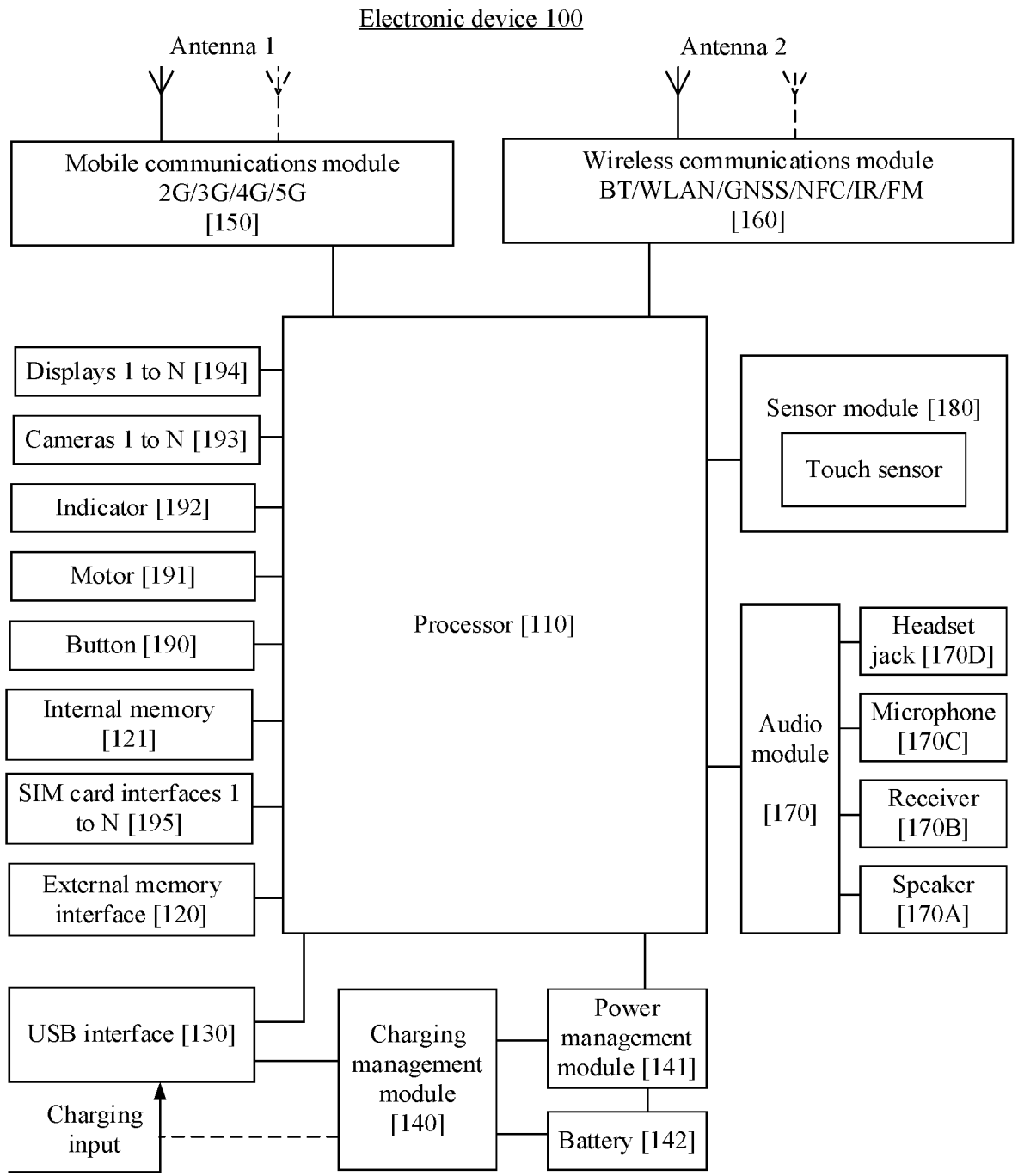
FIG. 5 is a schematic diagram of a structure of an electronic device according to an embodiment of this disclosure.

FIG. 5 is a schematic diagram of a structure of an electronic device 100. It may be understood that the structure shown in this embodiment of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The electronic device 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces a waiting time of the processor 110, and improves system efficiency.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random-access memory (RAM), or may include a nonvolatile memory, for example, at least one magnetic disk storage device, a flash memory, or a Universal Flash Storage (UFS). The processor 110 runs instructions stored in the internal memory 121 and/or instructions stored in the memory disposed in the processor, to perform various function applications and data processing of the electronic device 100.

The external memory interface 120 may be used to connect to an external storage card, for example, a micro Secure Digital (SD) card, to extend a storage capability of the electronic device 100. The external memory card communicates with the processor 110 through the external memory interface 120, to implement a data storage function. For example, files such as music and videos are stored in the external storage card.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like. The mobile communications module 150 may provide a solution, applied to the electronic device 100, to wireless communication including second generation (2G), third generation (3G), fourth generation (4G), fifth generation (5G), or the like. The wireless communications module 160 may provide a wireless communication solution that is applied to the electronic device 100, and that includes a wireless local area network (WLAN) (for example, a WI-FI network), BLUETOOTH (BT), a global navigation satellite system (GNSS), frequency modulation (FM), a near-field communication (NFC) technology, an infrared (IR) technology, or the like.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS).

The electronic device 100 may implement a display function through the GPU, the display 194, the application processor, and the like. The electronic device 100 may implement a photographing function through the camera 193, the ISP, the video codec, the GPU, the display 194, the application processor and the like. The electronic device 100 may implement an audio function such as music playing and recording through the audio module 170, the speaker 170A, the receiver 170B, the microphone 170C, the headset jack 170D, the application processor, and the like.

The button 190 includes a power button, a volume button, and the like. The button 190 may be a mechanical button, or may be a touch button. The electronic device 100 may receive a key input, and generate a key signal input related to a user setting and function control of the electronic device 100. The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized. The indicator 192 may be an indicator light, and may be configured to indicate a charging status and a power change, or may be configured to indicate a message, a missed call, a notification, and the like. The SIM card interface 195 is configured to connect to a SIM card.

The sensor module 180 may include a touch sensor. The touch sensor is also referred to as a "touch component". The touch sensor may be disposed on the display 194, and the touch sensor and the display 194 form a touchscreen, which is also referred to as a "touch screen". The touch sensor is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor may alternatively be disposed on a surface of the electronic device 100, and is at a location different from that of the display 194.

Figure 6:
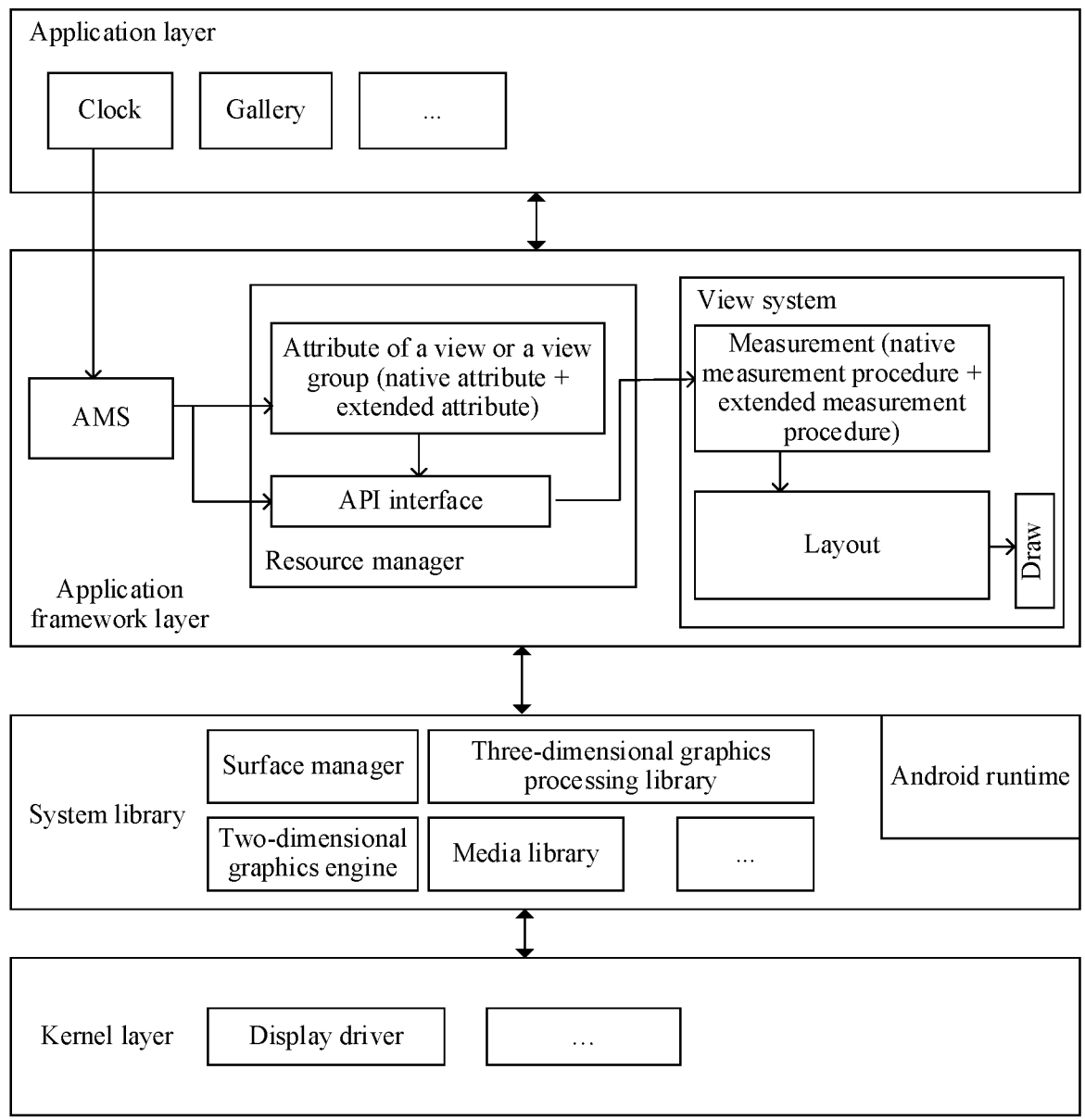
FIG. 6 is a schematic diagram of a structure of another electronic device according to an embodiment of this disclosure.

FIG. 6 is a block diagram of a software structure of an electronic device 100 according to an embodiment of the present disclosure.

In a layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom.

The application layer may include a series of application packages. As shown in FIG. 6, the application packages may include a gallery application, a clock application, and the like. It should be noted that the gallery application or the clock application herein is an application installed by using the foregoing application installation package. In other words, a layout file corresponding to the gallery application, the clock application, or the like includes a View or a ViewGroup provided with the foregoing adaptive layout capability.

The application framework layer provides an API and a programming framework for an application at the application layer. The application framework layer includes some predefined functions. As shown in FIG. 6, the application framework layer may include an activity manager system (AMS), a resource manager, a window manager system (WMS) (not shown in the figure), and a view system.

The AMS is configured to control all aspects of an application life cycle and an activity stack. The resource manager is configured to provide access to a non-code embedded resource such as a string, a color setting, and a user interface layout. The WMS is configured to obtain a display size, determine whether there is a status bar, perform screen locking, take a screenshot, and the like. The view system is configured to provide a view set for creating an application user interface.

Further, after an application (for example, the clock application) is started, the AMS responds to a touch event, and starts a main Activity. In the main Activity, attribute values of a View or a ViewGroup included in the display interface are read from the resource manager by performing an inflate procedure in setContentView. In some examples, a layout file is first read in the resource manager, and then a corresponding interface is invoked by using the layout file, to write the attribute values of each View and each ViewGroup included in the display interface. In some other examples, an interface may alternatively be directly invoked in the resource manager, to write the attribute values of each View and each ViewGroup included in the display interface. It should be noted that the attribute values of the View and the ViewGroup herein include an ANDROID native attribute value and an attribute value related to an adaptive layout capability in this disclosure. Then, a window drawing procedure of the view system is entered, and drawing of the display interface is completed by performing three procedures: measurement, layout, and draw. The measurement procedure includes an ANDROID native measurement procedure and an extended measurement procedure related to the adaptive layout capability in this disclosure.

The ANDROID runtime includes a kernel library and a virtual machine. The ANDROID runtime is responsible for scheduling and management of the ANDROID system.

The kernel library includes two parts: a function that needs to be called in JAVA language and a kernel library of ANDROID.

The application layer and the application framework layer run on the virtual machine. The virtual machine executes JAVA files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional (3D) graphics processing library (for example, OpenGL ES), and a 2D graphics engine (for example, SGL).

The surface manager is configured to manage a display subsystem, and provide fusion of 2D and 3D layers for a plurality of applications. The media library supports playback and recording in a plurality of commonly used audio and video formats, and static image files. The media library may support a plurality of audio and video coding formats, for example, Moving Picture Experts Group (MPEG)-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG). The 3D graphics processing library is configured to implement 3D graphics drawing, image rendering, composition, layer processing, and the like. The two-dimensional (2D) graphics engine is a drawing engine for 2D drawing.

The kernel layer is a layer between hardware and software. The kernel layer includes at least a display driver and the like.

After the electronic device 100 installs the foregoing application, the internal memory 121 in the electronic device 100 stores a layout file of each display interface of the application. When the electronic device 100 detects an operation of running the application, the electronic device 100 starts the application, and starts to draw each display interface of the application based on the layout file of the display interface.

An example in which an electronic device 100 equipped with an ANDROID system runs a clock application is used for description.

Figure 7A:
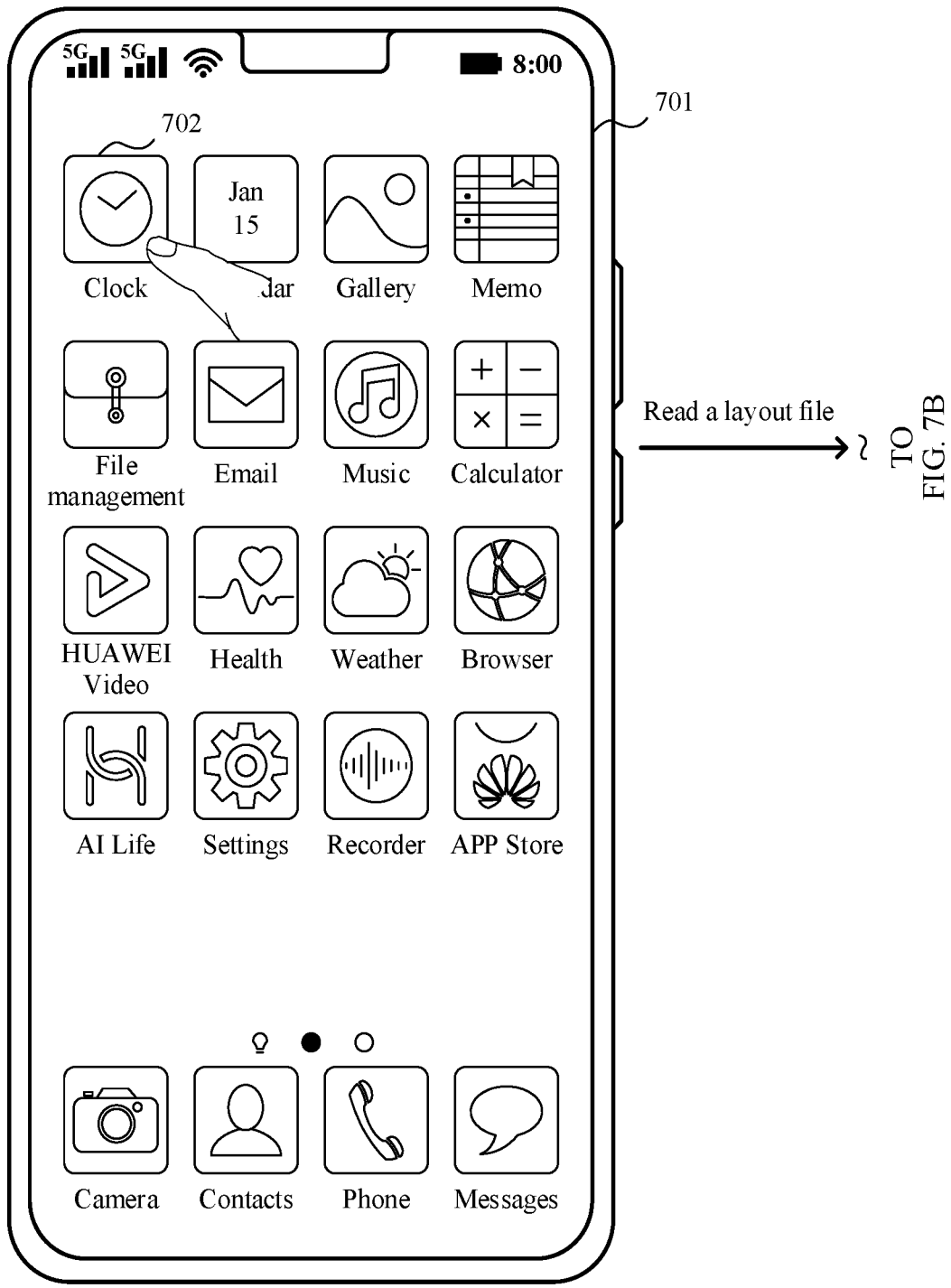
FIG. 7A and FIG. 7B are a schematic diagram of another display interface layout method according to an embodiment of this disclosure.
Figure 7B:
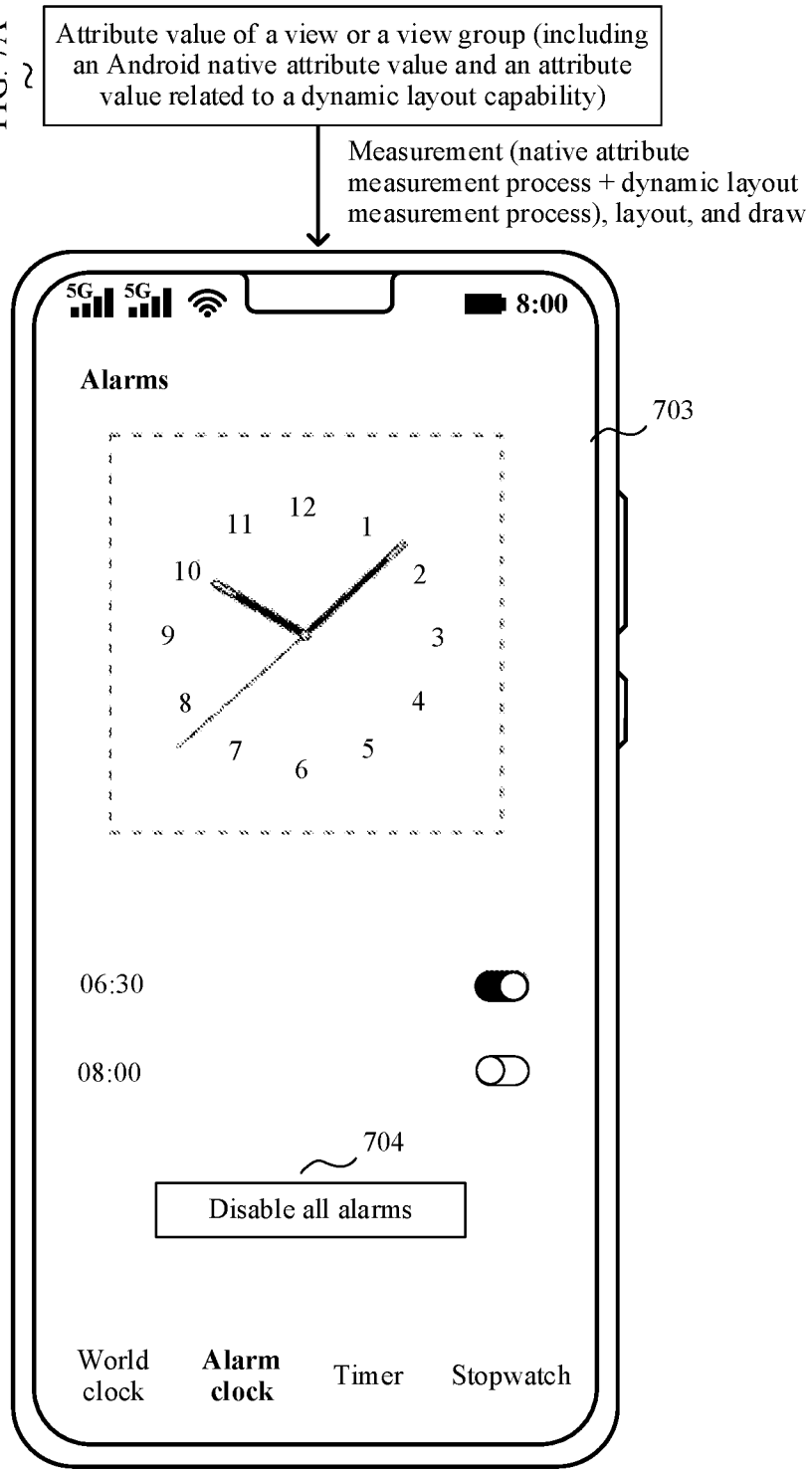

As shown in FIG. 7A, a display interface 701 is a home screen interface displayed by the electronic device 100 (for example, a mobile phone). In response to an operation of detecting that a user operates an icon 702 of the clock application on the display interface 701, the mobile phone starts the clock application, and draws a home page 703 of the clock application. A layout container in which a view 704 on the home page 703 is located has an extension capability. The view 704 changes with the layout container. The home page of the clock application may be understood as the 1$^{st}$ interface displayed after the clock application runs.

It should be further noted that an example in which an application is started to display a home page is used for description herein. After the application is started, in response to a user operation, the method provided in this disclosure is also applicable when the mobile phone displays another interface (not the home page).

Further, after the clock application is started, the mobile phone creates an Activity corresponding to the application, that is, a main Activity, and then generates a PhoneWindow instance by using an attach( ) method in the Activity. A DecorView is created in the PhoneWindow instance, and a screen parameter of the electronic device is obtained to determine sizes and locations (locations of four vertices, namely, locations of upper, lower, left, and right borders) of the PhoneWindow and the DecorView. Then, an inflate procedure of a setContentView( ) method of the Window is invoked to read a layout file of the clock application. The layout file includes Views and ViewGroups included in each display interface of the clock application (for example, the home page of the clock application), hierarchical structures of these Views and ViewGroups, and attributes of these Views and ViewGroups. The mobile phone invokes a corresponding interface to write each attribute value of these Views and ViewGroups. In addition, a dimension and a location of each ViewGroup and each View in the DecorView are determined level by level from a root based on a hierarchical structure of a view tree in the layout file. In other words, each View in the DecorView calculates a dimension and a location of the View based on a dimension constraint transferred by a parent layout container and a configuration (that is, a configured attribute value) of the View. Then, the mobile phone draws all Views, to obtain the home page of the clock application.

It should be noted that the attributes of these Views and ViewGroups herein include an ANDROID native attribute and an attribute related to an adaptive layout capability in this embodiment of this disclosure. Then, the mobile phone enters a window drawing procedure, and completes drawing of the display interface by performing three procedures: measurement (Measure), layout (Layout), and draw (Draw).

The foregoing measurement is used to calculate an actual size of the View. Starting with a perform Measure method, a MeasureSpec parameter is included. MeasureSpec indicates a 32-bit integer. The most significant two bits indicate a measurement mode (SpecMode), and the least significant 30 bits indicate a specification dimension (SpecSize) in a measurement mode. In other words, MeasureSpec is used to describe a manner of measuring this View. The foregoing layout is used to determine a location of the View in the parent layout container. This is implemented after the parent layout container obtains a location parameter of a child View, invokes a layout method of the child View, and transfers the location parameter. The foregoing draw is used to draw a view, starting from a perform Draw method. For the layout and draw processes, refer to related content in the conventional technology. Details are not described herein again.

It should be noted that MeasureSpec of the DecorView is determined based on both a window dimension and a layout parameter (LayoutParams), and MeasureSpec of a common View is determined based on both MeasureSpec of a layout container in which the common View is located (that is, a parent layout container) and LayoutParams.

In this embodiment of this disclosure, the window dimension is determined based on a screen parameter of the mobile phone. The screen parameter includes a screen specification parameter, a screen status parameter, and the like. The screen specification includes a dimension of a screen (for example, a width and a height of the screen). The screen specification determines a dimension of an area actually used by the mobile phone to display application content. In some examples, a form of a display also affects a dimension of an area actually used by the electronic device to display application content. For example, when the display is a notch screen, an area of the notch screen is not used to display application content. For another example, when the display is a curved screen, a curved area at an edge is not used to display application content. The screen status includes whether the screen is in a landscape state or a portrait state.

If the screen is a foldable screen, the screen is in a folded state, a half-folded state, an expanded state, or the like. If the screen supports screen splitting, a dimension of a window displayed by a current application can be determined accordingly. The half-folded state means that, when the foldable screen supports a plurality of times of folding, a part of the screen is in a folded state, and the other part of the screen is in an expanded state.

LayoutParams of each of the View and the ViewGroup includes a native attribute of the ANDROID system, an attribute related to an adaptive layout capability in this embodiment of this disclosure, and the like. Therefore, in a measurement process, the mobile phone performs measurement based on the native attributes of the ANDROID system of the View and the ViewGroup in the layout file, and further needs to perform measurement based on the attributes related to the adaptive layout capabilities of the View and the ViewGroup in the layout file. For a process in which the mobile phone performs measurement based on the native attributes of the ANDROID system of the View and the ViewGroup in the layout file and a process in which the mobile phone performs layout based on the native attributes of the ANDROID system of the View and the ViewGroup in the layout file, refer to related content in the conventional technology. Details are not described herein again.

For each adaptive layout capability extended in this embodiment of this disclosure, the following describes in detail a manner in which a developer designs a layout file including a View or a ViewGroup having an adaptive layout capability and a method for implementing adaptive layout based on a layout file when an electronic device runs an application.

(1) Extension Capability:

When developing an application, after adding dependency of an adaptive layout attribute package, a developer may set a ViewGroup having an extension capability on a display interface. Further, when editing a layout file of the display interface, the developer may set an attribute value related to the extension capability of the ViewGroup in the layout file (for example, an Extensible Markup Language (XL) file), or may set an attribute value related to the extension capability of the ViewGroup in a JAVA source code file by adding a call interface.

Table 1 shows an example of an attribute related to the extension capability.

extension capability enablement, and set the default spacing between the child views in the layout container. A capability of displaying the partial content of the last child view displayed in the layout container may be further enabled through extended extension capability enablement. The child view that displays partial content may be used to prompt a user that there is a child view that is not displayed or a child view that is not completely displayed in the current layout container, so that the user can perform a corresponding operation to view the child view that is not displayed. Further, the dimension threshold and the threshold of the spacing between the child views in the layout container may be set. Subsequently, when running the application and drawing the child view, the electronic device determines a quantity of displayed child views based on the dimension of the layout container, the dimension threshold of the child view, the spacing threshold, and the like, adjusts the spacing between the child views, and the like.

The meaning of each attribute related to the extension capability and an effect of displaying the layout container and the child view are described in detail below with reference to the accompanying drawings.

In some embodiments, the developer may set the general extension capability of the layout container to be enabled, and set the default spacing of the layout container. In this case, the electronic device determines, based on a width of the layout container, a width of each included child view, and the default spacing, a quantity of child views that can be completely displayed in the layout container actually.

For example, it is set that a layout container includes five horizontally arranged child views: a child view A to a child view E.

Figure 8:
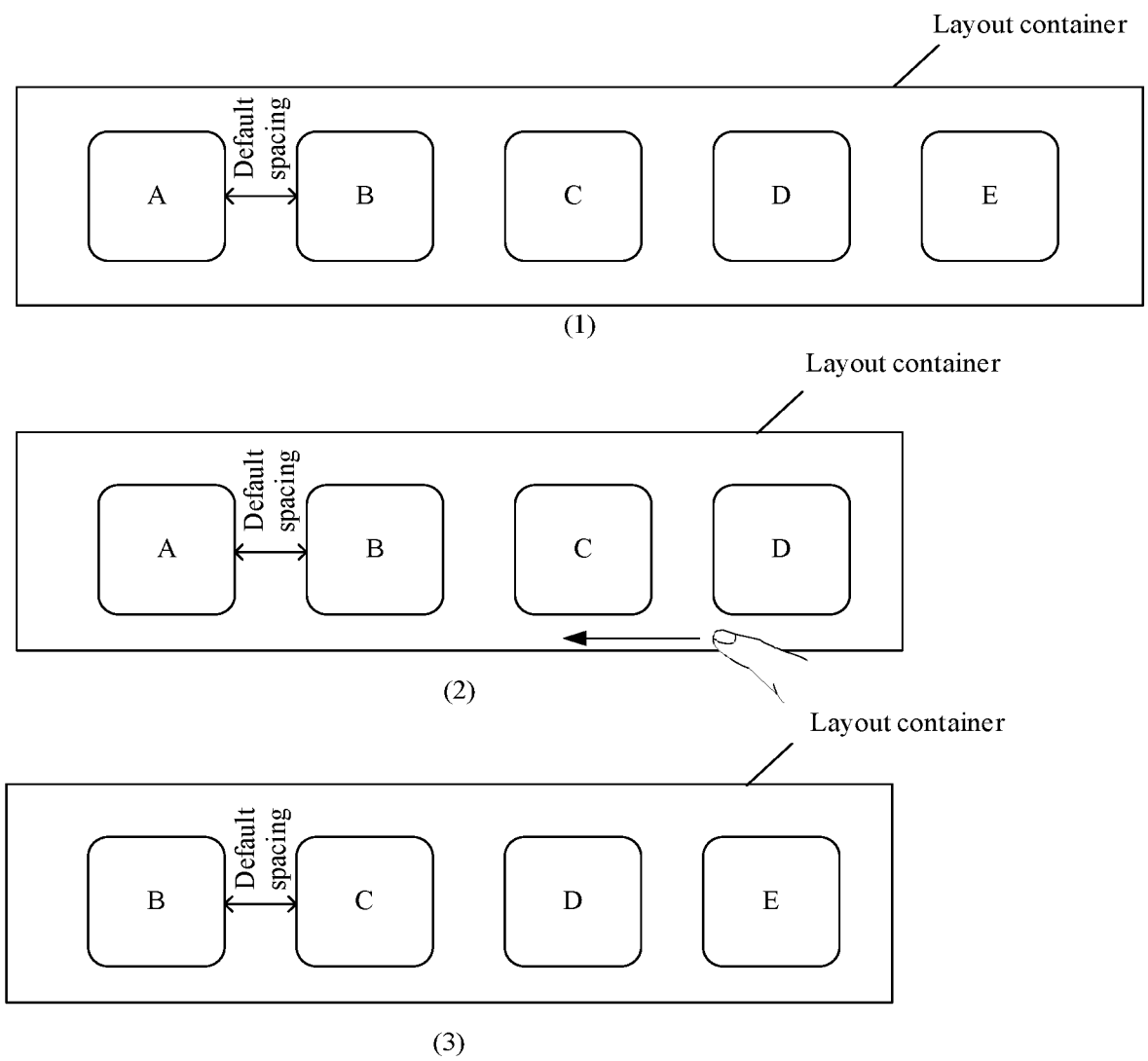
FIG. 8 is a display effect diagram of a layout container having an extension capability in different scenarios according to an embodiment of this disclosure.

(1) in FIG. 8 is an effect diagram of a layout container displayed by an electronic device 1. In this case, width of the layout container displayed by the electronic device 1≥sum of widths of child views in the layout container+default spacing*(quantity of child views−1). Therefore, the layout container on the electronic device 1 may horizontally display all the child views (the child view A to the child view E), and the child views keep the default spacing. In this case, the child view A to the child view E are completely displayed.

(2) in FIG. 8 is an effect diagram of a layout container displayed by an electronic device 2. In this case, width of the layout container displayed by the electronic device 2<sum of widths of child views in the layout container+default spac-

TABLE 1

| Attribute | Attribute type | Application scope | Meaning |
| --- | --- | --- | --- |
| General extension capability enablement | Boolean (boolean value) | Layout container | General extension function enabled/disabled |
| Default spacing | Dimension | Layout container | Default child view spacing in the layout container |
| Extended extension capability enablement | Boolean (boolean value) | Layout container | Extended extension function enabled/disabled |
| Dimension threshold | Dimension | Layout container | Dimension of partial content of the last displayed child view |
| Spacing threshold | Dimension | Layout container | A child view spacing in the layout container is not less than the spacing threshold |

It should be noted that, when setting the attribute of the layout container, the developer may enable a general extension capability of the layout container through general ing*(quantity of child views−1). Therefore, the layout container on the electronic device 2 cannot completely display all child views. Therefore, the electronic device 2 may determine, based on the actual width of the layout container, the width of the child view, and the default spacing, a quantity of child views that can be completely displayed on the electronic device 2. For example, the layout container on the electronic device 2 can completely display a maximum of four child views at a time: the child view A to the child view D, and the child views keep the default spacing. In this case, the child view A to the child view D are completely displayed.

It should be noted that the layout container supports scrolling viewing. In other words, the user may operate the layout container to view another child view that is not currently displayed on a screen. For example, in response to a slide-left operation performed by the user on a location of the layout container on the electronic device 2, the electronic device 2 displays an interface shown in (3) in FIG. 8, and displays the child view E on the interface. It can be learned that the layout container on the electronic device 2 can also completely display a maximum of four child views in this case.

In a specific implementation, the extension capability may be set for a layout container in which an image view, a button view, or the like is located. When a width of the layout container changes, a quantity of displayed image views or button views may be automatically determined based on the width of the layout container, so as to meet display requirements of electronic devices having different screen dimensions. It can be learned that the general extension capability in this solution can enable electronic devices having different screen parameters to present different display effects based on a same layout setting, reduce development and maintenance workload of developers, and meet display requirements of various types of electronic devices.

In some other embodiments, the developer may further set the extended extension capability of the layout container to be enabled, and set attributes such as the dimension threshold and the spacing threshold. In this case, the electronic device determines, based on a width of the layout container, a width of each child view, and the default spacing, whether the layout container can completely display all child views. If not all child views are completely displayed, the default spacing is reduced until the spacing threshold is reached. If all child views still cannot be completely displayed when the default spacing is reduced to the spacing threshold, a quantity of child views that can be completely displayed actually is determined based on the actual dimension of the layout container, the width of each child view, and the dimension threshold.

For example, it is set that a layout container includes five horizontally arranged child views: a child view A to a child view E.

Figure 9:
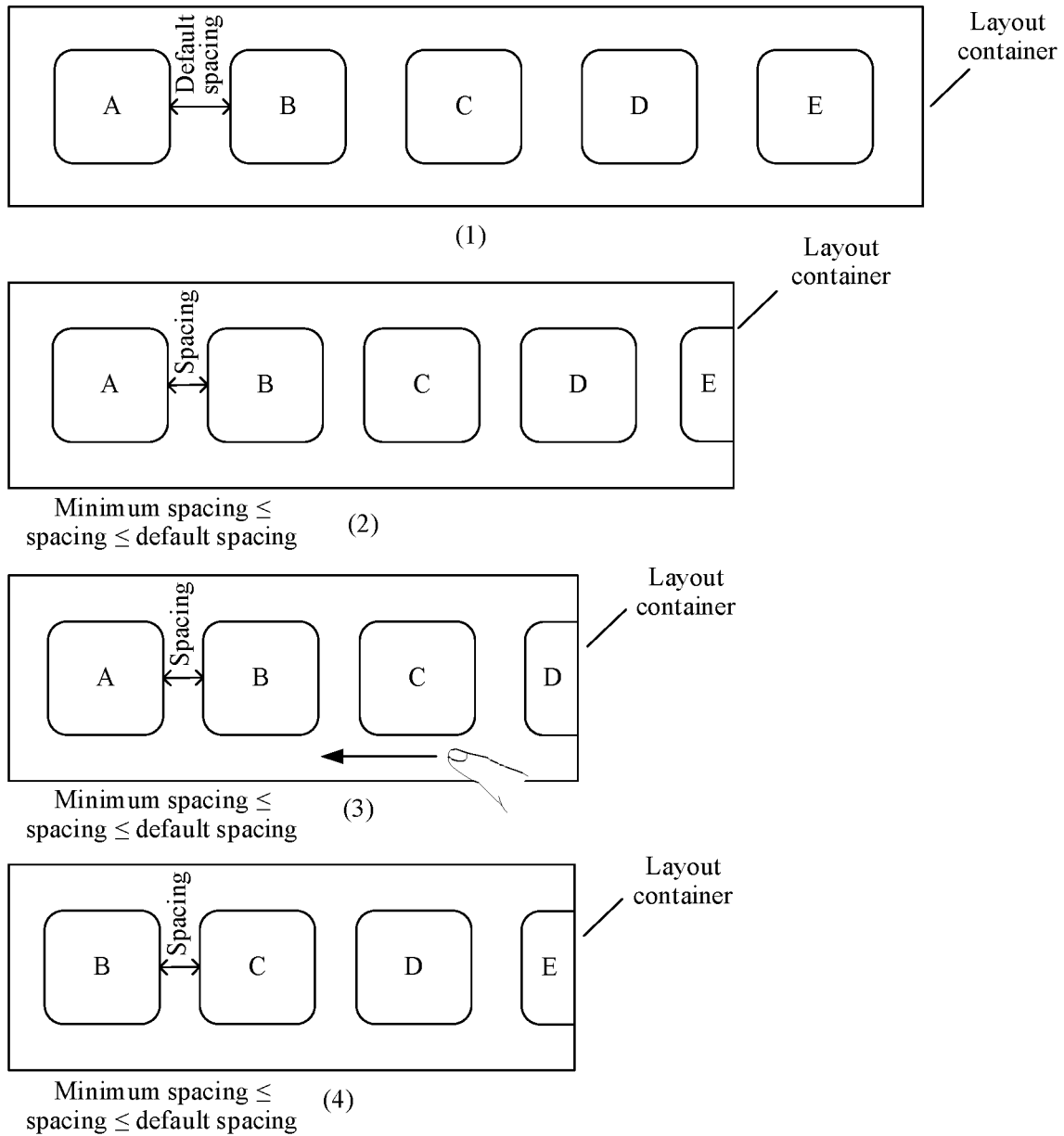
FIG. 9 is a display effect diagram of another layout container having an extension capability in different scenarios according to an embodiment of this disclosure.

(1) in FIG. 9 is an effect diagram of a layout container displayed by an electronic device 1. In this case, width of the layout container displayed by the electronic device 1≥sum of widths of child views in the layout container+default spacing*(quantity of child views−1). Therefore, the layout container on the electronic device 1 may horizontally display all the child views (the child view A to the child view E), and the child views keep the default spacing. In this case, the child view A to the child view E are completely displayed.

Alternatively, although width of the layout container displayed by the electronic device 1<sum of widths of child views in the layout container+default spacing*(quantity of child views−1), width of the layout container displayed by the electronic device 1≥sum of the widths of the child views in the layout container+spacing threshold*(quantity of child views−1). The electronic device 1 may also adjust a spacing between child views, so that the layout container on the electronic device 1 can completely display all child views (the child view A to the child view E), and the spacing between the child views is greater than or equal to the spacing threshold.

(2) in FIG. 9 is an effect diagram of a layout container displayed by an electronic device 2. In this case, width of the layout container displayed by the electronic device 2<sum of widths of child views in the layout container+spacing threshold*(quantity of child views−1). Therefore, the layout container on the electronic device 2 cannot completely display all child views. In this case, the electronic device needs to display a child view of partial content. The electronic device 2 may determine, based on the actual dimension of the layout container, the width of each child view, the dimension threshold, and the spacing threshold, a quantity of child views that can be completely displayed by the layout container. For example, the electronic device 2 determines that the layout container can display a maximum of four complete child views (the child view A to the child view D) and partial content of one child view (partial content of the child view E) at a time, and the spacing between the child views is greater than or equal to the spacing threshold.

(3) in FIG. 9 is an effect diagram of a layout container displayed by an electronic device 3. In this case, width of the layout container displayed by the electronic device 3<sum of widths of child views in the layout container+spacing threshold*(quantity of child views−1). Therefore, the layout container on the electronic device 3 cannot completely display all child views. In this case, the electronic device needs to display a child view that displays only partial content. The electronic device 3 may determine, based on the actual dimension of the layout container, the width of each child view, the dimension threshold, and the spacing threshold, a quantity of child views that can be displayed by the layout container. For example, the electronic device 3 determines that the layout container can display a maximum of three complete child views (the child view A to the child view C) and partial content of one child view (partial content of the child view D) at a time, and the spacing between the child views is greater than or equal to the spacing threshold.

It should be noted that the layout container supports scrolling viewing. In other words, the user may operate the layout container to view another child view that is not currently displayed on a screen. For example, in response to a slide-left operation performed by the user on a location of the layout container on the electronic device 3, the electronic device 3 displays an interface shown in (4) in FIG. 9, and displays all content of the child view D and partial content of the child view E on the interface.

It can be learned from the foregoing descriptions that, in this embodiment of this disclosure, a quantity of displayed child views may be adaptively reduced based on a change of a layout container, and a child view that displays only partial content may also be displayed, and a dimension of the partial content displayed by the child view may keep a fixed value (that is, the dimension threshold). In this way, the child view that displays only partial content may be used to prompt the user that there is still a child view that is not displayed in the layout container. In addition, keeping the dimension threshold as a fixed value can prevent the user from feeling jagged confusion caused because different screen dimensions lead to different dimensions of child views that display partial content.

The following provides an example of a layout file (an XML file). A layout container with an extension capability enabled is set in the layout file. In addition, the layout container includes four child views: four linear layout containers, and each linear layout container stores one image view and one text view. It should be noted that, because the extension capability needs to support scrolling viewing, the entire layout container having the extension capability needs to be placed in ScrollView, horizontal extension needs to be placed in HorizontalScrollView, and layout_width needs to be set to match_parent. A vertical extension capability can be deduced by analogy.

```
/* layout extension example */
<HorizontalScrollView
    xmlns:android="http://schemas.android.com/apk/res/android"
    xmlns:app="http://schemas.android.com/apk/res-auto"
        android:layout_height="wrap_content"         //set a height of the layout container
    android:layout_width="match_parent"              //set a width of the layout
container
    /* omit other configurations */ >
        <hwLayout /* omit other configurations */
            android:orientation="horizontal"         //set a layout
orientation to horizontal
            app: extension capability enablement="true" //enable a general extension
capability of the layout container
            app: extended extension capability enablement="true"    //enable an
extended extension capability of the layout container
            app: dimension threshold="32dp">         //set a dimension of the last child view
displayed in the layout container
            <LinearLayout /* omit other configurations */>//set a child view in the
layout container-linear layout container
                <ImageView /* omit other configurations */    //set a child view in the
linear layout container-image view
                    android:background="@drawable/shape_drawable"
                    android:src="@drawable/ic_group_04" />
                <TextView /* omit other configurations */     //set another child
view in the linear layout container-text view
                    android:text="game circle"/>
            </LinearLayout>
            <LinearLayout /* omit other configurations */>//set another child view in
the layout container-linear layout container
                <ImageView /* omit other configurations *////set a child view in
another linear layout container in the layout container-image view
                    android:background="@drawable/shape_drawable"
                    android:src="@drawable/ic_group_05" />
                <TextView /* omit other configurations *////set another child view in
another linear layout container in the layout container-text view
                    android:text="optical illusion" />
            </LinearLayout>
            <LinearLayout /* omit other configurations */>
                <ImageView /* omit other configurations */
                    android:background="@drawable/shape_drawable"
                    android:src="@drawable/ic_group_01" />
                <TextView /* omit other configurations */
                    android:text="fashion talent" />
            </LinearLayout>
            <LinearLayout /* omit other configurations */>
                <ImageView /* omit other configurations */
                    android:background="@drawable/shape_drawable"
                    android:src="@drawable/ic_group_02" />
                <TextView /* omit other configurations */
                    android:text="travel group" />
            </LinearLayout>
            < /* omit other configurations */>
    </hwLayout>
</HorizontalScrollView>
```

The foregoing embodiment is a solution in which the developer designs an adaptive display interface layout by setting an attribute value related to an extension capability of a View or a ViewGroup in a layout file (for example, an XML file). Alternatively, an attribute value related to an extension capability of a View or a ViewGroup may be set in a JAVA source code file by adding a call interface.

Table 2 shows an example of an interface corresponding to the attribute value related to the extension capability of the View or the ViewGroup.

TABLE 2

| Qualifier and type | Name and description | Parameter description |
| --- | --- | --- |
| Public boolean | Is general extension capability ( ) Obtain a general extension capability enablement status | Return a general extension capability enabled/disabled state |
| Public int | Get dimension threshold ( ) Obtain a dimension threshold of the extension capability | Return the dimension threshold of the extension capability |

TABLE 2-continued

| Qualifier and type | Name and description | Parameter description |
|---|---|---|
| Public void | Set extended extension capability enablement ( ) Set an extended extension capability enablement status | true-enabled; false-disabled |
| Public boolean | Is extended extension capability enablement ( ) Obtain the extended extension capability enablement status | Return the extended extension capability enablement enabled/disabled state |
| Public void | Set default spacing ( ) Set a default child view spacing in the layout container | Default child view spacing in the layout container |
| Public int | Get default spacing ( ) Obtain a default child view spacing in the layout container | Return the default child view spacing in the layout container |
| Public void | Set spacing threshold ( ) Set a child view spacing threshold in the layout container | Child view spacing threshold in the layout container |
| Public int | Get spacing threshold ( ) Obtain a child view spacing threshold in the layout container | Return the child view spacing threshold in the layout container |

The meanings of the extension capability are described in detail above. A developer may configure a layout file based on a layout design of each display interface in an application with reference to an extension capability, another adaptive layout capability, and a basic layout capability (for example, an ANDROID native attribute), pack the layout file, other source code and resources, and the like of the application into an installation package (for example, an APK file), and release the installation package to an application market. An electronic device downloads the installation package from the application market, and installs the application. The following describes in detail a solution of implementing adaptive layout based on the foregoing layout file when the electronic device runs the application.

Figure 10A:
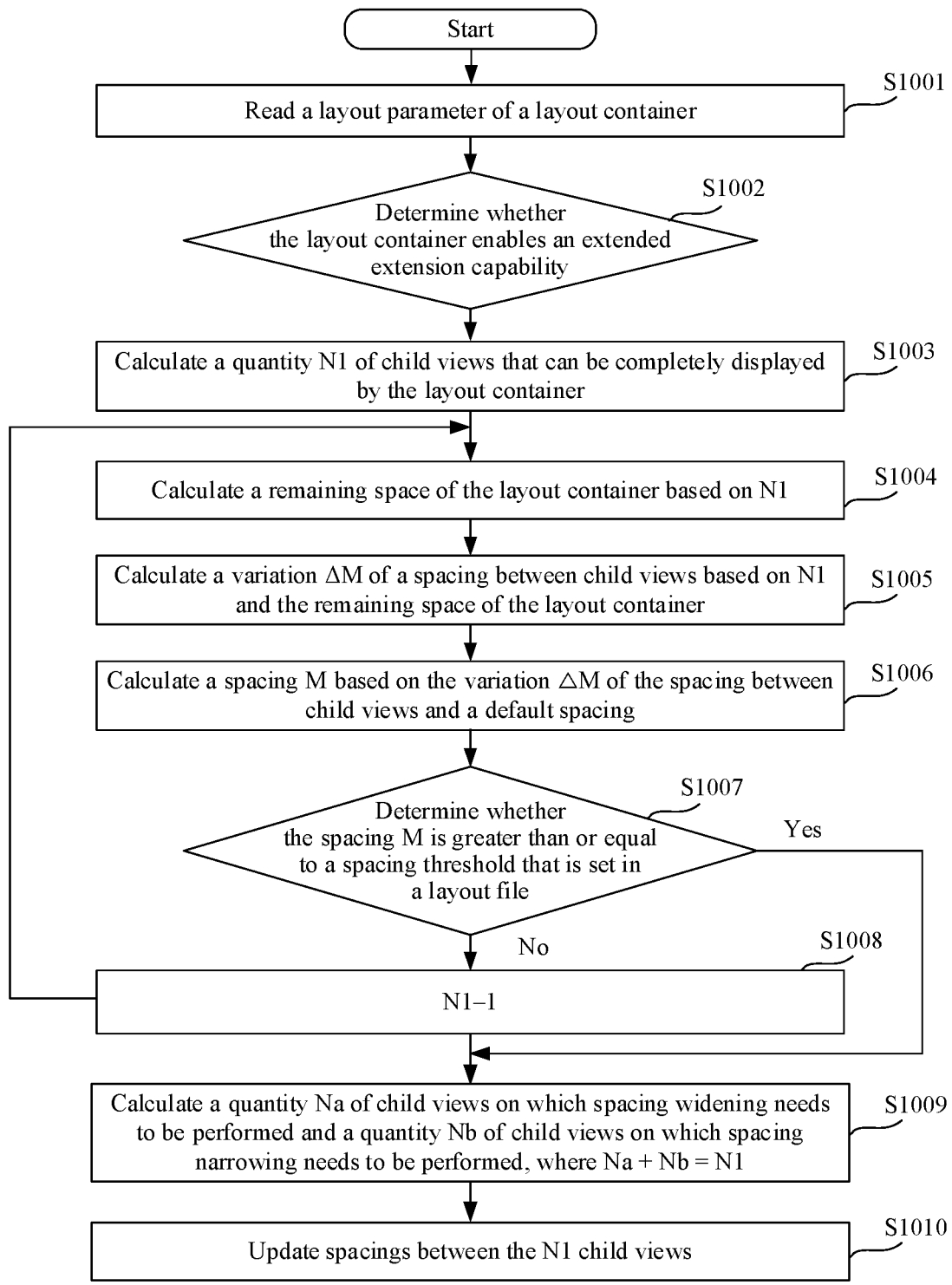
FIG. 10A is a schematic flowchart of a measurement method in a view system according to an embodiment of this disclosure.

Further, the mobile phone performs a measurement procedure shown in FIG. 10A for each layout container in the layout file. The method includes the following steps.

S1001: Read a layout parameter of the layout container.

The layout parameter of the layout container is read from the layout file (for example, an XML file). The layout parameter of the layout container includes layout information such as a hierarchical relationship of the layout container on the display interface (including a parent layout container of the layout container, a child view of the layout container, and the like), a dimension and a location of the layout container (the dimension and the location are not necessarily fixed values and may be a constraint), an inner margin of the layout container, dimensions of and spacings between child layout containers included in the layout container, and dimensions of and spacings between views included in the layout container.

For example, the layout container herein may be a layout container at any layer of the display interface. For example, the layout container herein may be a layout container at an upper layer of the display interface, for example, the content view in FIG. 1B. In this case, the electronic device obtains a screen parameter (including a screen type, a screen dimension, a screen status, and the like) of the electronic device, to determine a display size (that is, a dimension), a display location, and the like of the content view. For another example, the layout container herein may alternatively be a layout container at a middle layer of the display interface, for example, the view group 3. In this case, the electronic device sequentially determines dimensions and locations of all layout containers from top to bottom based on the screen parameter of the electronic device and the hierarchical relationship shown in FIG. 1B, until a display size (that is, a dimension), a display location, and the like of the view group 3 are determined.

S1002: Determine whether the layout container enables an extension capability.

If it is learned, based on the layout file, that the layout container does not enable an extended extension capability and does not enable a general extension capability, a native measurement procedure of the ANDROID system is used for measurement. If the layout container does not enable the extended extension capability but enables the general extension capability, the mobile phone determines a quantity of displayed child views based on the dimension of the layout container and a default spacing, and arranges the child views. In this case, the child views displayed by the mobile phone are all completely displayed. If the layout container enables the extended extension capability, step S1003 is performed.

It should be noted that an attribute value of enabling the extension capability (the general extension capability and the extended extension capability) included in the layout file may be set by the developer during application development, and the extension capability of the layout container is fixedly enabled or disabled. In some other embodiments, when developing the application, the developer may alternatively set the extension capability of the layout container to be set by a user. In this case, the user may enable the extension capability of the layout container, or disable the extension capability of the layout container.

S1003: Calculate a quantity N1 of child views that can be completely displayed by the layout container.

Further, the quantity N1 of child views that can be displayed is preliminarily determined based on the dimension of the layout container, the dimension of each child view, the default spacing, and a dimension threshold. For example, N1 (rounded)=(width of the layout container−dimension threshold−inner margin of the layout container)/(width of the child view+default spacing).

S1004: Calculate a remaining space of the layout container based on N1.

For example, remaining space of the layout container (±double-precision type)=(width of the layout container−dimension threshold−inner margin of the layout container)−N1*(width of the child view+default spacing).

S1005: Calculate a variation ΔM of a spacing between child views based on N1 and the remaining space of the layout container.

For example, the variation ΔM of the spacing between child views (±double-precision type)=remaining space of the layout container/N1.

S1006: Calculate a spacing M based on the variation ΔM of the spacing between child views and the default spacing.

For example, spacing M (±double-precision type)=variation ΔM of the spacing between child views+default spacing.

S1007: Determine whether the spacing M is greater than or equal to a spacing threshold that is set in the layout file.

If the spacing M is less than the spacing threshold, the quantity N1 of child views that can be displayed is decreased by one, and then the spacing between child views continues to be adjusted, that is, step S1008 is performed. If the spacing M is greater than or equal to the spacing threshold, the current child views may be arranged based on the spacing, and step S1009 is performed.

S1008: N1=N1−1, and then perform step S1004.

S1009: Calculate a quantity Na of child views on which spacing widening needs to be performed and a quantity Nb of child views on which spacing narrowing needs to be performed. Na+Nb=N1.

S1010: Update spacings between the N1 child views.

It should be noted that, in this embodiment, the remaining space in the layout container excluding a child view display space, a dimension threshold display space, and an inner margin space reserved in the layout container needs to be evenly allocated as the spacing between child views (including a child view that displays partial content). Because the electronic device performs display by using a pixel as a unit, the remaining space cannot be generally evenly divided strictly. Therefore, after the spacing that meets a condition (not less than the spacing threshold) is obtained, spacings between all child views may be further fine-tuned, so that the spacings between the child views completely occupy the remaining space. For example, the obtained spacing that meets the condition is rounded up by using a pixel as a unit, to obtain a widened spacing. In this case, quantity Na of child views on which spacing widening is performed=decimal part of the spacing*N1. The obtained spacing that meets the condition is rounded down by using a pixel as a unit, to obtain a narrowed spacing. In this case, quantity Nb of child views on which spacing narrowing is performed=N1−Na.

For example, a quantity, obtained through calculation according to the foregoing steps, of child views that need to be displayed is 5, and a spacing is 3.2 pixels. In this case, a widened spacing obtained after the spacing is rounded up is 4. Quantity of child views on which spacing widening needs to be performed=(3.2−3)*5=1, that is, a spacing with one of the child views needs to be determined as 4 pixels. A narrowed spacing obtained after the spacing is rounded down is 3. Quantity of child views on which spacing narrowing needs to be performed=5−1=4, that is, a spacing with each of the four child views is determined as 3 pixels. Further, a manner of determining child views on which spacing widening needs to be performed and child views on which spacing narrowing needs to be performed is not further limited in this embodiment of this disclosure. Certainly, the spacing between child views in the layout container may alternatively be adjusted by using another method.

In this way, values of the spacings between the child views in the layout container are approximately equal, and an error is kept within ±1 pixel.

It should be noted that, in this embodiment, the layout container displays partial content of the $(N1+1)^{th}$ child view.

It should be further noted that an example in which widths of the child views included in the layout container are equal is used for description herein. If the widths of the child views are not equal, the extended extension capability may not be enabled by default. In other words, the layout container does not display a child view having only partial content. Further, the electronic device may need to perform calculation based on an order of arranging all the child views included in the layout container, the width of each child view, and the default spacing, to determine a quantity of child views that can be completely displayed by the layout container, and arrange, based on the default spacing, the child views that can be completely displayed.

It can be understood that, when electronic devices (for example, a mobile phone and a tablet computer) having different screen dimensions use a same layout file (including a layout container provided with an extension capability), according to the measurement procedure in FIG. 10A, application interfaces finally drawn may present different layout effects.

For example, a screen width of the mobile phone is 720 pixels, and a screen width of the tablet computer is 1280 pixels. Both the mobile phone and the tablet computer use a same installation package to install the application market. A layout file corresponding to a home page of the application market includes a layout container configured to display a high-quality application, and the layout container enables an extended extension capability. In addition, the layout container includes 10 horizontally arranged child views, and each child view corresponds to one application icon. A width of each child view is 120 pixels, a default spacing is 40 pixels, and a dimension threshold (that is, a width of a child view that is not completely displayed) is 80 pixels. In addition, a width of the layout container is equal to the device screen width, and an inner margin is 0 pixels.

Figure 10B:
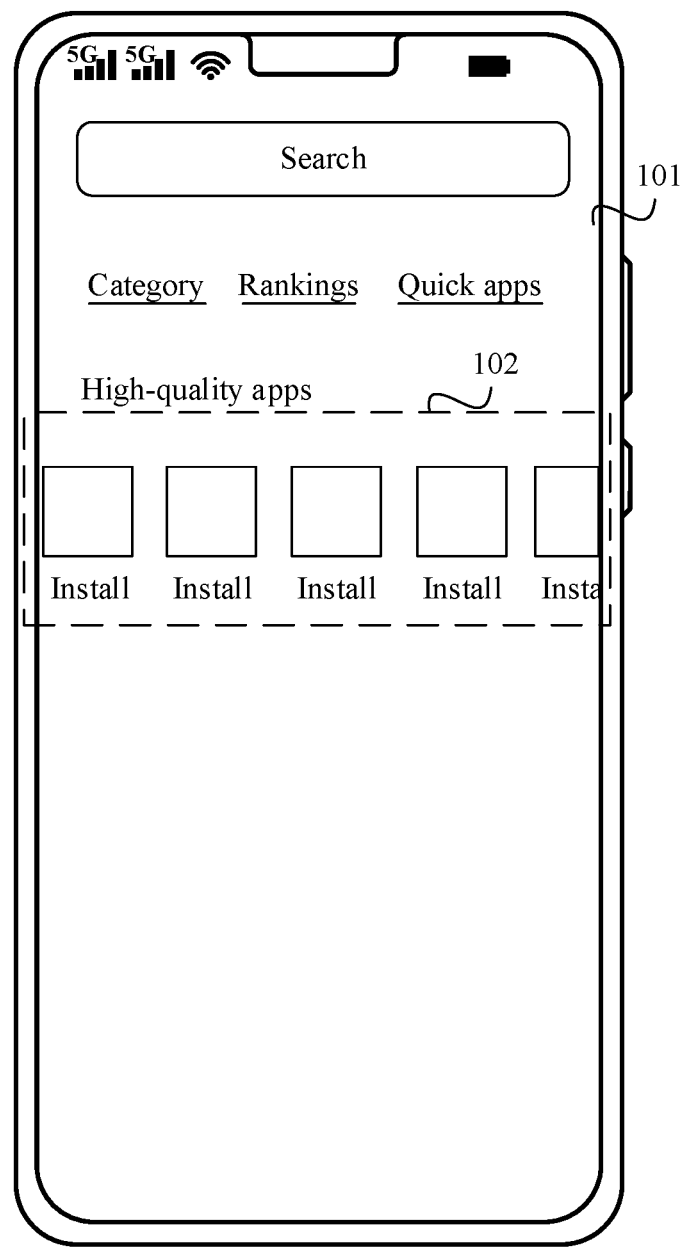
FIG. 10B and FIG. 10C are an effect diagram in which different electronic devices display a layout container having an extension capability according to an embodiment of this disclosure.

In this case, when the mobile phone draws the home page of the application market and performs the measurement procedure in FIG. 10A, a quantity of child views that can be displayed by the mobile phone is calculated as follows: N1=(width of the layout container−dimension threshold−inner margin of the layout container)/(width of the child view+default spacing)=(720−80−0)/(120+40)=4. In other words, the mobile phone can completely display four child views and incompletely display one child view. The mobile phone displays an interface 101 shown in FIG. 10B, and a layout container 102 includes four completely displayed application icons and one incompletely displayed application icon.

Figure 10C:
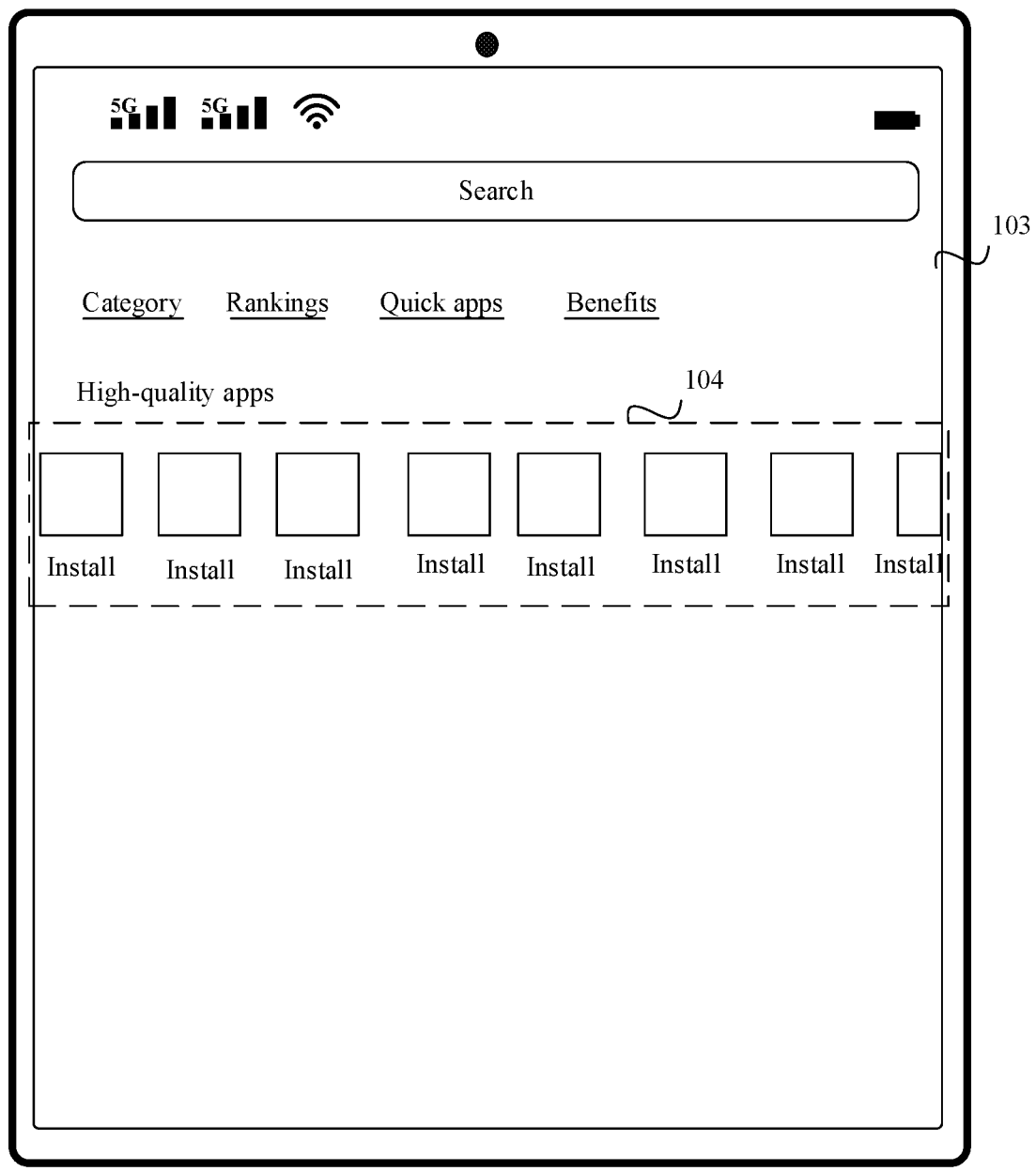

When the tablet computer draws the home page of the application market and performs the measurement procedure in FIG. 10A, a quantity of child views that can be displayed by the tablet computer is calculated as follows: N1=(width of the layout container−dimension threshold−inner margin of the layout container)/(width of the child view+default spacing)=(1280−80−0)/(120+40)=7.5. In other words, the tablet computer can completely display seven child views and incompletely display one child view. The tablet computer displays an interface 103 shown in FIG. 10C, and a layout container 104 includes seven completely displayed application icons and one incompletely displayed application icon.

Figure 11:
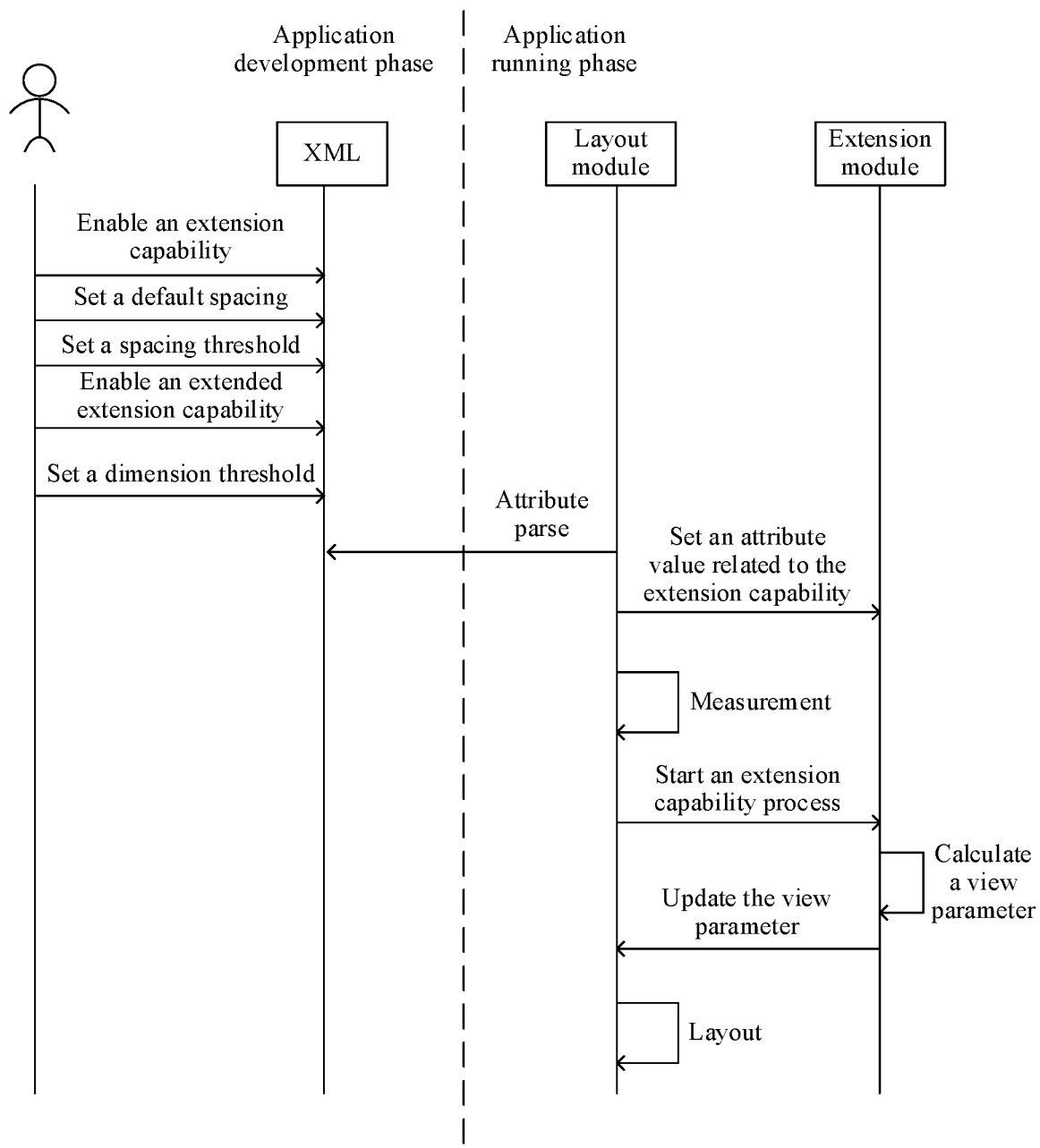
FIG. 11 is a schematic diagram of another adaptive application interface layout method according to an embodiment of this disclosure.

FIG. 11 is another schematic diagram of an adaptive application interface layout method according to an embodiment of this disclosure. In an application development phase, a developer may set an attribute related to an extension capability in a layout file such as an XML file. For example, the developer enables an extension capability, sets a default spacing, sets a spacing threshold, enables an extended extension capability, and sets a dimension threshold. Subsequently, the developer packs the layout file, other application code and resources, and the like into an installation package, and releases the installation package to an application market. Then, a user may download the installation package from the application market by using an electronic device, and install the application. When the electronic device runs the application, a layout module in the electronic device parses the attribute related to the extension capability from the layout file, to obtain an attribute value related to the extension capability, and sends the attribute value to an extension module in the electronic device. Then, the layout module performs measurement, and starts an extension capability process. In other words, the extension module calculates a parameter of a related view such as a dimension of the view based on the attribute value related to the extension capability. The layout module performs layout based on an updated parameter of the view, to obtain a location of the view on a specific display interface of the application. Finally, the electronic device may draw and display the specific display interface. In a specific example, the layout module may be a measurement module and a layout module in a native view system of an ANDROID system. The extension module may be a newly added function module in the measurement module in the view system, and may perform related steps in FIG. 10A.

(2) Proportion Capability:

When developing an application, after adding dependency of an adaptive layout attribute package, a developer may set a layout container (that is, a ViewGroup) having a proportion capability on a display interface. Further, when editing a layout file of the display interface, the developer may set an attribute value related to the proportion capability of the ViewGroup in the layout file (for example, an XML file), or may set an attribute value related to the proportion capability of the ViewGroup in a JAVA source code file by adding a call interface.

Table 3 shows an example of an attribute related to the proportion capability.

The meaning of each attribute related to the proportion capability and an effect of displaying the layout container and the child view are described in detail below with reference to the accompanying drawings.

Figure 12:
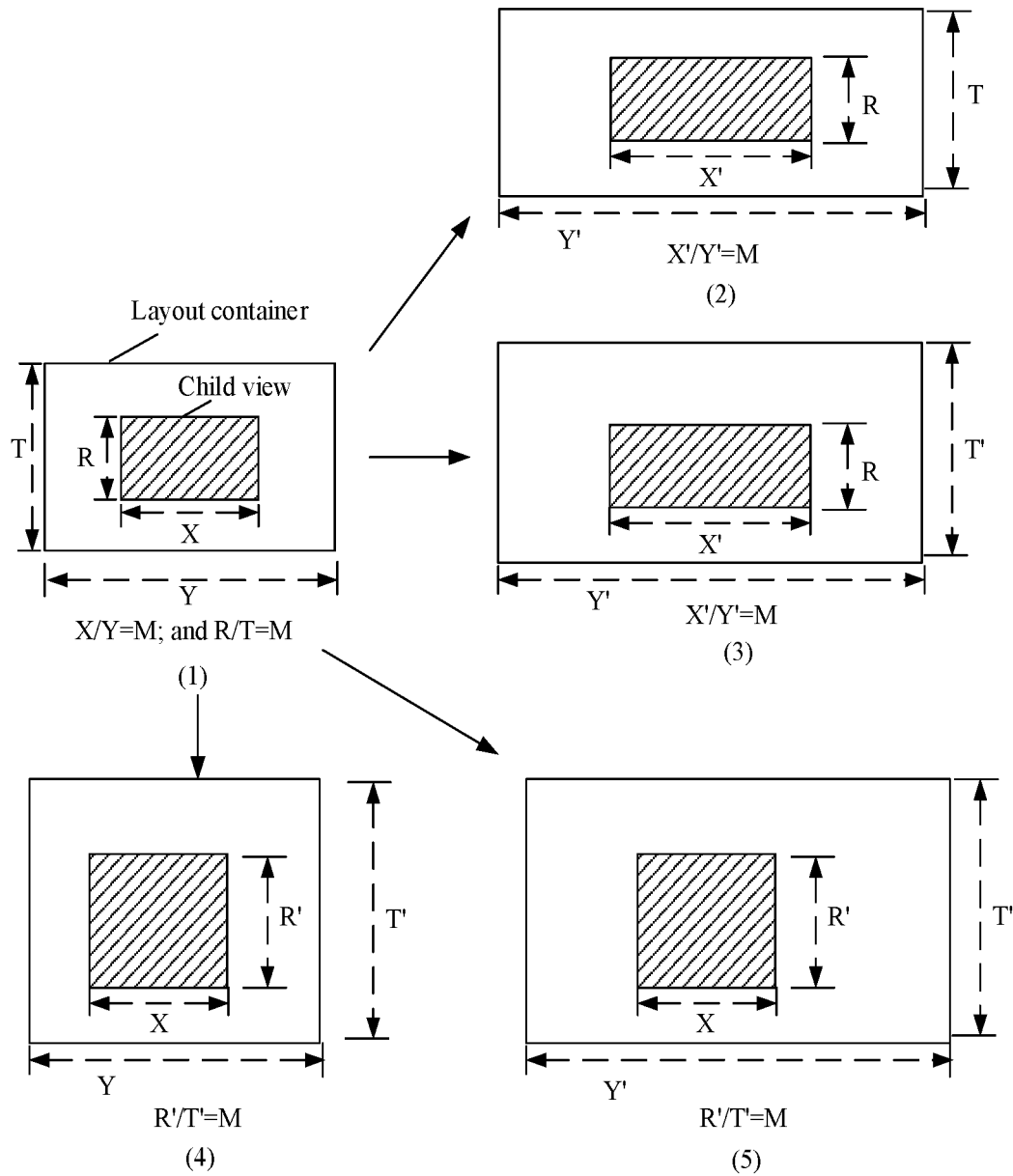
FIG. 12 is a display effect diagram of a layout container having a proportion capability in different scenarios according to an embodiment of this disclosure.

As shown in (1) in FIG. 12, a proportion of the child view to the layout container in a horizontal orientation is a ratio of a width (X) of the child view to a total width (Y) of the layout container, that is, X/Y, and a proportion of the child view to the layout container in a vertical orientation is a ratio of a height (R) of the child view to a total height (T) of the layout container, that is, R/T.

When an attribute of the layout container is set, an attribute value of proportion capability enablement is set to "true". Then, a proportion is set to M (M is a fraction) for the child view. A specific meaning of the proportion M (a horizontal proportion or a vertical proportion) may be determined based on a layout orientation of the layout container.

For example, if the layout orientation of the layout container is the horizontal orientation (or referred to as a horizontal direction), the proportion M represents a proportion of the child view in the horizontal orientation, that is, a fraction of the width of the child view to the total width of the layout container. In this case, when the width of the layout container changes, the width of the child view in the layout container is scaled, until a scaled width of the child view accounts for M of the total width of the layout container. However, the height of the child view does not change with the height of the layout container. For example, compared with a dimension of the layout container shown in (1) in FIG. 12, the width of the layout container shown in (2) in FIG. 12 changes (changes to Y'), but the height remains unchanged. In this case, the width of the child view correspondingly changes to X', where X'=M*Y', and the height of the child view remains unchanged and is still R. For another example, compared with the dimension of the layout container shown in (1) in FIG. 12, the width of the layout container shown in (3) in FIG. 12 changes (changes to X'), and the height also changes (changes to T'). In this case, the width of the child view correspondingly changes to X', where X'=M*Y', and the height of the child view remains unchanged and is still R. It should be noted that, herein, a layout parameter for changing the height of the child view is not set in the layout file. In conclusion, the proportion capability is applied to only a dimension of the child view in the layout orientation of the layout container (the layout orientation in this example is the horizontal orientation), but

TABLE 3

| Attribute | Attribute type | Application scope | Meaning |
| --- | --- | --- | --- |
| Proportion capability enablement | Boolean (boolean value) | Layout container | Proportion function enabled/disabled |
| Proportion | Fraction | Child view | Proportion of the child view in the layout container in a specified orientation |

It should be noted that, when setting the attribute of the layout container, the developer may enable the proportion capability of the layout container through proportion capability enablement, and set the proportion for each child view in the layout container (that is, a View or a ViewGroup stored in the layout container). Subsequently, when running the application and drawing each child view in the layout container, the electronic device draws the child view in the layout container based on a dimension of the layout container and the proportion of the child view.

is not applied to a dimension of the child view in another orientation (for example, the vertical orientation in this example).

If the layout orientation of the layout container is the vertical orientation (or referred to as a vertical direction), the proportion M represents a proportion of the child view in the vertical orientation, that is, a fraction of the height of the child view to the total height of the layout container. In this case, when the height of the layout container changes, the height of the child view in the layout container is scaled, until a scaled height of the child view accounts for M of the total height of the layout container. However, the width of the child view does not change with the width of the layout container. For example, compared with the dimension of the layout container shown in (1) in FIG. 12, the height of the layout container shown in (4) in FIG. 12 changes (changes to T'), but the width remains unchanged. In this case, the height of the child view correspondingly changes to R', where R'=M*T', and the width of the child view remains unchanged and is still X. For another example, compared with the dimension of the layout container shown in (1) in FIG. 12, the height of the layout container shown in (5) in FIG. 12 changes (changes to T'), and the width also changes (changes to Y'). In this case, the height of the child view correspondingly changes to R', where R'=M*T', and the width of the child view remains unchanged and is still X. It should be noted that, herein, a layout parameter for changing the width of the child view is not set in the layout file. In conclusion, the proportion capability is applied to only a dimension of the child view in the layout orientation of the layout container (the layout orientation in this example is the vertical orientation), but is not applied to a dimension of the child view in another orientation (for example, the horizontal orientation in this example).

It should be noted that an example in which only one parameter, that is, the proportion M, is set is used above for description. In this example, a specific meaning of the proportion M (a horizontal proportion or a vertical proportion) may be determined based on a layout orientation of the layout container In some other examples, different parameters may alternatively be set to represent a proportion (for example, a proportion P) in the horizontal orientation and a proportion (for example, a proportion Q) in the vertical orientation. This is not limited in this embodiment of this disclosure.

For example, the developer may set the proportion of the child view to 50%. As shown in (1) in FIG. 12, a dimension of the layout container on an electronic device 1 is 1080*540 (width*height, in a unit of pixel), and a dimension of the child view is 540*270. In this case, both the proportions of the child view in the horizontal orientation and the vertical orientation reach 50%.

In some examples, the layout orientation of the layout container is set to horizontal. As shown in (2) in FIG. 12, a dimension of the layout container on an electronic device 2 is 2160*540 (in a unit of pixel). In this case, the height of the layout container in the electronic device 2 is the same as that of the layout container in the electronic device 1, but the width is increased. Therefore, the child view is scaled based on the horizontal proportion (50%), and the dimension of the child view is calculated as 1080*270 (in a unit of pixel). As shown in (3) in FIG. 12, a dimension of the layout container on an electronic device 3 is 2160*1080 (in a unit of pixel). In this case, both the width and the height of the layout container in the electronic device 3 are greater than those of the layout container in the electronic device 1. Therefore, the child view is scaled based on the horizontal proportion (50%), and the dimension of the child view is calculated as 1080*270 (in a unit of pixel).

In some other examples, the layout orientation of the layout container is set to vertical. As shown in (4) in FIG. 12, a dimension of the layout container on an electronic device 4 is 1080*1080 (in a unit of pixel). In this case, the height of the layout container in the electronic device 4 is the same as that of the layout container in the electronic device 1, but the height is increased. Therefore, the child view is scaled based on the vertical proportion (50%), and the dimension of the child view is calculated as 540*540 (in a unit of pixel). As shown in (5) in FIG. 12, a dimension of the layout container on an electronic device 5 is 2160*1080 (in a unit of pixel). In this case, the height and width of the layout container in the electronic device 5 are greater than those of the layout container in the electronic device 1. Therefore, the child view is scaled based on the vertical proportion (50%), and the dimension of the child view is calculated as 540*540 (in a unit of pixel).

In a specific implementation, a proportion capability may be set for a layout container in which a text view, a button view, an image view, or the like is located. When a width or a height of the layout container changes, a width or a height of the text view, the button view, or the image view may automatically and adaptively change based on the width or the height of the layout container, so as to meet display requirements of electronic devices having different screen dimensions. It can be learned that the proportion capability in this solution can enable electronic devices having different screen parameters to present different display effects based on a same layout setting, reduce development and maintenance workload of developers, and meet display requirements of various types of electronic devices.

The foregoing embodiment is described by using one child view in the layout container. When the layout container includes a plurality of child views, a proportion may be set for each of the plurality of child views, or a proportion may be set for some of the plurality of child views.

In some embodiments, the proportion is set for each of the plurality child views. For a method for scaling each child view in a specified orientation, refer to the method for scaling a child view in a specified orientation in the foregoing embodiment. Details are not described herein again. It should be noted that, if a sum of proportions of all child views is greater than 100%, truncation occurs, that is, not all the child views can be displayed in the layout container. In some examples, when the developer sets the proportions of the child views, and the sum of the specified proportions is greater than 100%, the developer may be prompted to change proportions of some child views, or the developer is prompted to set another capability of the layout container, for example, a hiding capability. In some other examples, when an electronic device displays the layout container, a user may be prompted to perform interface adjustment. If the sum of the proportions of all the child views is less than 100%, blank-leaving occurs. In some other examples, the user may be prompted to select or increase by default a spacing between child views.

In some other embodiments, for a case in which proportions are set for some child views and no proportion is set for some child views in the layout container, a dimension, in a specified orientation, of each child view for which a proportion is set may be first calculated, and then a remaining space in the layout container is allocated to child views for which no proportion is set. For example, after the dimension, in the specified orientation, of each child view for which a proportion is set is determined, the remaining space in the layout container is evenly allocated to the child views for which no proportion is set.

Figure 13:
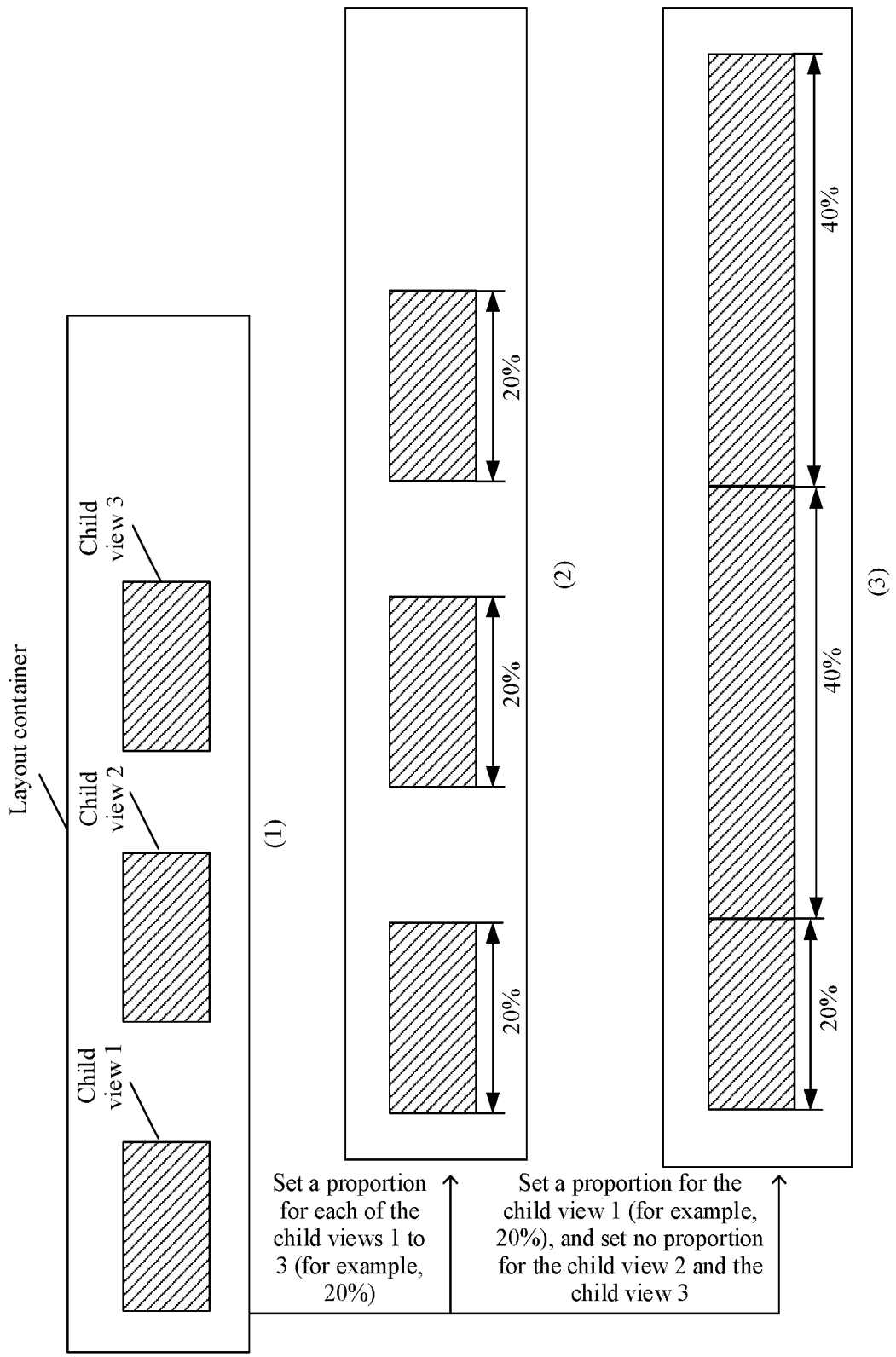
FIG. 13 is a display effect diagram of another layout container having a proportion capability in different scenarios according to an embodiment of this disclosure.

For example, as shown in (1) in FIG. 13, a layout container includes three child views: a child view 1, a child view 2, and a child view 3. A layout orientation of the layout container is a horizontal orientation.

As shown in (2) in FIG. 13, if a proportion, for example, 20%, is set for each of the child view 1 to the child view 3, when a width of the layout container changes, the proportion of each of the child view 1 to the child view 3 to the width of the layout container remains at 20%.

As shown in (3) in FIG. 13, if a proportion, for example, 20%, is set for the child view 1, but no proportion is set for the child view 2 and the child view 3, when the width of the layout container changes, the proportion of the child view 1 to the width of the layout container first remains at 20%. Then, a remaining space (80%) in the layout container is evenly allocated to the child view 2 and the child view 3, that is, the child view 2 and the child view 3 each occupy 40% of the width of the layout container. It may be noted that, in this example, a sum of proportions of the child view 1, the child view 2, and the child view 3 are exactly equal to 100%. In other words, there is no spacing between child views. In some examples, when the developer sets proportions of child views, and a sum of the specified proportions is equal to 100%, the developer may be prompted that there is no spacing between child views. If the developer wants to have a spacing between child views, the developer may set a sum of proportions of child views to be less than 100%.

The following describes application of a proportion capability of a layout container with reference to a case in which an interface of a layout container with a proportion capability enabled is nested in another layout container with a proportion capability enabled.

Figure 14:
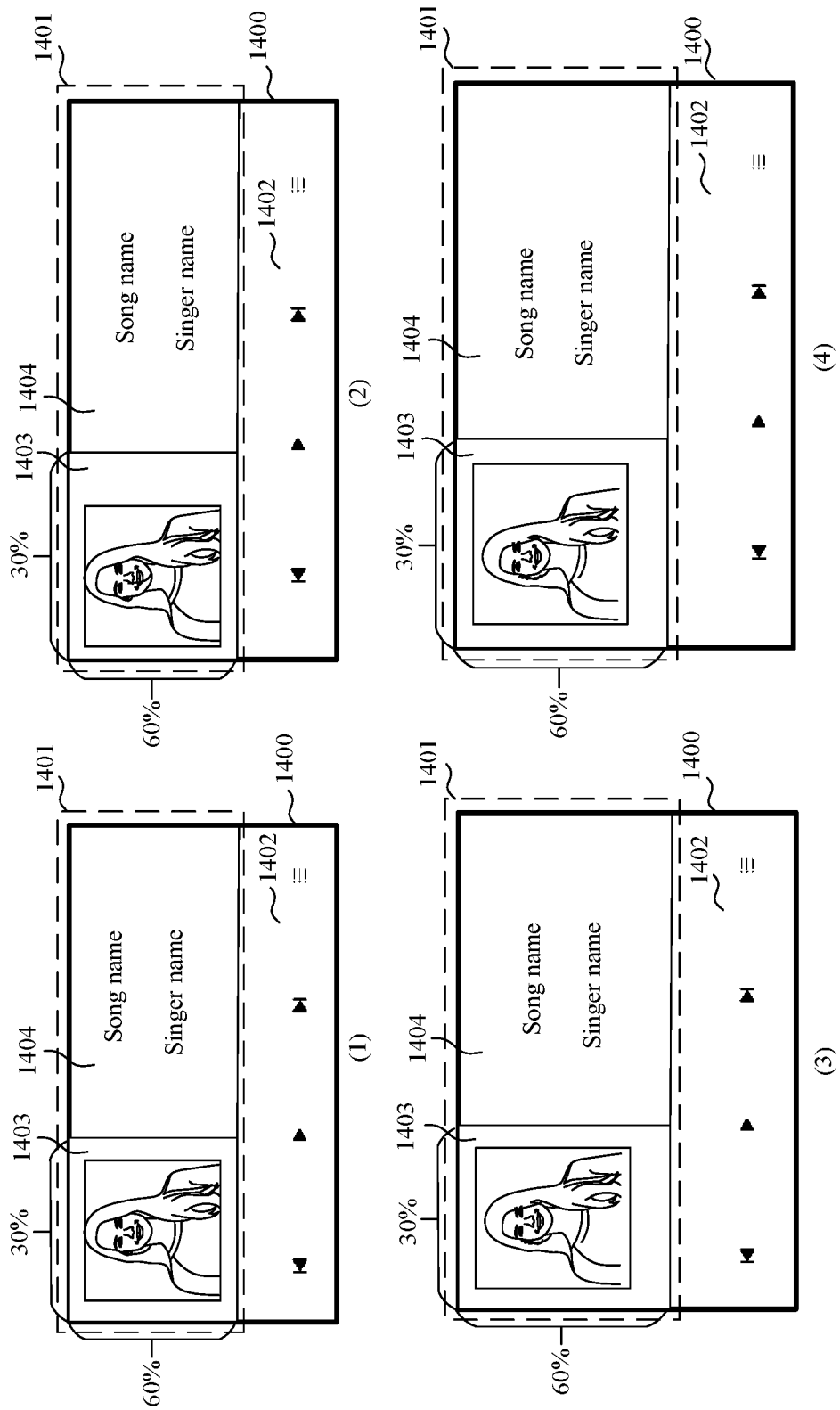
FIG. 14 is a display effect diagram of another layout container having a proportion capability in different scenarios according to an embodiment of this disclosure.

As shown in an interface shown in (1) in FIG. 14, a layout container 1400 includes a child view 1401 and a child view 1402. The layout container 1400 enables a proportion capability, and a layout orientation of the layout container 1400 is a vertical orientation. A proportion A (for example, 60%) of the child view 1401 is set. In this case, the proportion of the child view 1401 is a vertical proportion. In other words, a height of the child view 1401 changes with a height of the layout container 1400, and a fraction of the height of the child view 1401 to the height of the layout container 1400 remains as the proportion A.

Each of the child view 1401 and the child view 1402 is essentially one ViewGroup, that is, one layout container, which is also referred to as a layout container view. The child view 1402 includes play views such as "Previous", "Play", "Next", and "More". The child view 1401 also enables a proportion capability, and a layout orientation of the child view 1401 is a horizontal orientation. The child view 1401 includes a child view 1403 (one image view) and a child view 1404 (a plurality of text views). A proportion B (for example, 30%) of the child view 1403 is set. In this case, the proportion of the child view 1403 is a horizontal proportion. In other words, a width of the child view 1403 changes with a width of the layout container 1400, and a fraction of the width of the child view 1403 to the layout width of the layout container 1400 remains as the proportion B.

It can be learned that a height of the child view 1403 changes with the height of the layout container 1400, the width of the child view 1403 changes with a width of the child view 1401, and the width of the child view 1401 changes with the width of the layout container 1400. Therefore, the width and the height of the child view 1403 change with the width and the height of the layout container 1400, but an aspect ratio of the child view 1403 may change. In other words, a method for changing the width and the height of the child view 1403 herein is different from a method in which a child view keeps an aspect ratio for scaling in a scaling capability, so that more display requirements of an application interface can be met.

For example, as shown in (1) in FIG. 14, if a dimension of the layout container 1400 on an electronic device 1 is 1080*540 (width*height, in a unit of pixel), a dimension of the child view 1401 (that is, a child layout container) is 1080*324 (in a unit of pixel) (height of the child view 1401=(540*60%) pixels), a dimension of the child view 1402 is 1080*216 (in a unit of pixel) (height of the child view 1402=(540−324) pixels), a dimension of the child view 1403 is 324*324 (in a unit of pixel) (width of the child view 1403=(1080*30%) pixels), and a dimension of the child view 1404 is 756*324 (in a unit of pixel).

As shown in (2) in FIG. 14, if a dimension of the layout container 1400 on an electronic device 2 is 1280*540 (width*height, in a unit of pixel), a dimension of the child view 1401 (that is, a child layout container) is 1280*324 (in a unit of pixel) (height of the child view 1401=(540*60%) pixels), a dimension of the child view 1402 is 1280*216 (in a unit of pixel) (height of the child view 1402=(540−324) pixels), a dimension of the child view 1403 is 384*324 (in a unit of pixel) (width of the child view 1403=(1280*30%) pixels), and a dimension of the child view 1404 is 896*324 (in a unit of pixel).

As shown in (3) in FIG. 14, if a dimension of the layout container 1400 on an electronic device 3 is 1080*640 (width*height, in a unit of pixel), a dimension of the child view 1401 (that is, a child layout container) is 1080*384 (in a unit of pixel) (height of the child view 1401=(640*60%) pixels), a dimension of the child view 1402 is 1080*256 (in a unit of pixel) (height of the child view 1402=(640−384) pixels), a dimension of the child view 1403 is 324*384 (in a unit of pixel) (width of the child view 1403=(1080*30%) pixels), and a dimension of the child view 1404 is 756*384 (in a unit of pixel).

As shown in (4) in FIG. 14, if a dimension of the layout container 1400 on an electronic device 4 is 1280*640 (width*height, in a unit of pixel), a dimension of the child view 1401 (that is, a child layout container) is 1280*384 (in a unit of pixel) (height of the child view 1401=(640*60%) pixels), a dimension of the child view 1402 is 1280*256 (in a unit of pixel) (height of the child view 1402=(640−384) pixels), a dimension of the child view 1403 is 384*384 (in a unit of pixel) (width of the child view 1403=(1280*30%) pixels), and a dimension of the child view 1404 is 896*384 (in a unit of pixel).

The following provides an example of a layout file (an XML file) of the layout container 1400.

```
<hwLayout                          //set a layout
parameter of the layout container 1400
    xmlns:android="http://schemas.android.com/apk/res/android"
    xmlns:app="http://schemas.android.com/apk/res-auto"
    /* omit other configurations */
    app: proportion enablement="true" //enable a proportion capability
of the layout container 1400
    android:orientation="vertical">//the layout orientation of the layout
container 1400 is the vertical orientation, which means that a proportion
that is set for a child view in the layout container is a vertical proportion
    <hwLayout           //set a layout parameter of the child view
1401 in the layout container 1400
    /* omit other configurations */
    app: proportion enablement="true"        //enable a
proportion capability of the child view 1401
    android:orientation="horizontal"//set the layout orientation of
the child view 1401 to the horizontal orientation, which means that a
proportion that is set for a child view nested in the child view 1401 is a
horizontal proportion
        app: proportion="140%" >           //set a vertical
proportion of the child view 1401
        <ImageView                //set a layout
parameter of the child view 1403 nested in the child view 1401
        /* omit other configurations */
        app: proportion="30%" />          //set a horizontal
```

-continued

```
proportion of the child view 1403
        <hwLayout     //set a layout parameter of the child view 1404
nested in the child view 1401
            /* omit other configurations */
            app: proportion="70%" >//set a horizontal proportion of
another child view 1404 nested in the child view 1401, or set no horizon-
tal
proportion of the child view because the child view 1401 includes only
two horizontally arranged child views
            <TextView                    //set a layout
parameter of the child view 1403 nested in the child view 1401
                /* omit other configurations */
                android:text="song name" />
            <TextView
                /* omit other configurations */
                android:text="singer name" />
        </hwLayout>
    </hwLayout>
    <hwLayout                            //set a layout
parameter of the child view 1402 in the layout container 1400
        /* omit other configurations */>
        <ImageView
            /* omit other configurations */ />
        <ImageView
            /* omit other configurations */ />
        <ImageView
            /* omit other configurations */ />
    </hwLayout>
</hwLayout>
```

The foregoing embodiment is a solution in which the developer designs an adaptive display interface layout by setting an attribute value related to a proportion capability of a View or a ViewGroup in a layout file (for example, an XML file). Alternatively, an attribute value related to a proportion capability of a View or a ViewGroup may be set in a JAVA source code file by adding a call interface.

Table 4 shows an example of an interface corresponding to the attribute value related to the proportion capability of the View or the ViewGroup.

TABLE 4

| Qualifier and type | Name and description | Parameter description |
| --- | --- | --- |
| Public boolean | Is proportion capability ( ) Obtain a proportion capability enablement status | Return a proportion capability enablement enabled/disabled state |
| Public void | Set proportion capability enablement ( ) Set the proportion capability enablement status | true-enabled; false-disabled |
| Public float | Get proportion ( ) Obtain a proportion of a child view | Return a proportion of a child View to a parent View |
| Public void | Set proportion ( ) Set a proportion of a child view in the layout container | Set the proportion of the child view in the layout container |

The meanings of the proportion capability are described in detail above. A developer may configure a layout file based on a layout design of each display interface in an application with reference to a proportion capability, another adaptive layout capability, and a basic layout capability (for example, an ANDROID native attribute), pack the layout file, other source code and resources, and the like of the application into an installation package (for example, an APK file), and release the installation package to an application market. An electronic device downloads the installation package from the application market, and installs the application. The following describes in detail a solution of implementing adaptive layout based on the foregoing layout file when the electronic device runs the application.

Figure 15A:
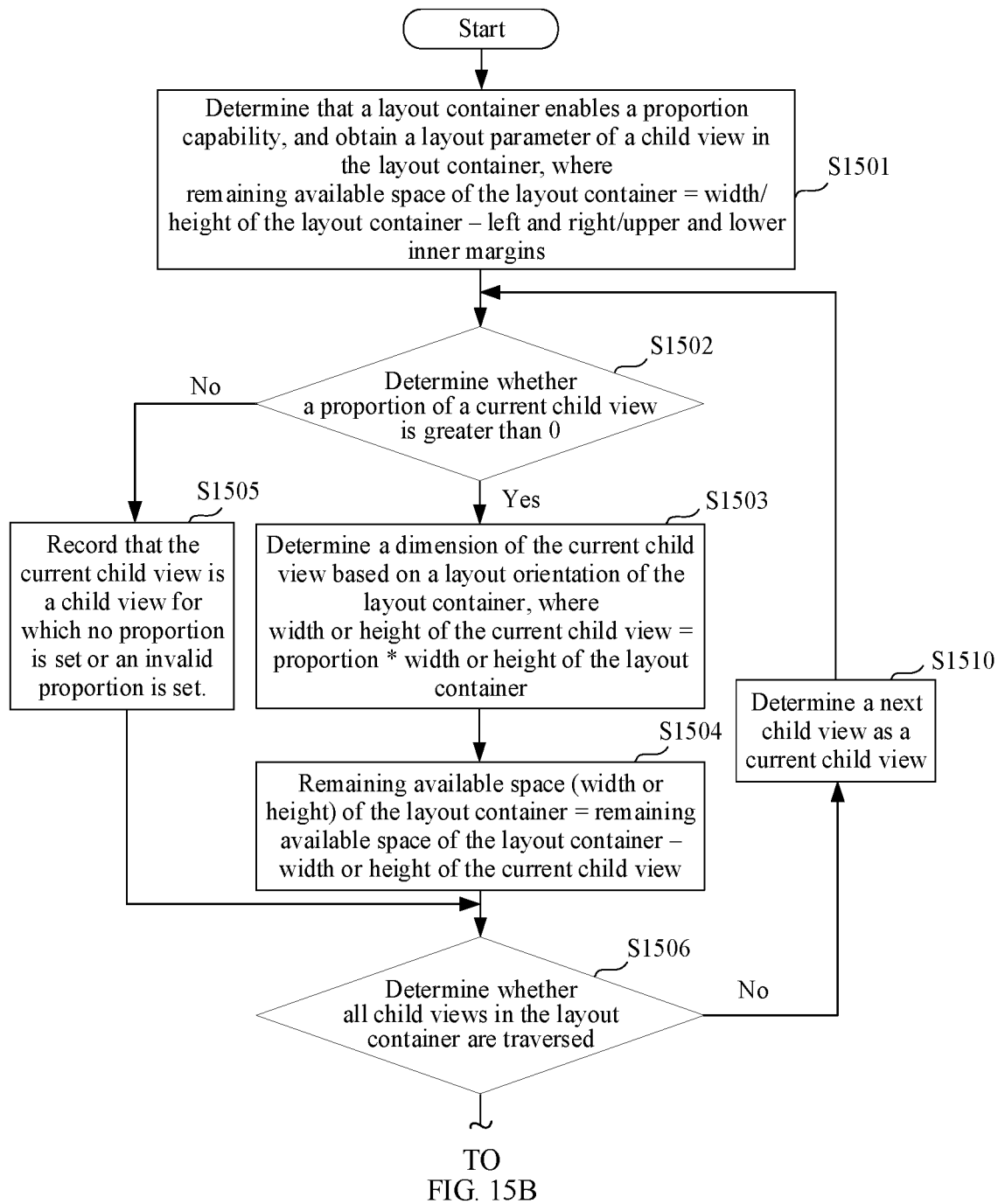
FIG. 15A and FIG. 15B are a schematic flowchart of another measurement method in a view system according to an embodiment of this disclosure.
Figure 15B:
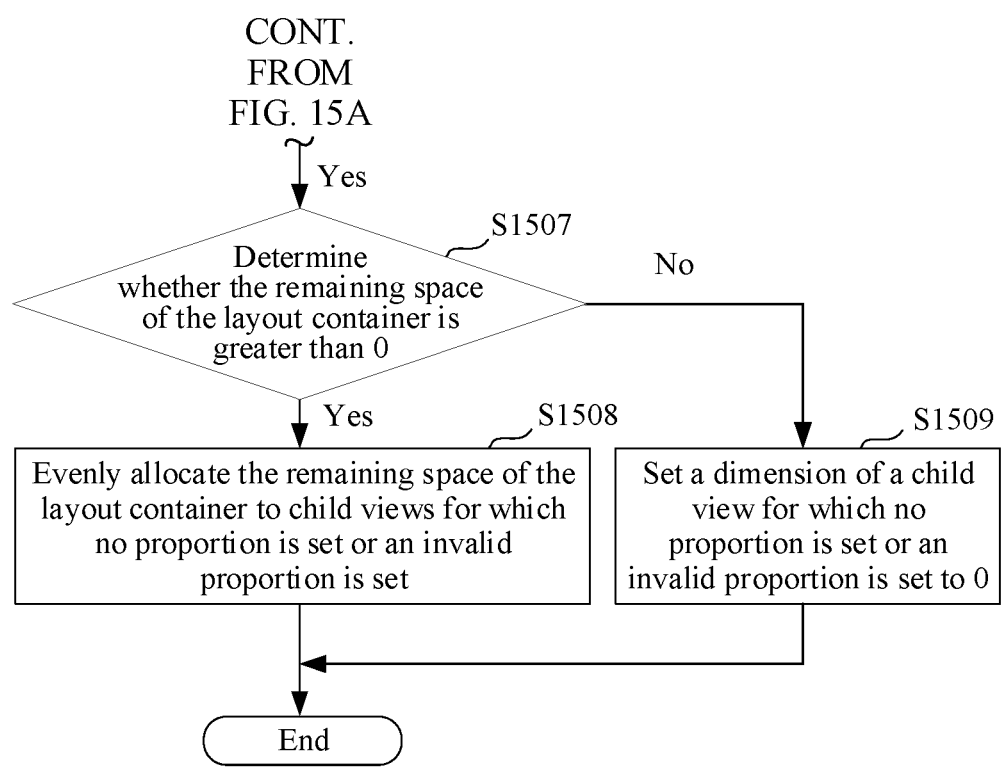

Further, the mobile phone performs a measurement procedure shown in FIG. 15A and FIG. 15B for each layout container in the layout file. The method further includes the following steps.

S1501: Determine that the layout container enables a proportion capability, and obtain a layout parameter of a child view in the layout container.

It is determined, based on a layout parameter of the layout container in the layout file, whether the layout container enables the proportion capability and whether a layout orientation of the layout container is a horizontal orientation or a vertical orientation. Further, a child view included in the layout container and a configured proportion of the child view are obtained. If the layout orientation of the layout container is the horizontal orientation, the proportion of the child view is a horizontal proportion. If the layout orientation of the layout container is the vertical orientation, the proportion of the child view is a vertical proportion.

In this case, remaining space of the layout container in the layout orientation=width/height of the layout container−left/right/upper/lower inner margin. Further, if the layout orientation of the layout container is the horizontal orientation, remaining width of the layout container=width of the layout container−left and right inner margins of the layout container. If the layout orientation of the layout container is the vertical orientation, remaining height of the layout container=height of the layout container−upper and lower inner margins of the layout container.

S1502: Determine whether a proportion of a current child view is greater than 0, and if yes, perform step S1503, or if no, perform step S1505.

S1503: Determine a dimension of the current child view based on the layout orientation of the layout container.

The layout orientation is an orientation in which the layout container arranges child views, including the horizontal orientation and the vertical orientation. If the layout orientation of the layout container is the horizontal orientation, width of the current child view=proportion*width of the layout container. If the layout orientation of the layout container is the vertical orientation, height of the current child view=proportion*height of the layout container.

S1504: Update the remaining space of the layout container.

If the layout orientation of the layout container is the horizontal orientation, remaining width of the layout container=width of the layout container−width of the current child view−left and right inner margins. If the layout orientation of the layout container is the vertical orientation, remaining height of the layout container=height of the layout container−height of the current child view−upper and lower inner margins.

Then, step S1506 is performed.

S1505: Record that the current child view is a child view for which no proportion is set or an invalid proportion is set.

S1506: Determine whether all child views in the layout container are traversed, and if yes, perform step S1507, or if no, perform step S1510.

S1507: Determine whether the remaining space of the layout container is greater than 0, and if yes, perform step S1508, otherwise, perform step S1509.

S1508: Evenly allocate the remaining space of the layout container to child views for which no proportion is set or an invalid proportion is set.

The measurement ends.

S1509: Set a dimension of a child view for which no proportion is set or an invalid proportion is set to 0.

The measurement ends.

S1510: Determine a next child view as a current child view. Then, step S1502 is performed.

This provides a method for measuring a layout container including a child view for which a proportion is set and a child view for which no proportion is set. It can be understood that an example in which the remaining space of the layout container in the layout orientation (total width/total height of the layout container−left and right/upper and lower inner margins−sum of widths/heights of child views for which a proportion is set) is evenly allocated to child views for which no proportion is set is used herein for description. Certainly, a manner of allocating, according to another rule, the remaining space in the layout orientation to child views for which no proportion is set is not limited in this embodiment of this disclosure.

It can be understood that, when electronic devices (for example, a mobile phone and a tablet computer) having different screen dimensions use a same layout file (including a layout container provided with a proportion capability), according to the measurement procedure in FIG. 15A and FIG. 15B, application interfaces finally drawn may present different layout effects.

For example, a screen width of the mobile phone is 720 pixels, and a screen width of the tablet computer is 1280 pixels. Both the mobile phone and the tablet computer use a same installation package to install a music application. A layout file corresponding to a home page of the music application includes a layout container configured to display a ranking, and the layout container enables a proportion capability. The layout container includes a child view 1 (configured to display a poster of a ranking 1), a child layout container (configured to display information about the top three songs), and a child view 2 (configured to notify a user that there are other rankings subsequently) that are horizontally arranged. A proportion of the child view 1 is set to 30%, no proportion is set for the child layout container, and a proportion of the child view 2 is set to 15%.

Figure 15C:
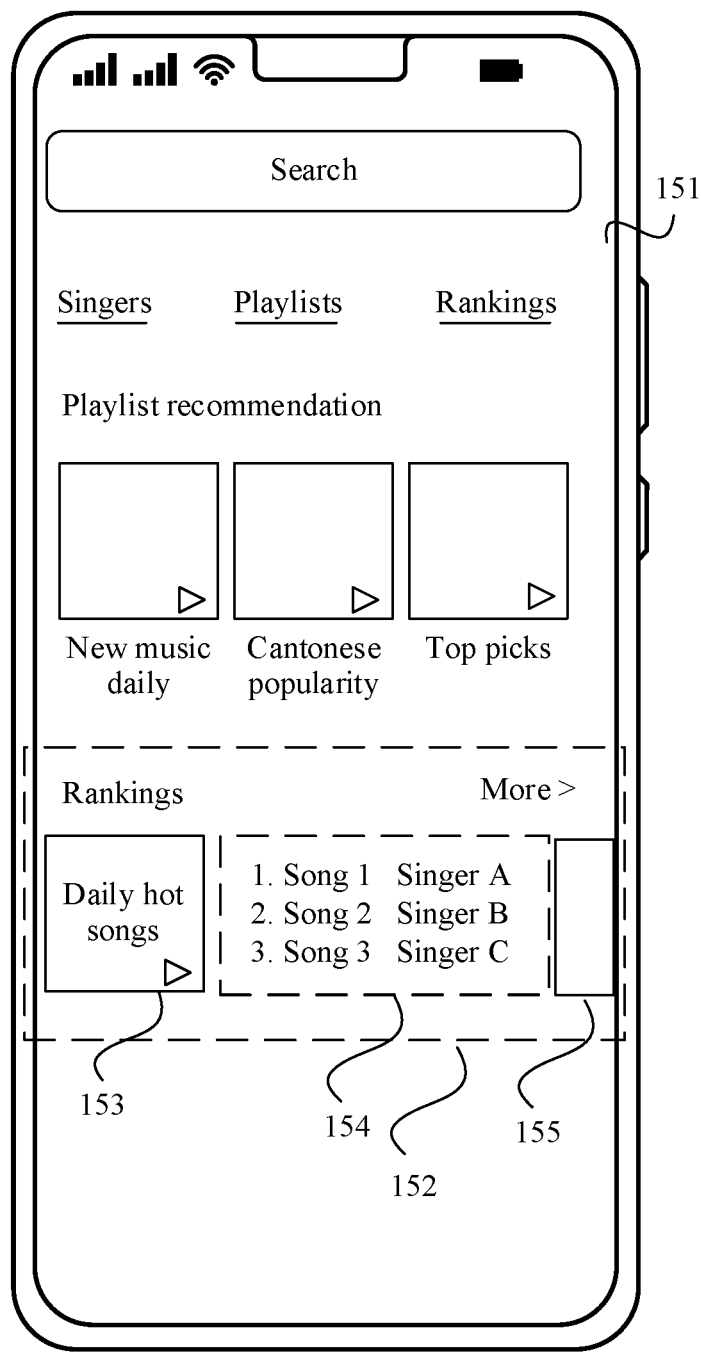
FIG. 15C and FIG. 15D are an effect diagram in which different electronic devices display a layout container having a proportion capability according to an embodiment of this disclosure.

Therefore, when the mobile phone draws the home page of the music application, and performs the measurement procedure in FIG. 15A and FIG. 15B for the layout container configured to display a ranking, the mobile phone performs the following calculation: width of the layout container=screen width of the mobile phone=720 pixels. In this case, width of the child view 1=width of the layout container*proportion of the child view 1=720*30%=216 pixels, width of the child view 2=width of the layout container*proportion of the child view 2=720*15%=108 pixels, and width of the child layout container=width of the layout container−sum of the determined widths of the child views=720−(216+108)=396 pixels. The mobile phone displays an interface 151 shown in FIG. 15C. A width of a child view 153 in the layout container 152 is 216 pixels, a width of a child view 155 is 108 pixels, and a width of a child layout container 154 is 396 pixels.

Figure 15D:
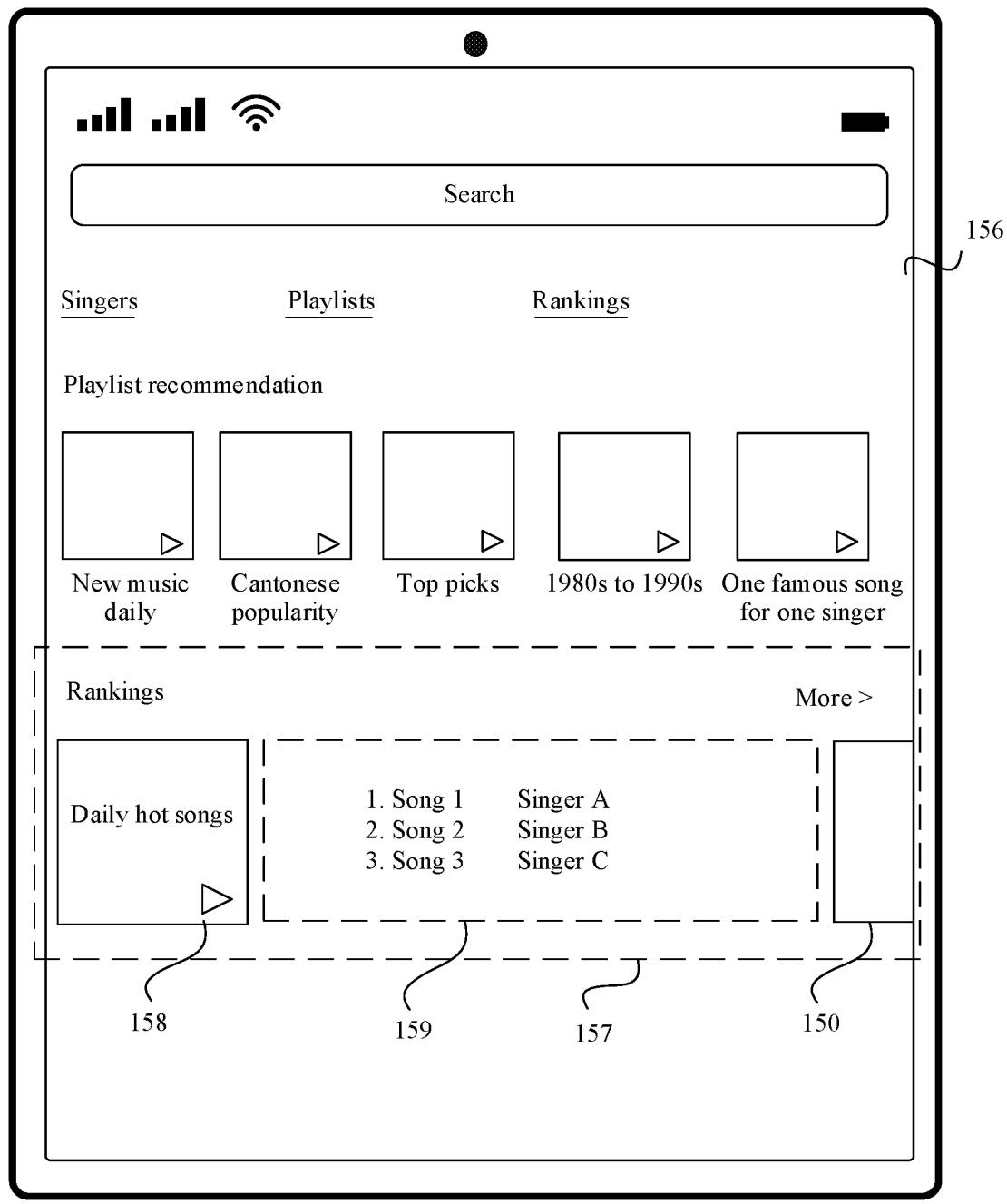

When the tablet computer draws the home page of the music application, and performs the measurement procedure in FIG. 15A and FIG. 15B for the layout container configured to display a ranking, the tablet computer performs the following calculation: width of the layout container=screen width of the tablet computer=1280 pixels. In this case, width of the child view 1=width of the layout container*proportion of the child view 1=1280*30%=384 pixels, width of the child view 2=width of the layout container*proportion of the child view 2=1280*15%=192 pixels, and width of the child layout container=1280−384−192=704 pixels. The tablet computer displays an interface 156 shown in FIG. 15D. A width of a child view 158 in the layout container is 384 pixels, a width of a child view 150 is 192 pixels, and a width of a child layout container 159 is 704 pixels.

Figure 16:
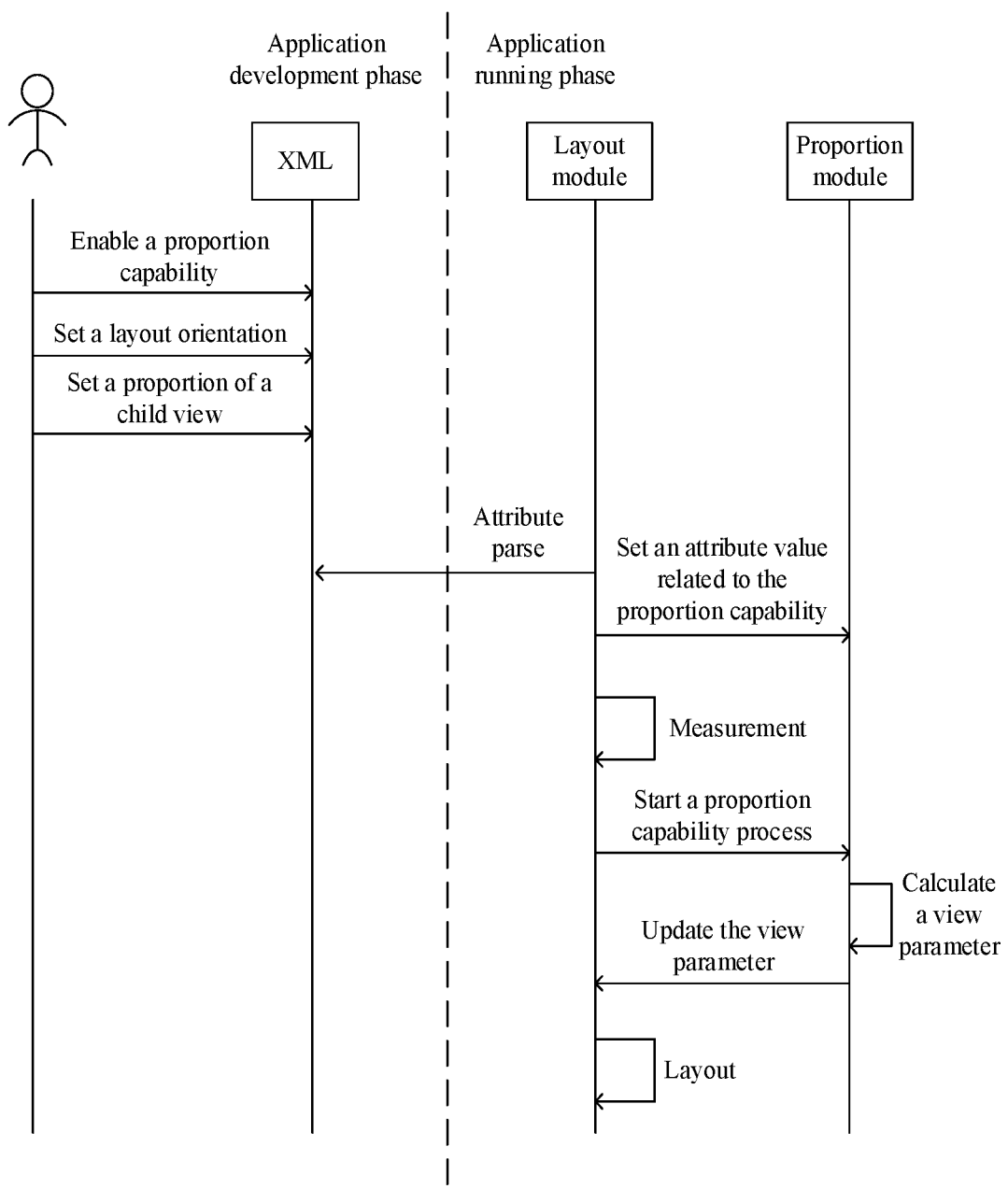
FIG. 16 is a schematic diagram of another adaptive application interface layout method according to an embodiment of this disclosure.

FIG. 16 is another schematic diagram of an adaptive application interface layout method according to an embodiment of this disclosure. In an application development phase, a developer may set an attribute related to a proportion capability in a layout file such as an XML file. For example, the developer enables a proportion capability, sets a layout orientation of a layout container, and sets a proportion of a child view. Subsequently, the developer packs the layout file, other application code and resources, and the like into an installation package, and releases the installation package to an application market. Then, a user may download the installation package from the application market by using an electronic device, and install the application. When the electronic device runs the application, a layout module in the electronic device parses the attribute related to the proportion capability from the layout file, to obtain an attribute value related to the proportion capability, and sends the attribute value to a proportion module in the electronic device. Then, the layout module performs measurement, and starts a proportion capability process. In other words, the proportion module calculates a parameter of a related view such as a dimension of the view based on the attribute value related to the proportion capability. The layout module performs layout based on an updated parameter of the view, to obtain a location of the view on a specific display interface of the application. Finally, the electronic device may draw and display the specific display interface. In a specific example, the proportion module may perform related steps in FIG. 15A and FIG. 15B. The layout module may be a measurement module and a layout module in a native view system of an ANDROID system. The proportion module is a newly added function module in the measurement module in the native view system of the ANDROID system in this disclosure.

(3) Equalization Capability:

When developing an application, after adding dependency of an adaptive layout attribute package, a developer may set a layout container (that is, a ViewGroup) having an equalization capability on a display interface. Further, when editing a layout file of the display interface, the developer may set an attribute value related to the equalization capability of the ViewGroup in the layout file (for example, an XML file), or may set an attribute value related to the equalization capability of the ViewGroup in a JAVA source code file by adding a call interface.

Table 5 shows an example of an attribute related to the equalization capability.

TABLE 5

| Attribute | Attribute type | Application scope | Meaning |
| --- | --- | --- | --- |
| Equalization capability enablement | Boolean (boolean value) | Layout container | Equalization function enabled/disabled |
| Equalization type | enum (enumeration type) | Layout container | Equalization type, including a first type and a second type |
| Spacing threshold A | Dimension (dimension value) | Layout container | A child view spacing is not greater than the spacing threshold A after equalization |
| Spacing threshold B | Dimension (dimension value) | Layout container | A child view spacing is not less than the spacing threshold B after equalization |

It should be noted that, when setting the attribute of the layout container, the developer may enable the equalization capability of the layout container through equalization capability enablement, may further set the equalization type, and set the spacing threshold A and the spacing threshold B. Subsequently, when running the application and drawing each child view in the layout container, the electronic device determines a spacing between child views based on a dimension of the layout container and a dimension of the child view, and draws the child view in the layout container.

The meaning of each attribute related to the equalization capability and an effect of displaying the layout container and the child view are described in detail below with reference to the accompanying drawings.

For example, the equalization capability may include a first-type equalization capability and a second-type equalization capability.

The equalization capability may be understood as that a remaining space obtained by subtracting a space occupied by each child view from an available space of the layout container is evenly allocated as a spacing between child views in a specified orientation. When no inner margin is set for the layout container, available space of the layout container=dimension of the layout container. When an inner margin is set for the layout container, available space of the layout container=dimension of the layout container−inner margin.

The foregoing first-type equalization capability means that no spacing needs to be allocated to a side that is of the $1^{st}$ child view and that is closest to the layout container in a layout orientation and a side that is of the last child view and that is closest to the layout container in the layout orientation.

Figure 17:
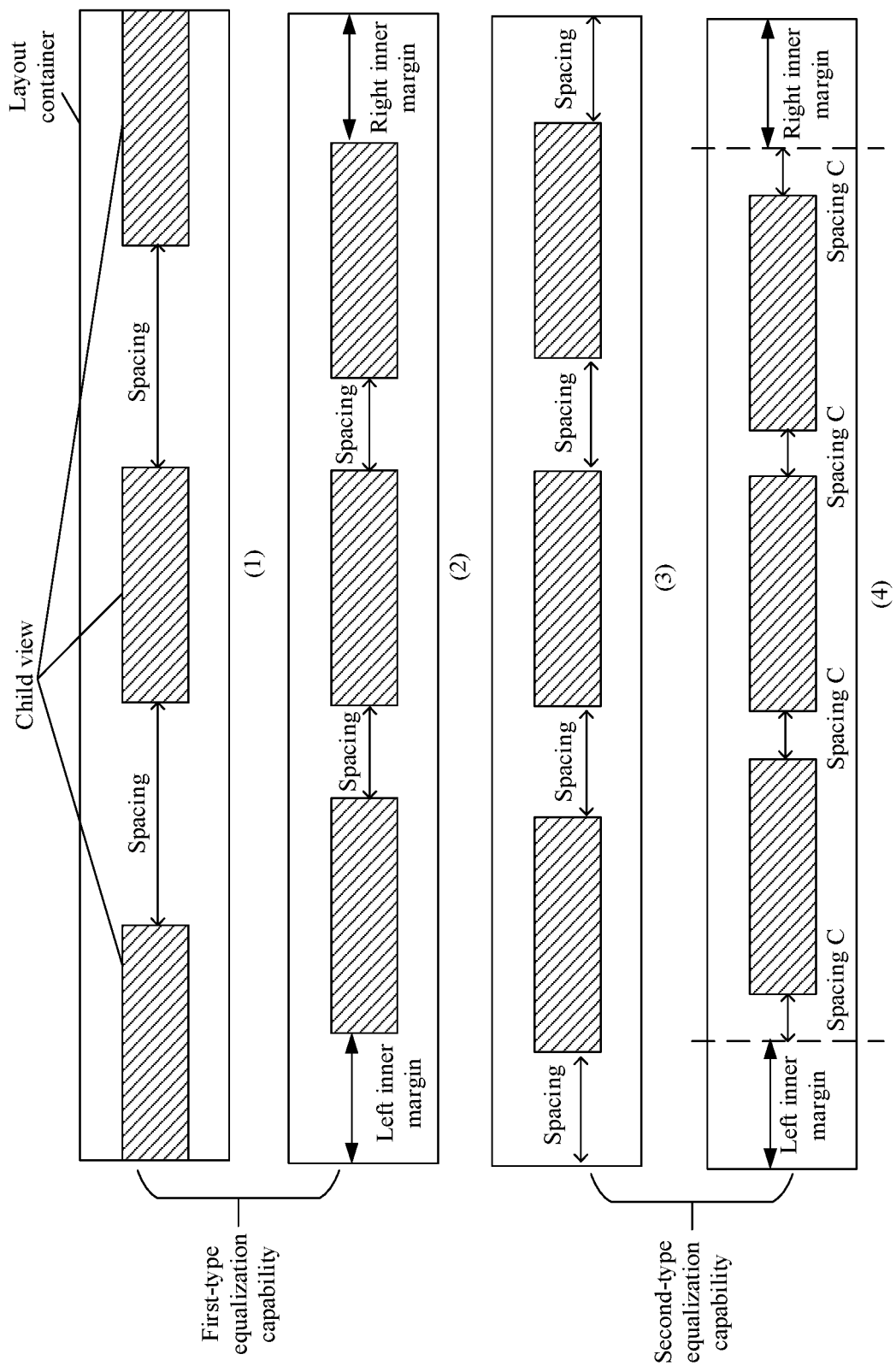
FIG. 17 is a display effect diagram of a layout container having an equalization capability in different scenarios according to an embodiment of this disclosure.

For example, the layout orientation of the layout container is a horizontal orientation (or referred to as a horizontal direction), and the first-type equalization capability of the layout container is enabled. In some examples, when no inner margin is set for the layout container, an available width of the layout container is a width of the layout container. A location relationship between child views displayed in the layout container may be shown in (1) in FIG. 17. A left edge of the $1^{st}$ child view coincides with a left edge of the layout container, a right edge of the last child view in the layout container coincides with a right edge of the layout container, and spacings between adjacent child views are equal or substantially equal. In some other examples, the layout container sets an inner margin in the layout orientation, for example, a left inner margin and a right inner margin. In this case, available width of the layout container=width of the layout container−left inner margin−right inner margin. Therefore, a location relationship between child views displayed in the layout container may be shown in (2) in FIG. 17. A distance between a left edge of the $1^{st}$ child view and a left edge of the layout container is equal to a left inner margin of the layout container, a distance between a right edge of the last child view in the layout container and a right edge of the layout container is equal to a right inner margin of the layout container, and spacings between adjacent child views are equal or substantially equal.

Figure 18:
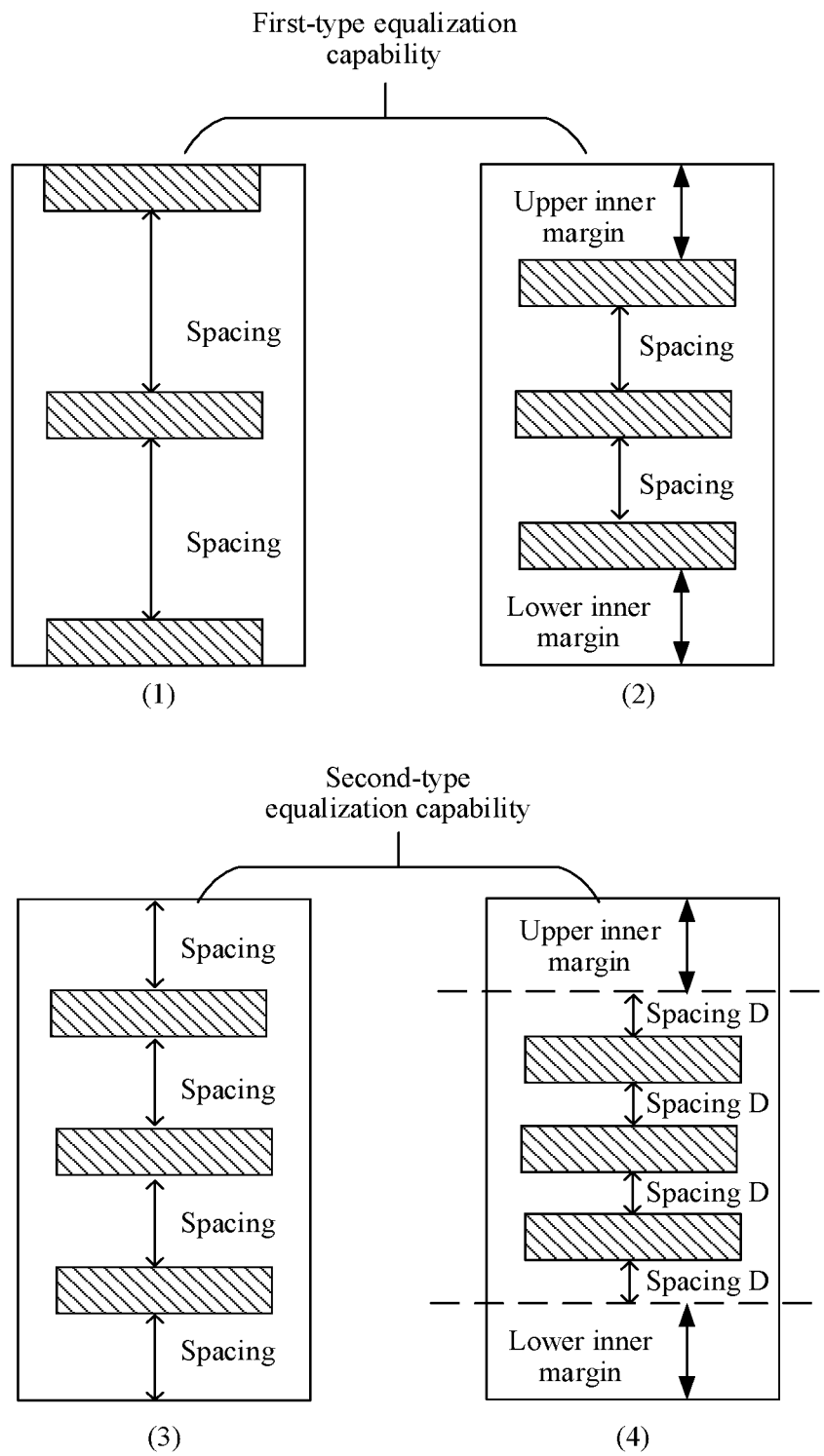
FIG. 18 is a display effect diagram of another layout container having an equalization capability in different scenarios according to an embodiment of this disclosure.

For another example, the layout orientation of the layout container is a vertical orientation (or referred to as a vertical direction), and the first-type equalization capability of the layout container is enabled. In some examples, when no inner margin is set for the layout container, an available height of the layout container is a height of the layout container. A location relationship between child views displayed in the layout container may be shown in (1) in FIG. 18. An upper edge of the $1^{st}$ child view coincides with an upper edge of the layout container, a lower edge of the last child view in the layout container coincides with a lower edge of the layout container, and spacings between adjacent child views are equal or substantially equal. In some other examples, the layout container sets an inner margin in the layout orientation, for example, an upper inner margin (or referred to as an upper inner margin or an upper inner margin) and a lower inner margin (or referred to as a lower inner margin or a lower inner margin). In this case, available height of the layout container=height of the layout container−upper inner margin−lower inner margin. Therefore, a location relationship between child views displayed in the layout container may be shown in (2) in FIG. 18. A distance between an upper edge of the $1^{st}$ child view and an upper edge of the layout container is equal to an upper inner margin of the layout container, a distance between a lower edge of the last child view in the layout container and a lower edge of the layout container is equal to a lower inner margin of the layout container, and spacings between adjacent child views are equal or substantially equal.

The foregoing second-type equalization capability means that a spacing needs to be allocated to a side that is of the $1^{st}$ child view and that is closest to the layout container in a layout orientation and a side that is of the last child view and that is closest to the layout container in the layout orientation.

For example, the layout orientation of the layout container is a horizontal orientation, and the second-type equalization capability of the layout container is enabled. In some examples, when no inner margin is set for the layout container, an available width of the layout container is a width of the layout container. A location relationship between child views displayed in the layout container may be shown in (3) in FIG. 17. A spacing between a left edge of the $1^{st}$ child view and a left edge of the layout container, a spacing between a right edge of the last child view in the layout container and a right edge of the layout container, and a spacing between adjacent child views are equal or substantially equal. In some other examples, the layout container sets an inner margin in the layout orientation, for example, a left inner margin and a right inner margin. In this case, available width of the layout container=width of the layout container−left inner margin−right inner margin. Therefore, a location relationship between child views displayed in the layout container may be shown in (4) in FIG. 17. Horizontal spacings between adjacent child views are equal or substantially equal, and each are denoted as a spacing C. In addition, a distance between a left edge of the $1^{st}$ child view and a left edge of the layout container is equal to a sum of a left inner margin of the layout container and the spacing C, and a distance between a right edge of the last child view in the layout container and a right edge of the layout container is equal to a sum of a right inner margin of the layout container and the spacing C.

For another example, the layout orientation of the layout container is a vertical orientation, and the second-type equalization capability of the layout container is enabled. In some examples, when no inner margin is set for the layout container, an available height of the layout container is a height of the layout container. A location relationship between child views displayed in the layout container may be shown in (3) in FIG. 18. A distance between an upper edge of the $1^{st}$ child view and an upper edge of the layout container, a distance between a lower edge of the last child view in the layout container and a lower edge of the layout container, and a spacing between adjacent child views are equal or substantially equal. In some other examples, the layout container sets an inner margin in the layout orientation, for example, an upper inner margin and a lower inner margin. In this case, available height of the layout container=height of the layout container−upper inner margin−lower inner margin. Therefore, a location relationship between child views displayed in the layout container may be shown in (4) in FIG. 18. Vertical spacings between adjacent child views are equal or substantially equal, and each are denoted as a spacing D. In addition, a distance between an upper edge of the $1^{st}$ child view and an upper edge of the layout container is equal to a sum of an upper inner margin of the layout container and the spacing D, and a distance between a lower edge of the last child view in the layout container and a lower edge of the layout container is equal to a sum of a lower inner margin of the layout container and the spacing D.

In a specific implementation, an equalization capability may be set for a layout container including a plurality of same or similar child views. The child view is, for example, a text view, a button view, an image view, or an icon button view. When a width or a height of the layout container changes, a spacing between child views may automatically and adaptively change based on the width or the height of the layout container, so as to meet display requirements of electronic devices having different screen dimensions. It can be learned that the equalization capability in this solution can enable electronic devices having different screen parameters to present different display effects based on a same layout setting, reduce development and maintenance workload of developers, and meet display requirements of various types of electronic devices.

In some other embodiments, the spacing threshold A or the spacing threshold B may be further set for the layout container with the equalization capability enabled, so as to restrict a range of an adjusted spacing between child views. The adjusted spacing between child views is not greater than the spacing threshold A. The adjusted spacing between child views is not less than the spacing threshold B.

For example, an example in which the layout orientation of the layout container is a horizontal orientation and the first-type equalization capability is enabled is used for description. According to the foregoing method, the spacing between child views is determined as a spacing E based on the available space of the layout container and the dimension of each child view. Then, the spacing E is compared with the spacing threshold A. If the spacing E is greater than the spacing threshold A, the spacing between adjacent child views is determined as the spacing threshold A, and the spacing between the left edge of the $1^{st}$ child view and the left edge of the layout container is adjusted and/or the spacing between the right edge of the last child view and the right edge of the layout container is adjusted.

Figure 19:
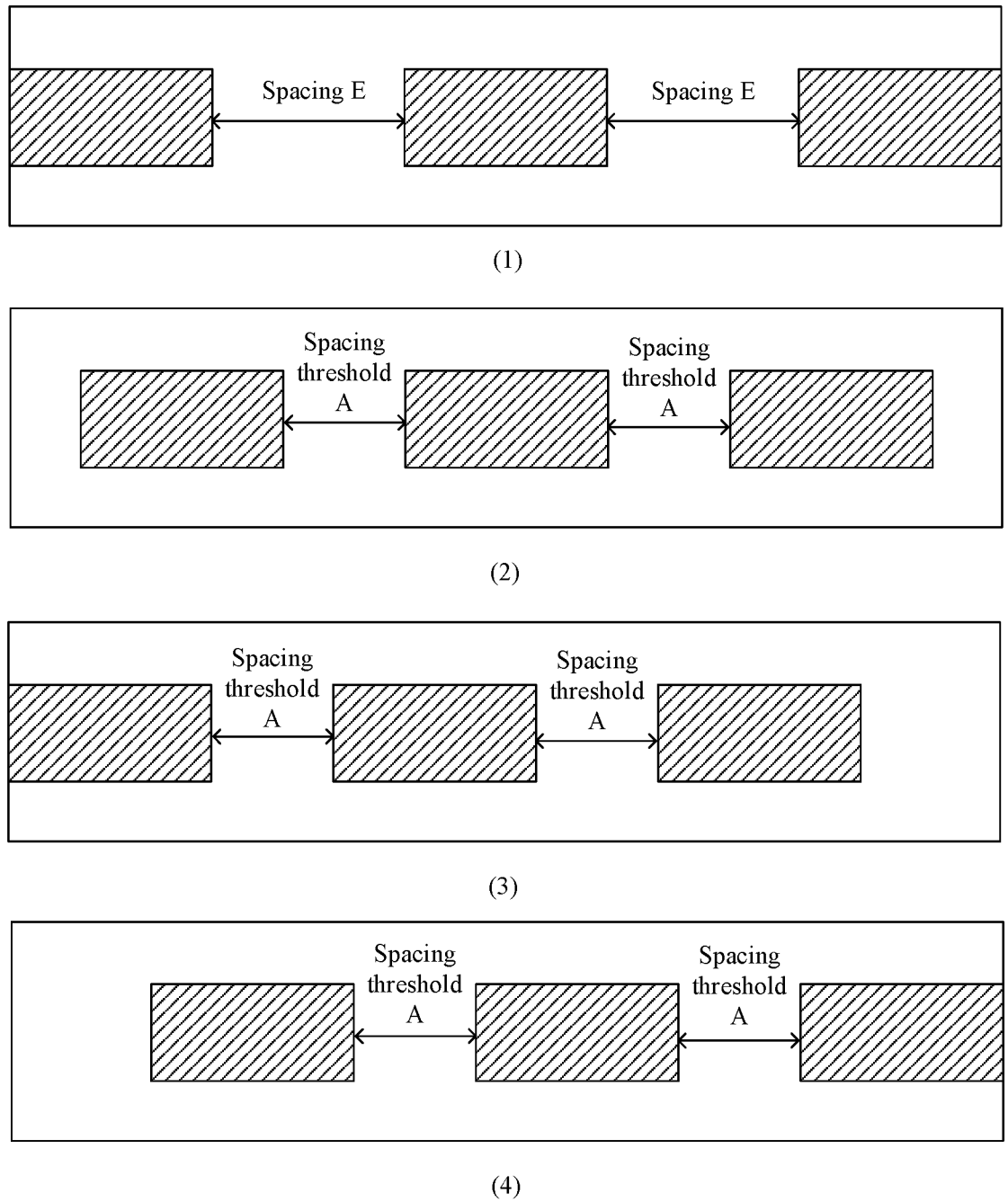
FIG. 19 is a display effect diagram of another layout container having an equalization capability in different scenarios according to an embodiment of this disclosure.

For example, as shown in (1) in FIG. 19, the layout container determines the spacing between child views as the spacing E based on the available space of the layout container and the dimension of the child view. In this case, the spacing E is greater than the spacing threshold A. In an example, as shown in (2) in FIG. 19, it is determined that the spacing between child views is equal to the spacing threshold A, and all child views are centered (that is, horizontally centered) in the layout container as a whole. In this case, the spacing between the left edge of the $1^{st}$ child view and the left edge of the layout container increases, and the spacing between the right edge of the last child view and the right edge of the layout container increases. In another example, as shown in (3) in FIG. 19, it is determined that the spacing between child views is equal to the spacing threshold A, and all child views are left-aligned in the layout container as a whole. In this case, only the spacing between the right edge of the last child view and the right edge of the layout container increases. In still another example, as shown in (4) in FIG. 19, it is determined that the spacing between child views is equal to the spacing threshold A, and all child views are right-aligned in the layout container as a whole. In this case, only the spacing between the left edge of the $1^{st}$ child view and the left edge of the layout container increases.

If the layout orientation of the layout container is a horizontal orientation and the second-type equalization capability is enabled, when it is determined that the spacing between adjacent child views is greater than the distance threshold A, adjustment may also be performed by using a method that is the same as a method for enabling the first-type equalization capability.

If the layout orientation of the layout container is a vertical orientation and the equalization capability (including the first-type equalization capability and the second-type equalization capability) is enabled, when it is determined that the spacing between adjacent child views is greater than the distance threshold A, the spacing between adjacent child views is still determined as the spacing threshold A, and the spacing between the upper edge of the $1^{st}$ child view and the upper edge of the layout container is adjusted and/or the spacing between the lower edge of the last child view and the lower edge of the layout container is adjusted. The child views in the layout container may be centered (that is, vertically centered), top-aligned, or bottom-aligned. For details, refer to the descriptions provided when the layout orientation is a horizontal orientation. Details are not described herein again.

For another example, an example in which the layout orientation of the layout container is a horizontal orientation and the first-type equalization capability is enabled is used for description. According to the foregoing method, the spacing between child views is determined as a spacing E based on the available space of the layout container and the dimension of each child view. Then, the spacing E is compared with the spacing threshold B. If the spacing E is less than the spacing threshold B, the spacing between adjacent child views is determined as the spacing threshold B. In this case, the $1^{st}$ child view and/or the last child view display/displays partial content. For example, if the child views are centered, a left part of the $1^{st}$ child view and a right part of the last child view may be truncated and not displayed. If the child views are left-aligned, a child view arranged to the right may be truncated and not displayed. If the child views are right-aligned, a child view arranged to the left may be truncated and not displayed.

In some other embodiments, the layout container may further set a hiding capability. Therefore, after the spacing E is adjusted to the spacing threshold B, when the layout container still cannot display all child views, the hiding capability may be triggered. After the hiding capability is triggered, a hidden child view may be determined based on hiding priorities of the child views, that is, a quantity of child views displayed in the layout container is reduced. In this case, the spacing between adjacent child views is re-determined based on an adjusted quantity of child views and the available space of the layout container.

It should be noted that the spacing between child views is first divided based on the equalization capability. When a divided spacing between child views is less than the spacing threshold B, the hiding capability is triggered, and then the spacing between displayed child views is determined by using the equalization capability. In some other examples, a hidden child view may be first determined based on the hiding capability, and then the spacing between displayed child views is determined based on the equalization capability. This is not limited in this embodiment of this disclosure.

In some other embodiments, the layout container may further set a wrapping capability. Therefore, after the spacing E is adjusted to the spacing threshold B, when the layout container still cannot display all child views, the wrapping capability may be triggered. After the wrapping capability is triggered, a quantity of rows or a quantity of columns in which the layout container displays these child views and a quantity of child views displayed in each row or each column may be first determined. In this case, the layout container may determine a spacing between child views in each row or each column based on the quantity of child views displayed in each row or each column and dimensions of the child views.

It should be noted that the spacing between child views is first divided based on the equalization capability. When a divided spacing between child views is less than the spacing threshold B, the wrapping capability is triggered, and then the spacing between child views displayed in each row or each column is determined by using the equalization capability. In some other examples, a quantity of rows or a quantity of columns included in the layout container may be first determined based on the wrapping capability, and then a spacing between child views in each row is determined based on the equalization capability. This is not limited in this embodiment of this disclosure.

An example in which the layout orientation of the layout container is a horizontal orientation and the first-type equalization capability is enabled is used above for description. If the layout orientation of the layout container is a horizontal orientation and the second-type equalization capability is enabled, or the layout orientation of the layout container is a vertical orientation and the equalization capability (including the first-type equalization capability and the second-type equalization capability) is enabled, when it is determined that the spacing between adjacent child views is less than the distance threshold B, adjustment may also be performed by using a similar method.

It should be noted that the foregoing embodiment is described by using an example in which dimensions of child views included in a layout container are the same. In this disclosure, dimensions of child views in a layout container with an equalization capability enabled are not limited, and the dimensions of the child views may be the same or may be different.

In addition, as mentioned above, after the equalization capability is enabled, spacings between adjacent child views in the layout container may be equal or substantially equal, or may be different. For example, allocation is performed by using another rule. The following provides several examples.

Figure 20:
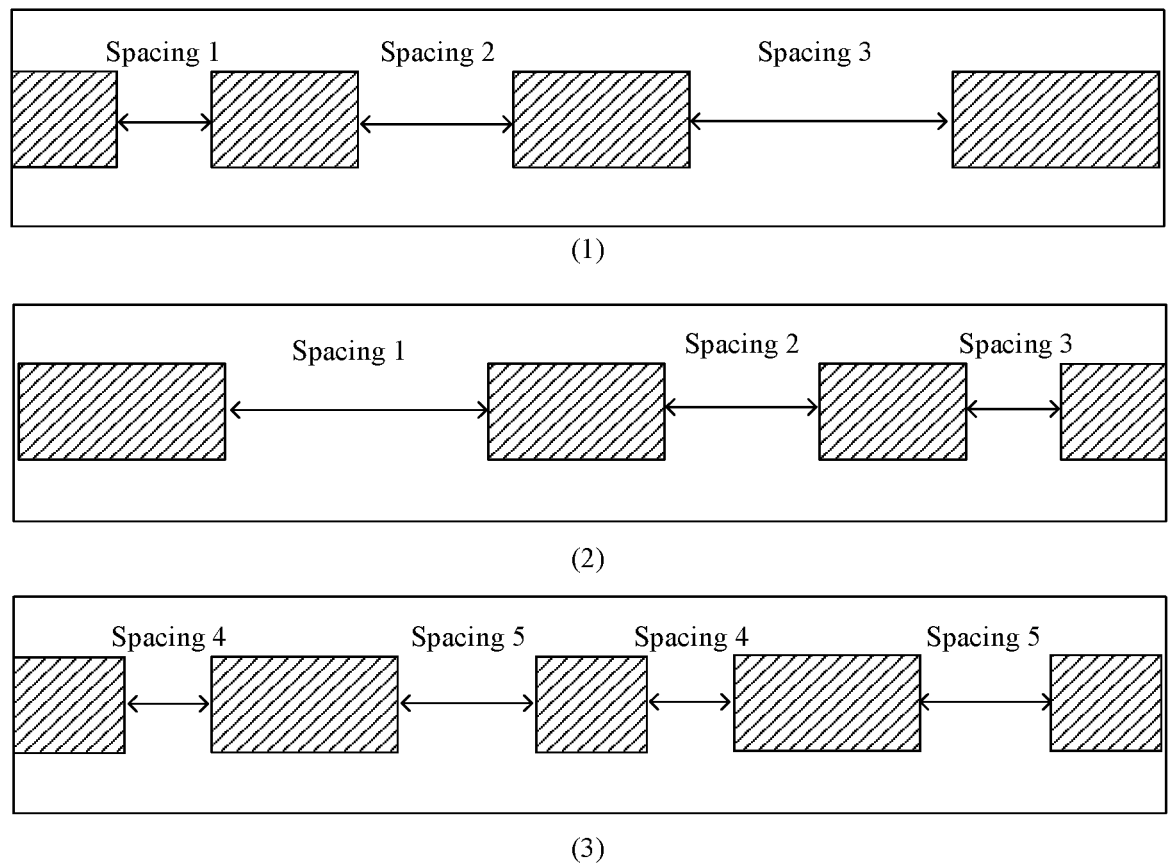
FIG. 20 is a display effect diagram of another layout container having an equalization capability in different scenarios according to an embodiment of this disclosure.

For example, as shown in (1) in FIG. 20, spacings between adjacent child views are in ascending order. Spacing 1<spacing 2<spacing 3. Alternatively, as shown in (2) in FIG. 20, spacings between adjacent child views are in descending order. Spacing 1>spacing 2>spacing 3. Alternatively, as shown in (3) in FIG. 20, spacings between adjacent child views alternately change. Spacing 4<spacing 5.

The following provides an example of one layout file (an XML file). A layout container with an equalization capability enabled is set in the layout file, and the layout container includes four child views: four image views.

```
<hwLayout
    xmlns:android="http://schemas.android.com/apk/res/android"
    xmlns:app="http://schemas.android.com/apk/res-auto"
    android:layout_height="match_parent"
    android:layout_width="match_parent"
    /* omit other configurations */
    android:orientation="horizontal"      //set a layout orientation
of the layout container
    app: equalization capability enablement="true"      //enable an
equalization capability
    app: equalization capability type="first type">      //set the
equalization capability as the first-type equalization capability
    <ImageView         //child view 1 in the layout container
      /* omit other configurations *//>
    <ImageView         //child view 2 in the layout container
      /* omit other configurations *//>
    <ImageView         //child view 3 in the layout container
      /* omit other configurations *//>
    <ImageView         //child view 4 in the layout container
      /* omit other configurations *//>
</hwLayout>
```

The foregoing embodiment is a solution in which the developer designs an adaptive display interface layout by setting an attribute value related to an equalization capability of a layout container in a layout file (for example, an XML file). Alternatively, an attribute value related to an equalization capability of a layout container may be set in a JAVA source code file by adding a call interface.

Table 6 shows an example of an interface corresponding to the attribute value related to the equalization capability of the layout container.

TABLE 6

| Qualifier and type | Name and description | Parameter description |
|---|---|---|
| Public boolean | Is equalization capability ( ) Obtain an equalization capability enablement status | Return an equalization capability enablement enabled/disabled state |
| Public void | Set equalization capability enablement ( ) Set the equalization capability enablement status | true-enabled; false-disabled |
| Public int | Get spacing threshold A ( ) Obtain a spacing threshold A | Return the spacing threshold A, where a child view spacing in the layout container is not greater than the spacing threshold A |
| Public int | Get spacing threshold B ( ) Obtain a spacing threshold B | Return the spacing threshold B, where a child view spacing in the layout container is not less than the spacing threshold B |
| Public void | Set equalization type ( ) Set an equalization type | Set the equalization type, including a first type and a second type |
| Public void | Set spacing threshold A ( ) Set the spacing threshold A | Set the spacing threshold A |
| Public void | Set spacing threshold B ( ) Set the spacing threshold B | Set the spacing threshold B |

The meanings of the equalization capability are described in detail above. A developer may configure a layout file based on a layout design of each display interface in an application with reference to an equalization capability, another adaptive layout capability, and a basic layout capability (for example, an ANDROID native attribute), pack the layout file, other source code and resources, and the like of the application into an installation package (for example, an APK file), and release the installation package to an application market. An electronic device downloads the installation package from the application market, and installs the application. The following describes in detail a solution of implementing adaptive layout based on the foregoing layout file when the electronic device runs the application.

Figure 21A:
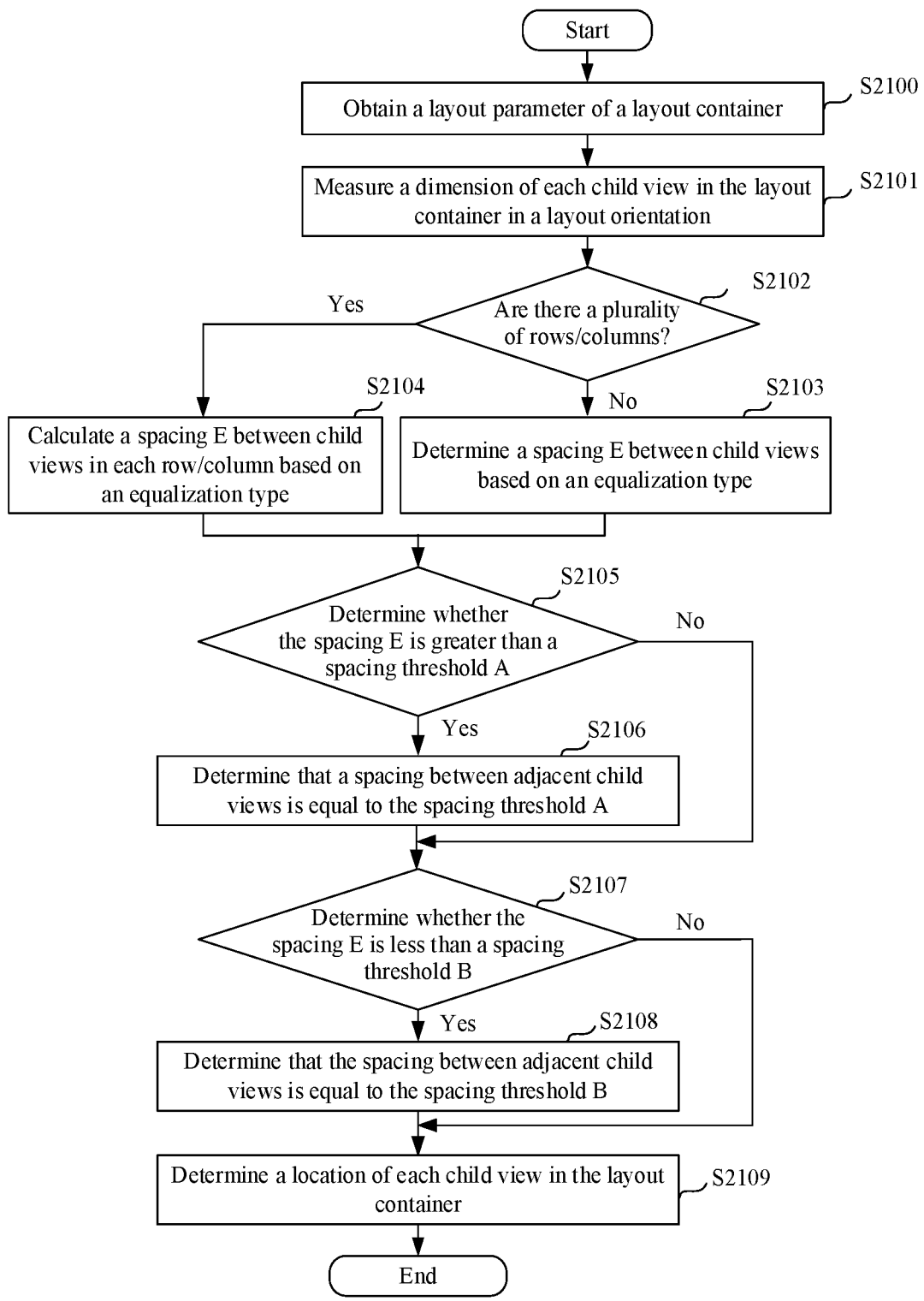
FIG. 21A is a schematic flowchart of another measurement method in a view system according to an embodiment of this disclosure.

Further, the mobile phone performs a measurement procedure shown in FIG. 21A for each layout container in the layout file. The method includes the following steps.

S2100: Obtain a layout parameter of the layout container.

The layout parameter of the layout container includes whether the layout container enables an equalization capability, a child view included in the layout container, and a layout parameter of the child view. If the equalization capability is enabled, the layout parameter of the layout container further includes an equalization type, a spacing threshold A, a spacing threshold B, and the like. After it is determined that the layout container enables the equalization capability, the following steps are performed.

S2101: Measure a dimension of each child view in the layout container in a layout orientation.

For example, a dimension of the child view, including the dimension in the layout orientation, is first obtained by using an ANDROID native measurement method and the layout parameter of the child view.

S2102: Determine whether the layout container has a plurality of rows/columns, and if yes, perform step S2104, or if not, perform step S2103.

In some examples, the layout container further enables a wrapping capability. In this case, a quantity of rows or a quantity of columns included in the layout container and a quantity of child views included in each row or each column need to be first determined based on an attribute related to the wrapping capability. For a value of a spacing between child views in each row or each column, if the layout container does not enable the wrapping capability, the layout container includes child views in one row or one column, and a spacing between the child views in one row or one column is calculated.

S2103: Determine a spacing E between child views in the layout container based on the equalization type.

For example, the spacing E between child views is determined based on the equalization type, a dimension of the layout container, an inner margin, the layout orientation, and the dimension of the child view. Adjacent child views have an equal spacing E.

For first-type equalization, spacing E=[dimension space of the layout container in the layout orientation−inner margin in the layout orientation−Σ(w1, w2, . . . , wN)]/(N−1).
For second-type equalization, spacing E=[dimension space of the layout container in the layout orientation−inner margin in the layout orientation−Σ(w1, w2, . . . , wN)]/(N+1).

The layout container includes N child views, where Wi is a dimension of the $i^{th}$ child view in the layout orientation, i=1, 2, . . . , or N, and N is an integer greater than 1.

Then, step S2105 is performed.

S2104: Calculate a spacing E between child views in each row/column based on the equalization type.

The spacing E is calculated based on the quantity of child views in each row/column and the dimension of the child view. For a specific calculation method, refer to the descriptions in step S2103.

S2105: Determine whether the spacing E is greater than the spacing threshold A, and if yes, perform step S2106, otherwise, perform step S2107.

S2106: Determine that a spacing between adjacent child views is equal to the spacing threshold A.

S2107: Determine whether the spacing E is less than the spacing threshold B, and if yes, perform step S2108, otherwise, perform step S2109.

S2108: Determine that a spacing between adjacent child views is equal to the spacing threshold B.

S2109: Determine a location of each child view in the layout container.

After the spacing between adjacent child views is determined, all child views are centered, or left-aligned, or right-aligned, or top-aligned, or bottom-aligned in the layout container as a whole, to determine the location of each child view.

It should be noted that, if the spacing between adjacent child views is adjusted based on the spacing threshold A or the spacing threshold B, when all the child views are centered, or left-aligned, or right-aligned, or top-aligned, or bottom-aligned in the layout container as a whole, a distance between an outer edge of each of child views on both sides and the layout container may further need to be adjusted. For a specific adjustment process, refer to related content in FIG. 19. Details are not described herein again.

It should be noted that, if the first row has only one child view, the child view may be centered. If the first row has a plurality of child views, the plurality of child views is displayed based on the equalization type.

If the first row has only one child view and the second row starts to have a plurality of child views, display starts from the second row based on the equalization type. The third row and subsequent rows may be displayed based on a calculated spacing in the second row. In this way, starting from the second row, each child view may present a mesh effect. Alternatively, in some other examples, a spacing between adjacent child views may be independently calculated based on data of a child view included in each row and a width (or a height) of each child view in the third row and subsequent rows, and display is performed based on the calculated spacing.

It can be understood that, when electronic devices (for example, a mobile phone and a tablet computer) having different screen dimensions use a same layout file (including a layout container provided with an equalization capability), according to the measurement procedure in FIG. 21A, application interfaces finally drawn may present different layout effects.

For example, a screen width of the mobile phone is 720 pixels, and a screen width of the tablet computer is 1280 pixels. Both the mobile phone and the tablet computer use a same installation package to install a gallery application. A layout file corresponding to a page of the gallery application includes a layout container configured to display navigation, and the layout container enables a second-type equalization capability. The layout container includes four horizontally arranged child views (which are respectively "Photos", "Albums", "Moments", and "Discover"). Widths of the four child views are equal and each are 80 pixels. An inner margin of the layout container is set to 0 pixels.

Figure 21B:
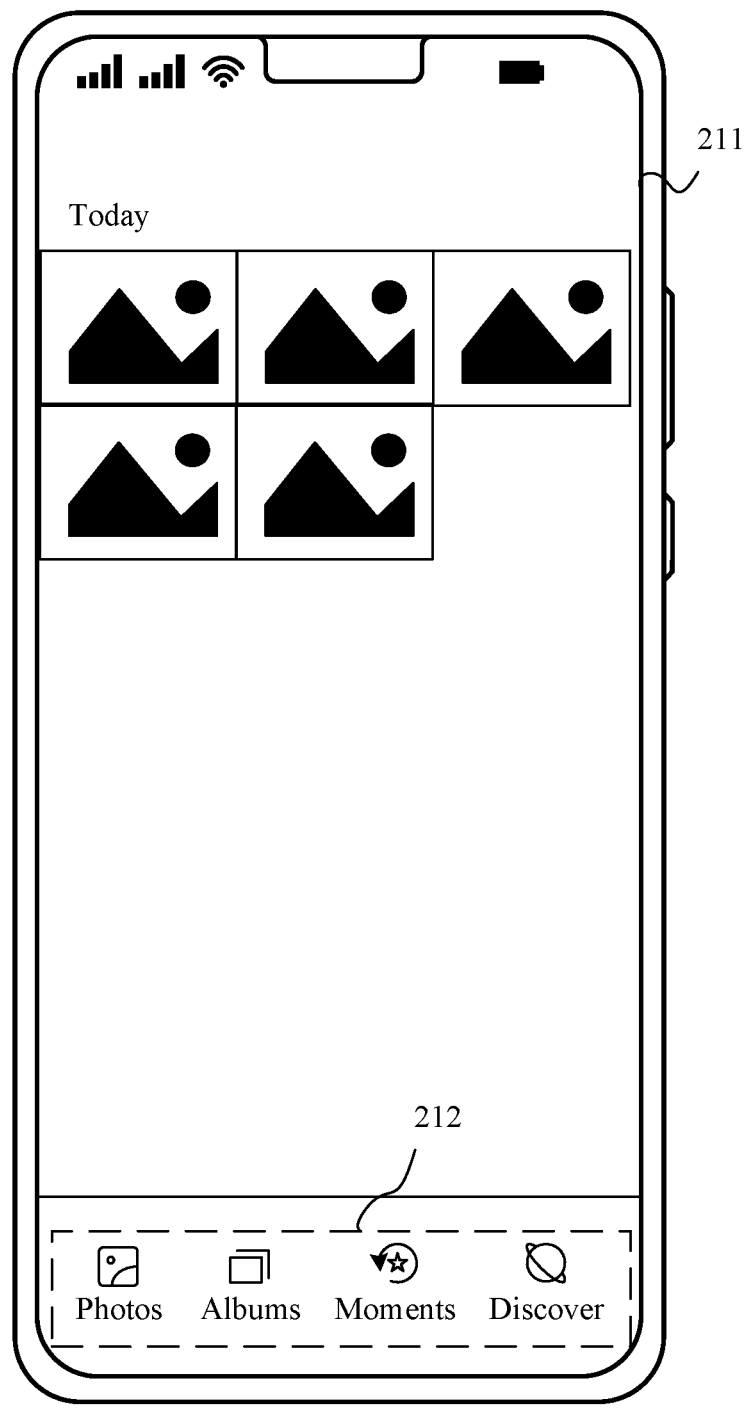
FIG. 21B and FIG. 21C are an effect diagram in which different electronic devices display a layout container having an equalization capability according to an embodiment of this disclosure.

Therefore, when the mobile phone draws the page of the gallery application and performs the measurement procedure in FIG. 21A for the layout container, the mobile phone calculates a spacing between child views: spacing between child views=[dimension space of the layout container in a layout orientation−inner margin in the orientation direction−$\Sigma(w1, w2, \ldots, wN)$]/(N+1)=(720−0−80*4)/5=80 pixels. The mobile phone displays an interface 211 shown in FIG. 21B, where a spacing between child views in a layout container 212 is 80 pixels.

Figure 21C:
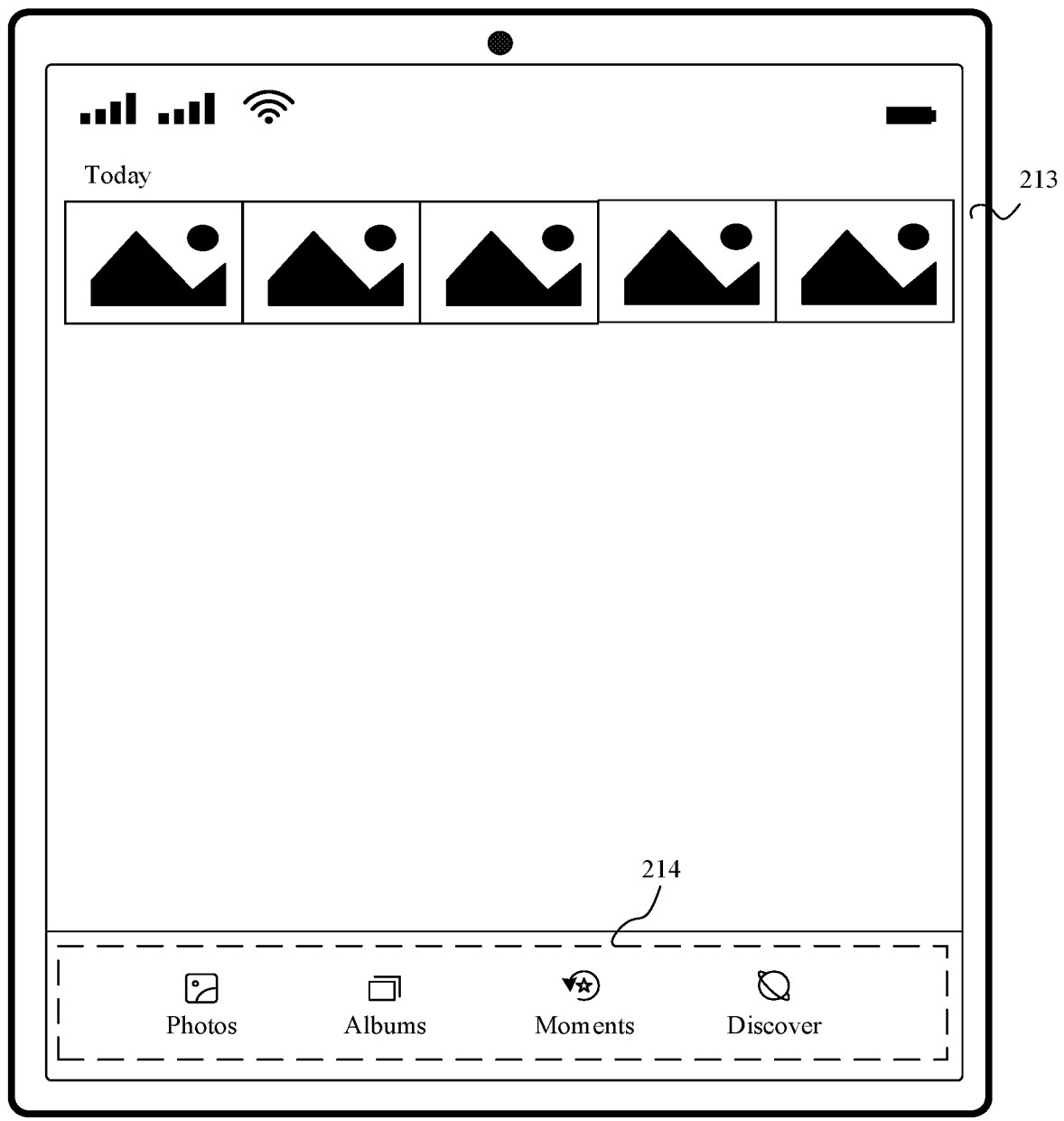

When the tablet computer draws the page of the gallery application and performs the measurement procedure in FIG. 21A for the layout container, the tablet computer calculates a spacing between child views: spacing between child views=[dimension space of the layout container in a layout orientation−inner margin in the orientation direction−$\Sigma(w1, w2, \ldots, wN)$]/(N+1)=(1280−0−80*4)/5=192 pixels. The tablet computer displays an interface 213 shown in FIG. 21C, where a spacing between child views in a layout container 214 is 192 pixels.

Figure 22:
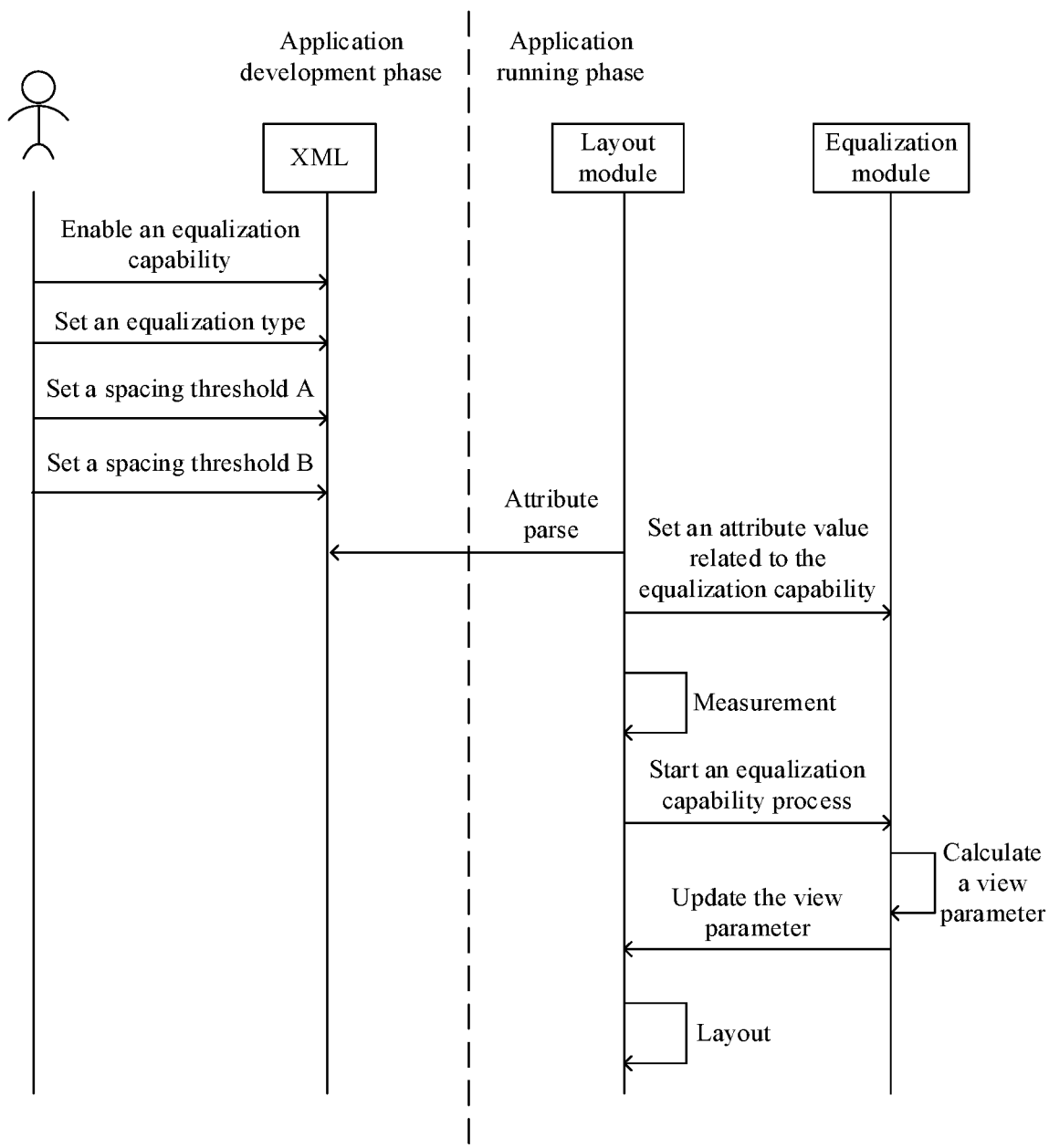
FIG. 22 is a schematic diagram of another adaptive application interface layout method according to an embodiment of this disclosure.

FIG. 22 is another schematic diagram of an adaptive application interface layout method according to an embodiment of this disclosure. In an application development phase, a developer may set an attribute related to an equalization capability in a layout file such as an XML file. For example, the developer enables the equalization capability, sets an equalization type, and sets a spacing threshold A and a spacing threshold B. Subsequently, the developer packs the layout file, other application code and resources, and the like into an installation package, and releases the installation package to an application market. Then, a user may download the installation package from the application market by using an electronic device, and install the application. When the electronic device runs the application, a layout module in the electronic device parses the attribute related to the equalization capability from the layout file, to obtain an attribute value related to the equalization capability, and sends the attribute value to an equalization module in the electronic device. Then, the layout module performs measurement, and starts an equalization capability process. In other words, the equalization module calculates a parameter of a related view such as a dimension of the view based on the attribute value related to the equalization capability. The layout module performs layout based on an updated parameter of the view, to obtain a location of the view on a specific display interface of the application. Finally, the electronic device may draw and display the specific display interface. In a specific example, the equalization module may perform related steps in FIG. 21A. The layout module may be a measurement module and a layout module in a native view system of an ANDROID system. The equalization module is a newly added function module in the measurement module in the native view system of the ANDROID system in this disclosure.

(4) Hiding Capability:

When developing an application, after adding dependency of an adaptive layout attribute package, a developer may set a layout container (that is, a ViewGroup) having a hiding capability on a display interface. Further, when editing a layout file of the display interface, the developer may set an attribute value related to the hiding capability of the ViewGroup in the layout file (for example, an XML file), or may set an attribute value related to the hiding capability of the ViewGroup in a JAVA source code file by adding a call interface.

Table 7 shows an example of an attribute related to the hiding capability.

TABLE 7

| Attribute | Attribute type | Application scope | Meaning |
| --- | --- | --- | --- |
| Horizontal hiding capability enablement | Boolean (boolean value) | Layout container | Horizontal hiding function enabled/disabled |

TABLE 7-continued

| Attribute | Attribute type | Application scope | Meaning |
| --- | --- | --- | --- |
| Horizontal hiding priority | Integer (integer type) | Child view | greater than or equal to 0 |
| Vertical hiding capability enablement | Boolean (boolean value) | Layout container | Vertical hiding function enabled/disabled |
| Vertical hiding priority | Integer (integer type) | Child view | greater than or equal to 0 |

It should be noted that, when setting an attribute of a layout container, the developer may enable a horizontal hiding capability/vertical hiding capability of the layout container through horizontal hiding capability enablement/vertical hiding capability enablement. In addition, a hiding priority may be further set for a child view (a View or a ViewGroup in the layout container). Subsequently, when running the application and drawing a child view in the layout container, if the electronic device determines, based on a dimension of the layout container, that not all child views can be displayed in a horizontal direction/vertical direction, the electronic device may determine a hidden child view or a displayed child view based on a hiding priority of each child view. Then, the electronic device draws each child view in the layout container, so as to implement an adaptive layout on the electronic device.

It should be further noted that each attribute in Table 7 is merely an example. In some other embodiments, hiding capability enablement and a hiding priority may also be set. In this way, after the hiding capability of the layout container is enabled, a hidden child view may be determined by default in a layout direction of the layout container based on a hiding priority of the child view. Optionally, an orientation of the hiding capability may be further set. After the user sets the orientation of the hiding capability, a hidden child view is determined in a specified orientation based on a hiding priority of the child view. This is not limited in this embodiment of this disclosure.

The meaning of each attribute related to the hiding capability and an effect of displaying the layout container and the child view are described in detail below with reference to the accompanying drawings by using Table 7 as an example.

In some embodiments, a horizontal hiding capability of the layout container may be enabled, and a horizontal hiding priority or a horizontal display priority is set for each child view in the layout container. Herein, the horizontal hiding priority is used as an example for description. Therefore, after a width of the layout container is determined, whether the layout container can display all child views is determined based on widths of child views horizontally arranged in the layout container. If yes, all the child views are displayed. If not, a hidden child view, that is, a child view not displayed in the layout container, is further determined based on the horizontal hiding priority of each child view. In some examples, when running the application, the electronic device does not draw a child view that is determined to be hidden in the layout container, or draws only a child view that is determined to be displayed in the layout container. It should be further noted that, in this disclosure, displaying a child view means completely displaying content of the child view, that is, displaying all content of the child view.

For example, it is set that a layout container includes six horizontally arranged child views: a child view A to a child view F. In addition, horizontal hiding priorities of the six child views are arranged in ascending order: (child view A, child view B, and child view D)<(child view E and child view F)<child view C. The horizontal hiding priorities of the child view A, the child view B, and the child view D are the same, and the horizontal hiding priorities of the child view E and the child view F are the same.

Figure 23:
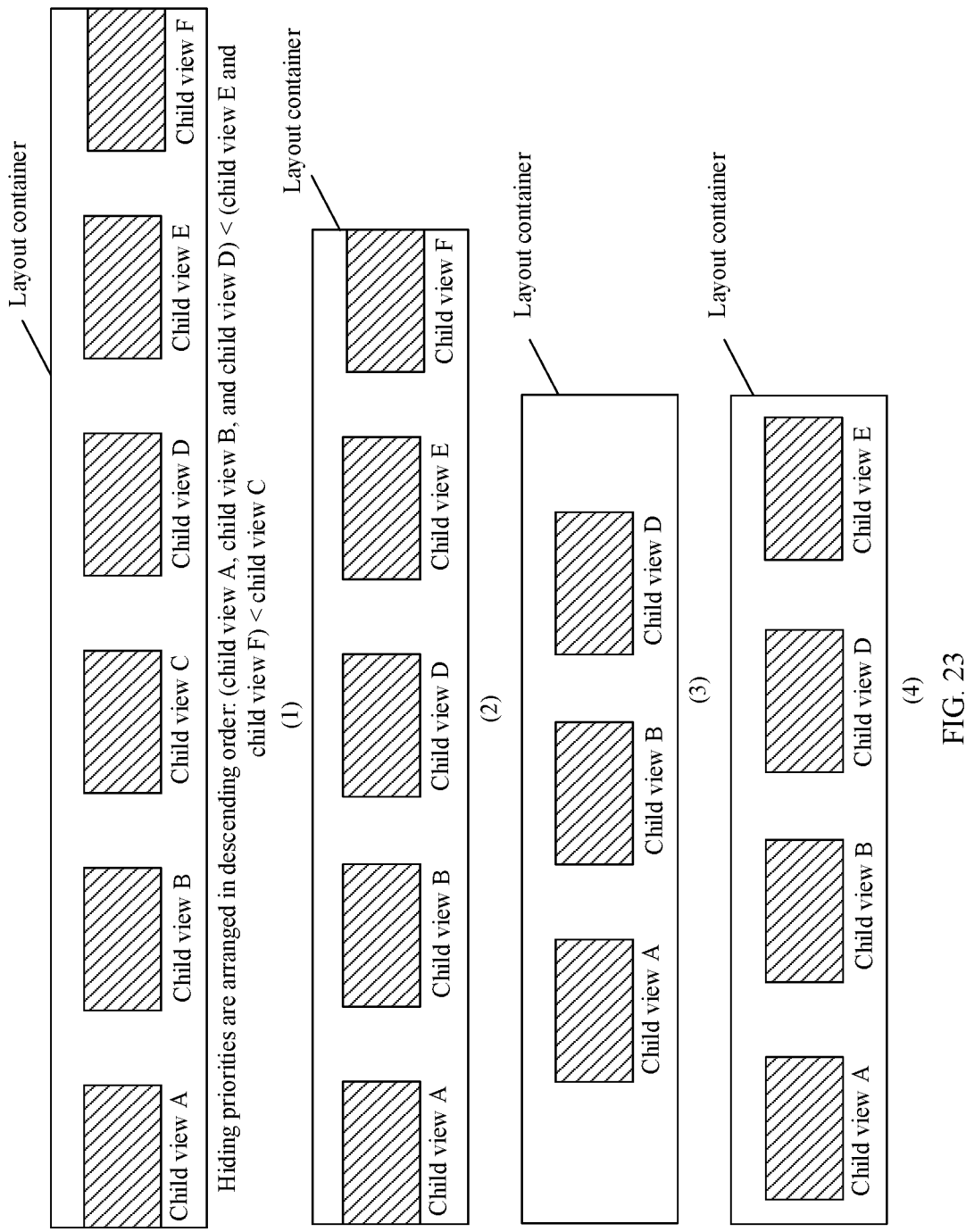
FIG. 23 is a display effect diagram of a layout container having a hiding capability in different scenarios according to an embodiment of this disclosure.

(1) in FIG. 23 is an effect diagram of a layout container displayed by an electronic device 1. In this case, available width of the layout container displayed by the electronic device 1≥sum of widths of all child views in the layout container. Herein, available width of the layout container=total width of the layout container−left and right inner margins. In (1) in FIG. 23, an example in which the left and right inner margins are 0 is used for description. Therefore, the layout container on the electronic device 1 may horizontally display all the child views (the child view A to the child view F).

It should be noted that, if a spacing between adjacent child views is further set, the sum of the widths of all the child views in the layout container includes the width of each child view and the spacing between adjacent child views. Similarly, in the following, when it is determined whether a plurality of child views can be placed, a sum of widths of the plurality of child views includes a spacing between adjacent child views in the plurality of child views. This is not described below. Adjacent child views may have a same spacing, or may have different spacings. In some examples, the spacing between adjacent child views may be a fixed value that is set in the layout file. In some other examples, an initial value of the spacing between adjacent child views may alternatively be set in the layout container. After a hidden child view or a displayed child view in the layout container is determined based on the initial value of the spacing between adjacent child views and the width of each child view, the spacing between adjacent child views is adjusted based on the width of the layout container and a width of the displayed child view. This is not limited in this embodiment of this disclosure.

When available width of the layout container<sum of the widths of all the child views in the layout container, it is determined that the layout container cannot display all the child views. In this case, the hidden child view or the displayed child view is determined based on an available space of the layout container, the width of each child view, and the horizontal hiding priority of each child view.

In a technical solution, when the layout container cannot display all child views, a child view of a high horizontal hiding priority in the layout container is hidden in a sequence of horizontal hiding priorities of the child views.

For example, (2) in FIG. 23 is an effect diagram of a layout container displayed by an electronic device 2. Because available width of the layout container displayed by the electronic device 2<sum of widths of child views in the layout container, a child view of a highest horizontal hiding priority (for example, the child view C) in the layout container is hidden. After the child view C is hidden, the layout container on the electronic device 2 can display the other five child views, that is, the child view A, the child view B, and the child view D to the child view F.

For another example, (3) in FIG. 23 is an effect diagram of a layout container displayed by an electronic device 3. Because available width of the layout container displayed by the electronic device 3<sum of widths of child views in the layout container, a child view of a highest horizontal hiding priority (for example, the child view C) in the layout container is hidden. Then, it is determined, based on widths of the other child views (for example, the child view A, the child view B, and the child view D to the child view F), that the layout container still cannot display all the five child views. Further, a child view whose horizontal hiding priority is only second to that of the child view C (for example, the child view E and the child view F) in the layout container is further determined to be hidden. Then, it is determined, based on widths of the other child views (the child view A, the child view B, and the child view D), that the layout container can display all the three child views. In this case, the electronic device 3 displays the three child views.

It should be noted that, in some examples, a plurality of child views of a same horizontal hiding priority is simultaneously hidden or simultaneously displayed. For example, the child view E and the child view F are child views of a same horizontal hiding priority. In this case, the child view E and the child view F are simultaneously displayed in the layout container, or are not simultaneously displayed in the layout container. In some other examples, it may alternatively be determined, in a plurality of child views of a same horizontal hiding priority, that a child view arranged after a current child view is hidden. For example, the child view E and the child view F are child views of a same horizontal hiding priority. When it is determined to hide a child view, the child view F is hidden prior to the child view E. In other words, when it is determined that the electronic device 3 cannot display all the five child views (the child view A, the child view B, and the child view D to the child view F), it is further determined to hide the child view F. In this case, it is determined whether the layout container can display all other child views (the child view A, the child view B, the child view D, and the child view E). If it is determined that the four child views can be displayed, as shown in (4) in FIG. 23, the layout container displays the four child views. Certainly, for child views of a same horizontal hiding priority, a child view that is hidden may be determined by using another method or may be determined randomly. This is not limited in this embodiment of this disclosure.

It should be noted that a sequence of arranging child views herein may be determined based on a user's reading habit of text. For example, the user's reading habit may be determined based on a language of the text displayed on the child views. Generally, for languages such as Chinese and English, the user is accustomed to reading from left to right and from top to bottom. Therefore, for a plurality of horizontally arranged child views, it may be considered that a left child view is arranged before a right child view, and for a plurality of vertically arranged child views, it may be considered that an upper child view is arranged before a lower child view. For some other languages, for a plurality of horizontally arranged child views, it may be considered that a rear child view is arranged before a left child view, and for a plurality of vertically arranged child views, it may be considered that a lower child view is arranged before an upper child view. In addition, the user may alternatively set whether a plurality of horizontally arranged child views are arranged first on the left side or the right side and/or set whether a plurality of vertically arranged child views are arranged first on the upper side or the lower side. The foregoing sequence of arranging child views is merely an example, and is not limited in this disclosure.

In another technical solution, when the layout container cannot display all child views, child views that can be displayed in the layout container are sequentially calculated in a sequence of horizontal hiding priorities of the child views.

Further, child views that are to be determined whether to be displayed through each calculation are determined in ascending order of the horizontal hiding priorities of the child views, where the child views are referred to as to-be-determined child views for short. Horizontal hiding priorities of the to-be-determined child views in each calculation are the same. In each calculation process, if available width of the layout container−sum of widths of child views determined to be displayed≥sum of widths of to-be-determined child views in current calculation, it is determined that the layout container can display the to-be-determined child views in current calculation. If it is determined that available width of the layout container<sum of the widths of the to-be-determined child views in current calculation, it is determined that the layout container cannot display the to-be-determined child views in current calculation.

In addition, if available width of the layout container−sum of widths of child views determined to be displayed>sum of widths of to-be-determined child views in current calculation, it needs to be further determined whether another child view can be placed in the layout container. Another child view whose horizontal hiding priority is higher than that of the current to-be-determined child view is determined as a to-be-determined child view in next calculation.

If available width of the layout container−sum of widths of child views determined to be displayed=sum of widths of to-be-determined child views in current calculation, it indicates that the layout container cannot display more child views other than the to-be-determined child views in current calculation.

The following provides specific description with reference to an instance. To simplify description, w(M) is used to identify a width of a child view M, where M is a variable. For example, w(A) indicates a width of a child view A.

For example, as shown in (2) in FIG. 23, available width of the layout container displayed by the electronic device 2<sum of the widths of the child views in the layout container.

First, it is determined that a child view of a lowest horizontal hiding priority (or a highest horizontal display priority) (for example, the child view A, the child view B, and the child view D) in the layout container is a child view that is first displayed, and is a to-be-determined child view in current calculation. Because available space of the layout container of the electronic device 2>Σ[w(A), w(B), w(D)], it is determined that the child view A, the child view B, and the child view D can be displayed in the layout container. In addition, it needs to be further determined whether another child view can be displayed.

It should be noted that, if it is determined that available width of the layout container=Σ[w(A), w(B), w(D)], only the child view A, the child view B, and the child view D can be displayed in the layout container.

Further, it is determined that another child view of a slightly higher horizontal hiding priority (for example, the child view E and the child view F) is a to-be-determined child view in current calculation. When it is determined that available width of the layout container−Σ[w(A), w(B), w(D)]≥Σ[w(E), w(F)], it is determined that the child view E and the child view F can be further displayed in the layout container. In this case, if available width of the layout container−Σ[w(A), w(B), w(D)]>Σ[w(E), w(F)], it further needs to be determined whether another child view can be displayed.

It should be noted that, if it is determined that available width of the layout container−Σ[w(A), w(B), w(D)]=Σ[w(E), w(F)], only the child view A, the child view B, the child view D, the child view E, and the child view F can be displayed in the layout container.

Further, it is determined whether another child view of a higher horizontal hiding priority (for example, the child view C) can be displayed in the layout container. In this case, available width of the layout container−Σ[w(A), w(B), w(D), w(E), w(F)]<w(C), the child view C cannot be displayed in the layout container.

In conclusion, the layout container of the electronic device 2 displays a total of five child views: the child view A, the child view B, and the child view D to the child view F.

For another example, as shown in (2) in FIG. 23, available width of the layout container displayed by the electronic device 2<sum of the widths of the child views in the layout container.

First, it is determined that a child view of a lowest horizontal hiding priority (for example, the child view A, the child view B, and the child view D) in the layout container is a child view that is first displayed, and is a to-be-determined child view in current calculation. Because available space of the layout container of the electronic device 2>Σ[w(A), w(B), w(D)], it is determined that the child view A, the child view B, and the child view D can be displayed in the layout container. In addition, it needs to be further determined whether another child view can be displayed.

Further, it is determined that another child view of a slightly higher horizontal hiding priority (for example, the child view E and the child view F) is a to-be-determined child view in current calculation. When it is determined that available width of the layout container−Σ[w(A), w(B), w(D)]<Σ[w(E), w(F)], it is determined that the child view E and the child view F cannot be displayed in the layout container. In this case, only the child view A, the child view B, and the child view D are displayed in the layout container.

In some other embodiments, a vertical hiding capability of the layout container may be enabled, and a vertical hiding priority or a vertical display priority is set for each child view in the layout container. Therefore, after a height of the layout container is determined, whether the layout container can display all child views is determined based on heights of child views vertically arranged in the layout container. If yes, all the child views are displayed. If not, a hidden child view, that is, a child view not displayed in the layout container, is further determined based on the vertical hiding priority of each child view. For a specific implementation of the vertical hiding capability, refer to related content in the horizontal hiding capability. Details are not described herein again.

In a specific implementation, a hiding capability may be set for a layout container including a plurality of child views. The child view is, for example, a text view, a button view, an image view, or an icon button view (ImageButton View). When a width or a height of a layout container changes, some child views in the layout container may be automatically determined to be hidden, so as to meet display requirements of electronic devices having different screen dimensions. It can be learned that the hiding capability in this solution can enable electronic devices having different screen parameters to present different display effects based on a same layout setting, reduce development and maintenance workload of developers, and meet display requirements of various types of electronic devices.

The following provides an example of one layout file (an XML file). A layout container with a hiding capability enabled is set in the layout file, and the layout container includes four child views: four image views.

```
<hwLayout
    xmlns:android="http://schemas.android.com/apk/res/android"
    xmlns:app="http://schemas.android.com/apk/res-auto"
    /* omit other configurations */
    android:orientation="horizontal"
    app: vertical hiding capability enablement="true"   //enable a
vertical hiding capability
    app: wrapping capability enablement="true"          //enable a
wrapping capability
    app: wrapping alignment mode="end">   //set the wrapping
    alignment mode.
For Chinese and English, "end" corresponds to right alignment
    <ImageView     //set a child view 1 in the layout container-image
    view
        /* omit other configurations */
        app:layout_vertical hiding priority="5" //set a vertical hiding
priority of the child view 1
        app: wrapping reference width="90dp" />   //set a wrapping
reference value of the wrapped child view 1
    <ImageView //set a child view 2 in the layout container-image view
        /* omit other configurations */
        app:layout_vertical hiding priority="3" //set a vertical hiding
priority of the child view 2
        app: wrapping reference width="90dp" />   //set a wrapping
reference value of the wrapped child view 2
    <ImageView //set a child view 3 in the layout container-image view
        /* omit other configurations */
        app:layout_vertical hiding priority="2" //set a vertical hiding
priority of the child view 3
        app: wrapping reference width="90dp" />   //set a wrapping
reference value of the wrapped child view 3
    <ImageView //set a child view 4 in the layout container-image view
        /* omit other configurations */
        app:layout_vertical hiding priority="4" //set a vertical hiding
priority of the child view 4
        app: wrapping reference width="90dp" />   //set a wrapping
reference value of the wrapped child view 4
    <ImageView //set a child view 5 in the layout container-image view
        /* omit other configurations */
        app:layout_vertical hiding priority="1" //set a vertical hiding
priority of the child view 5
        app: wrapping reference width="90dp" />   //set a wrapping
reference value of the wrapped child view 5
</hwLayout>
```

The foregoing embodiment is a solution in which the developer designs an adaptive display interface layout by setting an attribute value related to a hiding capability of a layout container in a layout file (for example, an XML file). Alternatively, an attribute value related to a hiding capability of a layout container may be set in a JAVA source code file by adding a call interface.

Table 8 shows an example of an interface corresponding to the attribute value related to the hiding capability of the layout container.

TABLE 8

| Qualifier and type | Name and description | Parameter description |
|---|---|---|
| Public boolean | Is horizontal hiding capability ( ) Obtain a horizontal hiding capability enablement status | Return a horizontal hiding capability enablement enabled/disabled state |
| Public void | Set horizontal hiding capability enablement ( ) Set a horizontal hiding capability enablement status | true-enabled; false-disabled |
| Public int | Get horizontal hiding priority ( ) Obtain a horizontal hiding priority | Return a horizontal hiding priority of a child view |
| Public void | Set horizontal hiding priority ( ) Set a horizontal hiding priority of a child view | Set the horizontal hiding priority of the child view |
| Public boolean | Is vertical hiding capability ( ) Obtain a vertical hiding capability enablement status | Return a vertical hiding capability enablement enabled/disabled state |
| Public void | Set vertical hiding capability enablement ( ) Set a vertical hiding capability enablement status | true-enabled; false-disabled |
| Public int | Get vertical hiding priority ( ) Obtain a vertical hiding priority of a child view | Return the vertical hiding priority of the child view |
| Public void | Set a vertical hiding priority ( ) Set a vertical hiding priority of a child view | Set the vertical hiding priority of the child view |

The meanings of the hiding capability are described in detail above. A developer may configure a layout file based on a layout design of each display interface in an application with reference to a hiding capability, another adaptive layout capability, and a basic layout capability (for example, an ANDROID native attribute), pack the layout file, other source code and resources, and the like of the application into an installation package (for example, an APK file), and release the installation package to an application market. An electronic device downloads the installation package from the application market, and installs the application. The following describes in detail a solution of implementing adaptive layout based on the foregoing layout file when the electronic device runs the application.

Figure 24A:
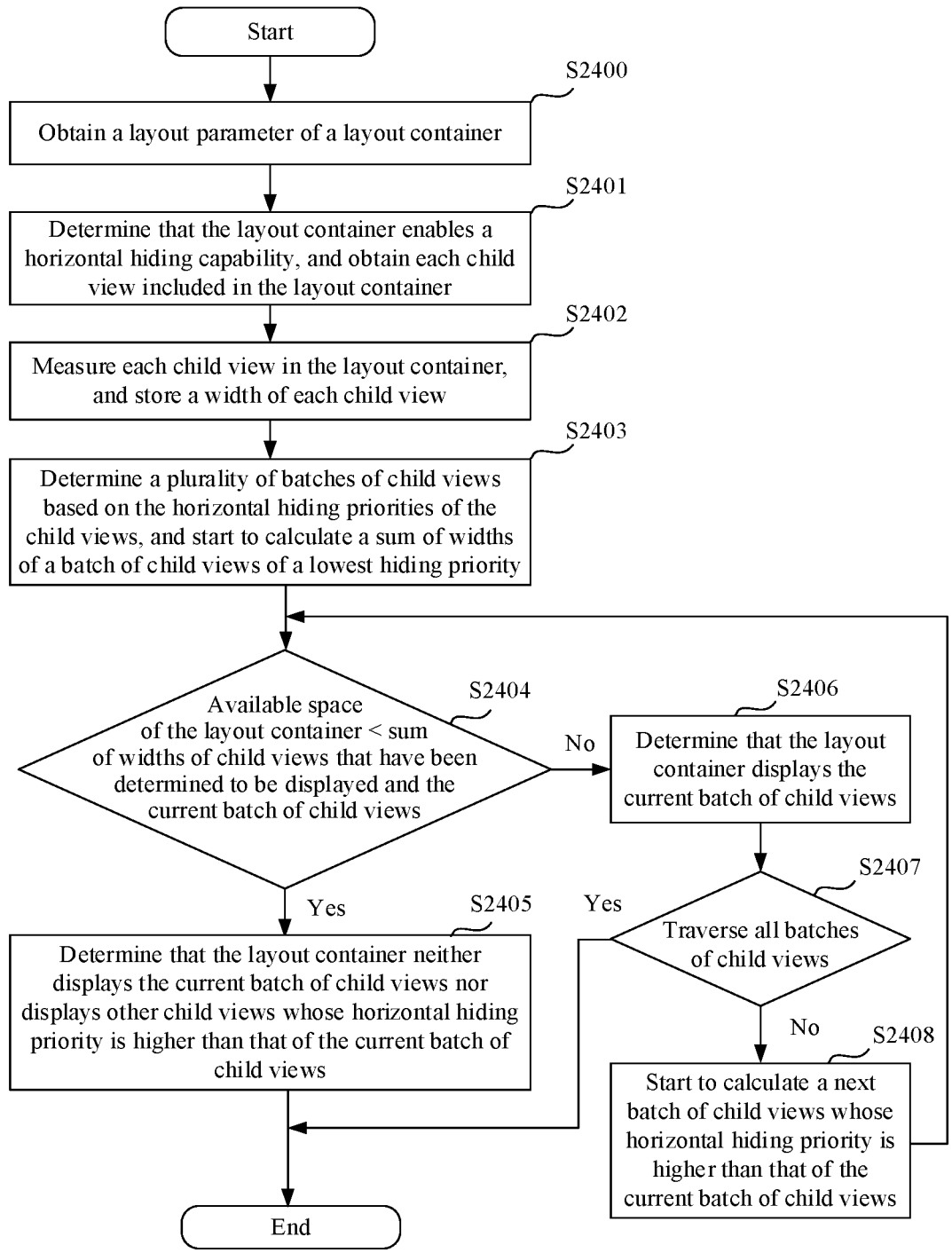
FIG. 24A is a schematic flowchart of another measurement method in a view system according to an embodiment of this disclosure.

Further, the mobile phone performs a measurement procedure shown in FIG. 24A for each layout container in the layout file. The method includes the following steps.

S2400: Obtain a layout parameter of the layout container.

The layout parameter of the layout container includes whether to enable a horizontal hiding capability and a vertical hiding capability, a dimension of the layout container, an inner margin, and the like.

S2401: Determine that the layout container enables the horizontal hiding capability, and obtain all child views included in the layout container.

Herein, an example in which the layout container enables the horizontal hiding capability is used for description. Each child view included in the layout container and a layout parameter corresponding to each child view are obtained. The layout parameter corresponding to each child view includes an attribute value of a dimension of each child view, and a horizontal hiding priority or a horizontal display priority corresponding to each child view. In some examples, if no hiding priority is set for a child view, it may be considered that the child view is a child view of a lowest hiding priority, or a child view that needs to be displayed.

S2402: Measure each child view in the layout container, and store a width of each child view.

Based on the layout parameter of each child view (other than the horizontal hiding priority), a parameter transferred from the layout container, and the like, initial measurement is performed on each child view in the layout container (for example, measurement is performed based on an ANDROID original measurement procedure), to obtain and store the width of each child view.

S2403: Determine a plurality of batches of child views based on the horizontal hiding priorities of the child views, and start to calculate a sum of widths of a batch of child views of a lowest horizontal hiding priority.

In other words, one or more child views of a same horizontal hiding priority are determined as a batch of child views. Child views displayed in the layout container are determined in batches in ascending order of horizontal hiding priorities. The first batch of child views is a batch of child views of a lowest horizontal hiding priority. A sum of widths of the batch of child views is calculated.

S2404: Determine whether available space of the layout container<sum of widths of child views that have been determined to be displayed and a current batch of child views, and if yes, perform step S2405, or if not, perform step S2406.

Herein, available space of the layout container=width of the layout container−left and right inner margins. When the first batch of child views are calculated, there are no child views that have been determined to be displayed.

If available space of the layout container<sum of the widths of the child views that have been determined to be displayed and the current batch of child views, it indicates that the available space of the layout container cannot be used to place the current batch of child views, that is, step S2405 is performed. If available space of the layout container≥sum of the widths of the child views that have been determined to be displayed and the current batch of child views, it indicates that the available space of the layout container can be used to place the current batch of child views.

It should be noted that, if a spacing between child views is further set, a spacing between the child views that have been determined to be displayed and a spacing between the current batch of child views need to be further added during determining.

S2405: Determine that the layout container neither displays the current batch of child views nor displays other child views whose hiding priority is higher than that of the current batch of child views.

The measurement procedure ends.

S2406: Determine that the layout container displays the current batch of child views.

S2407: Determine whether all batches of child views are traversed, and if yes, end the measurement procedure, or if not, perform step S2408.

S2408: Calculate a sum of widths of a next batch of child views whose hiding priority is higher than that of the current batch of child views, and then perform step S2404.

The foregoing is described by using an example in which the horizontal hiding capability is enabled. If the vertical hiding capability is enabled, calculation and determining need to be performed based on a height of the layout container and a height of each child view. For other content, refer to the related descriptions in FIG. 24A.

Figure 24B:
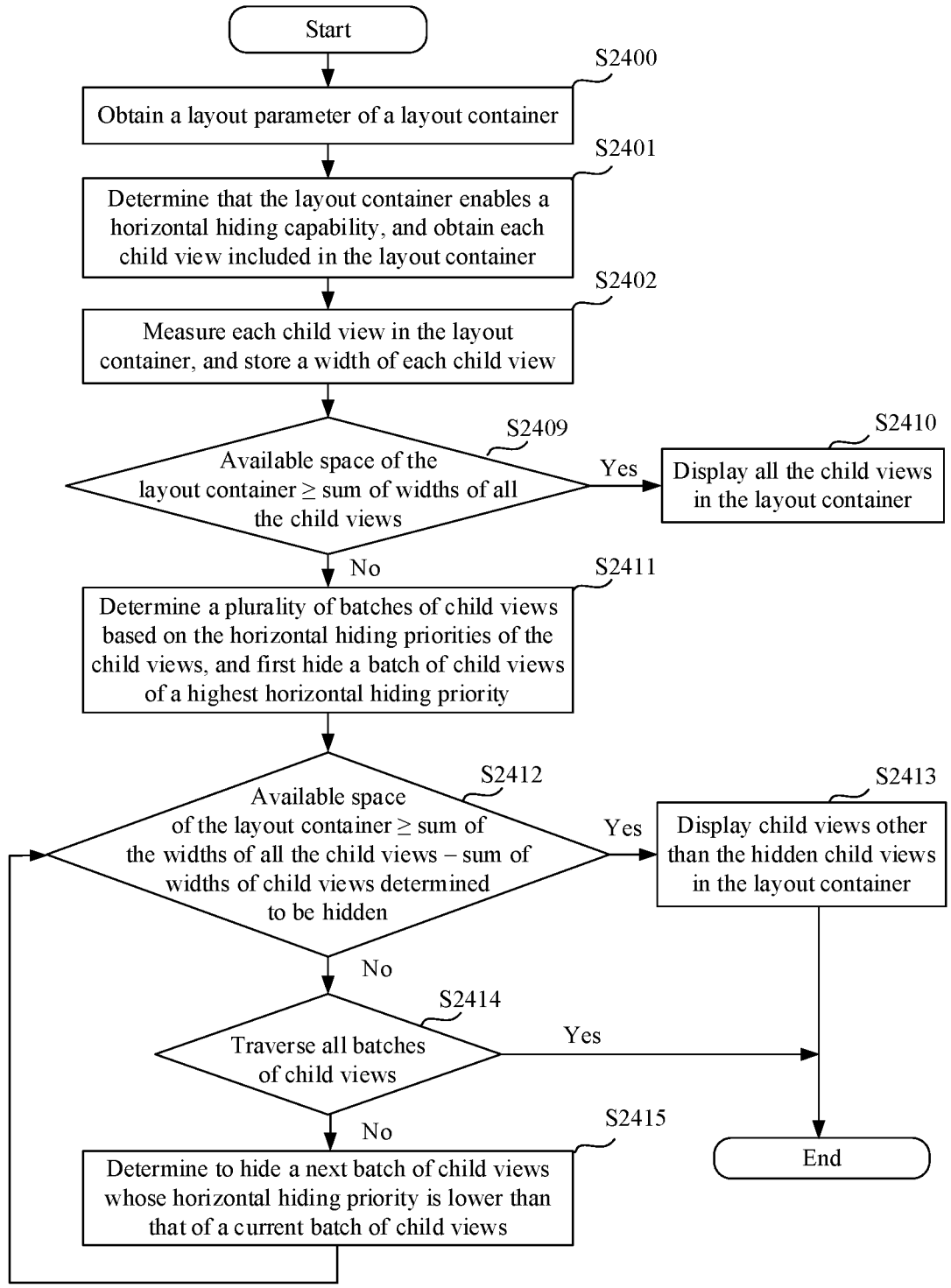
FIG. 24B is a schematic flowchart of another measurement method in a view system according to an embodiment of this disclosure.

FIG. 24B is a schematic flowchart of another measurement method of a layout container according to an embodiment of this disclosure. In other words, step S2403 to step S2408 are replaced with step S2409 to step S2415. Details are as follows.

S2400: Obtain a layout parameter of the layout container.

The layout parameter of the layout container includes whether to enable a horizontal hiding capability and a vertical hiding capability, a dimension of the layout container, an inner margin, and the like.

S2401: Determine that the layout container enables the horizontal hiding capability, and obtain all child views included in the layout container.

Herein, an example in which the layout container enables the horizontal hiding capability is used for description. Each child view included in the layout container and a layout parameter corresponding to each child view are obtained. The layout parameter corresponding to each child view includes an attribute value of a dimension of each child view, and a horizontal hiding priority or a horizontal display priority corresponding to each child view. In some examples, if no hiding priority is set for a child view, it may be considered that the child view is a child view of a lowest hiding priority, or a child view that needs to be displayed.

S2402: Measure each child view in the layout container, and store a width of each child view.

Based on the layout parameter of each child view (other than the horizontal hiding priority), a parameter transferred from the layout container, and the like, initial measurement is performed on each child view in the layout container (for example, measurement is performed based on an ANDROID original measurement procedure), to obtain and store the width of each child view.

S2409: Determine whether available space of the layout container≥sum of the widths of all the child views, and if yes, perform step S2410, otherwise, perform step S2411.

If a spacing between child views is further set, a child view spacing sum further needs to be added to the right of the inequality during determining.

S2410: Display all the child views in the layout container.

The measurement procedure ends.

S2411: Determine a plurality of batches of child views based on the horizontal hiding priorities of the child views, and first hide a batch of child views of a highest horizontal hiding priority.

S2412: Determine whether available space of the layout container≥sum of the widths of all the child views−sum of widths of the child views determined to be hidden, and if yes, perform step S2413, otherwise, perform step 814.

If a spacing between child views is further set, a spacing between child views other than the child views determined to be hidden further needs to be added to the right of the inequality during determining.

S2413: Display, in the layout container, child views other than the child views determined to be hidden.

The measurement ends.

S2414: Determine whether all batches of child views are traversed, and if yes, end the measurement procedure, or if not, perform step S2415.

S2415: Determine a next batch of child views whose horizontal hiding priority is lower than that of a current batch of child views, and then perform step S2412.

It can be understood that, when electronic devices (for example, a mobile phone and a tablet computer) having different screen dimensions use a same layout file (including a layout container provided with a hiding capability), according to the measurement procedure in FIG. 24A or FIG. 24B, application interfaces finally drawn may present different layout effects.

For example, a screen width of the mobile phone is 720 pixels, and a screen width of the tablet computer is 1280 pixels. Both the mobile phone and the tablet computer use a same installation package to install a music application. A layout file corresponding to a play page of the music application includes a layout container configured to control play, and the layout container enables a hiding capability. The layout container includes five horizontally arranged child views (which are respectively "Previous", "Play/Pause", "Next", "More", and "Favorites"). In addition, hiding priorities are set to be arranged in ascending order: ("Previous", "Play/Pause", and "Next") <"More"<"Favorites". In addition, widths of the five child views are equal to 100 pixels, and a spacing between the child views is 180 pixels. An inner margin of the layout container is set to 0 pixels.

Figure 25:
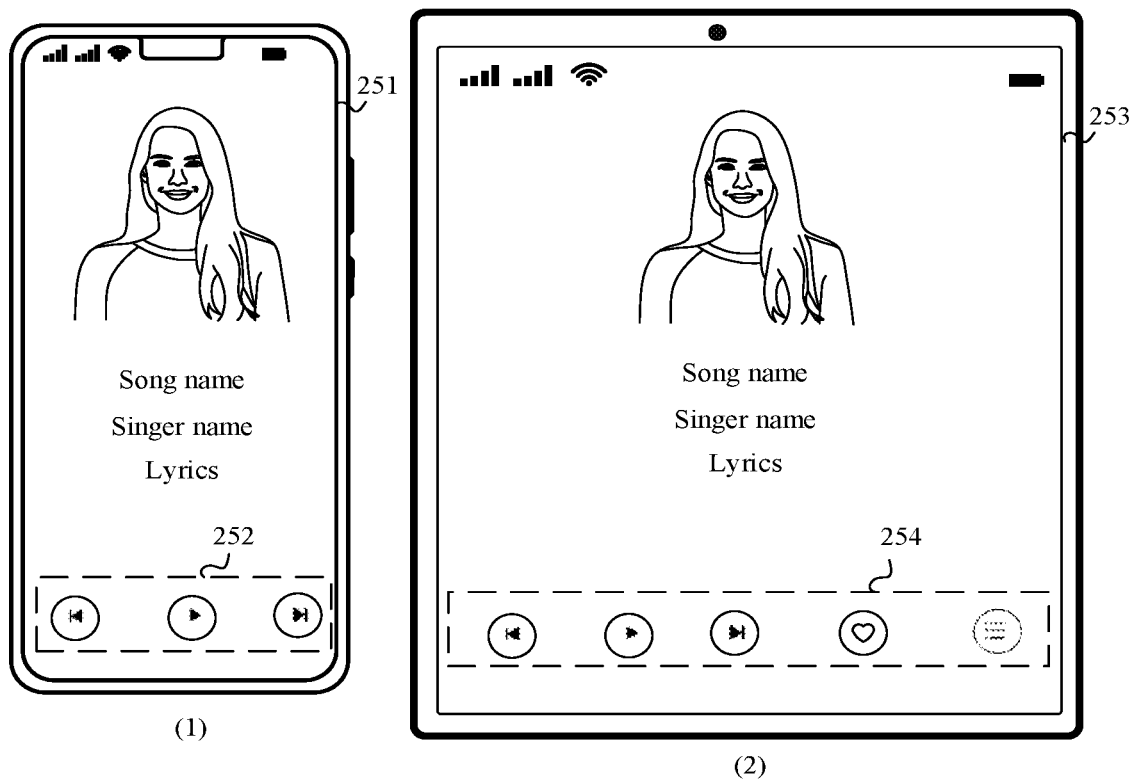
FIG. 25 is an effect diagram in which different electronic devices display a layout container having a hiding capability according to an embodiment of this disclosure.

In this case, when the mobile phone draws the play page of the music application, and performs the measurement procedure in FIG. 24A (FIG. 24A is used as an example) on the layout container, the mobile phone determines that the first batch of displayed child views are "Previous", "Play/Pause", and "Next", and performs the following calculation: sum of widths of the three child views+sum of spacings between the three child views=100*3+180*2=660 pixels<screen width of the mobile phone 720 pixels. Therefore, the mobile phone determines to display the three child views. In this case, after the three child views are displayed, remaining screen width of the mobile phone=720-660=60 pixels. A next batch of child views are determined based on the hiding priority, namely, "More". If "More" needs to be displayed again, width that needs to be further occupied=100+180=280 pixels>remaining screen width of the mobile phone 60 pixels. In this case, the mobile phone determines not to display the current batch of child views and other child views. The mobile phone displays an interface 251 shown in (1) in FIG. 25. A layout container 252 displays three child views: "Previous", "Play/Pause", and "Next".

When the tablet computer draws the play page of the music application, and performs the measurement procedure in FIG. 24A (FIG. 24A is used as an example) on the layout container, the tablet computer determines, through calculation, that the first batch of displayed child views are "Previous", "Play/Pause", and "Next", and performs the following calculation: sum of widths of the three child views+sum of spacings between the three child views=100*3+ 180*2=660 pixels<screen width of the tablet computer 1280 pixels. Therefore, the tablet computer determines to display the three child views. In this case, after the three child views are displayed, remaining screen width of the tablet computer=1280−660=620 pixels. A next batch of child views are determined based on the hiding priority, namely, "More". If "More" needs to be displayed again, width that needs to be further occupied=100+180=280 pixels<remaining screen width of the tablet computer 620 pixels obtained after the three child views are displayed. Therefore, the tablet computer determines to further display "More". In this case, remaining screen width of the tablet computer=620−280=340 pixels. Then, a next batch of child views are determined based on the hiding priority, namely, "Favorites". If "Favorites" needs to be displayed again, width that needs to be further occupied=100+180=280 pixels<remaining screen width of the tablet computer 340 pixels. Therefore, the tablet computer determines to further display "More". The tablet computer displays an interface 253 shown in (2) in FIG. 25. A layout container 254 displays five child views: "Previous", "Play/Pause", "Next", "More", and "Favorites".

Figure 26:
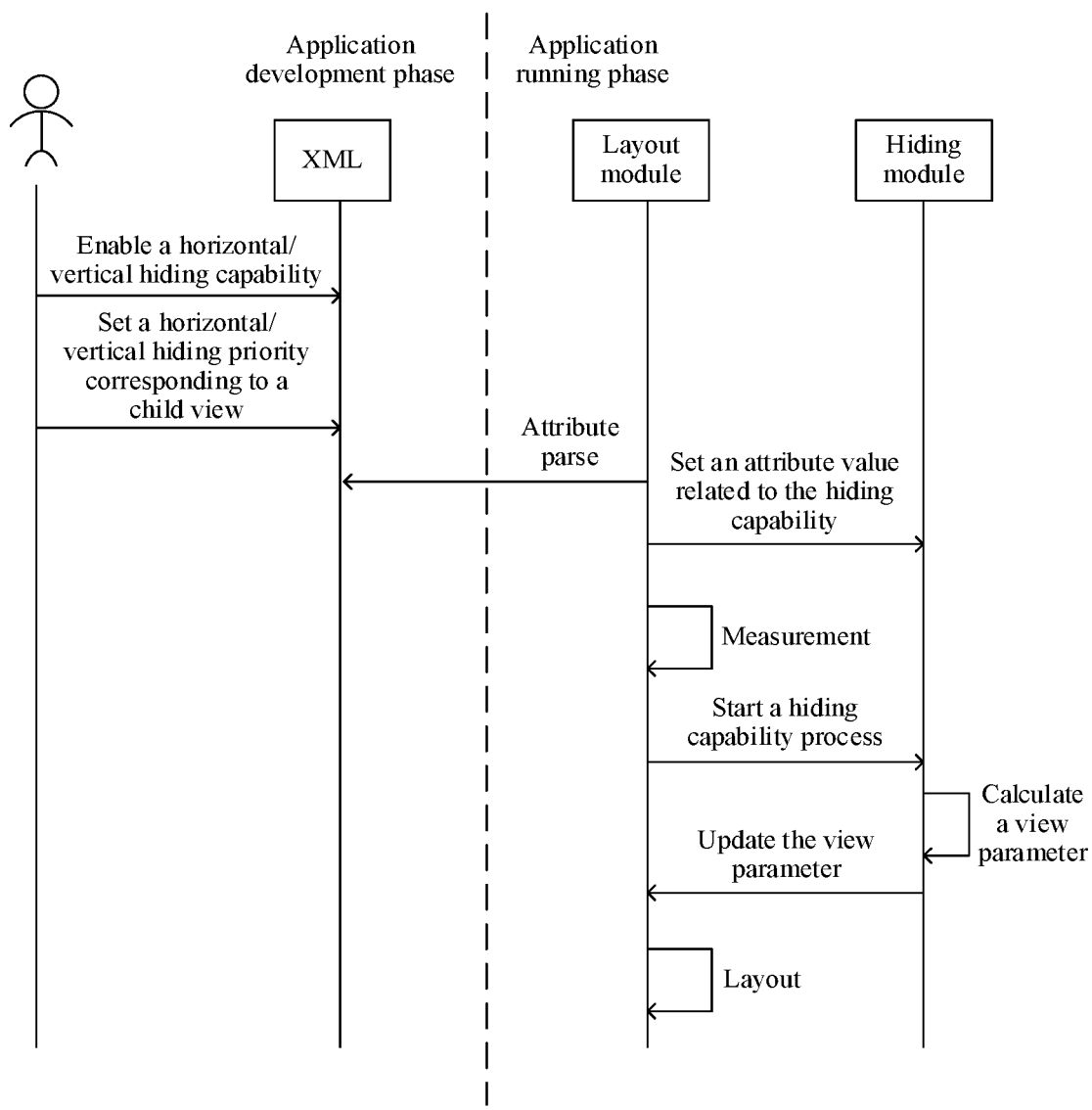
FIG. 26 is a schematic diagram of another adaptive application interface layout method according to an embodiment of this disclosure.

FIG. 26 is another schematic diagram of an adaptive application interface layout method according to an embodiment of this disclosure. In an application development phase, a developer may set an attribute related to a hiding capability in a layout file such as an XML file. For example, a horizontal hiding capability or a vertical hiding capability is enabled, and a horizontal hiding priority or a vertical hiding priority of each child view is set. Subsequently, the developer packs the layout file, other application code and resources, and the like into an installation package, and releases the installation package to an application market. Then, a user may download the installation package from the application market by using an electronic device, and install the application. When the electronic device runs the application, a layout module in the electronic device parses the attribute related to the hiding capability from the layout file, to obtain an attribute value related to the hiding capability, and sends the attribute value to a hiding module in the electronic device. Then, the layout module performs measurement, and starts a hiding capability process. In other words, the hiding module calculates a parameter of a related view such as a dimension of the view based on the attribute value related to the hiding capability. The layout module performs layout based on an updated parameter of the view, to obtain a location of the view on a specific display interface of the application. Finally, the electronic device may draw and display the specific display interface. In a specific example, the hiding module may perform related steps in FIG. 24A. The layout module may be a measurement module and a layout module in a native view system of an ANDROID system. The hiding module is a newly added function module in the measurement module in the native view system of the ANDROID system in this disclosure.

(5) Stretching Capability:

When developing an application, after adding dependency of an adaptive layout attribute package, a developer may set a ViewGroup having a stretching capability on a display interface. Further, when editing a layout file of the display interface, the developer may set an attribute value related to the stretching capability of the ViewGroup in the layout file (for example, an XML file), or may set an attribute value related to the stretching capability of the ViewGroup in a JAVA source code file by adding a call interface.

Table 9 shows an example of an attribute related to the stretching capability.

TABLE 9

| Attribute | Attribute type | Application scope | Meaning |
| --- | --- | --- | --- |
| Horizontal stretching enablement | Boolean | Layout container | Horizontal stretching function enabled/disabled |
| Vertical stretching enablement | Boolean | Layout container | Vertical stretching function enabled/disabled |
| Maximum width | Dimension | Layout container | Describe a maximum horizontal stretching dimension of each child view in the layout container |
| Maximum height | Dimension | Layout container | Describe a maximum vertical stretching dimension of each child view in the layout container |
| Minimum width | Dimension | Layout container | Describe a minimum horizontal stretching dimension of each child view in the layout container |
| Minimum height | Dimension | Layout container | Describe a minimum vertical stretching dimension of each child view in the layout container |
| Inner margin | Dimension | Layout container | Describe an inner margin of the layout container, including four inner margins: an upper inner margin, a lower inner margin, a left inner margin, and a right inner margin. |

It should be noted that, when setting an attribute of a layout container, the developer may enable the stretching capability of the layout container through stretching capability enablement. Then, for a child view (that is, a View or a ViewGroup stored in the layout container) included in the layout container, a width of the child view is set to "match_parent", and/or a height of the child view is set to "match_ parent". Subsequently, when running the application and drawing the child view, the electronic device stretches the child view based on a dimension of the layout container.

For example, when the layout container is set to have a horizontal stretching capability, and when the dimension of the layout container on the electronic device is 720*1080 pixels, a dimension of the child view may be 720*600 pixels. When the dimension of the layout container on the electronic device is 1280*800 pixels, the dimension of the child view may be 1280*600 pixels. For another example, the layout container is set to have a horizontal stretching capability, and both a left inner margin and a right inner margin are set to 10 pixels. When the dimension of the layout container on the electronic device is 720*1080 pixels, the dimension of the child view may be 700*600 pixels. When the dimension of the layout container on the electronic device is 1280*800 pixels, the dimension of the child view may be 1260*600 pixels.

The meaning of each attribute related to the stretching capability and an effect of displaying the layout container and the child view are described in detail below with reference to the accompanying drawings.

In some embodiments, the developer may set horizontal stretching enablement of the layout container to be enabled, or set vertical stretching enablement of the layout container to be enabled, or set horizontal stretching enablement and vertical stretching enablement of the layout container to be enabled.

Figure 27:
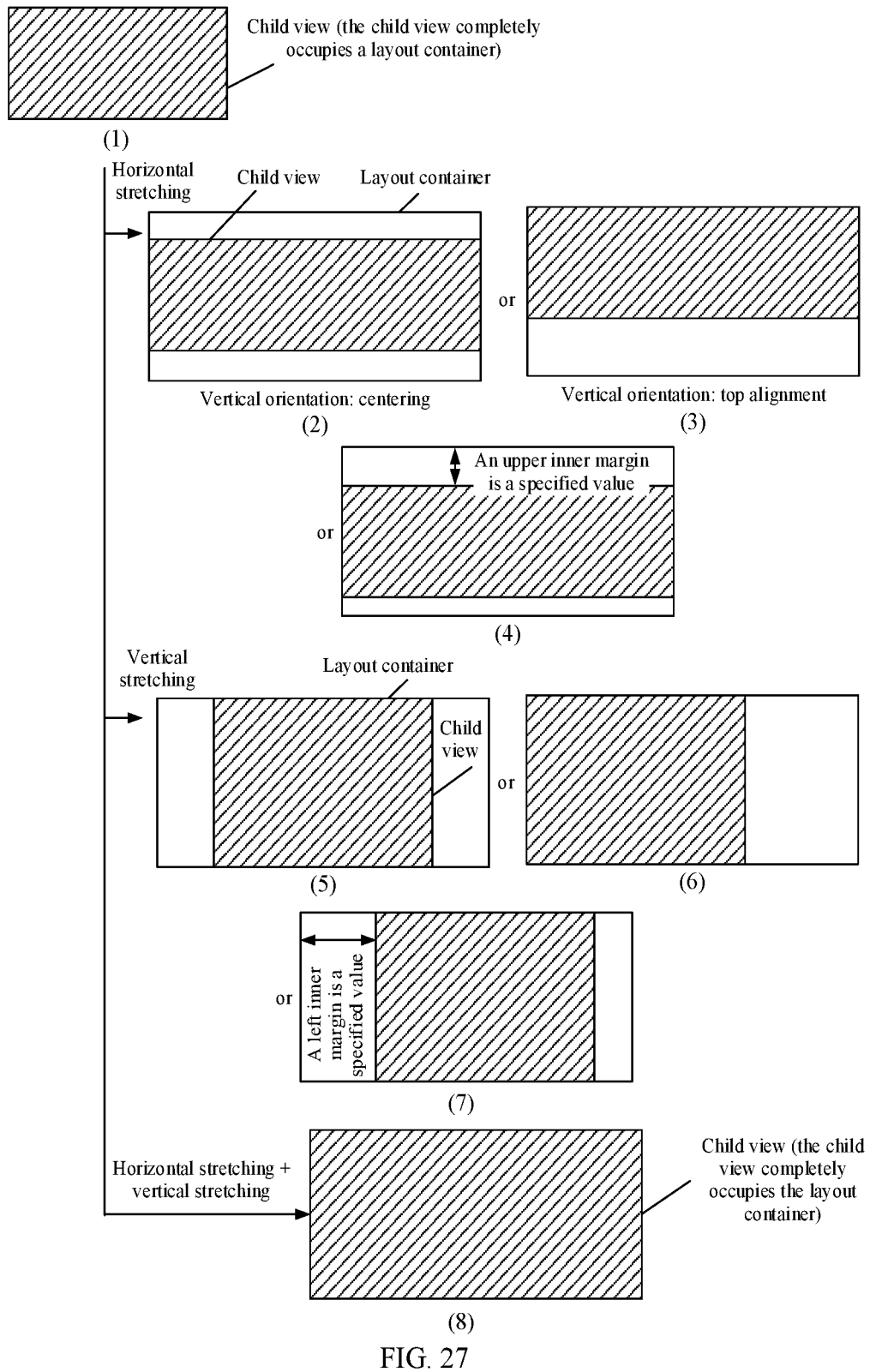
FIG. 27 is a display effect diagram of a layout container having a stretching capability in different scenarios according to an embodiment of this disclosure.

For example, on an interface shown in (1) in FIG. 27, the child view completely occupies the layout container. After the stretching capability of the layout container is enabled, when the dimension of the layout container changes, the child view in the layout container is stretched in a specified direction.

In some examples, an attribute value of horizontal stretching capability enablement of the layout container is set to true, and the width of the child view is set to "match_parent". In this case, when the dimension of the layout container changes, the child view is horizontally stretched. In other words, as shown in (2) in FIG. 27, (3) in FIG. 27, and (4) in FIG. 27, the width of the child view adaptively changes with the width of the layout container.

It should be noted that, if the height of the layout container also changes, the child view performs adjustment based on a layout parameter that is set by the child view. For example, if the height of the child view is a fixed value, the height of the child view remains a fixed value. As the height of the layout container changes, if the child view does not completely occupy a space of the layout container in a vertical direction, a vertical alignment manner of the child view may be further set. The vertical alignment manner includes vertical centering (as shown in (2) in FIG. 27), top alignment (as shown in (3) in FIG. 27), and bottom alignment. The top alignment means that an upper border of the child view is aligned with an upper border of the layout container. The vertical centering means that a distance between the upper border of the child view and the upper border of the layout container is equal to a distance between a lower border of the child view and a lower border of the layout container. The bottom alignment means that the lower border of the child view is aligned with the lower border of the layout container. Certainly, the distance between the upper border of the child view and the upper border of the layout container (that is, an upper inner margin) may also be set. In this case, as shown in (4) in FIG. 27, when the height of the container dimension changes, the distance between the upper border of the child view and the upper border of the layout container is kept as a specified value, and the distance between the lower border of the child view and the lower border of the layout container varies with the layout container. Alternatively, the distance between the lower border of the child view and the lower border of the layout container (that is, a lower inner margin) may be set. In this case, when the height of the container dimension changes, the distance between the lower border of the child view and the lower border of the layout container is kept as a specified value, and the distance between the upper border of the child view and the upper border of the layout container varies with the layout container.

If the height of the child view is match_parent, the height of the child view varies with the layout container.

In some other examples, an attribute value of vertical stretching capability enablement of the layout container is set to true, and the height of the child view is set to "match_parent". In this case, when the dimension of the layout container changes, the child view is vertically stretched. In other words, as shown in (5) in FIG. 27, (6) in FIG. 27, and (7) in FIG. 27, the height of the child view adaptively changes with the height of the layout container.

It should be noted that, if the width of the layout container also changes, the child view performs adjustment based on a layout parameter that is set by the child view. For example, if the width of the child view is a fixed value, the width of the child view remains a fixed value. As the width of the layout container changes, if the child view does not completely occupy a space of the layout container in a horizontal direction, a horizontal alignment manner of the child view may be further set. The horizontal alignment manner includes horizontal centering (as shown in (5) in FIG. 27), left alignment (as shown in (6) in FIG. 27), and right alignment. The left alignment means that a left border of the child view is aligned with a left border of the layout container. The horizontal centering means that a distance between the left border of the child view and the left border of the layout container is equal to a distance between a right border of the child view and a right border of the layout container. The right alignment means that the right border of the child view is aligned with the right border of the layout container. Certainly, the distance between the left border of the child view and the left border of the layout container (that is, a left inner margin) may also be set. In this case, as shown in (7) in FIG. 27, when the width of the container dimension changes, the distance between the left border of the child view and the left border of the layout container is kept as a specified value, and the distance between the right border of the child view and the right border of the layout container varies with the layout container. Alternatively, the distance between the right border of the child view and the right border of the layout container (that is, a right inner margin) may be set. In this case, when the width of the container dimension changes, the distance between the right border of the child view and the right border of the layout container is kept as a specified value, and the distance between the left border of the child view and the left border of the layout container varies with the layout container. For another example, if the height of the child view is match_parent, the height of the child view varies with the layout container.

In some other examples, an attribute value of horizontal stretching capability enablement of the layout container is set to true, and the width of the child view is set to "match_parent", and each attribute value of vertical stretching capability enablement of the layout container is set to true, and the height of the child view is set to "match_parent". In this case, when the dimension of the layout container changes, the child view is horizontally and vertically stretched. In other words, as shown in (8) in FIG. 27, the height of the child view adaptively changes with the height of the layout container, and the width of the child view adaptively changes with the width of the layout container.

It can be learned that, based on the stretching capability provided in this embodiment of this disclosure, the child view in the layout container having the stretching capability may be adaptively stretched based on the change of the layout container. Therefore, electronic devices having different screen parameters can present different display effects based on a same layout setting, development and maintenance workload of developers is reduced, and display requirements of various types of electronic devices are met. For example, a stretching capability may be set for a layout container in which a text view (for example, a TextView view or an EditText view) and a button view (for example, a Button view or an ImageButton view) are located. When the width and/or the height of the layout container change/changes, stretching may be adaptively performed in a specified direction, so as to meet a display requirement.

In some other embodiments, after setting the stretching capability of the layout container to be enabled, the developer may further set an inner margin of the layout container in a stretching direction. Therefore, when maintaining the inner margin from the layout container, the child view in the layout container may stretch in a specified direction as the dimension of the layout container changes.

Figure 28:
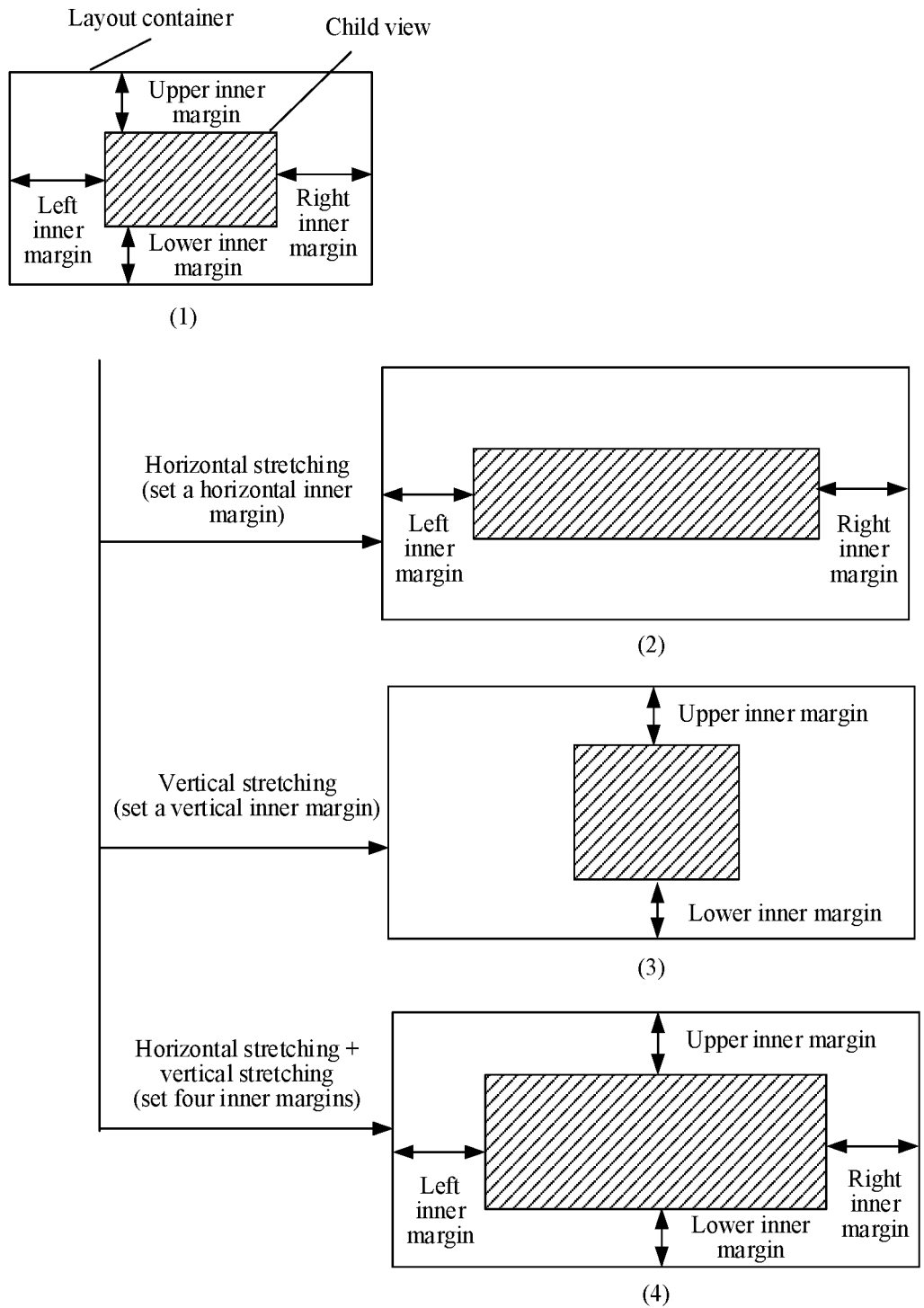
FIG. 28 is a display effect diagram of another layout container having a stretching capability in different scenarios according to an embodiment of this disclosure.

For example, as shown in (1) in FIG. 28, the child view does not completely occupy the layout container. After the stretching capability of the layout container is enabled, when the dimension of the layout container changes, the child view in the layout container is stretched in a specified direction.

In some examples, an attribute value of horizontal stretching capability enablement of the layout container is set to true, and the width of the child view is set to "match_parent". A horizontal inner margin is further set, for example, a left inner margin and/or a right inner margin. Therefore, as shown in (2) in FIG. 28, when the dimension of the layout container changes, a horizontal inner margin of the child view is kept as a specified value, and the child view is horizontally stretched. In other words, the width of the child view adaptively changes with the width of the layout container. Certainly, the developer may also set any horizontal inner margin. In this case, the other inner margin that is not set is 0 density-independent pixels (dp) by default.

It should be noted that, for a vertical change of the child view, refer to the descriptions of the related content in FIG. 27. Details are not described herein again.

In some other examples, an attribute value of vertical stretching capability enablement of the layout container is set to true, and the height of the child view is set to "match_parent". A vertical inner margin is further set, for example, an upper inner margin and/or a lower inner margin. Therefore, as shown in (3) in FIG. 28, when the dimension of the layout container changes, a vertical inner margin of the child view is kept as a specified value, and the child view is vertically stretched. In other words, the height of the child view adaptively changes with the height of the layout container. Certainly, the developer may also set any vertical inner margin. In this case, the other inner margin that is not set is 0 dp by default.

It should be noted that, for a horizontal change of the child view, refer to the descriptions of the related content in FIG. 27. Details are not described herein again.

In some other examples, an attribute value of horizontal stretching capability enablement of the layout container is set to true, the width of the child view is set to "match_parent", and the horizontal inner margin is set, and each attribute value of vertical stretching capability enablement of the layout container is set to true, the height of the child view is set to "match_parent", and the vertical inner margin is set. In this case, when the dimension of the layout container changes, the child view is horizontally and vertically stretched. In other words, as shown in (4) in FIG. 28, the height of the child view adaptively changes with the height of the layout container, and the width of the child view adaptively changes with the width of the layout container.

It can be learned that, by setting the inner margin of the layout container, it is ensured that a view in the layout container keeps a specific distance from an edge of the layout container, so that different display requirements can be met. For example, by ensuring that the view in the layout container keeps a specific distance from the edge of the layout container, the display interface can present a magazine-like layout, for example, present a large white space, so that the display interface presents a magazine-like reading sense. This improves visual experience of the user.

In some other embodiments, in addition to the stretching capability of the layout container in the specified direction and the inner margin value in the specified direction, a maximum/minimum value may be further set for the dimension of the layout container, for example, a maximum width, a minimum width, a maximum height, and a minimum height. The maximum width means a maximum value that can be reached by a sum of horizontal widths of all child views in the layout container (including horizontal spacings between the child views). The minimum width means a minimum value that can be reached by a sum of horizontal widths of all child views in the layout container (including horizontal spacings between the child views). The maximum height means a maximum value that can be reached by a sum of vertical heights of all child views in the layout container (including vertical spacings between the child views). The minimum height means a minimum value that can be reached by a sum of vertical widths of all child views in the layout container (including vertical spacings between the child views). It should be noted that, in a stretching process of the child view, when a dimension sum of all the child views conflicts with a maximum/minimum dimension value that is set by the layout container, an actual stretching proportion of the child view may be determined based on the maximum/minimum dimension value. In some other examples, if the maximum/minimum dimension value of the layout container is not set, a default value may also be used. For example, the maximum width is infinite by default, the minimum width is 0 dp by default, the maximum height is infinite by default, and the minimum height is 0 dp by default. Certainly, the default value may alternatively be another value. This is not limited in this embodiment of this disclosure.

It can be learned that setting the maximum/minimum dimension value of the layout container can prevent a view in the layout container from being excessively scaled up or scaled down in a specified direction. For example, avoiding excessive scale-up in the specified direction can ensure that view information in the layout container is not lost. For example, an image view is not distorted or deformed. Avoiding excessive scale-down in the specified direction can ensure that view content in the layout container does not overlap and therefore can prevent a display effect from being affected.

It should be noted that, when the child view is a View, and when running the application, the electronic device stretches the View in a specified direction based on an actual dimension of the layout container, and the inner margin and the maximum/minimum dimension value of the layout container, and displays the View. When the view is a ViewGroup, and when running the application, the electronic device stretches the ViewGroup in a specified direction by using a same method. It should be noted that, for a View nested in a ViewGroup or a ViewGroup, an attribute corresponding to the ViewGroup is used for layout. For example, if a stretching capability is also enabled for the ViewGroup, a method corresponding to the stretching capability is used to draw the View nested in the ViewGroup or the ViewGroup. For another example, if a stretching capability is not enabled for the ViewGroup, a method corresponding to the stretching capability is not used to draw the View nested in the ViewGroup or the ViewGroup. In other words, the stretching capability that is set for the layout container may be applied to a child view stored in the layout container, but cannot be applied to a View or a ViewGroup nested in the child view.

The following provides an example of one layout file (an XML file). A layout container with a stretching capability enabled is set in the layout file, and the layout container includes one child view (a button view).

layout files corresponding to the music play interfaces are the same, that is, layout parameters of Views and ViewGroups on the music play interfaces are the same.

Figure 29:
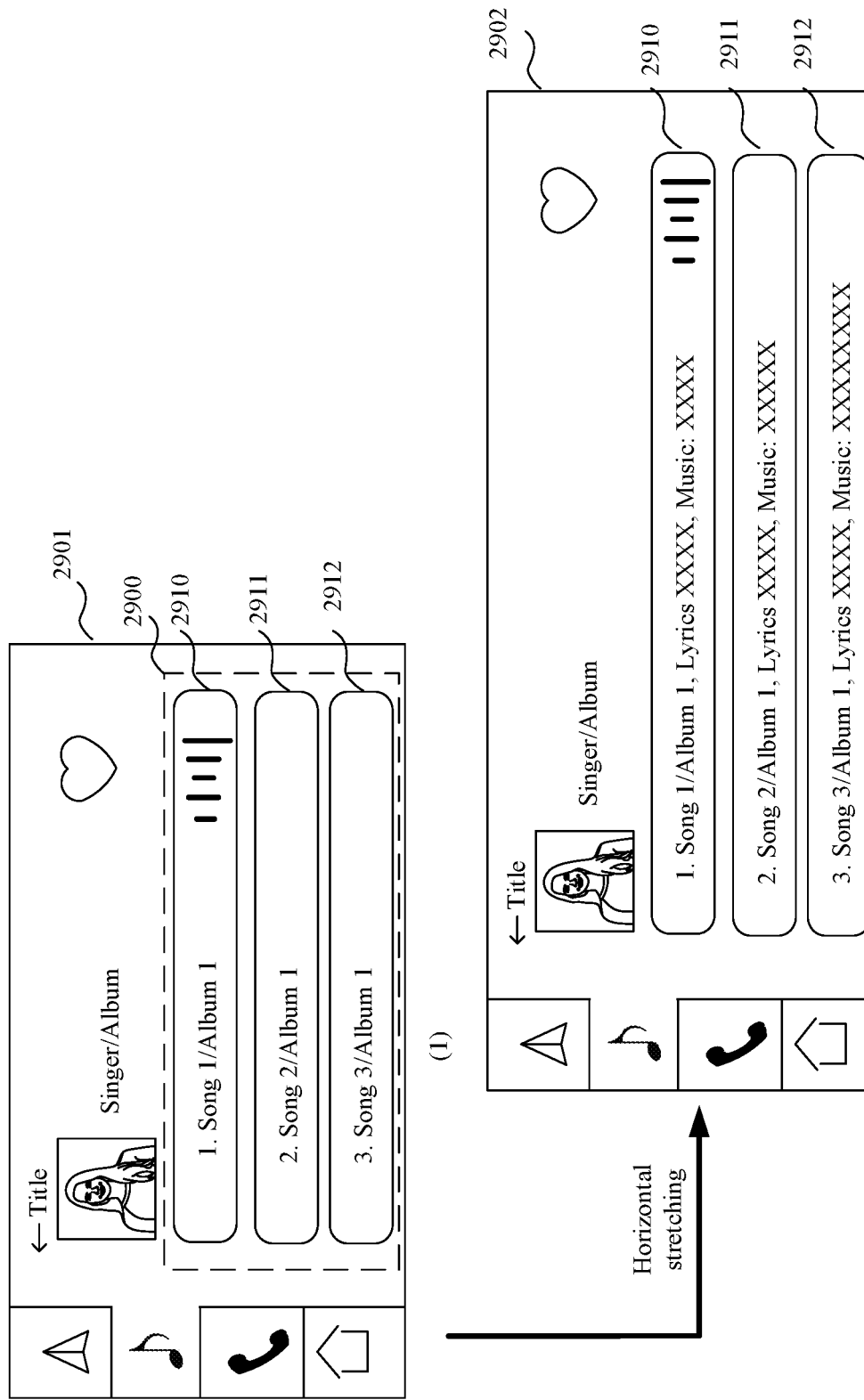
FIG. 29 is a display effect diagram of another layout container having a stretching capability in different scenarios according to an embodiment of this disclosure.

As shown in (1) in FIG. 29, an interface 2901 is an example of a music play interface displayed by a head unit 1. On the interface 2901, a horizontal stretching capability is set for a layout container 2900. The layout container 2900 stores a plurality of button views, for example, a button view 2910, a button view 2911, and a button view 2913. A width of each of these button views is set to "match parent", and a height is set to a fixed value. In this case, when a horizontal dimension of the layout container 2900 changes, these button views are horizontally stretched.

For example, as shown in (2) in FIG. 29, an interface 2902 is an example of a music play interface displayed by a head unit 2. Compared with a width of a screen dimension of the head unit 1, a width of a screen dimension of the head unit 2 is increased, and a width of the layout container 2900 is also increased. Therefore, when displaying the music play interface, the head unit 2 horizontally stretches the button views (such as the button view 2910, the button view 2911, and the button view 2913) in the layout container 2900. In some examples, as the width of the button view increases, resources (for example, text) displayed in the button view may also adaptively increase. The height of each of these button views remains at a fixed specified value.

The foregoing embodiment is a solution in which the developer designs an adaptive display interface layout by

```
/* layout stretching example */
<com.huawei.adaptive stretching layout
    xmlns:android="http://schemas.android.com/apk/res/android"
    xmlns:app="http://schemas.android.com/apk/res-auto"
    android:layout_height="300dp"    //set a height of the layout container
    android:layout_width="130dp"     //set a width of the layout container
    app: horizontal stretching capability enablement="true"      //enable a
horizontal stretching capability of the layout container
    app: vertical stretching capability enablement="true"        //enable a vertical
stretching capability of the layout container
    android: left inner margin="25dp"              //set a left inner margin of the
layout container
    android: upper inner margin="25dp"             //set an upper inner margin of
the layout container
    android: right inner margin="25dp"             //set a right inner margin of
the layout container
    android: lower inner margin="25dp"             //set a lower inner margin of
the layout container
    app: maximum width="400dp"                     //set a maximum width of the layout
container
    app: maximum height="400dp"                    //set a maximum height of the layout
container
    app: minimum width="100dp"                     //set a minimum width of the layout
container
    app: minimum height="100dp">                   //set a minimum height of the
layout container
        <Button        //set a child view-button view
        android:layout_width="match_parent"        //set a width of the
child view
        android:layout_height="match_parent"       //set a height of the
child view
        android:text="Button" />
</com.huawei.adaptive stretching layout>
```

To better understand an adaptive layout effect implemented by using the stretching capability in this embodiment of this disclosure, an example in which head units having different screen dimensions display music play interfaces is used for description herein. It should be noted that setting an attribute value related to a stretching capability of a View or a ViewGroup in a layout file (for example, an XML file). Alternatively, an attribute value related to a stretching capability of a View or a ViewGroup may be set in a JAVA source code file by adding a call interface.

Table 10 shows an example of an interface corresponding to the attribute value related to the stretching capability of the View or the ViewGroup.

TABLE 10

| Qualifier and type | Name and description | Parameter description |
|---|---|---|
| Public boolean | Is horizontal stretching capability enablement ( ) Determine whether to enable a horizontal stretching capability | Return a horizontal stretching capability enablement enabled/disabled state |
| Public void | Set horizontal stretching capability enablement ( ) Set horizontal stretching capability enablement to be enabled/disabled for HwMagicLayout | true-enabled; false-disabled |
| Public boolean | Is vertical stretching capability enablement ( ) Determine whether to enable a vertical stretching capability | Return a vertical stretching capability enablement enabled/disabled state |
| Public void | Set vertical stretching capability enablement ( ) Set the vertical stretching capability enablement enabled/disabled state | true-enabled; false-disabled |
| . . . | . . . | . . . |

The meanings of the stretching capability are described in detail above. A developer may configure a layout file based on a layout design of each display interface in an application with reference to a stretching capability, another adaptive layout capability, and a basic layout capability (for example, an ANDROID native attribute), pack the layout file, other source code and resources, and the like of the application into an installation package (for example, an APK file), and release the installation package to an application market. An electronic device downloads the installation package from the application market, and installs the application. The following describes in detail a solution of implementing adaptive layout based on the foregoing layout file when the electronic device runs the application.

Figure 30A:
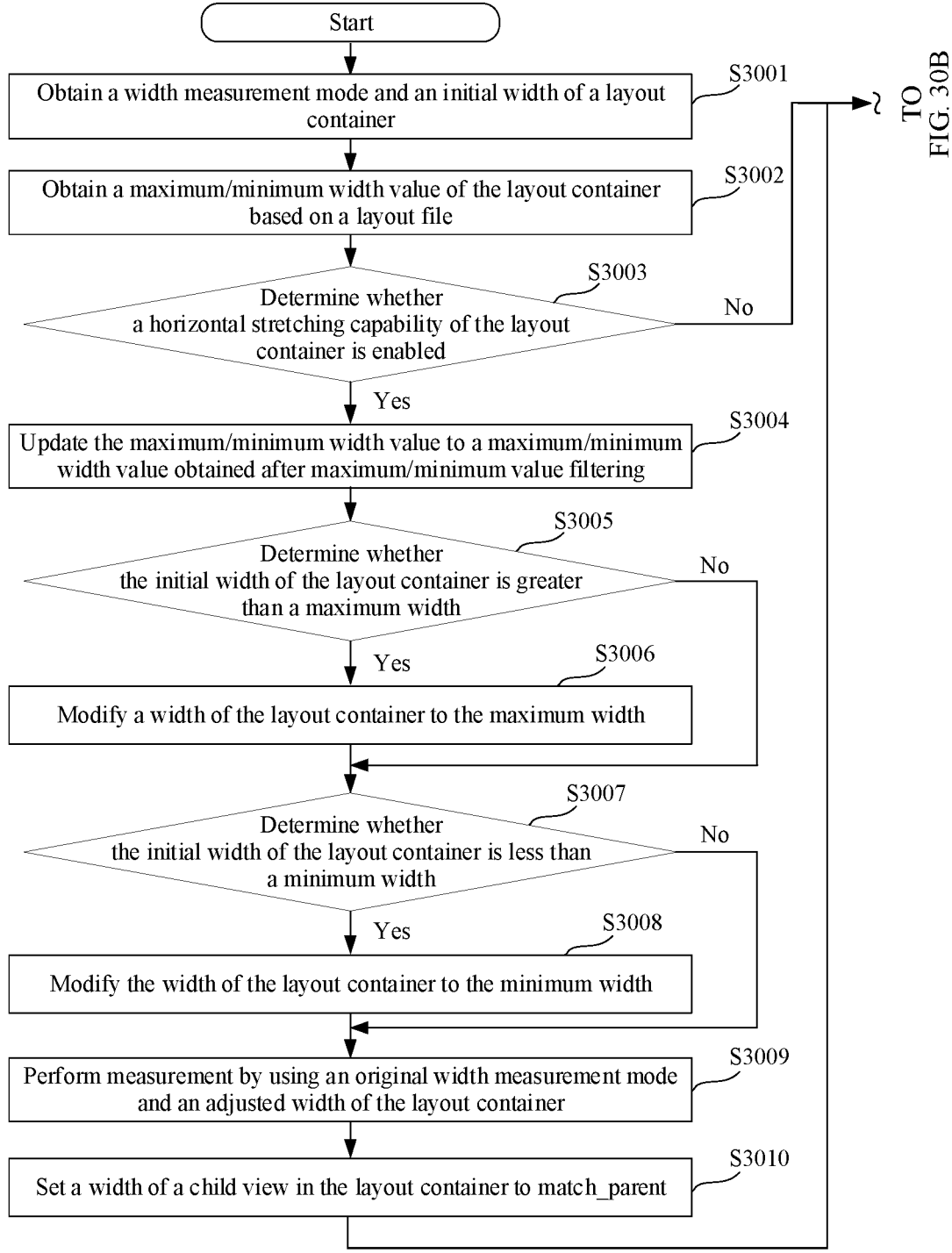
FIG. 30A and FIG. 30B are a schematic flowchart of another measurement method in a view system according to an embodiment of this disclosure.
Figure 30B:
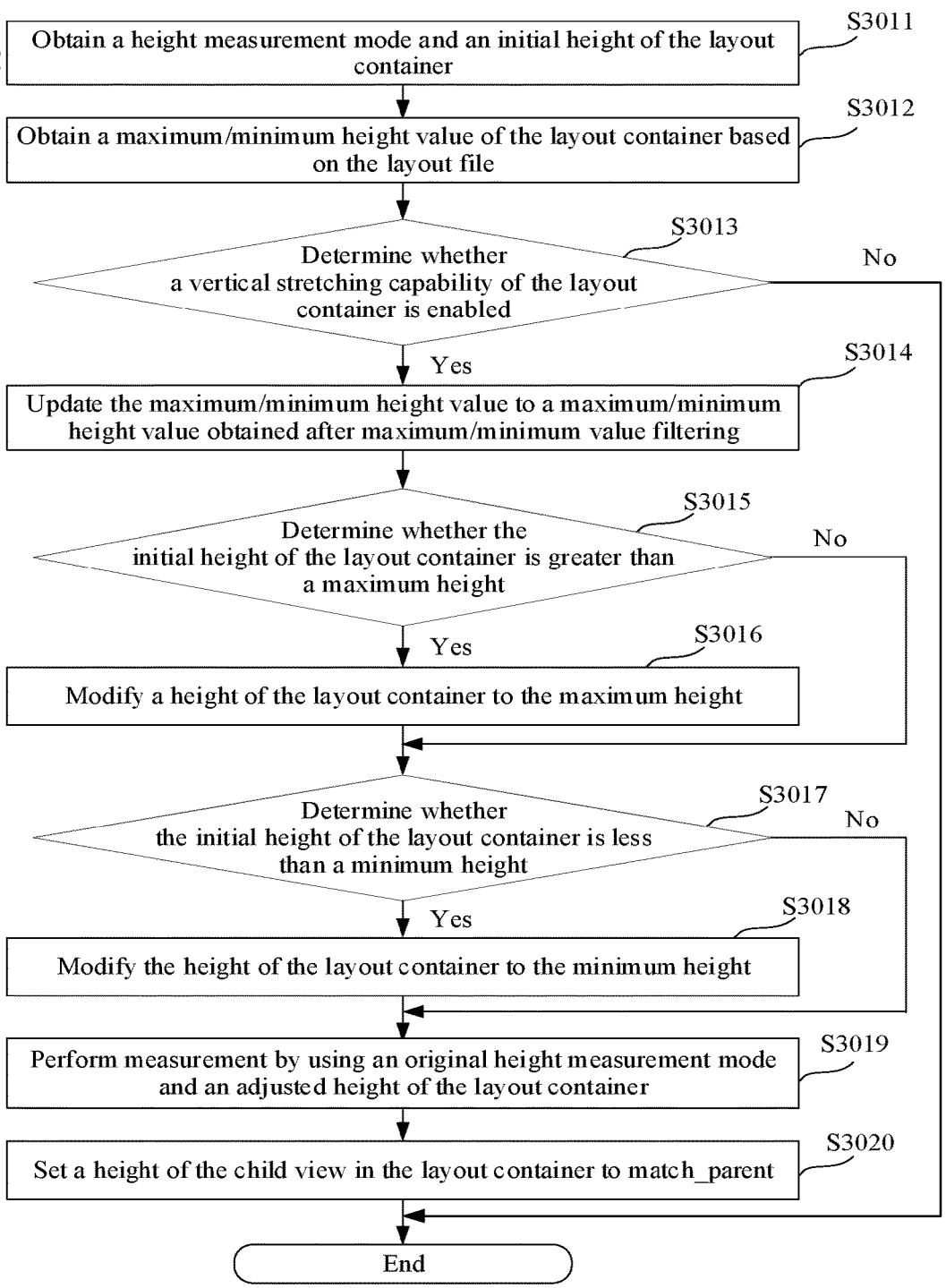

Further, the mobile phone performs a measurement procedure shown in FIG. 30A and FIG. 30B for each layout container in the layout file. The method further includes the following steps.

S3001: Obtain a width measurement mode and an initial width of the layout container.

Generally, the measurement mode and the initial width of the layout container are determined by a MeasureSpec parameter transferred from a parent layout container. Herein, MeasureSpec indicates a 32-bit integer. The most significant 2 bits indicate the measurement mode (SpecMode), and the least significant 30 bits indicate a specification size (SpecSize) in a specific measurement mode, that is, the initial width.

S3002: Obtain a maximum/minimum width value of the layout container based on the layout file.

S3003: Determine whether a horizontal stretching capability of the layout container is enabled, and if yes, perform step S3004, otherwise, perform step S3011.

S3004: Update the maximum/minimum width value to a maximum/minimum width value obtained after maximum/minimum value filtering.

For example, the mobile phone determines whether a maximum width of the layout container that is set by the developer in the layout file is greater than or equal to a minimum width of the layout container. If yes, the mobile phone determines to use the specified maximum and minimum widths of the layout container. In other words, the specified maximum and minimum widths of the layout container are maximum and minimum width values obtained after maximum/minimum value filtering.

S3005: Determine whether the initial width of the layout container is greater than the maximum width, and if yes, perform step S3006, otherwise, perform step S3007.

S3006: Modify a width of the layout container to the maximum width.

S3007: Determine whether the initial width of the layout container is less than the minimum width, and if yes, perform step S3008, otherwise, perform step S3009.

S3008: Modify a width of the layout container to the minimum width.

S3009: Perform measurement by using an original width measurement mode and an adjusted width of the layout container.

In other words, in this case, the measurement mode determined in step S3001 and the width of the layout container that is adjusted in step S3006 or step S3008 are still used for measurement.

S3010: Set a width of a child view in the layout container to match_parent.

In other words, the width of the child view in the layout container changes with the width of the layout container.

S3011: Obtain a height measurement mode and an initial height of the layout container.

Likewise, the measurement mode and the initial height of the layout container are determined by a MeasureSpec parameter transferred from a parent layout container. Herein, MeasureSpec indicates a 32-bit integer. The most significant 2 bits indicate the measurement mode (SpecMode), and the least significant 30 bits indicate a specification size (SpecSize) in a specific measurement mode, that is, the initial height.

S3012: Obtain a maximum/minimum height value of the layout container based on the layout file.

S3013: Determine whether a vertical stretching capability of the layout container is enabled, and if yes, perform step S3014, otherwise, end the procedure.

S3014: Update the maximum/minimum height value to a maximum/minimum height value obtained after maximum/minimum value filtering.

For example, the mobile phone determines whether a maximum height of the layout container that is set by the developer in the layout file is greater than or equal to a minimum height of the layout container. If yes, the mobile phone determines to use the specified maximum and minimum heights of the layout container. In other words, the specified maximum and minimum heights of the layout container are maximum and minimum height values obtained after maximum/minimum value filtering.

S3015: Determine whether the initial height of the layout container is greater than the maximum height, and if yes, perform step S3016, otherwise, perform step S3017.

S3016: Modify a height of the layout container to the maximum height.

S3017: Determine whether the initial height of the layout container is less than the minimum height, and if yes, perform step S3018, otherwise, perform step S3019.

S3018: Modify a height of the layout container to the minimum height.

S3019: Perform measurement by using an original height measurement mode and an adjusted height of the layout container.

In other words, in this case, the measurement mode determined in step S3011 and the height of the layout container that is adjusted in step S3016 or step S3018 are still used for measurement.

S3020: Set a height of a child view in the layout container to match_parent.

In other words, the height of the child view in the layout container changes with the height of the layout container.

It should be noted that the foregoing measurement procedure is merely an example. A sequence of performing some steps may be changed, or some steps may be combined, simplified, or the like. For example, the height of the layout container may alternatively be measured before the width of the layout container is measured, that is, steps S3011 to S3020 may be performed before or when steps S3001 to S3010 are performed. For another example, determining whether an initial dimension of the layout container is greater than a maximum dimension and determining whether an initial dimension of the layout container is less than a minimum dimension may be simultaneously performed, or determining sequences may be exchanged. Steps of the extended measurement procedure are not limited in this embodiment of this disclosure.

It can be understood that, when electronic devices (for example, a mobile phone and a tablet computer) having different screen dimensions use a same layout file (including a layout container provided with a stretching capability), according to the measurement procedure in FIG. 30A and FIG. 30B, application interfaces finally drawn may present different layout effects.

For example, a screen width of the mobile phone is 720 pixels, and a screen width of the tablet computer is 1280 pixels. Both the mobile phone and the tablet computer use a same installation package to install a music application. A layout file corresponding to a play page of the music application includes a layout container configured to display lyrics, and the layout container enables a horizontal stretching capability. In addition, the layout container includes one horizontally arranged text view configured to display lyrics. Left and right inner margins of the layout container each are 20 pixels, a maximum width is 1000 pixels, and a minimum width is 500 pixels.

Figure 30C:
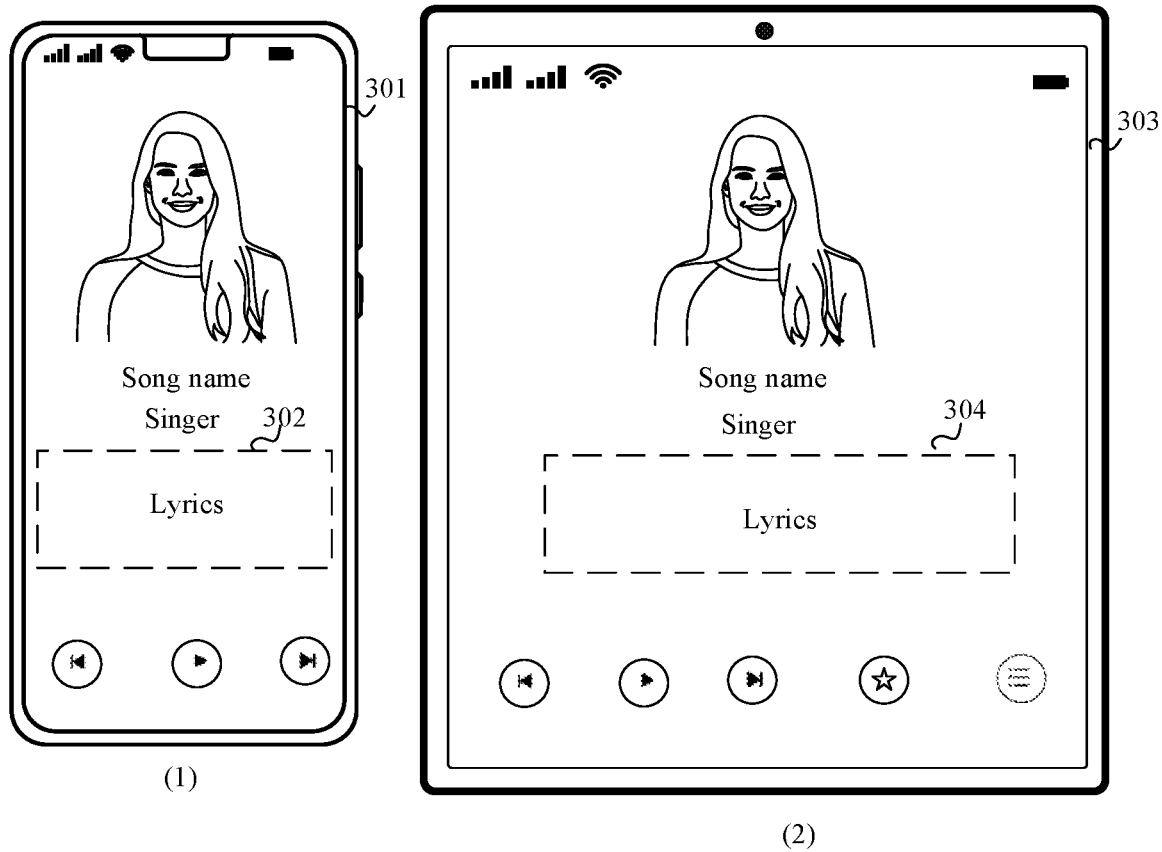
FIG. 30C is an effect diagram in which different electronic devices display a layout container having a stretching capability according to an embodiment of this disclosure.

In this case, when the mobile phone draws the play page of the music application and executes the measurement procedure in FIG. 30A and FIG. 30B, a width of the layout container is calculated as follows: screen width−left and right inner margins=720−20−20=680 pixels. This meets requirements of the maximum and minimum widths of the layout container. Further, because a width of a text view in the layout container is match-parent, the width of the text view in the layout container is 680 pixels. The mobile phone displays an interface 301 shown in (1) in FIG. 30C, where a width of a text view in a layout container 302 is 680 pixels. If the layout container is further provided with a vertical stretching capability, similar to the method for calculating the width of the layout container, the layout container and the height of the text view in the layout container may be calculated. Details are not described herein again.

When the tablet computer draws the play page of the music application and executes the measurement procedure in FIG. 30A and FIG. 30B, a width of the layout container is calculated as follows: screen width−left and right inner margins=1280−20−20=1240 pixels. Because the calculated width (1240 pixels) of the layout container is greater than the specified maximum width (1000 pixels), the width of the layout container is adjusted to the specified maximum width 1000 pixels. Further, because a width of a text view in the layout container is match-parent, the width of the text view in the layout container is 1000 pixels. The tablet computer displays an interface 303 shown in (2) in FIG. 30C, where a width of a text view in a layout container 304 is 1000 pixels. If the layout container is further provided with a vertical stretching capability, similar to the method for calculating the width of the layout container, the layout container and the height of the text view in the layout container may be calculated. Details are not described herein again.

In conclusion, in an application development phase, a developer of an application sets an attribute of an adaptive layout capability (for example, an extension capability, a proportion capability, an equalization capability, a hiding capability, or a stretching capability) in a View and a ViewGroup on a display interface in a layout file. After installing the application, electronic devices having different screen parameters may automatically adjust, with reference to the screen parameters of the electronic devices, dimensions and/or layouts of a View and a ViewGroup in each layout container based on the attribute of the adaptive layout capability of the View and the ViewGroup in the layout file, so as to implement adaptive display interface layouts. In this way, the developer needs to design only one layout file, so that display requirements of the electronic devices having different screen parameters can be met, and development costs and maintenance costs of the developer can be reduced.

In addition, compared with a solution in which an application installation package needs to carry a plurality of layout files, this solution in which an application installation package carries one layout file increases traffic costs and time costs of downloading an application installation package by the electronic device. In addition, after installing the application, the electronic device does not need to store another redundant layout file. This increases storage space utilization of the electronic device.

It can be understood that a plurality of adaptive layout capabilities extended in this embodiment of this disclosure may be used in combination with each other. For example, different adaptive layout capability attributes are set for different objects (Views or ViewGroups) on a same application interface, or two or more adaptive layout capability attributes are set for a same object. It should be noted that, when two or more adaptive layout capability attributes are set for a same object, an adaptive layout capability of the layout container may be enabled or disabled for each adaptive layout capability, or a plurality of adaptive layout capabilities of the layout container may be uniformly enabled or disabled for a plurality of adaptive layout capabilities. This disclosure imposes no limitation on specific implementation. It can be understood that, in an actual application development process, in addition to a case in which a conflict occurs during combination, the foregoing adaptive layout capabilities may be randomly combined according to an actual requirement. For example, the stretching capability may be combined with any one of the hiding capability, the proportion capability, the equalization capability, and a wrapping capability, and the scaling capability may be combined with any one of the hiding capability, the proportion capability, the equalization capability, and the wrapping capability. Some examples of several adaptive layout capability combinations may be provided herein.

1. Stretching Capability+Equalization Capability:

For example, the stretching capability and the equalization capability are set for a same object. As shown in (1) in FIG. 31, an interface 3101 is a music play interface. On the interface 3101, a horizontal stretching capability is set for a layout container 3100. The layout container 3100 stores a plurality of child layout containers, for example, a child layout container 3110, a child layout container 3111, and a child layout container 3113. A width of each of these child layout containers is set to "match parent", and a height is set to a fixed value. In addition, the layout container 3100 is further provided with a vertical equalization capability.

Figure 31:
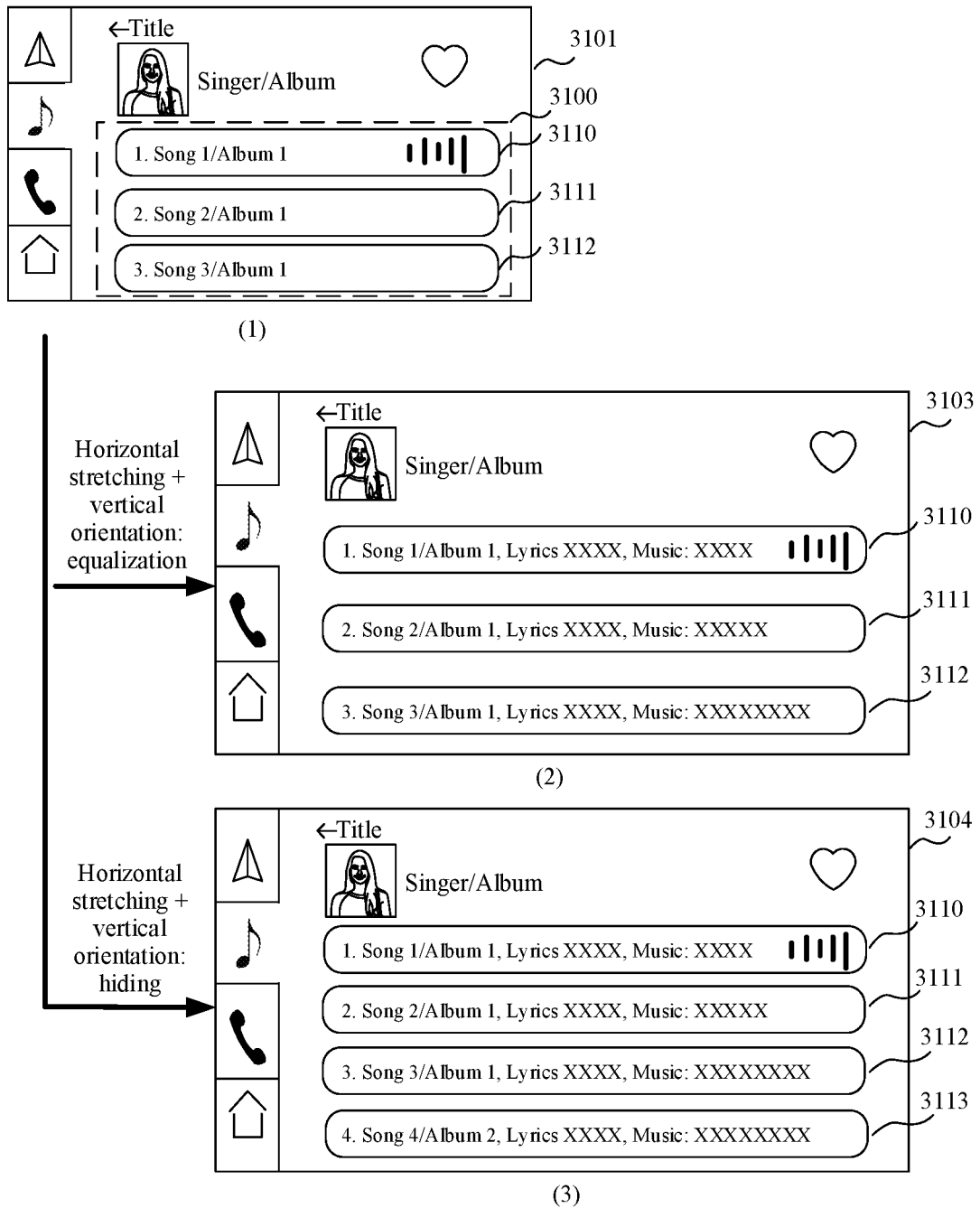
FIG. 31 is a display effect diagram of some layout containers having a plurality of adaptive layout capabilities in different scenarios according to an embodiment of this disclosure.

For example, as shown in (2) in FIG. 31, an interface 3103 is an example of a music play interface displayed by a head unit 2. Compared with a width of a screen dimension of the head unit 1 shown in (1) in FIG. 31, a width of a screen dimension of the head unit 2 is increased, and a width of the layout container 3100 is also increased. Therefore, when displaying the music play interface, the head unit 2 horizontally stretches the child layout containers (for example, the child layout container 3110, the child layout container 3111, and the child layout container 3113) in the layout container 3100. In addition, compared with a height of the screen dimension of the head unit 1, a height of the screen dimension of the head unit 2 is increased, and a height of the layout container 3100 is also increased. However, the height of each of the child layout containers in the layout container 3100 remains a fixed value. Because the layout container 3100 is provided with the vertical equalization capability, spacings between these child layout containers in the layout container 3100 are increased, and the spacings between the child layout containers keep equal.

2. Stretching Capability+Hiding Capability:

For example, the stretching capability and the hiding capability are set for a same object. The music play interface shown in (1) in FIG. 31 is still used as an example. On the interface 3101, a horizontal stretching capability is set for a layout container 3100. The layout container 3100 stores a plurality of child layout containers, for example, a child layout container 3110, a child layout container 3111, and a child layout container 3113. A width of each of these child layout containers is set to "match parent", and a height is set to a fixed value. In addition, the layout container 3100 is further provided with a vertical hiding capability.

For example, as shown in (3) in FIG. 31, an interface 3104 is an example of a music play interface displayed by a head unit 3. Compared with a width of a screen dimension of the head unit 1 shown in (1) in FIG. 31, a width of a screen dimension of the head unit 3 is increased, and a width of the layout container 3100 is also increased. Therefore, when displaying the music play interface, the head unit 3 horizontally stretches the child layout containers (for example, the child layout container 3110, the child layout container 3111, and the child layout container 3113) in the layout container 3100. In addition, compared with a height of the screen dimension of the head unit 1, a height of the screen dimension of the head unit 3 is increased, and a width of the layout container 3100 is also increased. However, the height of each of the child layout containers in the layout container 3100 remains a fixed value. Because the layout container 3100 is provided with the vertical hiding capability, as the height of the layout container 3100 increases, more child layout containers may be displayed, for example, the child layout container 3113. On the interface 3101, when the screen of the head unit 1 is relatively small, it may be considered that the child layout container 3113 is hidden.

In conclusion, electronic devices having different screen parameters draw different display interfaces based on a same layout file. In other words, the electronic devices having different screen parameters may adaptively perform display interface layout adjustment based on the layout file, so as to meet different display requirements.

Figure 32A:
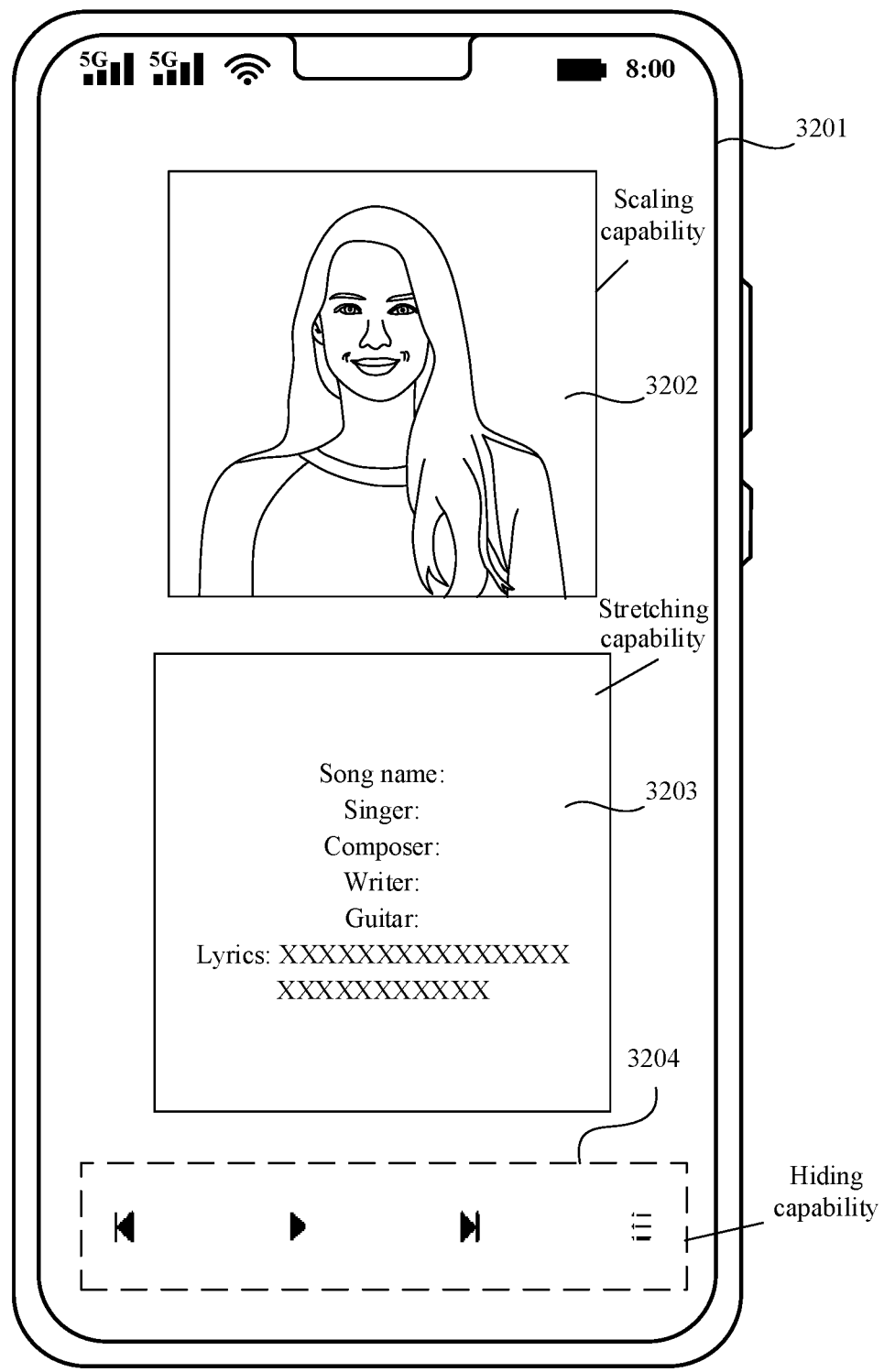
FIG. 32A and FIG. 32B are a display effect diagram of some other layout containers having a plurality of adaptive layout capabilities in different scenarios according to an embodiment of this disclosure.

3. Stretching Capability+Scaling Capability+Hiding Capability:

For example, different adaptive capabilities such as the stretching capability, the scaling capability, and the hiding capability are separately set for different objects on a same interface. FIG. 32A shows a play interface 3201 displayed when a mobile phone runs a music application. The play interface 3201 includes an image view 3202 (configured to display an album cover), a text view 3203 (configured to display song information), and a button view group 3204 (including button views such as "Previous", "Play", "Next", and "Playlist"). The image view 3202 is provided with a scaling capability (a horizontal available space proportion and a vertical available space proportion), the text view 3203 is provided with a stretching capability, and the button view group 3204 is provided with a hiding capability.

Figure 32B:
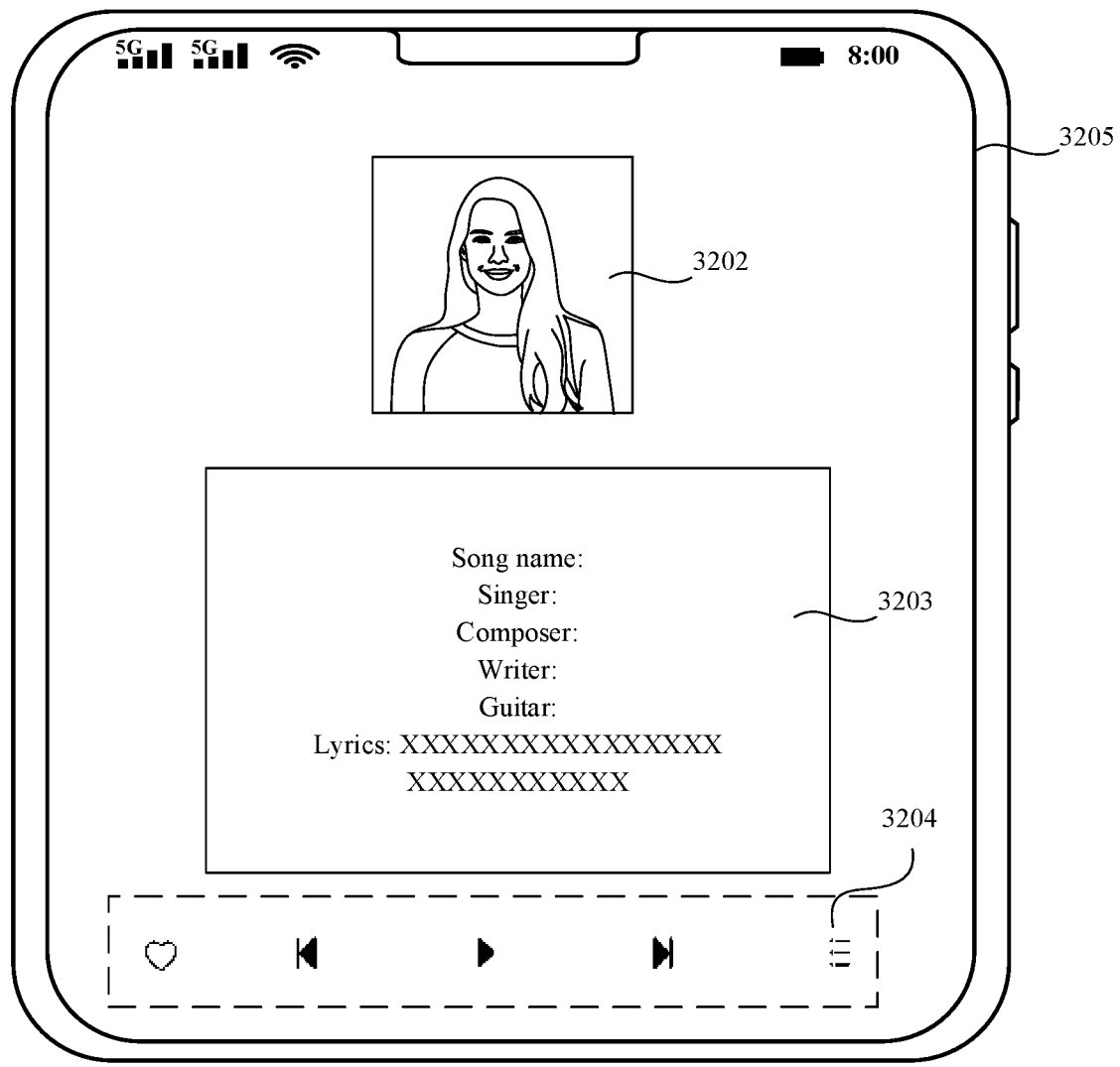

FIG. 32B shows a play interface 3205 displayed when a tablet runs a music application. It can be learned that a screen of the tablet is wider than but is lower than a screen of the mobile phone. Therefore, the image view 3202 needs to be scaled down based on the scaling capability corresponding to the image view 3202. Because the text view 3203 has the stretching capability, when the width of the screen of the tablet is increased, the width of the text view 3203 is also increased. When the width of the screen of the tablet is increased, a display width of the button view group 3204 is increased, and more button views may be displayed, that is, some hidden button views (for example, "Favorites") are displayed. In other words, the scaling capability may implement scaling of the image view when the width/height of the screen changes. In addition, the stretching capability implements adaptive stretching or shrinking of the text view when the width/height of the screen changes, and the hiding capability implements adaptive increase or decrease of a quantity of displayed button views when the width/height of the screen changes.

4. Equalization Capability+Wrapping Capability:

A browsing interface of a gallery application is used as an example for description.

Figure 33A:
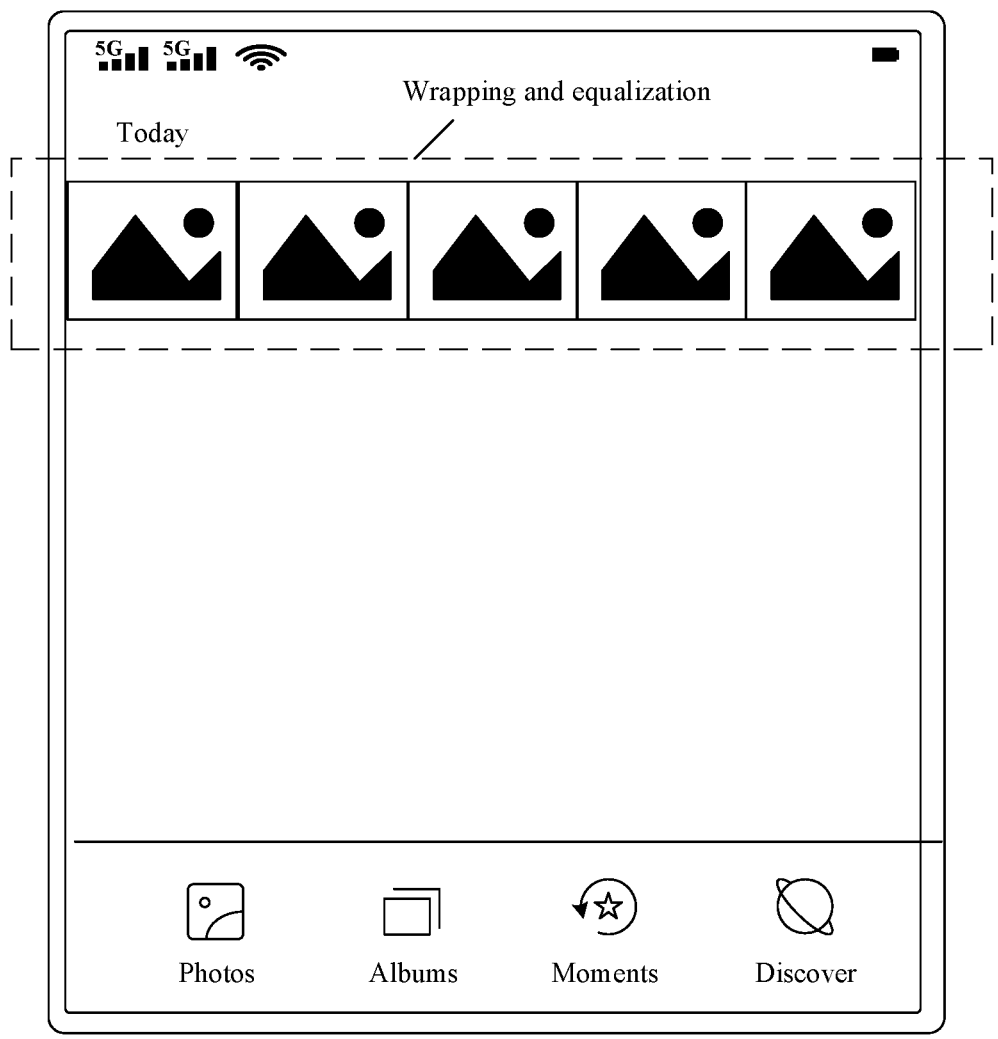
FIG. 33A, FIG. 33B, and FIG. 33C are a display effect diagram of some other layout containers having a plurality of adaptive layout capabilities in different scenarios according to an embodiment of this disclosure.

FIG. 33A shows a browsing interface displayed when a tablet runs the gallery application. The browsing interface includes one layout container, and the layout container includes a plurality of image views (configured to display a thumbnail of a photo or a video). The layout container is provided with a wrapping capability and an equalization capability (for example, a second-type equalization capability). In this case, widths of the plurality of image views are just a wrapping reference value.

Figure 33B:
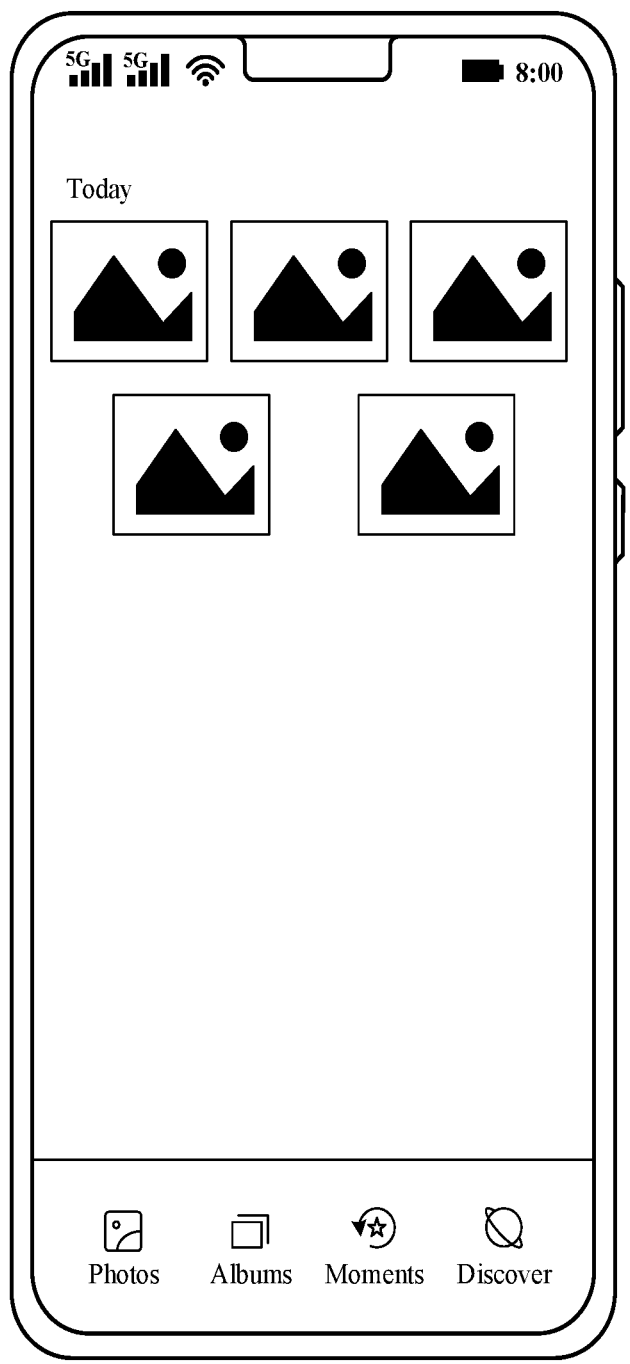

FIG. 33B shows a browsing interface displayed when a mobile phone runs the gallery application. First, the mobile phone determines a quantity of rows of the layout container and a quantity of image views displayed in each row based on a wrapping reference value of each image view in the layout container. For example, the mobile phone determines that a maximum of three image views are displayed in each row on the mobile phone. In this case, it may be determined that the five image views need to be displayed in two rows on the mobile phone. In addition, because the layout container is further provided with the equalization capability, when displaying the image views in each row, the mobile phone further ensures that the image views in each row have same spacings. It may be noted that, on the mobile phone, a quantity of image views displayed in the second row is less than a quantity of image views displayed in the first row, and a spacing between image views in the second row is greater than a spacing between image views in the first row. By comparing the browsing interface in FIG. 33B with the browsing interface in FIG. 33A, it can be learned that, although a width of the mobile phone is smaller than that of the tablet, the quantity of image views displayed in each row is reduced, and the spacing between image views in each row is adaptively adjusted.

Figure 33C:
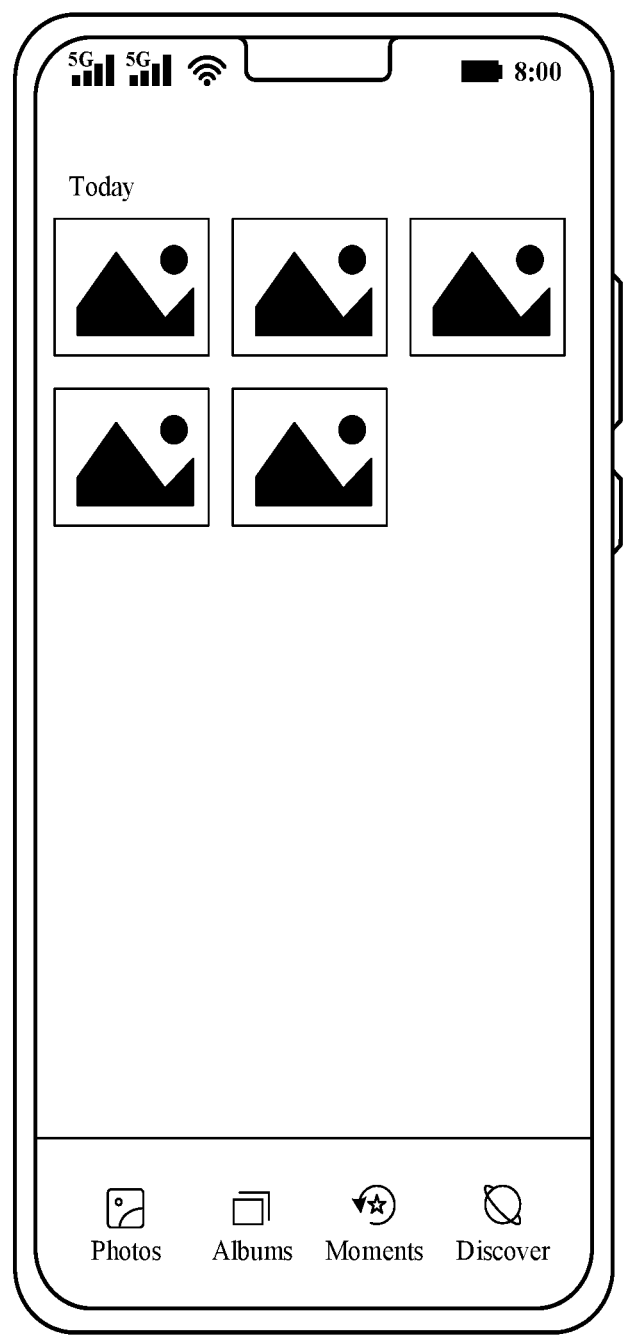

Alternatively, FIG. 33C shows another browsing interface displayed when a tablet runs a gallery application. A difference from the browsing interface shown in FIG. 33B lies in a method for displaying the image views in the second row. On the browsing interface shown in FIG. 33B, the tablet recalculates a spacing between adjacent child views based on a quantity of child views actually included in the second row, a width of each child view, and a specified equalization type, and performs display based on the recalculated spacing. On the browsing interface shown in FIG. 33C, the tablet directly displays the child views in the second row based on the calculated spacing in the first row. In other words, a spacing between adjacent child views in the second row is equal to or approximate to a spacing between adjacent child views in the first row.

It can be learned that a developer may not need to pay attention to a screen dimension of an electronic device, and does not need to pay attention to a quantity of image views that can be displayed in one row, but directly use a wrapping capability and an equalization capability to enable the electronic device to adaptively perform layout adjustment and adaptively adjust a spacing between image views. This can implement a grid effect.

5. Equalization Capability+Hiding Capability:

A play interface of a music application is used as an example for description.

Figure 34:
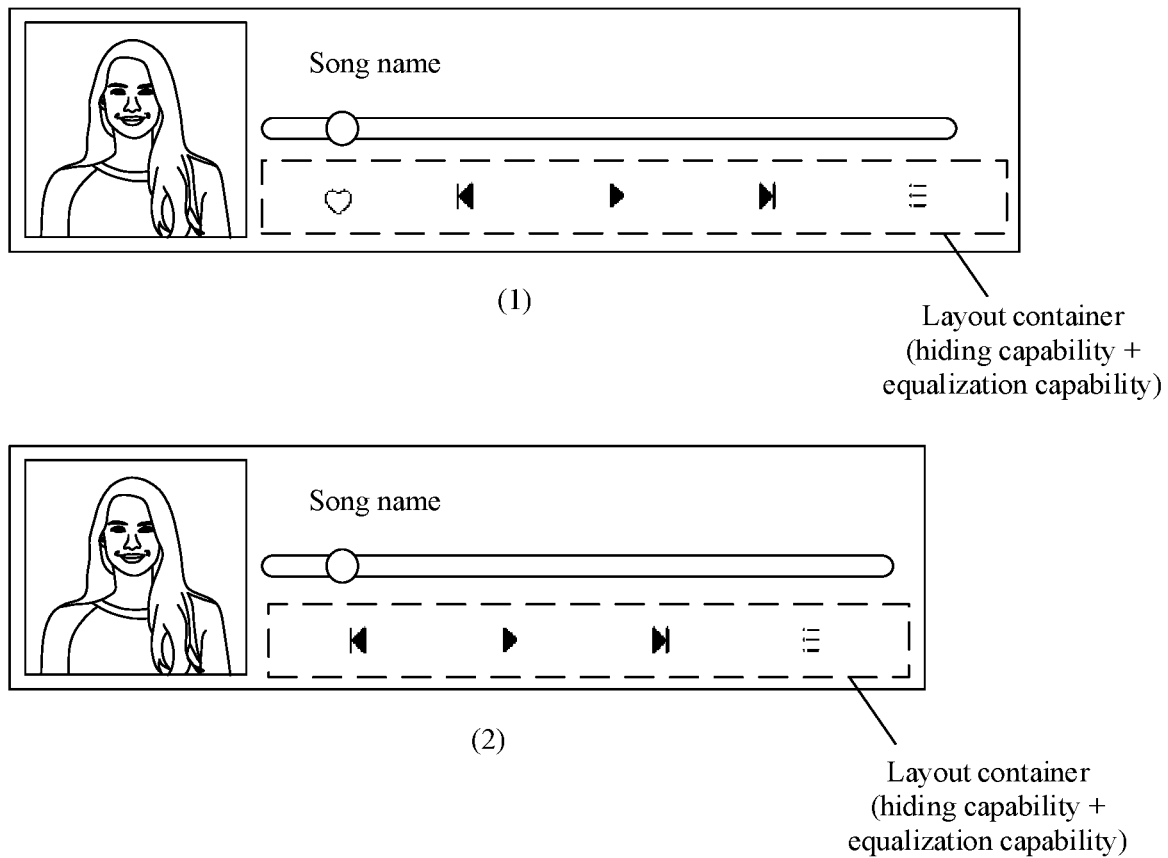
FIG. 34 is a display effect diagram of some other layout containers having a plurality of adaptive layout capabilities in different scenarios according to an embodiment of this disclosure.

Herein, (1) in FIG. 34 shows a play interface displayed when a tablet runs the music application. The play interface includes one layout container, and the layout container includes a plurality of image button views ("Favorites", "Previous", "Play", "Next", and "Playlist"). The layout container is provided with an equalization capability (for example, a second-type equalization capability) and a hiding capability. A hiding priority of each of "Previous", "Play", and "Next" is lower than that of "Playlist", and the hiding priority of "Playlist" is lower than that of "Favorites".

Herein, (2) in FIG. 34 shows a play interface displayed when a mobile phone runs the music application. Compared with the tablet, a width of the mobile phone is reduced, and correspondingly a width of the layout container is also reduced. In this case, the mobile phone first determines, based on the width of the layout container and a width of each icon button view, that the layout container cannot display all icon button views. The mobile phone determines, based on hiding priorities of the icon button views, an icon button view that needs to be hidden. First, the mobile phone hides the icon button view of "Favorites", and determines that the remaining four icon button views may be displayed in the layout container. Then, the mobile phone determines spacings between the four icon button views based on dimensions of the remaining four icon button views and a dimension of the layout container. If the layout container cannot display the four icon button views, the icon button view that further needs to be hidden is further determined, and so on.

An example of a layout file in which both an equalization capability and a hiding capability are enabled is provided herein.

```
<hwLayout
    xmlns:android="http://schemas.android.com/apk/res/android"
    xmlns:app="http://schemas.android.com/apk/res-auto"
    /* omit other configurations */
    android:orientation="horizontal"         //set a layout orientation of the layout container
    app: equalization capability enablement="true"    //enable an equalization capability of the layout container
    app: equalization type="second type"     //set as a second-type equalization capability
    app: hiding capability enablement="true"    //enable a hiding capability of the layout container
    <ImageButton        //set an icon button view of the layout container
        /* omit other configurations */
        android:src="@drawable/trends_ic_favorite"
        app: hiding priority="3"/>    //set a hiding priority of the first icon button view of the layout container
    <ImageButton
        /* omit other configurations */
        android:src="@drawable/trends_ic_previous"
        app: hiding priority="1"/>    //set a hiding priority of the second icon button view of the layout container
    <ImageButton
        /* omit other configurations */
        android:src="@drawable/trends_ic_pause"
        app: hiding priority="1"/>//set a hiding priority of the third icon button view of the layout container
    <ImageButton
        /* omit other configurations */
        android:src="@drawable/trends_ic_next"
        app: hiding priority="1"/>    set a hiding priority of the fourth icon button view of the layout container
    <ImageButton
        /* omit other configurations */
        android:src="@drawable/trends_ic_list"
        app: hiding priority="2"/>    set a hiding priority of the fifth icon button view of the layout container
</hwLayout>
```

6. Equalization Capability+Scaling Capability:

A browsing interface of a gallery application is still used as an example for description.

Figure 35A:
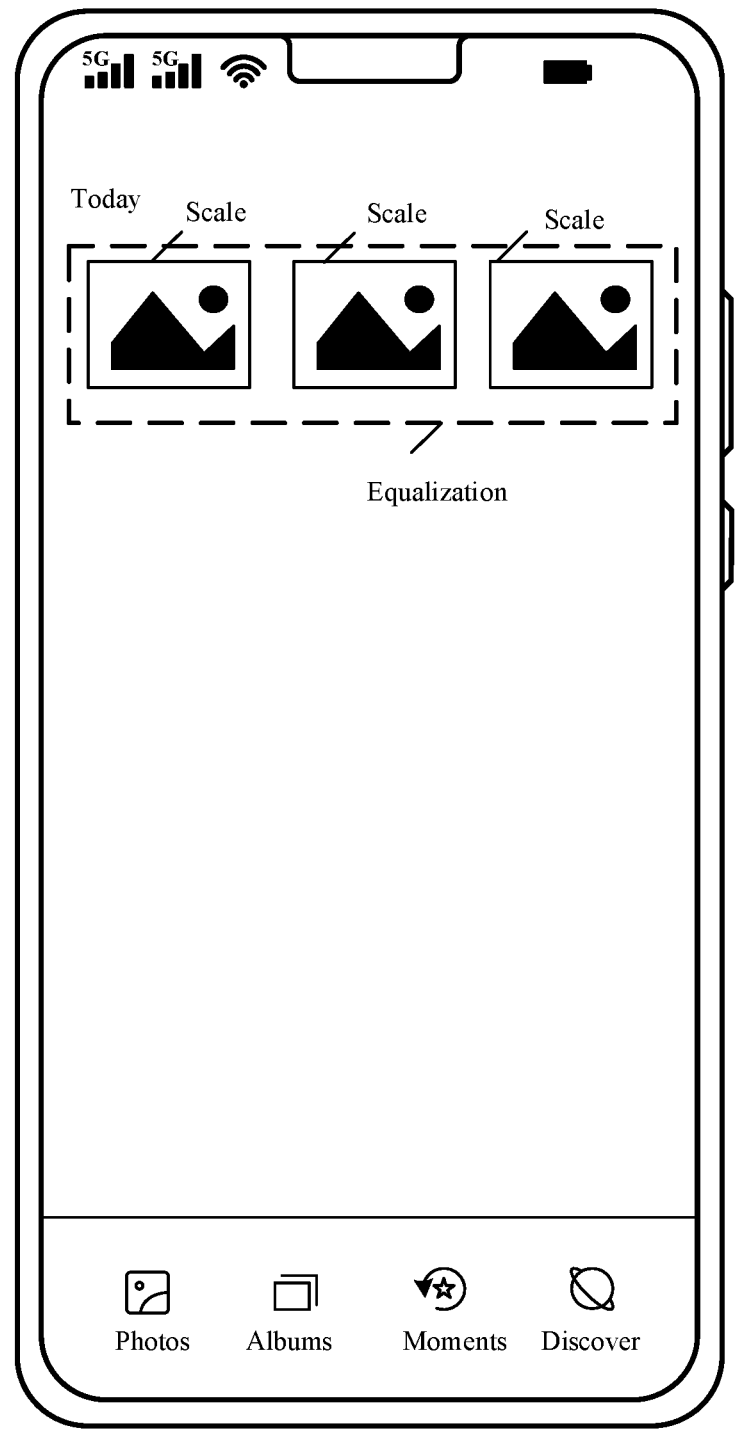
FIG. 35A and FIG. 35B are a display effect diagram of some other layout containers having a plurality of adaptive layout capabilities in different scenarios according to an embodiment of this disclosure.

FIG. 35A shows a browsing interface displayed when a mobile phone runs the gallery application. The gallery application includes one layout container, and the layout container includes a plurality of image views (configured to display a thumbnail of a photo or a video). The layout container is provided with a scaling capability, and a horizontal available space proportion and a vertical available space proportion are set for each image view. The layout container is further provided with an equalization capability (for example, a second-type equalization capability).

Figure 35B:
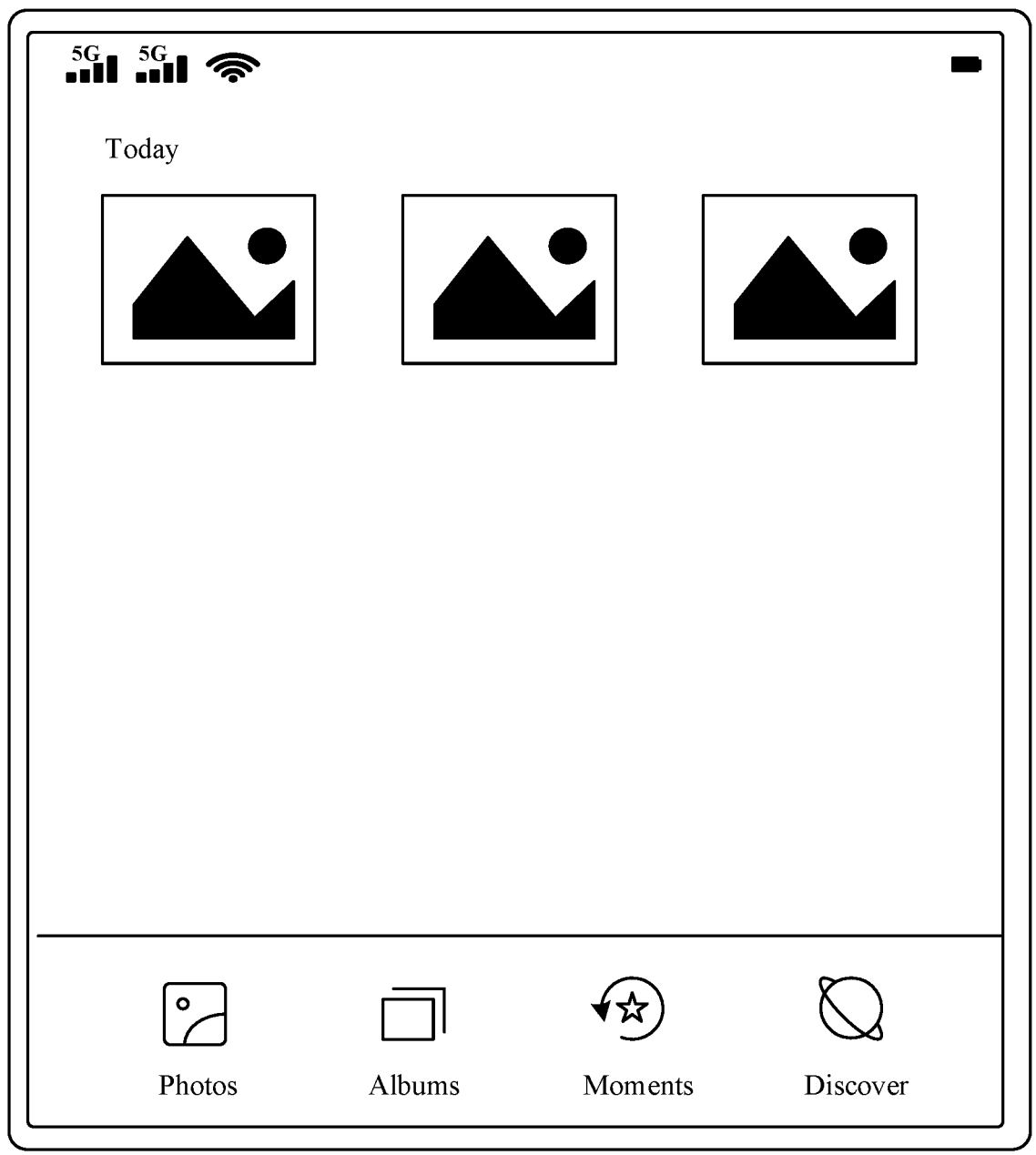

FIG. 35B shows a browsing interface displayed when a tablet runs the gallery application. Compared with the mobile phone, the tablet has a wider width. The image view is scaled up based on the width of the layout container, and the horizontal available space proportion and the vertical available space proportion of the image view. After a width of the scaled-up image view is determined, a spacing between two adjacent image views is determined based on an available space of the layout container.

7. Hiding Capability+Wrapping Capability:

A browsing interface of a gallery application is used as an example for description.

Figure 36A:
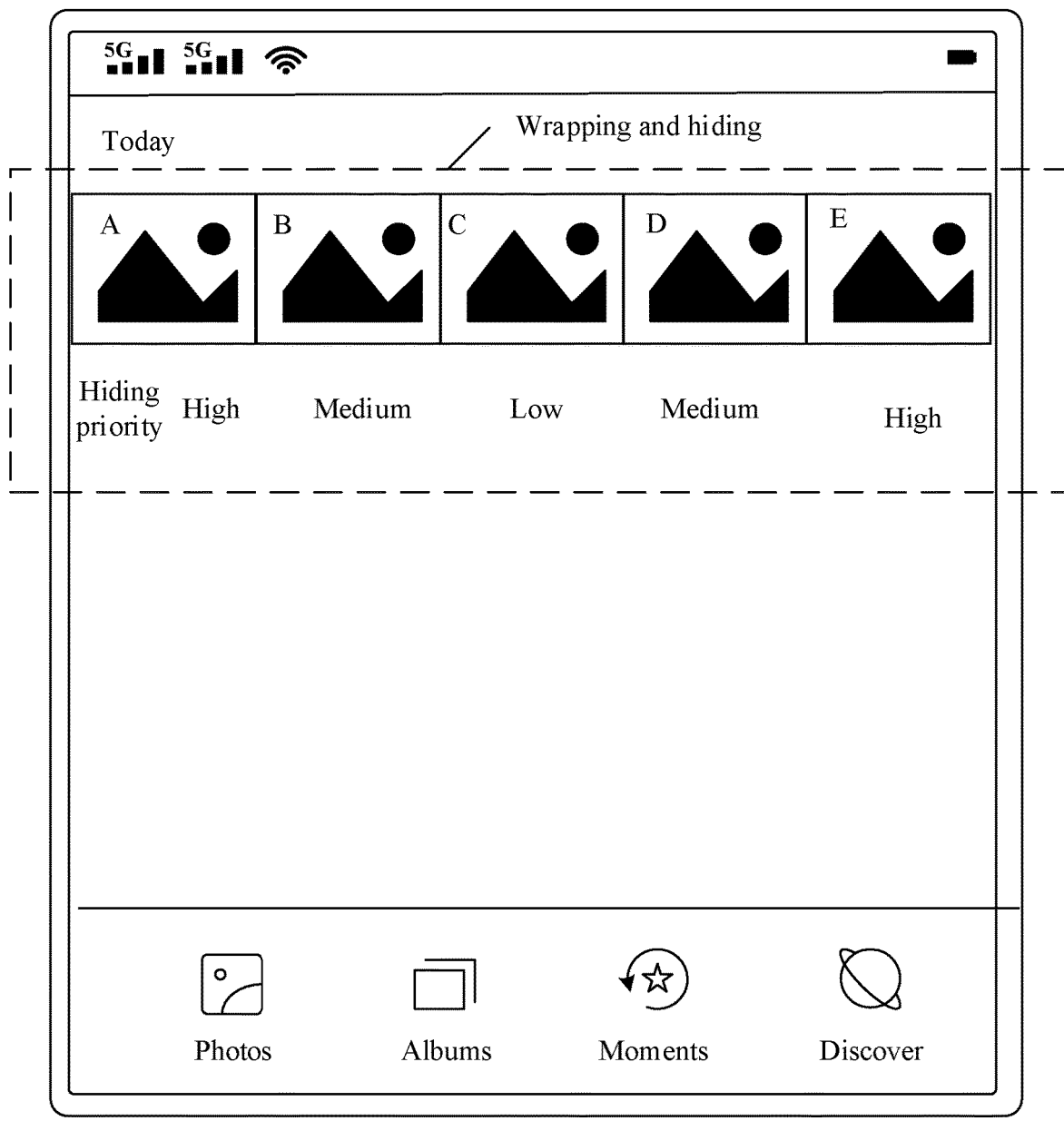
FIG. 36A, FIG. 36B, and FIG. 36C are a display effect diagram of some other layout containers having a plurality of adaptive layout capabilities in different scenarios according to an embodiment of this disclosure.

FIG. 36A shows a browsing interface displayed when a tablet runs the gallery application. The browsing interface includes one layout container, and the layout container includes a plurality of image views (configured to display a thumbnail of a photo or a video): an image view A to an image view E. The layout container is provided with a wrapping capability and a hiding capability. The image views A and E have the highest hiding priority, the image views B and D have the second highest hiding priority, and the image view C has the lowest hiding priority. In this case, widths of the plurality of image views are just a wrapping reference value.

Figure 36B:
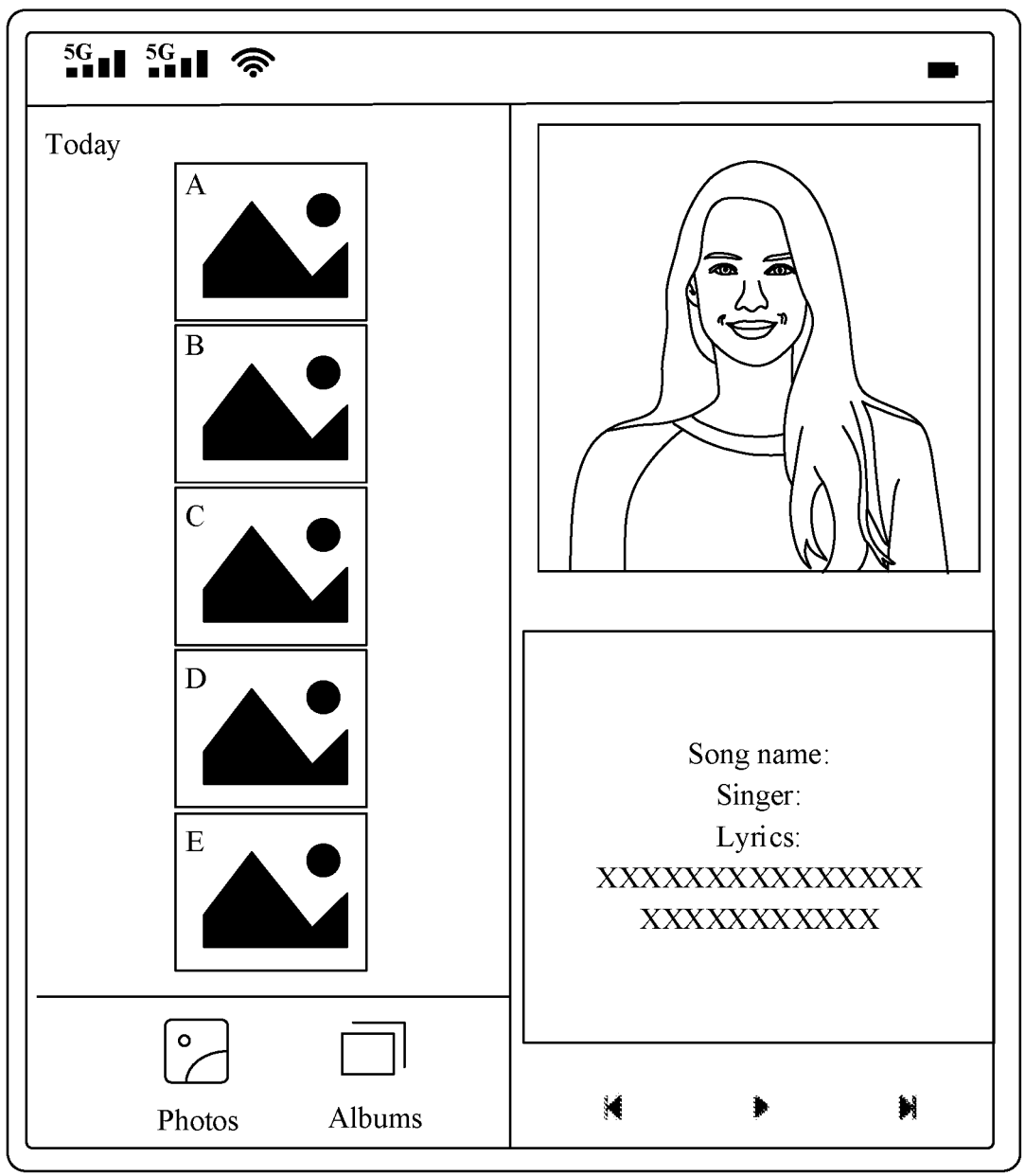
Figure 36C:
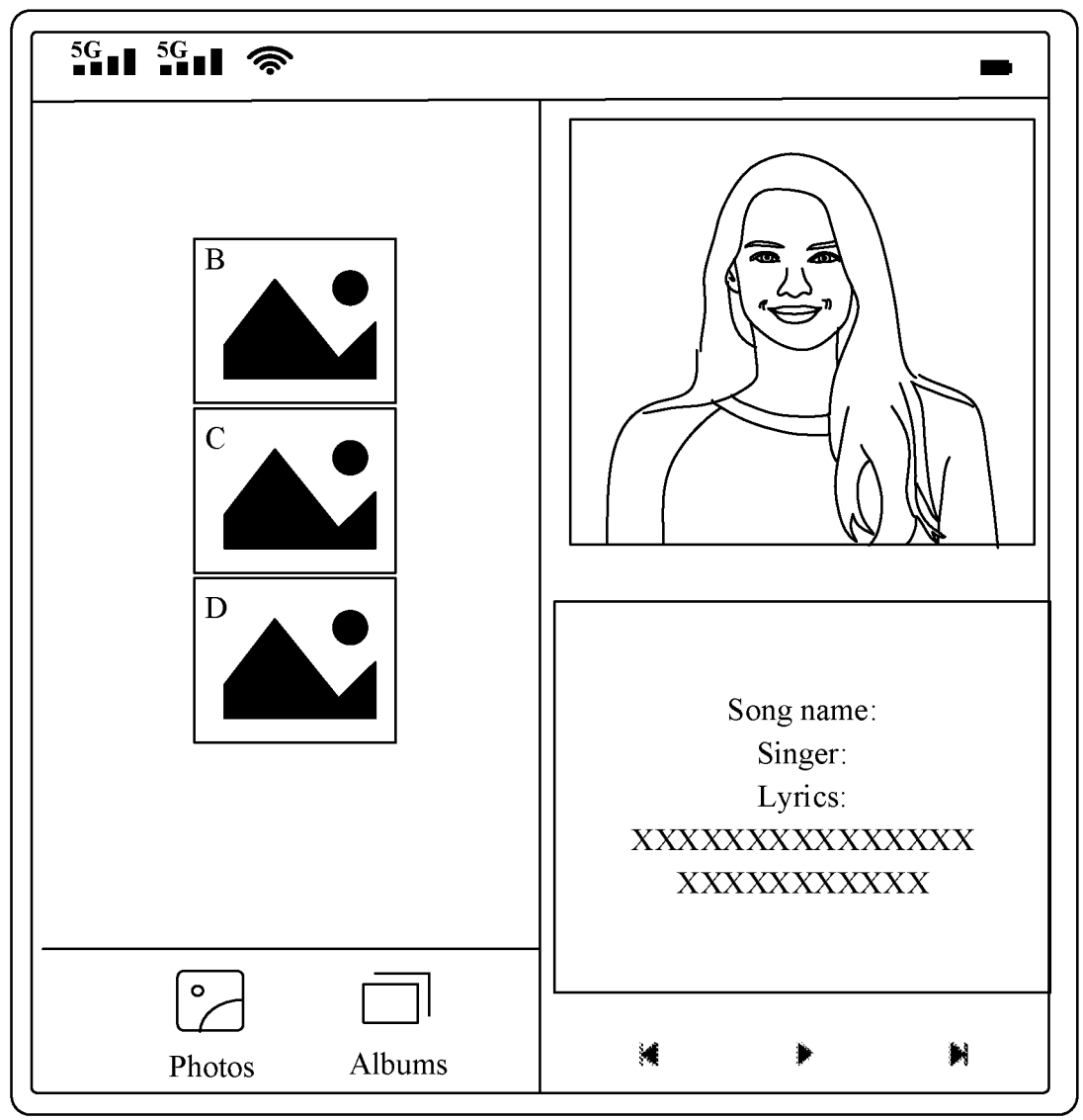

FIG. 36B is a schematic diagram of an interface in which the tablet displays two windows on split screens. The left window is configured to display the browsing interface of the gallery application. The right window is configured to display the play interface of the music application. Because a dimension of the window configured to display the browsing interface of the gallery application is reduced, the tablet is triggered to display the layout container in a wrapping manner. It is determined, based on the wrapping reference value of each image view in the layout container, that only one image view can be displayed in each row. In this case, the five image views are exactly vertically displayed on the interface shown in FIG. 36B. If a height of the window that is used by the tablet to display the browsing interface of the gallery application is insufficient to display the five image views, the tablet is triggered to hide the five image views based on the hiding priorities. On an interface shown in FIG. 36C, the image view A and the image view E that have the highest hiding priority are not displayed.

The following provides an example of one layout file (an XML file). A layout container with a hiding capability enabled is set in the layout file, and the layout container includes four child views: four image views.

```
<hwLayout
    xmlns:android="http://schemas.android.com/apk/res/android"
    xmlns:app="http://schemas.android.com/apk/res-auto"
    /* omit other configurations */
    android:orientation="horizontal"
    app: vertical hiding capability enablement="true"   //enable a vertical hiding capability
    app: wrapping capability enablement="true"          //enable a wrapping capability
    app: wrapping alignment mode="end">                 //set the wrapping alignment mode.
For Chinese and English, "end" corresponds to right alignment
    <ImageView     //set a child view 1 in the layout container-image view
        /* omit other configurations */
        app:layout_vertical hiding priority="3" //set a vertical hiding priority of the child view 1
        app: wrapping reference width="90dp" />   //set a wrapping reference value of the wrapped child view 1
    <ImageView //set a child view 2 in the layout container-image view
        /* omit other configurations */
        app:layout_vertical hiding priority="2" //set a vertical hiding priority of the child view 2
        app: wrapping reference width="90dp" />   //set a wrapping reference value of the wrapped child view 2
    <ImageView //set a child view 3 in the layout container-image view
        /* omit other configurations */
        app:layout_vertical hiding priority="1" //set a vertical hiding priority of the child view 3
        app: wrapping reference width="90dp" />   //set a wrapping reference value of the wrapped child view 3
    <ImageView //set a child view 4 in the layout container-image view
        /* omit other configurations */
        app:layout_vertical hiding priority="2" //set a vertical hiding priority of the child view 4
        app: wrapping reference width="90dp" />   //set a wrapping reference value of the wrapped child view 4
    <ImageView //set a child view 5 in the layout container-image view
        /* omit other configurations */
        app:layout_vertical hiding priority="3" //set a vertical hiding priority of the child view 5
        app: wrapping reference width="90dp" />   //set a wrapping reference value of the wrapped child view 5
</hwLayout>
```

8. Proportion Capability+Scaling Capability:

A browsing interface of a gallery application is used as an example for description.

Figure 37A:
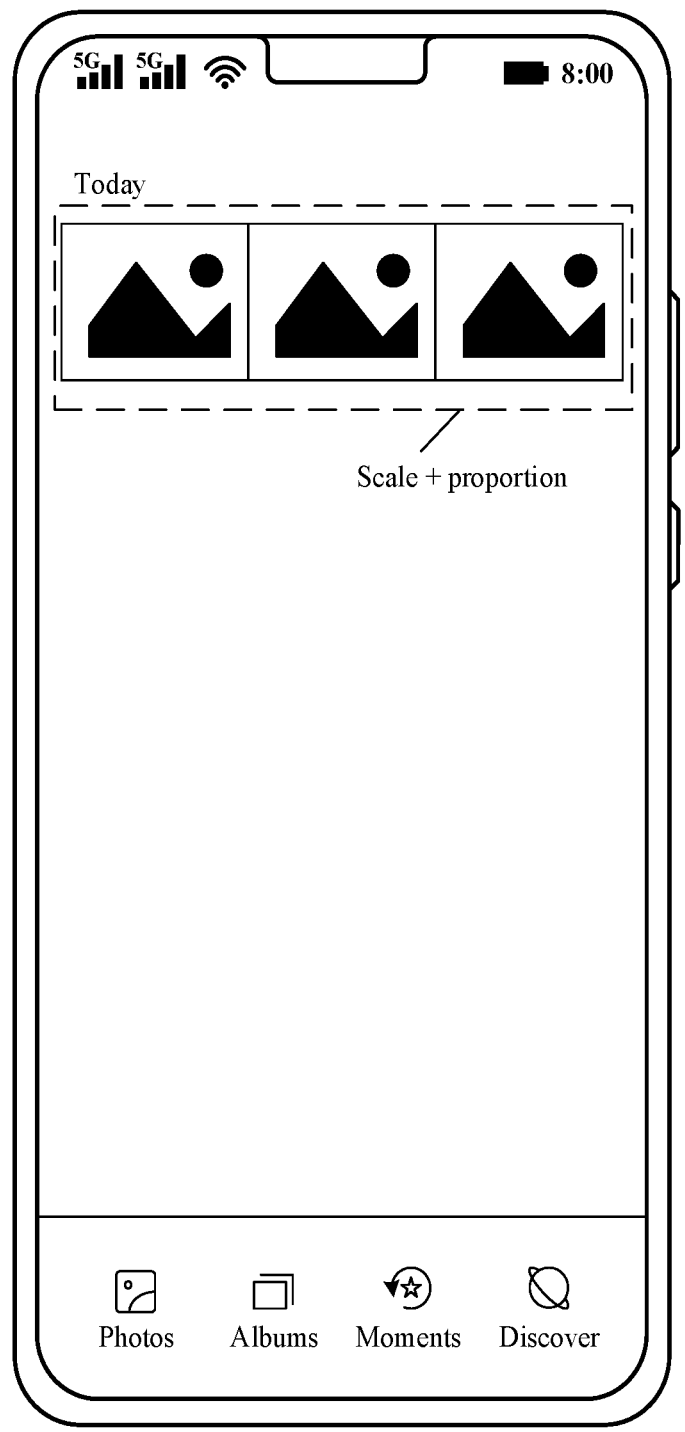
FIG. 37A and FIG. 37B are a display effect diagram of some other layout containers having a plurality of adaptive layout capabilities in different scenarios according to an embodiment of this disclosure.

FIG. 37A shows a browsing interface displayed when a mobile phone runs the gallery application. The gallery application includes one layout container, and the layout container includes a plurality of image views (configured to display a thumbnail of a photo or a video). The layout container is provided with a scaling capability (a horizontal available space proportion and a vertical available space proportion are not set for each image view). In addition, the layout container is further provided with a proportion capability (for example, a proportion in a horizontal direction, for example, 33.33%).

Figure 37B:
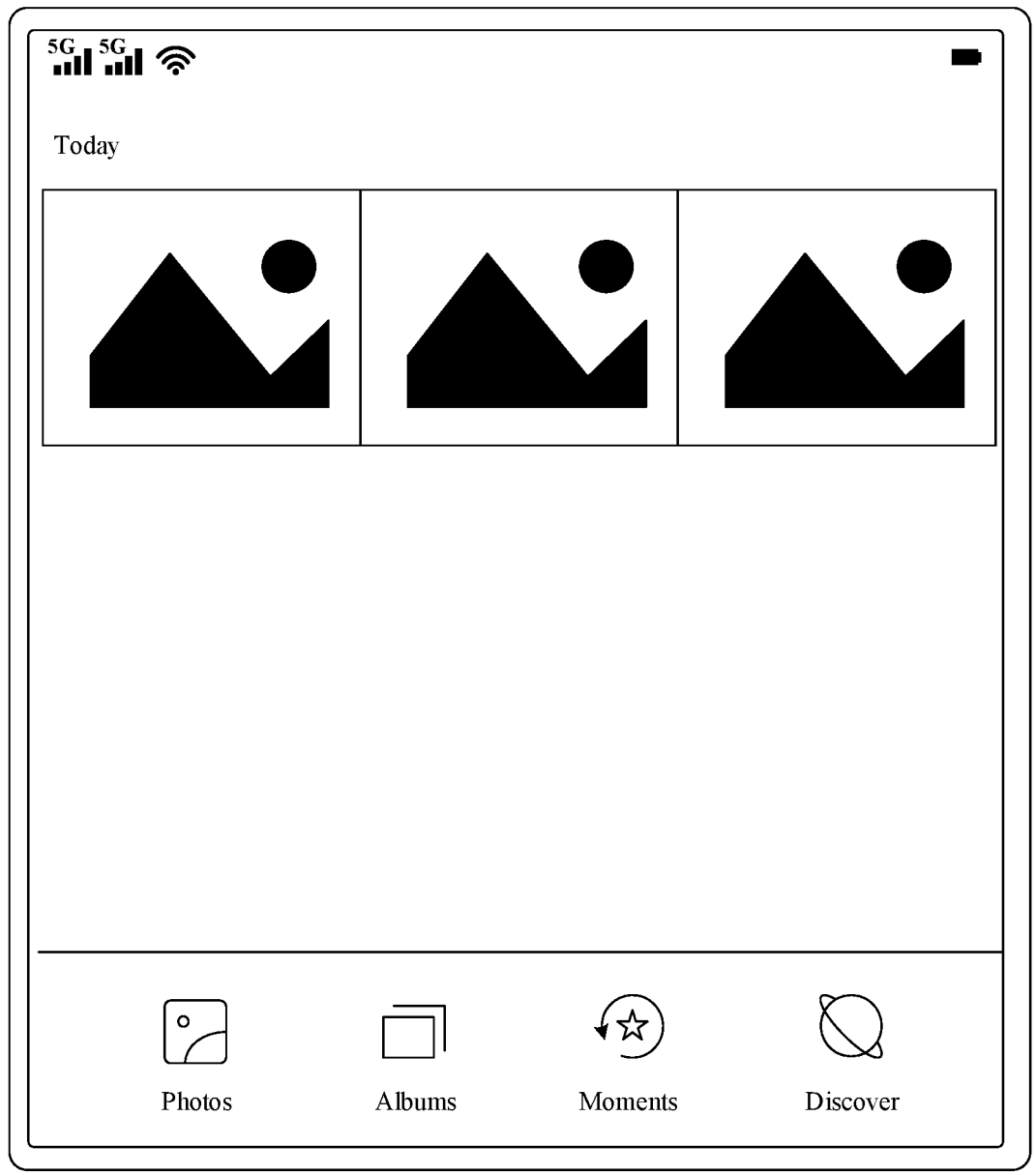

FIG. 37B shows a browsing interface displayed when a tablet runs the gallery application. It can be learned that all image views evenly occupy an available space in a horizontal direction of the tablet (a width of each image view is ⅓ of a total width of the tablet). The scaling capability of each image view enables each image view to be scaled to occupy the available space in the horizontal direction. In other words, the proportion capability controls a horizontal size of each image view. The scaling capability ensures that each image view is scaled based on an aspect ratio, to avoid image distortion.

9. Proportion Capability+Scaling Capability+Wrapping Capability:

A browsing interface of a gallery application is still used as an example for description.

Figure 38A:
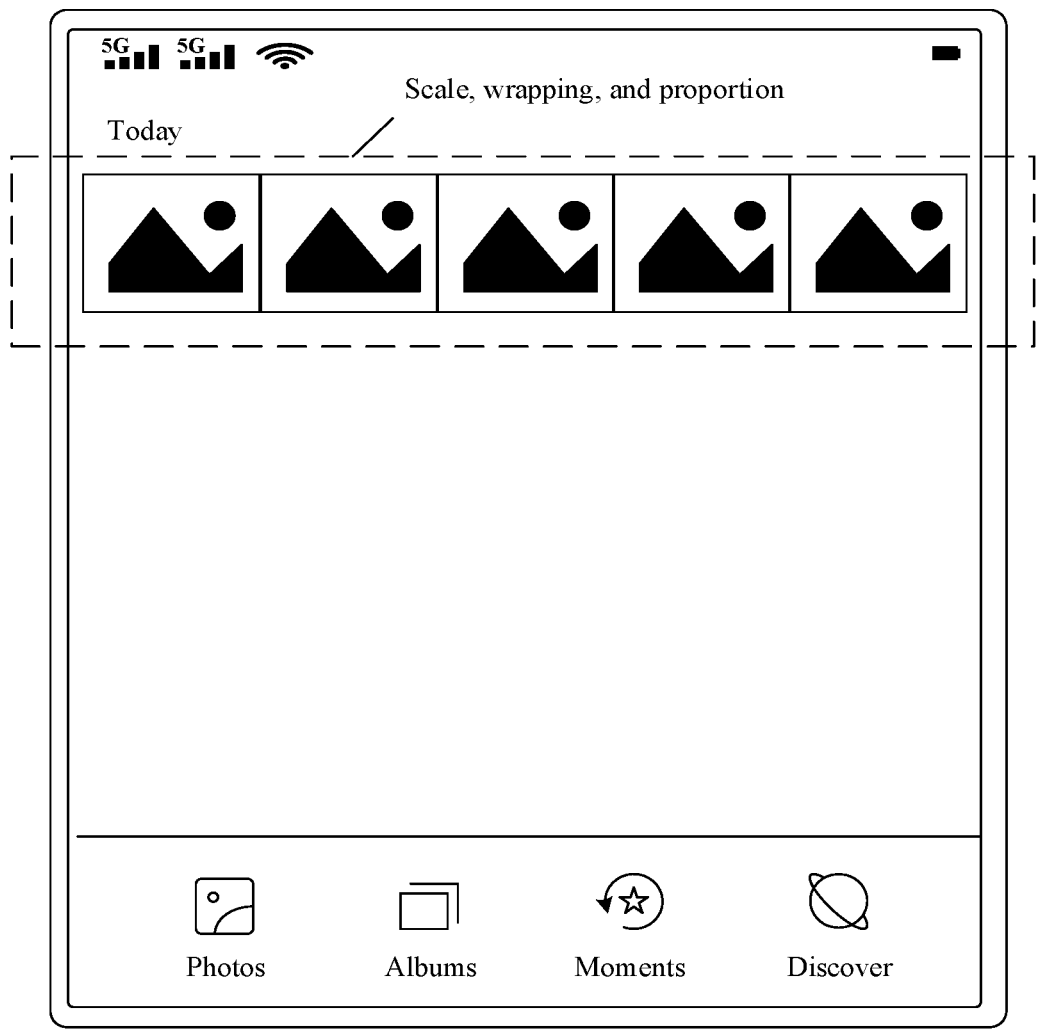
FIG. 38A and FIG. 38B are a display effect diagram of some other layout containers having a plurality of adaptive layout capabilities in different scenarios according to an embodiment of this disclosure.

FIG. 38A shows a browsing interface displayed when a tablet runs the gallery application. The gallery application includes one layout container, and the layout container includes a plurality of image views (configured to display a thumbnail of a photo or a video). The layout container is provided with a scaling capability (a horizontal available space proportion and a vertical available space proportion are not set for an image view). In addition, the layout container is provided with a horizontal proportion capability and a horizontal wrapping capability.

Figure 38B:
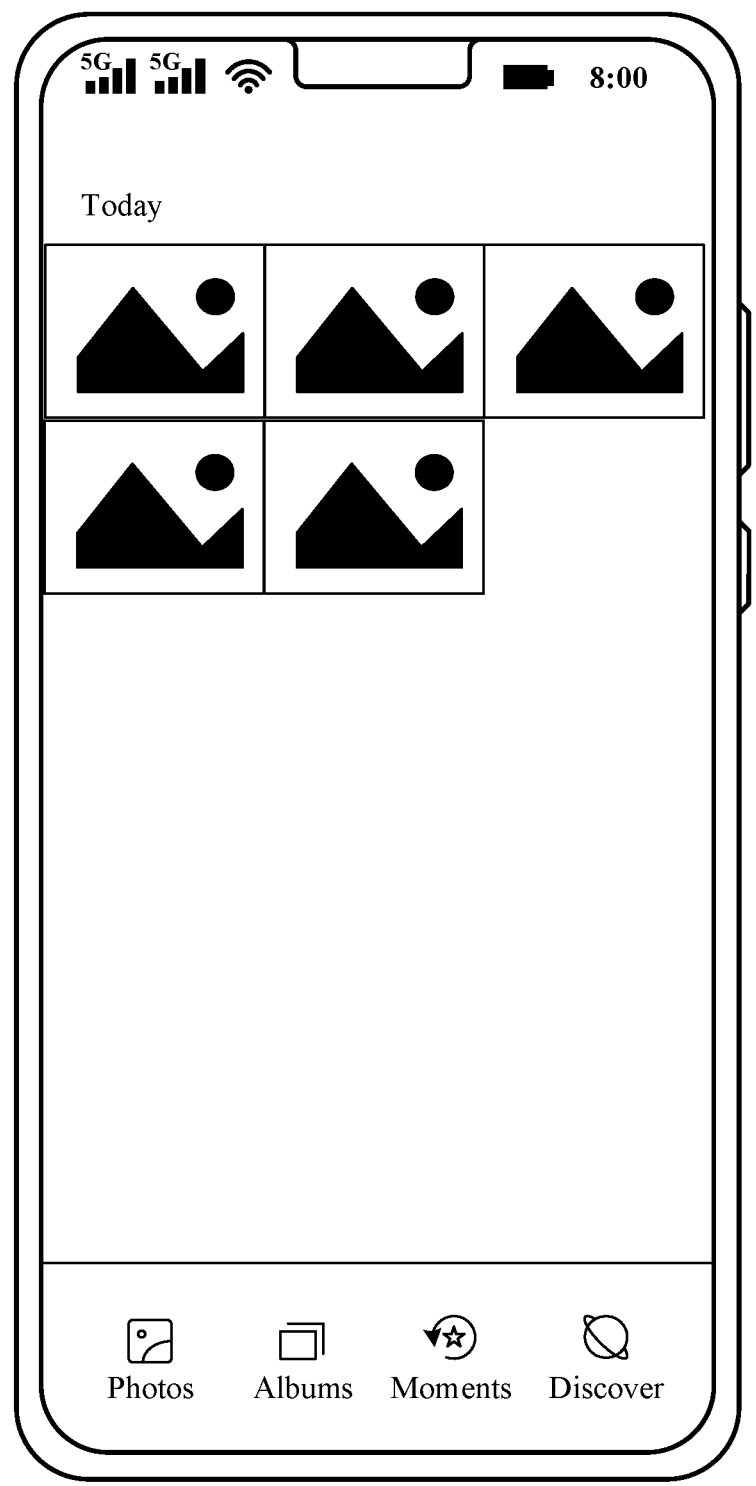

FIG. 38B shows a browsing interface displayed when a mobile phone runs the gallery application. First, the mobile phone determines a quantity of image views displayed in each row based on a wrapping reference value of each image view in the layout container. For example, the mobile phone determines that only three image views are displayed in each row on the mobile phone. Then, widths of the three image views in the first row are determined based on the horizontal proportion capability, and then a shape of the image view is kept for scaling based on the scaling capability of the image view. For a horizontal proportion of an image view in another row, refer to the width of the image view in the first row. By comparing the browsing interface in FIG. 38B with the browsing interface in FIG. 38A, it can be learned that, although the width of the mobile phone is smaller than that of the tablet, the image view in each row is enlarged.

The following is an example of an XML file that combines the scaling capability, the wrapping capability, and the proportion capability.

```
<hwLayout
    xmlns:android="http://schemas.android.com/apk/res/android"
    xmlns:app="http://schemas.android.com/apk/res-auto"
    /* omit other configurations */
    app: proportion capability enabled/disabled="true"       //enable a
proportion capability of the layout container
    app: wrapping capability enabled/disabled="true"
    app: wrapping alignment mode="start">       //set the wrapping
    alignment mode.
In Chinese or English, "start" indicates left alignment. In Arabic, "start"
indicates right alignment
    <hwLayout
        android:layout_height="match_parent"
        android:layout_width="match_parent"
        app: wrapping reference width="80dp"            //set a
wrapping reference value
        android:gravity="center_horizontal"
        app: scaling capability enabled/disabled="true">
//enable a scaling capability of the layout container
            <ImageView /* omit other configurations */ />
    </hwLayout>
    <hwLayout
        android:layout_height="match_parent"
        android:layout_width="match_parent"
        app: wrapping reference width="80dp"    //set a wrapping reference
        value
        android:gravity="center_horizontal"
        app: scaling capability enabled/disabled="true">
            <ImageView /* omit other configurations */ />
    </hwLayout>
    <hwLayout
        android:layout_height="match_parent"
        android:layout_width="match_parent"
        app: wrapping reference width="80dp"          //set a wrapping
reference value
        android:gravity="center_horizontal"
        app: scaling capability enabled/disabled="true">
            <ImageView /* omit other configurations */ />
    </hwLayout>
    <hwLayout
        android:layout_height="match_parent"
        android:layout_width="match_parent"
        app: wrapping reference width="80dp"            //set a
wrapping reference value
        android:gravity="center_horizontal"
        app: scaling capability enabled/disabled="true">
            <ImageView /* omit other configurations */ />
    </hwLayout>
    <hwLayout
        android:layout_height="match_parent"
        android:layout_width="match_parent"
        app: wrapping reference width="80dp"            //set a
wrapping reference value
        android:gravity="center_horizontal"
        app: scaling capability enabled/disabled="true">
            <ImageView /* omit other configurations */ />
    </hwLayout>
</hwLayout>
```

It can be understood that the foregoing combination forms are merely examples. For a case in which a conflict occurs when the foregoing adaptive layout capability combination is performed, when an application developer designs an application interface, a development device may provide a prompt and a suggestion. Alternatively, when an electronic device runs an application, and it is found that a plurality of layout capabilities conflict when an object (a View or a ViewGroup) is measured, a corresponding conflict solution may be used.

For example, generally, a stretching capability and a scaling capability cannot be simultaneously set in a same direction for a same object (View or ViewGroup) on a same interface. If the application developer sets the stretching capability and the scaling capability in the same direction for the same object when setting a layout file of the application interface, an error message may be displayed. Alternatively, after the application developer sets the stretching capability (or the scaling capability) for an object, a setting item of the scaling capability (or the stretching capability) is dimmed, that is, no setting can be performed. Alternatively, when the electronic device draws the application interface, setting of one of the capabilities such as the stretching capability or the scaling capability takes effect by default. Alternatively, it can be determined, based on a type of the object, that setting of one of the capabilities takes effect. For example, if the object is an image view, setting of the scaling capability takes effect by default, and setting of the stretching capability is invalid. For another example, if the object is a text view, setting of the stretching capability takes effect by default, and setting of the scaling capability is invalid. Alternatively, the electronic device may ask a user to select setting of a capability to take effect.

For another example, generally, an extension capability and another adaptive layout capability cannot be simultaneously set for a same object on a same interface. If the application developer sets an extension capability for a same object when setting a layout file of the application interface, the extension capability cannot be combined with another adaptive layout capability. Alternatively, after the application developer sets the extension capability for an object, setting items of other adaptive layout capabilities are dimmed, that is, no setting can be performed.

For another example, generally, a proportion capability and an equalization capability cannot be simultaneously set in a same direction for a same object on a same interface. If the application developer sets the proportion capability and the equalization capability in the same direction for the same object when setting a layout file of the application interface, an error message may be displayed. Alternatively, when the electronic device draws the application interface, setting of one of the capabilities takes effect by default, or it is determined, based on a type of the object, that setting of one of the capabilities takes effect. For example, when the object includes one view or a plurality of views of different types, setting of the proportion capability takes effect by default. For another example, when the object includes a plurality of views of a same type, setting of the equalization capability takes effect by default.

For another example, generally, a wrapping capability and a hiding capability cannot be simultaneously set in a same direction for a same object on a same interface. If the application developer sets the wrapping capability and the hiding capability in the same direction for the same object when setting a layout file of the application interface, an error message may be displayed. Alternatively, when the application developer simultaneously sets the wrapping capability and the hiding capability in the same direction for the same object when setting a layout file of the application interface, the application developer is prompted to set priorities for the two capabilities. In other words, when subsequently drawing the application interface based on the layout file, after finding that the wrapping capability and the hiding capability are simultaneously set in a same direction for a same object, the electronic device may select, based on the priorities that are set by the application developer, a capability of a higher priority (for example, the wrapping capability) to perform layout. In other words, in this case, setting of a capability of a low priority (for example, the hiding capability) does not take effect. Optionally, when layout is performed based on a capability of a high priority, if it is determined that a space of the layout container in the orientation is insufficient for layout based on the capability of the high priority, layout is performed again based on a capability of a low priority. In this case, setting of the capability of the high priority does not take effect. Alternatively, when the electronic device draws the application interface, setting of one of the capabilities takes effect by default, or it is determined, based on a type of the object, that setting of one of the capabilities takes effect, or it is selected, based on user setting, that setting of one of the capabilities takes effect.

It can be understood that the foregoing conflict solutions may be used independently, or may be combined, for example, combined according to a specific priority policy. In addition, the foregoing solutions or a combination of the foregoing solutions may also be applied to a case in which a conflict occurs when two or more capabilities other than capabilities in the foregoing embodiment are combined. In conclusion, a solution to a conflict occurring when a plurality of capabilities is combined is not limited in this embodiment of this disclosure.

Figure 39:
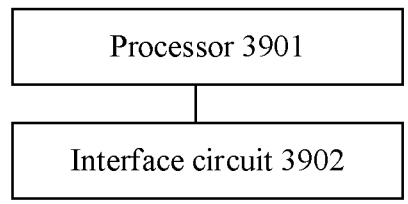
FIG. 39 is a schematic diagram of a structure of a chip system according to an embodiment of this disclosure.

An embodiment of this disclosure further provides a chip system. As shown in FIG. 39, the chip system includes at least one processor 3901 and at least one interface circuit 3902. The processor 3901 and the interface circuit 3902 may be connected to each other through a line. For example, the interface circuit 3902 may be configured to receive a signal from another apparatus (for example, a memory of an electronic device 100). For another example, the interface circuit 3902 may be configured to send a signal to another apparatus (for example, the processor 3901). For example, the interface circuit 3902 may read instructions stored in the memory, and send the instructions to the processor 3901. When the instructions are executed by the processor 3901, the electronic device may be enabled to perform steps performed by the electronic device 100 (for example, the mobile phone) in the foregoing embodiments. Certainly, the chip system may further include another discrete device. This is not limited in this embodiment of this disclosure.

An embodiment of this disclosure further provides an apparatus. The apparatus is included in an electronic device, and the apparatus has a function of implementing behavior of the electronic device in any method in the foregoing embodiments. The functions may be implemented by hardware, or may be implemented by hardware executing corresponding software. The hardware or the software includes at least one module or unit corresponding to the foregoing functions, for example, a detection module or unit, a display module or unit, a determining module or unit, and a calculation module or unit.

An embodiment of this disclosure further provides a computer storage medium, including computer instructions. When the computer instructions are run on an electronic device, the electronic device is enabled to perform any method in the foregoing embodiments.

An embodiment of this disclosure further provides a computer program product. When the computer program product runs on a computer, the computer is enabled to perform any method in the foregoing embodiments.

An embodiment of this disclosure further provides a graphical user interface on an electronic device. The electronic device includes a display, a camera, a memory, and one or more processors. The one or more processors are configured to execute one or more computer programs stored in the memory, and the graphical user interface includes a graphical user interface displayed when the electronic device performs any method in the foregoing embodiments.

It can be understood that, to implement the foregoing functions, the electronic device and the like each include corresponding hardware structures and/or software modules for performing the foregoing functions. A person skilled in the art should be easily aware that, in combination with the examples described in embodiments disclosed in this specification, units, algorithms, and steps may be implemented by hardware or a combination of hardware and computer software in embodiments of this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present disclosure.

Function modules may be obtained by dividing the foregoing electronic device and the like based on the foregoing method examples in embodiments of this disclosure. For example, the function modules may be obtained through division for corresponding functions, or two or more functions may be integrated into one processing module. The integrated module may be implemented in a form of hardware, or may be implemented in a form of a software function module. It should be noted that in embodiments of the present disclosure, module division is an example, and is merely a logical function division. During actual implementation, another division manner may be used.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in embodiments of this disclosure may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of embodiments of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this disclosure. The foregoing storage medium includes any medium that can store program code, such as a flash memory, a removable hard disk, a read-only memory (ROM), a RAM, a magnetic disk, or an optical disc.

The foregoing descriptions are merely specific implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

The invention claimed is:

1. A method, implemented by an electronic device, wherein the method comprises:
    installing an application installation package of an application, wherein the application installation package comprises a first layout file indicating N child views and an enabled preset capability, wherein N is a positive integer, and wherein the enabled preset capability comprises one or more of an extension capability, a proportion capability, an equalization capability, a stretching capability, or a hiding capability;
    receiving, from a user on a first interface, a first operation;
    determining, in response to the received first operation and based on a device parameter of the electronic device and the enabled preset capability, attribute values of the N child views, wherein the device parameter comprises at least one of a screen type value of the electronic device, a screen dimension value of the electronic device, or a running status value of the electronic device, and wherein the attribute values indicate sizes of the N child views on a second interface and locations of the N child views on the second interface; and
    displaying, on the second interface based on the attribute values, the N child views.

2. The method of claim 1, wherein the first layout file comprises a preset parameter corresponding to the preset capability, and wherein the method further comprises further determining, based on the preset parameter, the attribute values.

3. The method of claim 1, wherein a running status of the electronic device comprises one or more of a landscape/portrait state of the electronic device, a screen splitting state of the electronic device, or a folding state of the electronic device.

4. The method of claim 1, wherein the first operation is any one of starting the application, jumping to the second interface, or switching a running status of the electronic device.

5. The method of claim 1, wherein the enabled preset capability is the extension capability, wherein the first layout file further indicates that the N child views are arranged in a first orientation of a first layout container, wherein the first orientation is either a horizontal orientation or a vertical orientation, and wherein the method further comprises:
    determining, based on the device parameter, a dimension of the first layout container in the first orientation;
    determining, based on the dimension of the first layout container and dimensions of the N child views, N1 child views and an $(N1+1)^{th}$ child view in the N child views, wherein N1 is less than N;
    completely displaying, on the second interface based on the attribute values, the N1 child views; and
    partially displaying, on the second interface based on the attribute values, the $(N1+1)^{th}$ child view.

6. The method of claim 5, further comprising:
    receiving, from the user on the second interface, a second operation; and
    displaying, in response to the second operation, a third interface displaying an $(N1+2)^{th}$ child view in the N child views.

7. The method of claim 1, wherein the enabled preset capability is the proportion capability, wherein the first layout file further indicates proportions of arranging the N child views and a first child view in the N child views in a first orientation of a first layout container, wherein the first orientation is either a horizontal orientation or a vertical orientation, and wherein the method further comprises:
    determining, based on the device parameter, a first dimension of the first layout container in the first orientation;
    determining, based on the first dimension and a proportion of the first child view in the proportions, a second dimension of the first child view in the first orientation; and
    displaying, on the second interface based on the attribute values, the first child view.

8. The method of claim 1, wherein the enabled preset capability is the equalization capability, wherein the first layout file further indicates that the N child views are arranged in a first orientation of a first layout container, a first dimension of each of the N child views in the first orientation, and an inner margin of the first layout container in the first orientation, and wherein the method further comprises:
    determining, based on the device parameter, a second dimension of the first layout container in the first orientation;
    determining, based on the second dimension, the first dimension of each of the N child views, and the inner margin, a first spacing between two adjacent child views, wherein each two adjacent child views have an equal spacing; and
    further displaying, on the second interface and using the first spacing between each two adjacent child views in the N child views, the N child views.

9. The method of claim 1, wherein the enabled preset capability is the hiding capability, wherein the first layout file further indicates that the N child views are arranged in a first orientation of a first layout container, a first dimension of each of the N child views in the first orientation, and an inner margin of the first layout container in the first orientation, and wherein the method further comprises:
    determining, based on the device parameter, a second dimension of the first layout container in the first orientation;
    determining, based on first dimensions of the N child views in the first orientation, a third dimension;
    determining, based on the second dimension and the inner margin, a fourth dimension;
    determining M child views from the N child views when the third dimension is greater than the fourth dimension, wherein M is an integer less than N; and
    displaying, based on the attribute values, the M child views on the second interface.

10. An electronic device, comprising:
    a memory configured to store:
        instructions; and
        an application installation package of an application, wherein the application installation package comprises a first layout file indicating N child views and an enabled preset capability, wherein N is a positive integer, wherein the enabled preset capability comprises one or more of an extension capability, a proportion capability, an equalization capability, a stretching capability, or a hiding capability;

one or more processors coupled to the memory and configured to execute the instructions to cause the electronic device to:

receive, from a user on a first interface a first operation;

determine, in response to the first operation and based on a device parameter of the electronic device and the enabled preset capability, attribute values of the N child views, wherein the device parameter comprises at least one of a screen type value of the electronic device, a screen dimension value of the electronic device, or a running status value of the electronic device, and wherein the attribute values indicate sizes of the N child views on a second interface and locations of the N child views on the second interface; and display, based on the attribute values, the N child views on the second interface.

11. The electronic device of claim 10, wherein the first layout file comprises a preset parameter corresponding to the enabled preset capability, and wherein the one or more processors is further configured to execute the instructions to cause the electronic device to further determine, based on the preset parameter, the attribute values.

12. The electronic device of claim 10, wherein a running status of the electronic device comprises one or more of a landscape/portrait state of the electronic device, a screen splitting state of the electronic device or a folding state of the electronic device.

13. The electronic device of claim 10, wherein the first operation is any one of starting the application, jumping to the second interface, or switching a running status of the electronic device.

14. The electronic device of claim 10, wherein the enabled preset capability is the extension capability, wherein the first layout file further indicates that the N child views are arranged in a first orientation of a first layout container, wherein the first orientation is either a horizontal orientation or a vertical orientation, and wherein the one or more processors are further configured to execute the instructions to cause the electronic device to:

determine, based on the device parameter a dimension of the first layout container in the first orientation;

determine, based on the dimension of the first layout container in the first orientation and dimensions of the N child views, N1 child views and an $(N1+1)^{th}$ child view in the N child views, wherein N1 is less than N;

completely display, on the second interface based on the attribute values, the N1 child views; and partially display, on the second interface based on the attribute values, the $(N1+1)^{th}$ child view.

15. The electronic device of claim 14, wherein the one or more processors are further configured to execute the instructions to cause the electronic device to:

receive, from the user on the second interface, a second operation; and display, in response to the second operation, a third interface displaying an $(N1+2)^{th}$ child view in the N child views.

16. The electronic device of claim 10, wherein the enabled preset capability is the proportion capability, wherein the first layout file further indicates proportions of arranging the N child views and a first child view in the N child views in a first orientation of a first layout container, wherein the first orientation is either a horizontal orientation or a vertical orientation, and wherein the one or more processors are further configured to execute the instructions to cause the electronic device to:

determine, based on the device parameter, a first dimension of the first layout container in the first orientation;

determine, based on the first dimension and a proportion of the first child view in the proportions, a second dimension of the first child view in the first orientation; and display, on the second interface based on the attribute values, the first child view.

17. The electronic device of claim 10, wherein the enabled preset capability is the equalization capability, wherein the first layout file further indicates that the N child views are arranged in a first orientation of a first layout container, a first dimension of each of the N child views in the first orientation, and an inner margin of the first layout container in the first orientation, and wherein the one or more processors are further configured to execute the instructions to cause the electronic device to:

determine, based on the device parameter, a second dimension of the first layout container in the first orientation;

determine, based on the second dimension, the first dimension of each of the N child views, and the inner margin, a first spacing between each two adjacent child views, wherein each of the two adjacent child views have an equal spacing; and further display, on the second interface and using the first spacing between each two adjacent child views in the N child views the N child views.

18. The electronic device of claim 10, wherein the enabled preset capability is the hiding capability, wherein the first layout file indicates that the N child views are arranged in a first orientation of a first layout container, a first dimension of each of the N child views in the first orientation, and an inner margin of the first layout container in the first orientation, and wherein the one or more processors are further configured to execute the instructions to cause the electronic device to:

determine, based on the device parameter, a second dimension of the first layout container in the first orientation;

determine, based on first dimensions of the N child views in the first orientation, a third dimension;

determine, based on the second dimension and the inner margin, a fourth dimension;

determine M child views from the N child views when the third dimension is greater than the fourth dimension, wherein M is an integer less than N; and display, on the second interface based on the attribute values, the M child views.

19. A computer program product comprising computer-executable instructions that are stored on a non-transitory computer readable storage medium and that, when executed by one or more processors, cause an electronic device to:

install an application installation package of an application, wherein the application installation package comprises a first layout file indicating N child views and an enabled preset capability, wherein N is a positive integer, and wherein the enabled preset capability comprises one or more of an extension capability, a proportion capability, an equalization capability, a stretching capability, or a hiding capability;

receive, from a user on a first interface, a first operation;

determine, in response to the first operation and based on a device parameter of the electronic device and the enabled preset capability, attribute values of the N child views, wherein the device parameter comprises at least one of a screen type value of the electronic device, a screen dimension value of the electronic device, or a running status value of the electronic device, and wherein the attribute values indicate sizes of the N child views on a second interface and locations of the N child views on the second interface; and display, on the second interface based on the attribute values, the N child views.

20. The computer program product of claim 19, wherein the first layout file comprises a preset parameter corresponding to the enabled preset capability, and wherein the computer-executable instructions further cause the electronic device to further determine, based on the preset parameter, the attribute values.

\* \* \* \* \*

UNITED STATES PATENT AND TRADEMARK OFFICE
CERTIFICATE OF CORRECTION

PATENT NO. : 12,288,086 B2
APPLICATION NO. : 18/191378
DATED : April 29, 2025
INVENTOR(S) : Wei Zhong et al.

Page 1 of 1

It is certified that error appears in the above-identified patent and that said Letters Patent is hereby corrected as shown below:

On the Title Page

(72) Inventors: "Jun Zhu Guangdong (CN)" should read "Jun Zhu Shanghai (CN)"

In the Claims

Claim 1, Column 93, Line 27: "the received first operation" should read "the first operation"

Signed and Sealed this
Second Day of September, 2025

Coke Morgan Stewart
*Acting Director of the United States Patent and Trademark Office*